US012203631B2

(12) United States Patent
Kopitzke et al.

(10) Patent No.: US 12,203,631 B2
(45) Date of Patent: Jan. 21, 2025

(54) ROUND METAL HOUSING FOR A LIGHTING SYSTEM

(71) Applicant: DMF, Inc., Carson, CA (US)

(72) Inventors: Frederick William Kopitzke, Long Beach, CA (US); Ken Czech, Naperville, IL (US); Bao Khoa Vinh, Garden Grove, CA (US); Amir Lotfi, Redondo Beach, CA (US); Morteza Nejad, Rancho Palos Verdes, CA (US)

(73) Assignee: DMF, Inc., Carson, CA (US)

(*) Notice: Subject to any disclaimer, the term of this patent is extended or adjusted under 35 U.S.C. 154(b) by 336 days.

(21) Appl. No.: 17/378,214

(22) Filed: Jul. 16, 2021

(65) Prior Publication Data

US 2022/0018522 A1 Jan. 20, 2022

Related U.S. Application Data

(60) Provisional application No. 63/123,334, filed on Dec. 9, 2020, provisional application No. 63/061,160, filed (Continued)

(51) Int. Cl.

*F21V 15/01* (2006.01)
*F21S 8/04* (2006.01)
*H02G 3/12* (2006.01)

(52) U.S. Cl.

CPC ................ *F21V 15/01* (2013.01); *F21S 8/04* (2013.01); *H02G 3/12* (2013.01)

(58) Field of Classification Search

CPC ........... F21V 15/01; F21V 21/04; H02G 3/12; F21S 8/04

(Continued)

(56) References Cited

U.S. PATENT DOCUMENTS 1,133,535 A 3/1915 Cain et al.
1,454,722 A * 5/1923 Boutin .................. H02G 3/126 220/3.9

(Continued)

FOREIGN PATENT DOCUMENTS

CA 2243934 C 6/2002
CA 2502637 A1 9/2005

(Continued)

OTHER PUBLICATIONS

Notice of Allowance mailed Nov. 3, 2021 from U.S. Appl. No. 17/220,779, 7 pages.q (Continued)

*Primary Examiner* — J. Gregory Pickett
*Assistant Examiner* — Niki M Eloshway
(74) *Attorney, Agent, or Firm* — Smith Baluch LLP

(57) ABSTRACT

A housing assembly for a lighting system includes a single metal housing that functions as a can housing and a junction box and has a round geometry to improve ease of installation and support trims with smaller flanges. The housing includes a top component and one or more sidewall components. The sidewall component defines the desired round shape of the housing while the top component provides one or more flat surfaces to support one or more knockout features. For a remodel installation, the housing assembly further includes a spring clip assembly with a mounting ring and multiple spring clamps to securely couple the housing assembly to a drywall panel of a ceiling. For a new construction installation, the housing assembly further includes a bar hanger assembly to couple the housing to one or more support structures within the ceiling.

21 Claims, 104 Drawing Sheets

Related U.S. Application Data on Aug. 4, 2020, provisional application No. 63/052,915, filed on Jul. 16, 2020.

(58) Field of Classification Search
USPC ........................................................ 220/3.9
See application file for complete search history.

(56) References Cited

U.S. PATENT DOCUMENTS 1,471,340 A 10/1923 Knight
1,856,356 A 5/1932 Owen
2,038,784 A 4/1936 Ghadiali
2,179,161 A 11/1939 Rambusch
2,197,737 A 4/1940 Appleton
2,352,913 A 7/1944 Morrill
2,528,989 A 11/1950 Ammells
2,642,246 A 6/1953 Larry
2,670,919 A 3/1954 Vincent
2,697,535 A 12/1954 Olson
2,758,810 A 8/1956 Good
D180,844 S 8/1957 Poliakoff
2,802,933 A 8/1957 Broadwin
2,809,002 A 10/1957 Rudolph
2,998,512 A 8/1961 Duchene et al.
3,023,920 A 3/1962 Cook et al.
3,057,993 A 10/1962 Gellert
3,104,087 A 9/1963 Joseph et al.
3,214,126 A 10/1965 Roos
3,422,261 A 1/1969 McGinty
3,460,299 A 8/1969 Wilson
3,650,046 A 3/1972 Skinner
3,675,807 A 7/1972 Lund et al.
3,700,885 A 10/1972 Bobrick
3,711,053 A 1/1973 Drake
D227,989 S 7/1973 Geisel
3,773,968 A 11/1973 Copp
3,836,766 A 9/1974 Auerbach
3,874,035 A 4/1975 Schuplin
3,913,773 A 10/1975 Copp et al.
D245,905 S 9/1977 Taylor
4,050,603 A 9/1977 Harris et al.
4,062,512 A 12/1977 Arnold
4,088,827 A 5/1978 Kohaut
4,176,758 A 12/1979 Glick
D267,694 S 1/1983 Moriarty et al.
D267,695 S 1/1983 Paquette et al.
D267,775 S 2/1983 Holcombe
4,399,497 A 8/1983 Druffel
4,450,512 A 5/1984 Kristofek
4,520,435 A 5/1985 Baldwin
4,539,629 A 9/1985 Poppenheimer
4,601,145 A 7/1986 Wilcox
4,667,840 A 5/1987 Lindsey
4,723,747 A 2/1988 Karp et al.
4,729,080 A 3/1988 Fremont et al.
4,733,339 A 3/1988 Kelsall
4,754,377 A 6/1988 Wenman
4,770,311 A 9/1988 Wang
4,880,128 A 11/1989 Jorgensen
4,910,651 A 3/1990 Montanez
4,919,292 A 4/1990 Hsu
4,929,187 A 5/1990 Hudson et al.
4,930,054 A 5/1990 Krebs
5,044,582 A 9/1991 Walters
D326,537 S 5/1992 Gattari
5,216,203 A 6/1993 Gower
5,222,800 A 6/1993 Chan et al.
5,239,132 A 8/1993 Bartow
5,250,269 A 10/1993 Langer et al.
D340,856 S 11/1993 McHugh
D341,819 S 11/1993 Carlstrom
5,266,050 A 11/1993 O'Neil et al.
5,291,381 A 3/1994 Price
5,303,894 A 4/1994 Deschamps et al.
5,382,752 A 1/1995 Reyhan et al.
5,420,376 A 5/1995 Rajecki et al.
5,465,199 A 11/1995 Bray et al.
D365,165 S 12/1995 Stultz
5,505,419 A 4/1996 Gabrius
5,544,870 A 8/1996 Kelly et al.
5,562,343 A 10/1996 Chan et al.
5,571,993 A 11/1996 Jones et al.
5,580,158 A 12/1996 Aubrey et al.
5,588,737 A 12/1996 Kusmer
5,603,424 A 2/1997 Bordwell et al.
5,613,338 A 3/1997 Esposito
D381,111 S 7/1997 Lecluze
5,662,413 A 9/1997 Akiyama et al.
D386,277 S 11/1997 Lecluze
5,690,423 A 11/1997 Hentz et al.
D387,466 S 12/1997 Lecluze
5,738,436 A 4/1998 Cummings et al.
5,778,625 A 7/1998 Druffel et al.
5,836,678 A 11/1998 Wright et al.
5,942,726 A 8/1999 Reiker
5,944,412 A 8/1999 Janos et al.
5,957,573 A 9/1999 Wedekind et al.
6,030,102 A 2/2000 Gromotka
6,033,098 A 3/2000 Hentz et al.
6,076,788 A 6/2000 Akiyama
6,082,878 A 7/2000 Doubek et al.
6,095,669 A 8/2000 Cho
6,098,945 A 8/2000 Korcz
6,105,334 A 8/2000 Monson et al.
6,161,910 A 12/2000 Reisenauer et al.
6,170,685 B1 1/2001 Currier
6,174,076 B1 1/2001 Petrakis et al.
6,176,599 B1 1/2001 Farzen
6,267,491 B1 7/2001 Parrigin
6,332,597 B1 12/2001 Korcz et al.
6,350,043 B1 2/2002 Gloisten
6,350,046 B1 2/2002 Lau
6,364,511 B1 4/2002 Cohen
6,375,338 B1 4/2002 Cummings et al.
6,423,899 B1 * 7/2002 Reiker .................. H02G 3/126 220/3.9
D461,455 S 8/2002 Forbes
6,461,016 B1 10/2002 Jamison et al.
6,474,846 B1 11/2002 Kelmelis et al.
6,491,270 B1 12/2002 Pfaller
6,491,413 B1 12/2002 Benesohn
D468,697 S 1/2003 Straub, Jr.
6,515,313 B1 2/2003 Ibbetson et al.
6,521,833 B1 2/2003 DeFreitas
6,583,573 B2 6/2003 Bierman
6,585,389 B2 7/2003 Bonazzi
6,600,175 B1 7/2003 Baretz et al.
D478,872 S 8/2003 Heggem
6,632,006 B1 10/2003 Rippel et al.
6,657,236 B1 12/2003 Thibeault et al.
6,666,419 B1 12/2003 Vrame
D488,583 S 4/2004 Benghozi
6,719,438 B2 4/2004 Sevack et al.
6,758,578 B1 7/2004 Chou
6,777,615 B1 8/2004 Gretz
6,827,229 B2 12/2004 Dinh et al.
6,827,471 B1 12/2004 Benghozi
6,838,618 B2 1/2005 Newbold et al.
6,889,943 B2 5/2005 Dinh et al.
6,906,352 B2 6/2005 Edmond et al.
D509,314 S 9/2005 Rashidi
6,948,829 B2 9/2005 Verdes et al.
6,958,497 B2 10/2005 Emerson et al.
6,964,501 B2 11/2005 Ryan
6,967,284 B1 11/2005 Gretz
D516,235 S 2/2006 Rashidi
7,025,477 B2 4/2006 Blessing
7,064,269 B2 6/2006 Smith
D528,673 S 9/2006 Maxik et al.
7,102,172 B2 9/2006 Lynch
D531,740 S 11/2006 Maxik
D532,532 S 11/2006 Maxik
7,148,420 B1 12/2006 Johnson et al.
7,154,040 B1 12/2006 Tompkins

(56) References Cited

U.S. PATENT DOCUMENTS 7,170,015 B1 1/2007 Roesch et al.
D536,349 S 2/2007 Humber et al.
D537,039 S 2/2007 Pincek
D539,229 S 3/2007 Murphey
7,186,008 B2 3/2007 Patti
7,190,126 B1 3/2007 Paton
7,211,833 B2 5/2007 Slater, Jr. et al.
7,213,940 B1 5/2007 Van De Ven et al.
7,234,674 B2 6/2007 Rippel et al.
D547,889 S 7/2007 Huang
D552,969 S 10/2007 Bobrowski et al.
D553,267 S 10/2007 Yuen
D555,106 S 11/2007 Pape et al.
D556,144 S 11/2007 Dinh
7,297,870 B1 11/2007 Sartini
7,312,474 B2 12/2007 Emerson et al.
7,320,536 B2 1/2008 Petrakis et al.
D561,372 S 2/2008 Yan
D561,373 S 2/2008 Yan
7,335,920 B2 2/2008 Denbaars et al.
D563,896 S 3/2008 Greenslate
7,347,580 B2 3/2008 Blackman et al.
D570,012 S 5/2008 Huang
7,374,308 B2 5/2008 Sevack et al.
D570,504 S 6/2008 Maxik et al.
D570,505 S 6/2008 Maxik et al.
7,399,104 B2 7/2008 Rappaport
7,413,156 B1 8/2008 Cho
7,429,025 B1 9/2008 Gretz
D578,677 S 10/2008 Huang
7,431,482 B1 10/2008 Morgan et al.
7,432,440 B2 10/2008 Hull et al.
7,442,883 B2 10/2008 Jolly et al.
7,446,345 B2 11/2008 Emerson et al.
7,470,048 B2 12/2008 Wu
7,473,005 B2 1/2009 O'Brien
7,488,097 B2 2/2009 Reisenauer et al.
7,494,258 B2 2/2009 McNaught
7,503,145 B2 3/2009 Newbold et al.
7,510,159 B2 3/2009 Rippel
7,524,089 B2 4/2009 Park
D591,894 S 5/2009 Flank
D592,945 S 5/2009 Mahan
7,534,989 B2 5/2009 Suehara et al.
D596,154 S 7/2009 Rivkin
7,566,154 B2 7/2009 Gloisten et al.
D599,040 S 8/2009 Alexander et al.
D600,836 S 9/2009 Hanley et al.
7,588,359 B2 9/2009 Coushaine et al.
7,592,583 B2 9/2009 Page et al.
D606,696 S 12/2009 Chen et al.
7,628,513 B2 12/2009 Chiu
7,651,238 B2 1/2010 O'Brien
D611,650 S 3/2010 Broekhoff
7,670,021 B2 3/2010 Chou
7,673,841 B2 3/2010 Wronski
7,677,766 B2 3/2010 Boyer
D613,444 S 4/2010 Rashidi
7,692,182 B2 4/2010 Bergmann et al.
7,699,283 B2 * 4/2010 Vrame .................. H02G 3/381
220/3.9
7,704,763 B2 4/2010 Fujii et al.
D616,118 S 5/2010 Thomas et al.
7,722,208 B1 5/2010 Dupre et al.
7,722,227 B2 5/2010 Zhang et al.
7,735,795 B2 6/2010 Wronski
7,735,798 B2 6/2010 Kojima
7,748,887 B2 7/2010 Zampini, II et al.
7,766,518 B2 8/2010 Piepgras et al.
7,769,192 B2 8/2010 Takagi et al.
7,771,082 B2 8/2010 Peng
7,771,094 B2 8/2010 Goode
7,784,754 B2 8/2010 Nevers et al.
D624,692 S 9/2010 Mackin et al.
D625,847 S 10/2010 Maglica
D625,876 S 10/2010 Chen et al.
7,810,775 B2 10/2010 Ponte et al.
D627,507 S 11/2010 Lai et al.
D627,727 S 11/2010 Alexander et al.
7,828,465 B2 11/2010 Roberge et al.
D629,366 S 12/2010 Ericson et al.
7,845,393 B2 12/2010 Kao et al.
7,857,275 B2 12/2010 de la Borbolla
7,871,184 B2 1/2011 Peng
7,874,539 B2 1/2011 Wright et al.
7,874,709 B1 1/2011 Beadle
D633,224 S 2/2011 Lee
D636,903 S 4/2011 Torenbeek
D637,339 S 5/2011 Hasan et al.
D637,340 S 5/2011 Hasan et al.
7,950,832 B2 5/2011 Tanaka et al.
D639,499 S 6/2011 Choi et al.
D640,819 S 6/2011 Pan
7,956,546 B2 6/2011 Hasnain
7,959,332 B2 6/2011 Tickner et al.
7,967,480 B2 6/2011 Pickard et al.
D642,317 S 7/2011 Rashidi
7,972,035 B2 7/2011 Boyer
7,972,043 B2 7/2011 Schutte
D642,536 S 8/2011 Robinson
D643,970 S 8/2011 Kim et al.
7,993,037 B1 8/2011 Buse
8,002,425 B2 8/2011 Russo et al.
D646,011 S 9/2011 Rashidi
8,013,243 B2 9/2011 Korcz et al.
8,038,113 B2 10/2011 Fryzek et al.
D648,476 S 11/2011 Choi et al.
D648,477 S 11/2011 Kim et al.
D650,115 S 12/2011 Kim et al.
8,070,328 B1 12/2011 Knoble et al.
8,096,670 B2 1/2012 Trott
D654,205 S 2/2012 Rashidi
D655,436 S 3/2012 Johnson
D656,262 S 3/2012 Yoshinobu et al.
D656,263 S 3/2012 Ogawa et al.
8,142,057 B2 3/2012 Roos et al.
8,152,334 B2 4/2012 Krogman
D658,788 S 5/2012 Dudik et al.
D658,802 S 5/2012 Chen
D659,862 S 5/2012 Tsai
D659,879 S 5/2012 Rashidi
D660,814 S 5/2012 Wilson
8,177,176 B2 5/2012 Nguyen et al.
8,182,116 B2 5/2012 Zhang et al.
8,201,968 B2 6/2012 Maxik et al.
D663,058 S 7/2012 Pan
D663,466 S 7/2012 Rashidi
D664,274 S 7/2012 de Visser et al.
D664,705 S 7/2012 Kong et al.
8,215,805 B2 7/2012 Cogliano et al.
8,220,970 B1 7/2012 Khazi et al.
8,226,270 B2 7/2012 Yamamoto et al.
8,235,549 B2 8/2012 Gingrich, III et al.
8,240,630 B2 8/2012 Wronski
D667,155 S 9/2012 Rashidi
8,262,255 B1 9/2012 Rashidi
D668,372 S 10/2012 Renshaw et al.
D668,809 S 10/2012 Rashidi
D669,198 S 10/2012 Qui
D669,199 S 10/2012 Chuang
D669,620 S 10/2012 Rashidi
8,277,090 B2 10/2012 Fryzek et al.
8,308,322 B2 11/2012 Santiago et al.
D673,869 S 1/2013 Yu
D676,263 S 2/2013 Birke
D676,814 S 2/2013 Paul
8,376,593 B2 2/2013 Bazydola et al.
D677,417 S 3/2013 Rashidi
D677,634 S 3/2013 Korcz et al.
D679,047 S 3/2013 Tickner et al.
8,403,289 B1 * 3/2013 Rinderer ................ H02G 3/126
220/3.9
8,403,533 B1 3/2013 Paulsel
8,403,541 B1 3/2013 Rashidi

(56) References Cited

U.S. PATENT DOCUMENTS 8,405,947 B1 3/2013 Green et al.
D681,259 S 4/2013 Kong
8,408,759 B1 4/2013 Rashidi
D682,459 S 5/2013 Gordin et al.
D683,063 S 5/2013 Lopez et al.
D683,890 S 6/2013 Lopez et al.
D684,269 S 6/2013 Wang et al.
D684,719 S 6/2013 Rashidi
D685,118 S 6/2013 Rashidi
D685,120 S 6/2013 Rashidi
8,454,204 B1 6/2013 Chang et al.
D685,507 S 7/2013 Sun
D687,586 S 8/2013 Rashidi
D687,587 S 8/2013 Rashidi
D687,588 S 8/2013 Rashidi
D687,980 S 8/2013 Gravely et al.
D688,405 S 8/2013 Kim et al.
8,506,127 B2 8/2013 Russello et al.
8,506,134 B2 8/2013 Wilson et al.
D690,049 S 9/2013 Rashidi
D690,864 S 10/2013 Rashidi
D690,865 S 10/2013 Rashidi
D690,866 S 10/2013 Rashidi
D691,314 S 10/2013 Rashidi
D691,315 S 10/2013 Samson
D691,763 S 10/2013 Hand et al.
8,550,669 B2 10/2013 Macwan et al.
D693,043 S 11/2013 Schmalfuss et al.
D693,517 S 11/2013 Davis
D694,456 S 11/2013 Rowlette, Jr. et al.
8,573,816 B2 11/2013 Negley et al.
D695,441 S 12/2013 Lui et al.
D696,446 S 12/2013 Huh
D696,447 S 12/2013 Huh
D696,448 S 12/2013 Huh
8,602,601 B2 12/2013 Khazi et al.
D698,067 S 1/2014 Rashidi
D698,068 S 1/2014 Rashidi
8,622,361 B2 1/2014 Wronski
8,632,040 B2 1/2014 Mass et al.
D698,985 S 2/2014 Lopez et al.
D699,384 S 2/2014 Rashidi
D699,687 S 2/2014 Baldwin et al.
D700,387 S 2/2014 Snell
8,641,243 B1 2/2014 Rashidi
8,659,034 B2 2/2014 Baretz et al.
D700,991 S 3/2014 Johnson et al.
D701,175 S 3/2014 Baldwin et al.
D701,466 S 3/2014 Clifford et al.
8,672,518 B2 3/2014 Boomgaarden et al.
D702,867 S 4/2014 Kim et al.
D703,843 S 4/2014 Cheng
8,684,569 B2 4/2014 Pickard et al.
D705,472 S 5/2014 Huh
D705,481 S 5/2014 Zhang et al.
8,727,582 B2 5/2014 Brown et al.
D708,381 S 7/2014 Rashidi
8,777,449 B2 7/2014 Ven et al.
D710,529 S 8/2014 Lopez et al.
8,801,217 B2 8/2014 Oehle et al.
8,833,013 B2 9/2014 Harman
8,845,144 B1 9/2014 Davies et al.
D714,989 S 10/2014 Rowlette, Jr. et al.
8,870,426 B2 10/2014 Biebl et al.
8,890,414 B2 11/2014 Rowlette, Jr. et al.
D721,845 S 1/2015 Lui et al.
8,926,133 B2 1/2015 Booth
8,939,418 B2 1/2015 Green et al.
D722,296 S 2/2015 Taylor
D722,977 S 2/2015 Hagarty
D722,978 S 2/2015 Hagarty
8,950,898 B2 2/2015 Catalano
8,967,575 B1 3/2015 Gretz
D726,363 S 4/2015 Danesh
D726,949 S 4/2015 Redfern
9,004,435 B2 4/2015 Wronski
9,039,254 B2 5/2015 Danesh
D731,689 S 6/2015 Bernard et al.
9,062,866 B1 6/2015 Christ et al.
9,065,264 B2 6/2015 Cooper et al.
9,068,719 B2 6/2015 Van De Ven et al.
9,068,722 B2 6/2015 Wronski et al.
D734,525 S 7/2015 Gordin et al.
D735,012 S 7/2015 Cowie
D735,142 S 7/2015 Hagarty
9,078,299 B2 7/2015 Ashdown
9,109,783 B1 8/2015 Davis et al.
D739,355 S 9/2015 D'Aubeterre
D739,590 S 9/2015 Redfern
9,140,441 B2 9/2015 Goelz et al.
D742,325 S 10/2015 Leung
9,151,457 B2 10/2015 Pickard et al.
9,151,477 B2 10/2015 Pickard et al.
9,217,560 B2 12/2015 Harbers et al.
9,222,661 B2 12/2015 Kim et al.
9,239,131 B1 1/2016 Wronski et al.
D750,317 S 2/2016 Lui et al.
9,285,103 B2 3/2016 Van De Ven et al.
9,291,319 B2 3/2016 Kathawate et al.
9,301,362 B2 3/2016 Dohn et al.
D754,078 S 4/2016 Baldwin et al.
D754,079 S 4/2016 Baldwin et al.
D754,605 S 4/2016 McMillan
9,303,812 B2 4/2016 Green et al.
9,310,038 B2 4/2016 Athalye
9,322,543 B2 4/2016 Hussell et al.
9,347,655 B2 5/2016 Boomgaarden et al.
9,366,418 B2 6/2016 Gifford
9,371,966 B2 6/2016 Rowlette, Jr. et al.
D762,181 S 7/2016 Lin
9,395,051 B2 7/2016 Hussell et al.
D762,906 S 8/2016 Jeswani et al.
D764,079 S 8/2016 Wu
9,417,506 B1 8/2016 Tirosh
D766,185 S 9/2016 Hagarty
D767,199 S 9/2016 Wronski et al.
9,447,917 B1 9/2016 Wronski et al.
D768,325 S 10/2016 Xu
D768,326 S 10/2016 Guzzini
D769,501 S 10/2016 Jeswani et al.
D770,065 S 10/2016 Tittle
D770,076 S 10/2016 Li et al.
9,476,552 B2 10/2016 Myers et al.
D776,324 S 1/2017 Gierl et al.
D777,967 S 1/2017 Redfern
9,534,751 B2 1/2017 Maglica et al.
D778,241 S 2/2017 Holbrook et al.
D778,484 S 2/2017 Guzzini
D779,100 S 2/2017 Redfern
9,581,302 B2 2/2017 Danesh
9,583,926 B2 2/2017 Ye
9,599,315 B1 3/2017 Harpenau et al.
9,605,842 B1 3/2017 Davis
9,605,910 B2 3/2017 Swedberg et al.
D785,228 S 4/2017 Guzzini
D786,472 S 5/2017 Redfern
D786,473 S 5/2017 Dean
D786,474 S 5/2017 Fujisawa
D788,330 S 5/2017 Johnson et al.
D790,102 S 6/2017 Guzzini
9,673,597 B2 6/2017 Lee
9,689,541 B2 6/2017 Wronski
D791,709 S 7/2017 Holton
D791,711 S 7/2017 Holton
D791,712 S 7/2017 Holton
9,696,021 B2 7/2017 Wronski
9,702,516 B1 7/2017 Vasquez et al.
D795,820 S 8/2017 Wengreen
9,732,904 B1 8/2017 Wronski
9,739,464 B2 8/2017 Wronski
9,791,111 B1 10/2017 Huang et al.
9,797,562 B2 10/2017 Dabiet et al.
9,803,839 B2 10/2017 Visser et al.
D805,660 S 12/2017 Creasman et al.

(56) References Cited

U.S. PATENT DOCUMENTS

| | | | |
|---|---|---|---|
| D805,881 S | 12/2017 | Nehls | |
| 9,854,642 B2 | 12/2017 | Kashani | |
| D809,176 S | 1/2018 | Partington | |
| 9,863,619 B2 | 1/2018 | Mak | |
| D809,465 S | 2/2018 | Keirstead | |
| 9,945,548 B2 | 4/2018 | Williams et al. | |
| 9,964,266 B2 | 5/2018 | Danesh | |
| D819,879 S | 6/2018 | Oudina et al. | |
| D820,494 S | 6/2018 | Cohen | |
| 9,995,441 B2 | 6/2018 | Power et al. | |
| 10,006,613 B2 | 6/2018 | Oudina et al. | |
| D824,494 S | 7/2018 | Martins et al. | |
| D827,903 S | 9/2018 | Wu | |
| 10,072,805 B2 | 9/2018 | Bailey | |
| D832,218 S | 10/2018 | Wronski et al. | |
| D833,977 S | 11/2018 | Danesh et al. | |
| 10,125,959 B2 | 11/2018 | Cohen | |
| 10,139,059 B2 | 11/2018 | Danesh | |
| D834,928 S | 12/2018 | Lu et al. | |
| D836,976 S | 1/2019 | Reese et al. | |
| 10,244,607 B1 | 3/2019 | Kashani | |
| D847,414 S | 4/2019 | Danesh et al. | |
| D847,415 S | 4/2019 | Danesh et al. | |
| 10,247,390 B1 | 4/2019 | Kopitzke et al. | |
| D848,375 S | 5/2019 | Danesh et al. | |
| 10,281,131 B2 | 5/2019 | Cohen | |
| 10,295,163 B1 | 5/2019 | Cohen | |
| D851,046 S | 6/2019 | Peng et al. | |
| 10,408,395 B2 | 9/2019 | Danesh | |
| 10,408,396 B2 | 9/2019 | Wronski et al. | |
| D864,877 S | 10/2019 | Danesh | |
| 10,488,000 B2 | 11/2019 | Danesh et al. | |
| 10,541,522 B2 | 1/2020 | Lalancette | |
| 10,551,044 B2 | 2/2020 | Peng et al. | |
| 10,563,850 B2 | 2/2020 | Danesh | |
| D877,957 S | 3/2020 | Kopitzke, IV | |
| 10,591,120 B2 | 3/2020 | Bailey et al. | |
| 10,609,785 B1 | 3/2020 | Fardadi et al. | |
| 10,663,127 B2 | 5/2020 | Danesh et al. | |
| 10,663,153 B2 | 5/2020 | Nikooyan et al. | |
| 10,683,994 B2 | 6/2020 | Wronski et al. | |
| 10,684,003 B2 | 6/2020 | Wronski et al. | |
| D892,069 S | 8/2020 | Cohen | |
| 10,753,558 B2 | 8/2020 | Danesh | |
| 10,808,917 B2 | 10/2020 | Harris et al. | |
| 10,816,148 B2 | 10/2020 | Danesh | |
| D901,398 S | 11/2020 | Danesh et al. | |
| D902,160 S | 11/2020 | Cohen | |
| D902,871 S | 11/2020 | Danesh et al. | |
| D903,605 S | 12/2020 | Danesh et al. | |
| D905,327 S | 12/2020 | Williams et al. | |
| D907,284 S | 1/2021 | Danesh et al. | |
| 10,975,570 B2 | 4/2021 | Shen | |
| 10,982,829 B2 | 4/2021 | Danesh | |
| 11,015,785 B1 * | 5/2021 | Schubert | F21V 25/125 |
| 11,022,259 B2 | 6/2021 | Bailey et al. | |
| 11,028,982 B2 | 6/2021 | Danesh | |
| 11,047,538 B2 | 6/2021 | Danesh et al. | |
| D924,467 S | 7/2021 | Danesh et al. | |
| D925,109 S | 7/2021 | Danesh et al. | |
| 11,060,705 B1 | 7/2021 | Danesh et al. | |
| 11,067,231 B2 | 7/2021 | Lotfi et al. | |
| D927,430 S | 8/2021 | Cohen et al. | |
| 11,085,597 B2 | 8/2021 | Danesh | |
| 11,118,768 B2 | 9/2021 | Danesh | |
| D934,665 S | 11/2021 | Cronkhite et al. | |
| D939,134 S | 12/2021 | Danesh et al. | |
| D940,545 S | 1/2022 | Tanner et al. | |
| 11,231,154 B2 | 1/2022 | Kopitzke et al. | |
| D944,212 S | 2/2022 | Peng et al. | |
| 11,242,983 B2 | 2/2022 | Danesh | |
| 11,255,497 B2 | 2/2022 | Danesh | |
| 11,274,821 B2 | 3/2022 | Danesh | |
| 11,306,903 B2 | 4/2022 | Young | |
| 11,391,442 B2 | 7/2022 | Danesh | |
| 11,435,064 B1 | 9/2022 | Danesh | |
| 11,435,066 B2 | 9/2022 | Danesh | |
| 11,448,384 B2 | 9/2022 | Nikooyan et al. | |
| D966,877 S | 10/2022 | Kopitzke et al. | |
| D970,081 S | 11/2022 | Kopitzke et al. | |
| 11,800,617 B2 | 10/2023 | Kumar et al. | |
| 2002/0172047 A1 | 11/2002 | Ashley | |
| 2003/0006353 A1 | 1/2003 | Dinh et al. | |
| 2003/0021104 A1 | 1/2003 | Tsao | |
| 2003/0092323 A1 | 5/2003 | Chou | |
| 2004/0001337 A1 | 1/2004 | Defouw et al. | |
| 2004/0120141 A1 | 6/2004 | Beadle | |
| 2005/0121215 A1 | 6/2005 | Halbert | |
| 2005/0225966 A1 | 10/2005 | Hartmann et al. | |
| 2005/0227536 A1 | 10/2005 | Gamache et al. | |
| 2005/0231962 A1 | 10/2005 | Koba et al. | |
| 2005/0237746 A1 | 10/2005 | Yiu | |
| 2006/0005988 A1 | 1/2006 | Jorgensen | |
| 2006/0158873 A1 | 7/2006 | Newbold et al. | |
| 2006/0215408 A1 | 9/2006 | Lee | |
| 2006/0237601 A1 | 10/2006 | Rinderer | |
| 2006/0243877 A1 | 11/2006 | Rippel | |
| 2006/0262536 A1 | 11/2006 | Nevers | |
| 2006/0262545 A1 | 11/2006 | Piepgras et al. | |
| 2007/0012847 A1 | 1/2007 | Tai | |
| 2007/0035951 A1 | 2/2007 | Tseng | |
| 2007/0121328 A1 | 5/2007 | Mondloch et al. | |
| 2007/0131827 A1 | 6/2007 | Nevers et al. | |
| 2007/0185675 A1 | 8/2007 | Papamichael et al. | |
| 2007/0200039 A1 | 8/2007 | Petak | |
| 2007/0206374 A1 | 9/2007 | Petrakis et al. | |
| 2008/0002414 A1 | 1/2008 | Miletich et al. | |
| 2008/0068847 A1 | 3/2008 | Bedard | |
| 2008/0112168 A1 | 5/2008 | Pickard et al. | |
| 2008/0112170 A1 | 5/2008 | Trott | |
| 2008/0112171 A1 | 5/2008 | Patti et al. | |
| 2008/0137347 A1 | 6/2008 | Trott et al. | |
| 2008/0165545 A1 | 7/2008 | O'Brien | |
| 2008/0170404 A1 | 7/2008 | Steer et al. | |
| 2008/0186718 A1 | 8/2008 | Magisano et al. | |
| 2008/0224008 A1 | 9/2008 | Dal Ponte et al. | |
| 2008/0232116 A1 | 9/2008 | Kim | |
| 2008/0285271 A1 | 11/2008 | Roberge et al. | |
| 2009/0003009 A1 | 1/2009 | Tessnow et al. | |
| 2009/0034261 A1 | 2/2009 | Grove | |
| 2009/0080189 A1 | 3/2009 | Wegner | |
| 2009/0097262 A1 | 4/2009 | Zhang et al. | |
| 2009/0135613 A1 | 5/2009 | Peng | |
| 2009/0141500 A1 | 6/2009 | Peng | |
| 2009/0141506 A1 | 6/2009 | Lan et al. | |
| 2009/0141508 A1 | 6/2009 | Peng | |
| 2009/0147517 A1 | 6/2009 | Li | |
| 2009/0161356 A1 | 6/2009 | Negley et al. | |
| 2009/0237924 A1 | 9/2009 | Ladewig | |
| 2009/0280695 A1 | 11/2009 | Sekela et al. | |
| 2009/0283292 A1 | 11/2009 | Lehr | |
| 2009/0290343 A1 | 11/2009 | Brown et al. | |
| 2010/0014282 A1 | 1/2010 | Danesh | |
| 2010/0033095 A1 | 2/2010 | Sadwick | |
| 2010/0061108 A1 | 3/2010 | Zhang et al. | |
| 2010/0110690 A1 | 5/2010 | Hsu et al. | |
| 2010/0110698 A1 | 5/2010 | Harwood et al. | |
| 2010/0110699 A1 | 5/2010 | Chou | |
| 2010/0148673 A1 | 6/2010 | Stewart et al. | |
| 2010/0149822 A1 | 6/2010 | Cogliano et al. | |
| 2010/0155497 A1 | 6/2010 | Hagaman | |
| 2010/0165643 A1 | 7/2010 | Russo et al. | |
| 2010/0244709 A1 | 9/2010 | Steiner et al. | |
| 2010/0246172 A1 | 9/2010 | Liu | |
| 2010/0259919 A1 | 10/2010 | Khazi et al. | |
| 2010/0270903 A1 | 10/2010 | Jao et al. | |
| 2010/0277905 A1 | 11/2010 | Janik et al. | |
| 2010/0302778 A1 | 12/2010 | Dabiet et al. | |
| 2011/0043040 A1 | 2/2011 | Porter et al. | |
| 2011/0063831 A1 | 3/2011 | Cook | |
| 2011/0068687 A1 | 3/2011 | Takahasi et al. | |
| 2011/0069499 A1 | 3/2011 | Trott et al. | |
| 2011/0080750 A1 | 4/2011 | Jones et al. | |
| 2011/0116276 A1 | 5/2011 | Okamura et al. | |

(56) References Cited

U.S. PATENT DOCUMENTS

2011/0134634 A1 6/2011 Gingrich, III et al.
2011/0134651 A1 6/2011 Berman
2011/0170294 A1 7/2011 Mier-Langner et al.
2011/0194299 A1 8/2011 Crooks et al.
2011/0216534 A1 9/2011 Tickner et al.
2011/0226919 A1 9/2011 Fryzek et al.
2011/0255292 A1 10/2011 Shen
2011/0267828 A1 11/2011 Bazydola et al.
2012/0020104 A1 1/2012 Biebl et al.
2012/0074852 A1 3/2012 Delnoij
2012/0106176 A1 5/2012 Lopez et al.
2012/0113642 A1 5/2012 Catalano
2012/0140442 A1 6/2012 Woo et al.
2012/0140465 A1 6/2012 Rowlette, Jr. et al.
2012/0162994 A1 6/2012 Wasniewski et al.
2012/0182744 A1 7/2012 Santiago et al.
2012/0188762 A1 7/2012 Joung et al.
2012/0243237 A1 9/2012 Toda et al.
2012/0266449 A1 10/2012 Krupa
2012/0287625 A1 11/2012 Macwan et al.
2012/0305868 A1 12/2012 Callahan et al.
2012/0314429 A1 12/2012 Plunk
2013/0009552 A1 1/2013 Page
2013/0010476 A1 1/2013 Pickard et al.
2013/0033872 A1 2/2013 Randolph et al.
2013/0051012 A1 2/2013 Oehle et al.
2013/0083529 A1 4/2013 Gifford
2013/0141913 A1 6/2013 Sachsenweger
2013/0163254 A1 6/2013 Chang et al.
2013/0170233 A1 7/2013 Nezu et al.
2013/0227908 A1 9/2013 Gulbrandsen et al.
2013/0258677 A1 10/2013 Fryzek et al.
2013/0265750 A1 10/2013 Pickard et al.
2013/0271989 A1 10/2013 Hussell et al.
2013/0294084 A1 11/2013 Kathawate et al.
2013/0301252 A1 11/2013 Hussell et al.
2013/0322062 A1 12/2013 Danesh
2013/0335980 A1 12/2013 Nakasuji et al.
2014/0036497 A1 2/2014 Hussel et al.
2014/0049957 A1 2/2014 Goelz et al.
2014/0063776 A1 3/2014 Clark et al.
2014/0071679 A1 3/2014 Booth
2014/0071687 A1 3/2014 Tickner et al.
2014/0140490 A1 5/2014 Roberts et al.
2014/0063818 A1 6/2014 Randolph et al.
2014/0254177 A1 9/2014 Danesh
2014/0268869 A1 9/2014 Blessitt et al.
2014/0299730 A1 10/2014 Green et al.
2014/0347848 A1 11/2014 Pisavadia et al.
2015/0009676 A1 1/2015 Danesh
2015/0085500 A1 3/2015 Cooper et al.
2015/0092449 A1 4/2015 Demuynck et al.
2015/0138779 A1 5/2015 Livesay et al.
2015/0153635 A1 6/2015 Chen et al.
2015/0184837 A1 7/2015 Zhang et al.
2015/0198324 A1 7/2015 O'Brien et al.
2015/0233556 A1 8/2015 Danesh
2015/0263497 A1 9/2015 Korcz et al.
2015/0276185 A1 10/2015 Bailey et al.
2016/0084488 A1 3/2016 Wu Weiquan et al.
2016/0209007 A1 7/2016 Belmonte et al.
2016/0230969 A1 8/2016 Pelletier et al.
2016/0238225 A1 8/2016 Doust
2016/0308342 A1 10/2016 Witherbee et al.
2016/0312987 A1 10/2016 Danesh
2016/0348861 A1 12/2016 Bailey et al.
2016/0366738 A1 12/2016 Boulanger et al.
2017/0003007 A1 1/2017 Wronski
2017/0045213 A1 2/2017 Williams et al.
2017/0059135 A1 3/2017 Jones
2017/0138576 A1 5/2017 Peng et al.
2017/0138581 A1 5/2017 Doust
2017/0167672 A1 6/2017 Stauner et al.
2017/0167699 A1 6/2017 Schubert et al.
2017/0307188 A1 10/2017 Oudina et al.
2017/0307198 A1 10/2017 Shah et al.
2018/0119907 A1 5/2018 O'Brien et al.
2018/0123351 A1 5/2018 Andrews et al.
2018/0142871 A1 5/2018 Morales
2018/0216809 A1 8/2018 Cohen
2018/0224095 A1 8/2018 Cohen
2018/0231197 A1 8/2018 Danesh
2018/0283677 A1 10/2018 Cohen
2019/0032874 A1 1/2019 Bonnetto et al.
2019/0049080 A1 2/2019 Danesh
2019/0063701 A1 2/2019 Lotfi et al.
2019/0063724 A1 2/2019 Vice et al.
2019/0093836 A1 3/2019 Danesh
2019/0195475 A1 6/2019 Jones
2019/0249852 A1 8/2019 Kim
2019/0301710 A1* 10/2019 Harris .................... F21S 8/026
2020/0182420 A1 6/2020 Cohen et al.
2020/0291652 A1 9/2020 Shen
2020/0323073 A1 10/2020 Cartrette et al.
2020/0393118 A1 12/2020 Danesh et al.
2021/0010647 A1 1/2021 Danesh et al.
2021/0010663 A1 1/2021 Nikooyan et al.
2021/0033268 A1 2/2021 Danesh
2021/0045221 A1 2/2021 Dejonge et al.
2021/0080081 A1 3/2021 Cohen
2021/0080084 A1 3/2021 Danesh et al.
2021/0222845 A1 7/2021 Kopitzke et al.
2021/0254812 A1 8/2021 Danesh et al.
2021/0364139 A1 11/2021 Danesh
2022/0018523 A1 1/2022 Vinh et al.
2022/0018525 A1 1/2022 Danesh
2022/0042664 A1 2/2022 Lotfi et al.
2022/0049841 A1 2/2022 Young et al.
2022/0082233 A1 3/2022 Kopitzke et al.
2022/0085610 A1 3/2022 Dejonge et al.
2023/0125086 A1* 4/2023 Ungaro ................ F21V 21/041
362/404

FOREIGN PATENT DOCUMENTS

CA 2691480 C 4/2012
CA 2734369 A1 10/2013
CA 2561459 A1 11/2013
CA 2815067 11/2013
CA 2848289 A1 10/2014
CN 2182475 Y 11/1994
CN 1309618 A 8/2001
CN 201059503 Y 5/2008
CN 201259125 Y 6/2009
CN 101608781 A 12/2009
CN 201636626 U 11/2010
CN 102062373 A 5/2011
CN 202014067 U 10/2011
CN 202392473 U 8/2012
CN 202733693 U 2/2013
CN 103307518 A 9/2013
CN 103322476 A 9/2013
CN 203215483 U 9/2013
CN 101498411 B 11/2013
CN 203273663 U 11/2013
CN 203297980 U 11/2013
CN 203628464 U 12/2013
CN 203641919 U 6/2014
CN 104654142 A 5/2015
CN 204513161 U 7/2015
CN 204611541 U 9/2015
CN 204786225 U 11/2015
CN 204829578 U 12/2015
CN 103712135 B 4/2016
CN 205606362 U 9/2016
CN 206130742 U 4/2017
CN 103154606 B 5/2017
DE 9109828 U1 2/1992
EP 1 589 289 10/2005
EP 1 672 155 A1 6/2006
EP 1688663 8/2006
EP 2 306 072 A1 4/2011
EP 2 453 169 A2 5/2012
EP 2 193 309 B1 7/2012

(56) References Cited

FOREIGN PATENT DOCUMENTS

| | | | |
|---|---|---|---|
| EP | 3 104 024 | A1 | 12/2016 |
| GB | 2325728 | | 12/1998 |
| GB | 2427020 | A | 12/2006 |
| GB | 2466875 | | 7/2010 |
| GB | 2471929 | | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| KR | 1020110008796 | A | 1/2011 |
| KR | 1020120061625 | A | 6/2012 |
| MX | 2011002947 | A | 9/2011 |
| PH | 3-2018-658-0001 | | 7/2018 |
| TW | 474382 | U | 1/2002 |
| WO | WO 2013/128896 | A1 | 9/2013 |
| WO | WO 2015/000212 | A1 | 1/2015 |
| WO | WO 2016152166 | A2 | 9/2016 |
| WO | WO 2022/056180 | | 3/2022 |

OTHER PUBLICATIONS

Notice of Allowance mailed Nov. 5, 2021 1 from U.S. Appl. No. 17/318,193, 11 pages.
Non-Final Office Action mailed Nov. 5, 2021 from U.S. Appl. No. 17/379,748, 8 pages.
Notice of Allowance mailed Nov. 8, 2021 1 from U.S. Appl. No. 29/764,875, 5 pages.
Non-Final Office Action mailed Nov. 15, 2021 from U.S. Appl. No. 17/374,674, 7 pages.
Final Office Action mailed Nov. 16, 2021 from U.S. Appl. No. 17/099,650, 14 pages.
Notice of Allowance mailed Nov. 22, 2021 from U.S. Appl. No. 29/694,475, 7 pages.
Notice of Allowance mailed Nov. 24, 2021 from U.S. Appl. No. 17/234,421, 9 pages.
Non-Final Office Action mailed Nov. 30, 2021 from U.S. Appl. No. 17/395,522, 28 pages.
Non-Final Office Action mailed Dec. 1, 2021 from U.S. Appl. No. 16/883,144, 23 pages.
Corrected Notice of Allowance mailed Dec. 10, 2021 from U.S. Appl. No. 17/234,421, 2 pages.
Non-Final Office Action mailed Dec. 13, 2021 from U.S. Appl. No. 29/711,198, 8 pages.
Corrected Notice of Allowance mailed Jan. 11, 2022 from U.S. Appl. No. 29/694,475, 2 pages.
Corrected Notice of Allowance mailed Jan. 12, 2022 from U.S. Appl. No. 16/779,865, 9 pages.
Non-Final Office Action mailed Jan. 21, 2022 from U.S. Appl. No. 17/229,668, 5 pages.
Notice of Allowance from U.S. Appl. No. 17/379,748 mailed Feb. 16, 2022, 5 pages.
"12 Pack" reference by Hykolity on Amazon.com, date first available Nov. 7, 2019 [online], available from internet URL: https://www.amazon.com/dp/B081655CDL/ref=cm_sw_em_r_mt_dp_8NAZD4R3MTTP59290SG3?_encoding=UTF8&th=1 (Year: 2019) (6 pages).
"Halo" reference by Amazon.com, date first available Aug. 4, 2017 [online], site visited Jan. 31, 2022, available from internet URL: https://www.amazon.com/dp/B074K234DL/ref=cm_sw_em_r_mt_dp_P7H78BZ413RNSQ55NVTR (Year: 2013) (6 pages).
"Juno Lighting" reference by Express Electric on Amazon.com, date first available Feb. 14, 2008 [online], site visited Jan. 31, 2022, available from internet URL: https://www.amazon.com/Juno-Lighting-TC44R-Retrofit-Downlight/dp/BOOOOD I2HT/ref=psdc_6355949011_12_B078X1D488?th=1 (Year: 2008) (6 pages).
"Sunco Lighting" reference by Sunco Lighting on Amazon.com, date first available Sep. 21, 2018 [online], site visited Jan. 31, 2022, available from internet URL: https://www.amazon.com/Sunco-Lighting-Construction-Downlight-Electrician/dp/B07D92B5DL?th=1 ( Year: 2018) (6 pages).
Non-Final Office Action mailed Feb. 16, 2022 from U.S. Appl. No. 29/743,066, 6 pages.
Notice of Allowance mailed Feb. 14, 2022 from U.S. Appl. No. 17/473,934, 9 pages.
Non-Final Office Action mailed Feb. 25, 2022 from U.S. Appl. No. 17/384,564 28 pages.
Notice of Allowance mailed Mar. 11, 2022 from U.S. Appl. No. 17/118,742 13 pages.
Notice of Allowance Mailed Apr. 27, 2022 from U.S. Appl. No. 16/883,144, 11 pages.
Notice of Allowance Mailed Apr. 27, 2022 from U.S. Appl. No. 17/374,674, 7 pages.
Notice of Allowance Mailed Apr. 27, 2022 from U.S. Appl. No. 17/473,934, 9 pages.
2006 International Building Code, Section 712 Penetrations, Jan. 2006, 4 pages.
Acrich COB Zhaga Module, Product Description, Seoul Semiconductor, Nov. 11, 2016, 39 pages.
<https://www.zhagastandard.org/books/book18/>, Mar. 2017, 5 pages. Accessed on May 14, 2018.
BXUV.GuideInfo, Fire Resistance Ratings—ANSI/UL 263, UL Online Certifications Directory, last updated Nov. 3, 2016, 27 pages.
CEYY.GuideInfo, Outlet Boxes and Fittings Certified for Fire Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.
Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Cree LED Lamp Family Sales Sheet—Better light is beautiful light , Apr. 24, 2017, 2 pages.
DME Series Installation Instructions, Oct. 18, 2011, 2 pages.
DMF, Inc., "dmfLIGHTING: LED Recessed Lighting Solutions," Info sheets, Mar. 15, 2012, 4 pages.
DMF, Inc., "dmfLIGHTING: LED Recessed Downlighting," DRD2 Product Brochure, Oct. 23, 2014, 50 pages.
DMF, Inc., "dmfLIGHTING: LED Recessed Downlighting," Product Catalog, Aug. 2012, 68 pages.
Final Office Action mailed Apr. 27, 2016 from U.S. Appl. No. 14/184,601, 19 pages.
Final Office Action mailed Jul. 26, 2017 from U.S. Appl. No. 14/184,601, 18 pages.
Final Office Action mailed Jan. 29, 2016 from U.S. Appl. No. 14/183,424, 21 pages.
Final Office Action mailed Jun. 23, 2016 from U.S. Appl. No. 13/484,901, 18 pages.
Final Office Action mailed Apr. 2, 2015 from U.S. Appl. No. 13/484,901, 13 pages.
Halo, Halo LED H4 H7 Collection, SustainabLEDesign, Cooper Lighting, (emphasis on p. 18 "H7 Collection LED Modules—Halo LED H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into

(56) References Cited

OTHER PUBLICATIONS

Halo H750x Series LED—only (Non-Screw Based), Recessed Fixture, p. 4, Oct. 20, 2009, 4 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance mailed Mar. 26, 2018 for U.S. Appl. No. 14/184,601, 10 pages.
Non-Final Office Action mailed Mar. 15, 2010 from U.S. Appl. No. 12/100,148, 8 pages.
Non-Final Office Action mailed Apr. 30, 2010 from U.S. Appl. No. 12/173,232, 13 pages.
Non-Final Office Action mailed Sep. 5, 2014 from U.S. Appl. No. 13/791,087, 8 pages.
Non-Final Office Action mailed Jul. 20, 2015 from U.S. Appl. No. 14/184,601, 16 pages.
Non-Final Office Action mailed Dec. 15, 2016 from U.S. Appl. No. 14/184,601, 18 pages.
Non-Final Office Action mailed Feb. 6, 2018 from U.S. Appl. No. 15/167,682, 9 pages.
Non-Final Office Action mailed Sep. 15, 2015 from U.S. Appl. No. 13/484,901, 16 pages.
Non-Final Office Action mailed Oct. 16, 2014 from U.S. Appl. No. 13/484,901, 11 pages.
Non-Final Office Action mailed Sep. 6, 2017 from U.S. Appl. No. 14/726,064, 8 pages.
Non-Final Office Action mailed May 17, 2017 from U.S. Appl. No. 14/183,424, 20 pages.
Non-Final Office Action mailed Jun. 2, 2015 from U.S. Appl. No. 14/183,424, 20 pages.
Non-Final Office Action mailed Apr. 12, 2018 for U.S. Appl. No. 29/638,259, 5 pages.
Non-Final Office Action mailed May 16, 2018 for U.S. Appl. No. 15/132,875, 18 pages.
Notice of Allowance mailed Jan. 30, 2015 from U.S. Appl. No. 13/791,087, 9 pages.
Notice of Allowance mailed Jan. 16, 2015 from U.S. Appl. No. 29/467,026, 9 pages.
Notice of Allowance mailed Oct. 21, 2016 from U.S. Appl. No. 13/484,901, 7 pages.
Notice of Allowance mailed Mar. 24, 2016 from U.S. Appl. No. 14/247,149, 8 pages.
Notice of Allowance mailed May 22, 2018 from U.S. Appl. No. 14/183,424, 9 pages.
Notice of Allowance mailed May 10, 2018 from U.S. Appl. No. 14/726,064, 7 pages.
Notice of Allowance mailed Aug. 23, 2017 from Canadian Application No. 2,879,629, 1 page.
"Outlet Boxes for Use in Fire Rated Assemblies," https://www.ul.com/wp-content/uploads/2014/04/UI_outletboxes.pdf, Apr. 2007, 2 pages.
Notice of Allowance mailed Sep. 21, 2018 from U.S. Appl. No. 29/645,941, 5 pages.
"Advanced LED Solutions," Imtra Marine Lighting. Jun. 17, 2011. 39 pages.
"Portland Bi-Color, Warm White/Red," item:ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," ELCO Lighting. Sep. 2018. 1 page.
"LED Undercabinet Pocket Guide," ELCO Lighting. Nov. 2, 2016. 12 pages.
"VERSI LED Mini Flush," Lithonia Lghting. Sep. 2013. 6 pages.
Notice of Allowance mailed Oct. 4, 2018 from U.S. Appl. No. 15/947,065 , 9 pages.
Notice of Allowance mailed Sep. 19, 2018 from U.S. Appl. No. 15/167,682 , 7 pages.
Non-Final Office Action mailed Jun. 25, 2018 for U.S. Appl. No. 29/541,565, 10 pages.
Non-Final Office Action mailed Oct. 24, 2018 for U.S. Appl. No. 15/688,266, 14 pages.
OneFrame Recessed LED Downlight. Dmflighting.com. Published Jun. 6, 2018. Retrieved at https://www.dmflighting.com/product/oneframe on Jun. 6, 2018. 11 pages.
Notice of Allowance mailed Oct. 9, 2018 from U.S. Appl. No. 29/653,142, 7 pages.
International Search Report and Written Opinion in PCT/US2018/048357 mailed Nov. 14, 2018, 13 pages.
Notice of Allowance mailed Nov. 27, 2018 from U.S. Appl. No. 15/167,682, 11 pages.
Non-Final Office Action mailed Dec. 5, 2018 from U.S. Appl. No. 14/942,937, 13 pages.
Notice of Allowance mailed Jan. 2, 2019 from U.S. Appl. No. 29/541,565, 6 pages.
RACO 4 i+A882:C958n. Octagon Welded Concrete Ring, 3-½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with ½ and ¾ in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
Notice of Allowance mailed Feb. 8, 2019 from U.S. Appl. No. 29/541,565, 5 pages.
Non-Final Office Action mailed Febraury 7, 2019 from U.S. Appl. No. 16/200,393, 32 pages.
Notice of Allowance mailed Jan. 28, 2019 from U.S. Appl. No. 29/664,471, 8 pages.
Non-Final Office Action mailed Jul. 24, 2018 from U.S. Appl. No. 29/638,259, 5 pages.
Final Office Action mailed Mar. 15, 2019 from U.S. Appl. No. 15/132,875, 15 pages.
International Search Report and Written Opinion in International Patent Application No. PCT/US18/62868 mailed Mar. 14, 2019, 13 pages.
Cs&E PCT Collaborative Search and Examination Pilot Upload Peer Contribution in International Patent Application No. PCT/US18/62868 mailed Mar. 14, 2019, 61 pages.
Notice of Allowance mailed Apr. 1, 2019 from U.S. Appl. No. 15/167,682, 7 pages.
Non-Final Office Action mailed Apr. 4, 2019 from U.S. Appl. No. 29/678,482, 8 pages.
Notice of Allowance mailed Apr. 8, 2019 from U.S. Appl. No. 29/653,142, 8 pages.
Notice of Allowance mailed Apr. 17, 2019 from U.S. Appl. No. 29/678,478, 7 pages.
International Search Report and Written Opinion in International Patent Application No. PCT/US18/67614 mailed Apr. 25, 2019, 20 pages.
Cs&E PCT Collaborative Search and Examination Pilot Upload Peer Contribution in International Patent Application No. PCT/US18/67614 mailed Apr. 24, 2019, 53 pages.
Specification & Features 4" Octagonal Concrete Box Covers. Orbit Industries, Inc. Accessed at https://www.orbitelectric.com on May 6, 2019. 1 page.

(56) References Cited

OTHER PUBLICATIONS

4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Final Office Action mailed Jun. 6, 2019 from U.S. Appl. No. 15/688,266, 7 pages.
Non-Final Office Action mailed Jun. 11, 2019 from U.S. Appl. No. 15/901,738, 6 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
Kwikbrace® New Construction Braces for Lighting Fixtures or Ceiling Fans 1-½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019.
Ex-Parte Quayle Action mailed Jun. 27, 2019 from U.S. Appl. No. 29/683,730, 5 pages.
Notice of Allowance mailed Jul. 31, 2019 from U.S. Appl. No. 15/167,682 , 7 pages.
Supplemental Notice of Allowance mailed Aug. 5, 2019 from U.S. Appl. No. 15/947,065, 2 pages.
Notice of Allowance mailed Sep. 11, 2019 from U.S. Appl. No. 29/653,142, 6 pages.
Corrected Notice of Allowance mailed Sep. 27, 2019 from U.S. Appl. No. 15/167,682 , 2 pages.
Final Office Action mailed Sep. 27, 2019 from U.S. Appl. No. 16/200,393, 34 pages.
Notice of Allowance mailed Feb. 15, 2019 from U.S. Appl. No. 15/947,065 , 9 pages.
Notice of Allowance mailed Oct. 1, 2019 from U.S. Appl. No. 14/942,937, 7 pages.
Final Office Action mailed Oct. 3, 2019 from U.S. Appl. No. 29/678,482, 6 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Cree® LMR2 LED Module. Product Family Data Sheet Cree 2011. 3 pages.
Notice of Allowance mailed Oct. 16, 2019 from U.S. Appl. No. 15/132,875, 12 pages.
International Search Report and Written Opinion in International Patent Application No. PCT/US2019/036477 mailed Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Notice of Allowance mailed Feb. 5, 2020 from U.S. Appl. No. 15/901,738 , 8 pages.
Notice of Allowance mailed Feb. 5, 2020 from U.S. Appl. No. 29/678,482 , 13 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT1805 Maxim Main Catalog 2018 p. 639.
Maxim Wafer. LMXCAT 1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 mailed Feb. 24, 2020, 23 pages.
Final Office Action mailed Mar. 17, 2020 for U.S. Appl. No. 29/653,142, 13 pages.
LED Book Pr ice Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Ser ies LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Non-Final Office Action mailed Apr. 2, 2020 for U.S. Appl. No. 16/522,275, 21 pages.
Notice of Allowance mailed May 18, 2020 from U.S. Appl. No. 15/901,738 , 7 pages.
Non-Final Office Action mailed May 20, 2020 for U.S. Appl. No. 15/688,266, 6 pages.
Non-Final Office Action mailed May 26, 2020 for U.S. Appl. No. 16/719,361, 10 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Notice of Allowance mailed Jul. 10, 2020 from U.S. Appl. No. 29/694,475, 6 pages.
Octagon Concrete Box Cover with (3) ½ in. & (2) ¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b4BRCMARIsADMUlypJc0K80UHdDTI9C5m4BDzR3U87PRYV1NdQIBFxEWQ21_3otTCTqEkaAi_DEALw_wcB on Jul. 20, 2020. 1 page.
Notice of Allowance mailed Jul. 28, 2020 from U.S. Appl. No. 16/719,361, 8 pages.
Notice of Allowance mailed Jul. 29, 2020 from U.S. Appl. No. 16/522,275, 8 pages.
Non-Final Office Action mailed Aug. 19, 2020 for U.S. Appl. No. 16/886,365, 16 pages.
Notice of Allowance mailed Sep. 8, 2020 from U.S. Appl. No. 29/678,482, 5 pages.
Corrected Notice of Allowance mailed Sep. 11, 2020 from U.S. Appl. No. 16/719,361, 2 pages.
Canadian Office Action in Application No. 2931588 dated Aug. 13, 2020, 5 pages.
Corrected Notice of Allowance mailed Sep. 14, 2020 from U.S. Appl. No. 16/522,275, 2 pages.
Notice of Allowance mailed Sep. 22, 2020 from U.S. Appl. No. 29/683,730, 6 pages.
Notice of Allowance mailed Sep. 22, 2020 from U.S. Appl. No. 29/653,142, 6 pages.
Notice of Allowance mailed Oct. 27, 2020 from U.S. Appl. No. 29/694,475, 5 pages.
Non-Final Office Action mailed Nov. 30, 2020 from U.S. Appl. No. 17/000,702, 7 pages.

(56) References Cited

OTHER PUBLICATIONS

Non-Final Office Action mailed Dec. 16, 2020 from U.S. Appl. No. 17/080,080, 28 pages.
Canadian Office Action in Application No. 2941051 dated Dec. 8, 2020, 5 pages.
Final Office Action mailed Jan. 11, 2021 from U.S. Appl. No. 15/688,266, 7 pages.
Non-Final Office Action mailed Jan. 11, 2021 from U.S. Appl. No. 16/725,606, 7 pages.
Notice of Allowance mailed Jan. 15, 2021 from U.S. Appl. No. 17/000,702, 7 pages.
Notice of Allowance mailed Jan. 22, 2021 from U.S. Appl. No. 17/080,080, 14 pages.
Notice of Allowance mailed Jan. 22, 2021 from U.S. Appl. No. 16/886,365, 7 pages.
Final Office Action mailed Feb. 5, 2021 from U.S. Appl. No. 16/200,393, 7 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http://electrical-inspector.blogspot.com/2013/06/electrical-boxes-volume-and-Fill-Calculations.html Jun. 22, 2013 retrieved from Wayback Machine Archive.org on Jan. 25, 2021. 8 pages.
U.S. Appl. No. 61/881,162 filed on Sep. 23, 2013. Priority application to US Publication No. 2015/0085500 to Cooper et al. 31 pages.
Supplemental Notice of Allowance mailed Mar. 10, 2021 from U.S. Appl. No. 16/886,365, 2 pages.
Notice of Allowance mailed Apr. 6, 2021 from U.S. Appl. No. 16/200,393, 11 pages.
Non-Final Office Action mailed Apr. 12, 2021 from U.S. Appl. No. 29/694,475, 11 pages.
Notice of Allowance mailed Apr. 13, 2021 from U.S. Appl. No. 16/725,606, 7 pages.
Notice of Allowance mailed Apr. 26, 2021 from U.S. Appl. No. 17/080,080, 11 pages.
Corrected Notice of Allowance mailed Apr. 28, 2021 from U.S. Appl. No. 16/725,606, 2 pages.
Notice of Allowance mailed May 17, 2021 from U.S. Appl. No. 15/688,266, 9 pages.
Notice of Allowance mailed May 27, 2021 from U.S. Appl. No. 16/779,865, 9 pages.
Notice of Allowance mailed May 28, 2021 from U.S. Appl. No. 16/779,824, 11 pages.
Notice of Allowance mailed Jun. 1, 2021 from U.S. Appl. No. 16/719,361,7 pages.
Corrected Notice of Allowance mailed Jun. 21, 2021 from U.S. Appl. No. 16/779,865, 3 pages.
Non-Final Office Action mailed Jul. 14, 2021 from U.S. Appl. No. 17/118,742, 11 pages.
Chinese Office Action and English Translation Thereof in Chinese Patent Application No. 201880088009.9 dated Jun. 30, 2021, 18 pages.
Supplemental Notice of Allowance mailed Aug. 13, 2021 1 from U.S. Appl. No. 16/779,824, 3 pages.
Notice of Allowance mailed Sep. 16, 2021 from U.S. Appl. No. 16/779,865, 9 pages.
The ALO™ Box, The All-in-One Recessed Box. ELCO Lighting ELCAT1064 Jul. 2, 2021. 16 pages.
ELCO—Installing 4" LED Retrofit Kits into 4" Deep Metallic Outlet Box for ELJ444/R/C/F. ELCO Lighting Nov. 2020. 1 page.
Square New Construction Box. ELCO Lighting 2021, Rev. Aug. 25, 2021. 3 pages.
ALO™ Box on New Construction Frame. ELCO Lighting 2021, Rev. Aug. 20, 2021. 7 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, PIER Lighting Research Program: Project 2.3 Low-profile LED Luminaires Final Report (Prepared by Lighting Research Center, Jan. 2005) ("PIER LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, Luxeon Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year

(56) References Cited

OTHER PUBLICATIONS

Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. *Docket Navegator AMP Plus, Inc. d/b/a Elco Lighting et al* v. *DMF, Inc*. PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a ELCO Lighting et al* v. *DMF, Inc*. PTAB-IPR2019-01500. Downloaded Mar. 25, 2020. 3 pages.
Civil Action No. 2:18-cv-07090. Complaint for Infringement and Unfair Competition. *DMF, Inc*. v. *AMP Plus, Inc. d/b/a ELCO Lighting*. 52 pages. Dated Aug. 15, 2018.
Docket Listing in Civil Action No. 2:18-cv-07090. *DMF, Inc*. v. *AMP Plus, Inc. d/b/a ELCO Lighting et al* CDCA-2-18-cv-07090. Downloaded on Mar. 25, 2020. 39 pages.
Civil Action No. 2:19-cv-4519.Complaint for Patent Infringement. *DMF, Inc*. v. *AMP Plus, Inc. d/b/a ELCO Lighting*. 52 pages dated May 22, 2019. 23 pages.
Docket Listing in Civil Action No. 2:19-cv-4519. *DMF Inc* v. *AMP Plus, Inc. d/b/a ELCO Lighting et al* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant to 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D In Support of Amp Plus, Inc.'s Opposition to Dmf, Inc.'s Motion for Partial Summary Judgment in Civil Action No. 2:18-cv-07090-CAS-GJS filed Feb. 10, 2020. 210 pages.
Plaintiff DMF's Reply in Support of Motion for Partial Summary Judgment in Civil Action No. 2:18-cv-07090-CAS-GJS filed Feb. 18, 2020. 33 pages.
Declaration of James R. Benya In Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Jan. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. EYE LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. ELCO Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS. 37 pages.
Defendant AMP Plus, Inc. D/B/A Elco Lighting's Supplemental Responses to Plaintiff DMF, Inc.'s First Set of Interrogatories (Nos. 1-16) in Civil Action No. 2:19-CV-4519-CAS, Redacted. 13 pages.
Final Written Decision in IPR2019-01094 dated Nov. 19, 2020, 58 pages.
U.S. Appl. No. 16/016,040, filed Jun. 22, 2018, Danesh.
U.S. Appl. No. 16/653,497, filed Oct. 15, 2019, Danesh et al.
U.S. Appl. No. 16/690,970, filed Nov. 21, 2019, Nikooyan et al.
U.S. Appl. No. 29/648,046, filed May 17, 2018, Williams.
U.S. Appl. No. 29/688,172, filed Apr. 18, 2019, Danesh et al.
U.S. Appl. No. 29/688,143, filed Apr. 18, 2019, Danesh et al.
U.S. Appl. No. 16/883,144, filed May 26, 2020, Nikooyan et al.
U.S. Appl. No. 16/182,481, filed Nov. 6, 2018, Kopitzke.
U.S. Appl. No. 17/318,193, filed May 12, 2021, Danesh et al.
U.S. Appl. No. 29/764,875, filed Jan. 4, 2021, Danesh et al.
U.S. Appl. No. 17/099,650, filed Nov. 16, 2020, Danesh et al.
Canadian Notice of Allowance dated Nov. 23, 2022 from Canadian App. No. 3,102,022 1 page.
Canadian Office Action dated Dec. 19, 2022 from Canadian Application No. 3,135,470, 5 pages.
Canadian Office Action dated Dec. 16, 2022 from Canadian Application No. 3,130,524, 6 pages.
Chinese Office Action and English Translation in Chinese Application No. CN 202210354716.6, dated Jul. 29, 2023, 13 pages.
Canadian Office Action in Canadian Application No. CA 3,135,470, dated Jul. 27, 2023, 4 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
International Search Report and Written Opinion in PCT/US 23/65292 dated Nov. 6, 2023, 31 pages.
Notice of Allowance Mailed Jun. 7, 2022 from U.S. Appl. No. 29/683,638, 7 pages.
Non-Final Office Action mailed Jun. 20, 2022 from U.S. Appl. No. 17/381,147, 4 Pages.
Non-Final Office Action mailed Jun. 22, 2022 from U.S. Appl. No. 29/759,492, 6 Pages.
Notice of Allowance mailed Jul. 11, 2022 from U.S. Appl. No. 29/696,830, 5 Pages.
Final Office Action received Jul. 11, 2022 from U.S. Appl. No. 29/711,198 , 7 Pages.
Non-Final Office Action dated Oct. 25, 2022 from U.S. Appl. No. 17/099,650, 10 Pages.
Final Office Action dated Dec. 15, 2022 from U.S. Appl. No. 29/743,066, 16 pages.
Supplemental Notice of Allowance mailed Jan. 17, 2023 from U.S. Appl. No. 17/384,564 2 pages.
Office Action dated Jan. 24, 2023 from U.S. Appl. No. 17/677,300, 5 pages.
Notice of Allowance mailed Mar. 1, 2023 from U.S. Appl. No. 29/711,198, 7 pages.
Non-Final Office Action mailed Mar. 17, 2023 from U.S. Appl. No. 17/723,370, 5 pages.
Non-Final Office Action mailed Mar. 23, 2023 from U.S. Appl. No. 17/694,489, 9 pages.
Notice of Allowance mailed Mar. 29, 2023 from U.S. Appl. No. 17/666,441, 9 pages.
Notice of Allowance mailed Apr. 10, 2023 from U.S. Appl. No. 29/743,066, 7 pages.
Final Office Action mailed Apr. 12, 2023 from U.S. Appl. No. 29/759,492, 8 Pages.
Non-Final Office Action dated May 8, 2023 from U.S. Appl. No. 17/677,300 , 7 Pages.
Non-Final Office Action dated Jul. 7, 2023 from U.S. Appl. No. 17/826,847, 8 Pages.
Non-Final Office Action dated Aug. 31, 2023 from U.S. Appl. No. 17/379,489, 11 Pages.

(56) References Cited

OTHER PUBLICATIONS

Final Office Action dated Oct. 12, 2023 from U.S. Appl. No. 17/723,370, 25 Pages.
Non-Final Office Action dated Oct. 16, 2023 from U.S. Appl. No. 17/694,489, 17 Pages.
Non-Final Office Action dated Oct. 23, 2023 from U.S. Appl. No. 17/381,147, 4 Pages.
Notice of Allowance dated Feb. 5, 2024 from U.S. Appl. No. 17/826,848, 8 Pages.
Opinion from the Fed. Ct. of App. in *AMP Plus, Inc*. v. *DMF, Inc*. in case Nos. 2021-1595, 2021-1636 (Appeals from the PTAB in IPR2019-01094) decided on Nov. 10, 2022, 15 pages.
U.S. Appl. No. 17/666,441, filed Feb. 7, 2022, Danesh et al.
U.S. Appl. No. 29/663,037, filed Sep. 11, 2018, Danesh et al.
U.S. Appl. No. 29/663,040, filed Sep. 11, 2018, Danesh et al.
U.S. Appl. No. 29/746,262, filed Aug. 12, 2020, Danesh et al.
U.S. Appl. No. 29/820,189, filed Dec. 20, 2021, Danesh et al.
U.S. Appl. No. 17/902,469, filed Sep. 2, 2022, Danesh.
U.S. Appl. No. 16/881,686, filed May 22, 2020, Danesh et al.
U.S. Appl. No. 17/085,636, filed Oct. 30, 2020, Danesh et al.
U.S. Appl. No. 17/867,522, filed Jul. 18, 2022, Danesh et al.
U.S. Appl. No. 17/000,702, filed Aug. 24, 2020, Danesh.
U.S. Appl. No. 17/677,300, filed Feb. 22, 2022, Danesh.
U.S. Appl. No. 17/933,257, filed Sep. 19, 2022, Danesh et al.
U.S. Appl. No. 16/886,365, filed May 28, 2020, Shen.
U.S. Appl. No. 17/694,489, filed Mar. 14, 2022, Danesh et al.
U.S. Appl. No. 13/484,901, filed May 31, 2012, Danesh.
U.S. Appl. No. 17/902,474, filed Sep. 2, 2022, Danesh.
U.S. Appl. No. 29/743,066, filed Jul. 17, 2020, Young et al.
U.S. Appl. No. 17/723,370, filed Apr. 18, 2022, Young et al.
U.S. Appl. No. 16/033,122, filed Jul. 11, 2018, Fardadi et al.
U.S. Appl. No. 29/867,928, filed Nov. 14, 2022, Kopitzke.
U.S. Appl. No. 29/683,638, filed Mar. 14, 2019, Kopitzke et al.
U.S. Appl. No. 29/867,213, filed Oct. 14, 2022, Kopitzke et al.
U.S. Appl. No. 17/582,921, filed Jan. 24, 2022, Kopitzke et al.
U.S. Appl. No. 17/826,847, filed May 27, 2022, Danesh.
U.S. Appl. No. 18/068,639, filed Dec. 20, 2022, Danesh et al.
U.S. Appl. No. 18/171,379, filed Feb. 20, 2023, Kopitzke et al.
U.S. Appl. No. 18/055,070, filed Nov. 14, 2022, Kumar.
U.S. Appl. No. 18/488,145, filed Oct. 17, 2023, Kumar, et al.
U.S. Appl. No. 18/501,219, filed Nov. 3, 2023, Danesh.

* cited by examiner

*Minimum thickness of uncoated sheet metal and extruded aluminum for enclosures*

| Specific construction | | Steel | | | | Copper, brass, aluminum sheet, and extruded aluminum | | | |
|---|---|---|---|---|---|---|---|---|---|
| | | Unreinforced | | Reinforced | | Unreinforced | | Reinforced | |
| | | mm | (in) | mm | (in) | mm | (in) | mm | (in) |
| At opening for conduit connection | | 0.66 | (0.026) | 0.66 | (0.026) | 0.81 | (0.032) | 0.81 | (0.032) |
| Length more than 660 mm (26 in) | No electrical component support | 0.51 | (0.020) | 0.41 | (0.016) | 0.56 | (0.022) | 0.43 | (0.017) |
| | Electrical component support | 0.66 | (0.026) | 0.51 | (0.020) | 0.71 | (0.028) | 0.56 | (0.022) |
| Length not more than 660 mm (26 in) | No electrical component support | 0.41 | (0.016) | 0.33 | (0.013) | 0.51 | (0.020) | 0.41 | (0.016) |
| | Electrical component support | 0.51 | (0.020) | 0.41 | (0.016) | 0.64 | (0.025) | 0.51 | (0.020) |
| Length not more than 380 mm (15 in) | No electrical component support | 0.41 | (0.016) | 0.33 | (0.013) | 0.51 | (0.020) | 0.41 | (0.016) |
| | Electrical component support | 0.41 | (0.016) | 0.41 | (0.016) | 0.51 | (0.020) | 0.51 | (0.020) |

NOTES (1) "Reinforced" refers to a form of construction that provides equivalent mechanical strength.

(2) "No electrical component support" refers to the minimum thickness required for mounting of non-electrical parts.

(3) Examples of acceptable methods of reinforcement are (a) a single piece of sheet metal that is formed to result in a maximum internal angle of 120 degrees;

(b) 13 × 13 mm (0.5 × 0.5 in) 90 degrees formed from sheet steel, 0.81 mm (0.032 in) minimum thickness, used to divide a surface into small sections and, unless along the greater dimension, are additionally secured to the adjacent sides of the enclosure, (c) flat steel bars, 9.5 mm (0.375 in) wide minimum, 3.2 mm (0.125 in) thick minimum, used and secured as in (b); and (d) curved, ribbed, or flanged surfaces. A surface is considered to be flanged if the two opposite sides are bent 13 mm (0.5 in) or wider at right angles to the surface.

(4) For coated or finished metals, the minimum thickness is considered to be obtained if the overall thickness exceeds that required in this table by at least 0.013 mm (0.0005 in) for each side coated or finished.

(5) "Length" refers to the longest straight line that can be drawn on any unreinforced flat section.

FIG. 4

ROUND METAL HOUSING FOR A LIGHTING SYSTEM

CROSS-REFERENCE TO RELATED APPLICATION(S)

The present application claims priority to U.S. Provisional Application No. 63/123,334, filed Dec. 9, 2020, entitled "ROUND HOUSING FOR AN ELECTRICAL ASSEMBLY OR A LIGHTING ASSEMBLY," U.S. Provisional Application No. 63/061,160, filed Aug. 4, 2020, entitled "ROUND HOUSING FOR A LIGHTING SYSTEM," and U.S. Provisional Application No. 63/052,915, filed Jul. 16, 2020, entitled "ROUND HOUSING FOR A LIGHTING SYSTEM." Each of the aforementioned applications is incorporated by reference herein in its entirety.

BACKGROUND

A conventional lighting system (also referred to herein as a "lighting fixture") typically includes a housing (also referred to as an "enclosure") to contain a lighting module, which includes a light source, a driver, and/or one or more wires. The housing is typically supported by various components (e.g., a pan frame, bar hanger holders, bar hangers) to form a housing assembly. The supporting components include mounting features to facilitate installation of the housing assembly onto one or more support structures in the environment. The mounting features often vary depending on the type of installation (e.g., a remodel lighting fixture, a new construction lighting fixture) and the type of support structure disposed in the environment to support the housing assembly.

For example, a conventional housing assembly for a recessed lighting system typically includes a can housing to contain a light source and a junction box to receive and contain wires from an electrical power supply of a building and wire splices to electrically couple the wires to the light source.

In a new construction installation, the can housing and the junction box are generally supported by a pan frame and one or more adjustable bar hanger assemblies coupled to the pan frame to mount the housing assembly to various support structures located within a ceiling (e.g., a wood joist or stud, a metal joist or stud, a T-bar). Each bar hanger assembly generally includes (1) a pair of telescopically adjustable bar hangers slidably coupled to the pan frame and (2) a bar hanger head on each bar hanger with one or more mounting features to couple to various support structures. Once the housing assembly is mounted to the support structures, a piece of drywall panel is then installed to cover the ceiling and an opening is then cut to expose the housing. A lighting module may then be inserted into the housing with a trim to cover the opening formed in the ceiling.

In a remodel installation, the can housing and the junction box are supported by a frame and the housing assembly is inserted directly through an opening formed in the drywall panel previously installed in the ceiling. Said in another way, a remodel installation does not require access to support structures disposed within the ceiling for installation. The can housing typically includes multiple spring clips to directly mount the housing assembly to the drywall panel. Once the housing assembly is mounted to the drywall panel, the lighting module and the trim may be installed in the same manner as in the new construction installation.

SUMMARY

The Inventors, via previous innovative designs of lighting systems, have recognized and appreciated recessed lighting systems offer several benefits for ambient and task lighting including, but not limited to, making the environment appear larger (e.g., low ceiling environments), greater flexibility in tailoring lighting conditions (e.g., wall wash, directional, accent, general lighting), and fewer limitations on the installation location (e.g., a sloped ceiling, a vaulted ceiling, a wall). However, the Inventors have also recognized several limitations in the design and use of conventional housing assemblies for recessed lighting systems.

First, conventional housing assemblies often include multiple housings to contain various components of a recessed lighting system. For example, a typical housing assembly includes a can housing to contain a light source, a junction box to contain various wiring connections, and a frame to mechanically support the can housing and the junction box. The inclusion of multiple housings results in more parts and sub-assemblies in the housing assembly, which, in turn, increases manufacturing time and cost. Additionally, conventional housing assemblies with multiple housings are often bulky in size and thus less easy to handle during installation. The separation of electrical wiring connections from the light source may also make maintenance of the lighting system more challenging since access to the junction box may be blocked once the drywall panel of the ceiling is installed.

In some applications, it may also be desirable for the housing assembly to meet various fire-rating standards set forth, for example, by the National Electric Code (NEC) or the Underwriter's Laboratory (UL). For conventional housing assemblies, an additional fire-rated enclosure (e.g., a firebox) is often included to enclose the can housing further increasing the overall size of the housing assembly and further limiting installation in smaller spaces.

Second, the housings in conventional housing assemblies for recessed lighting systems are often formed from sheet metal. A metallic housing provides a mechanically strong and durable enclosure to support a light source. The metallic housing is also able to withstand higher operating temperatures in response to the heat generated by the light source. Additionally, the metallic housing may provide a convenient electrical ground for the lighting module. However, housings formed from sheet metal are generally limited to relatively simple geometries with a limited set of structural features. This is due, in part, to conventional sheet metal forming processes being unsuitable for the production of complex-shaped components, such as a housing with rounded, enclosed walls with protruding structural features and/or flat sections. The formation of more complex structural features often entails additional processing steps, which can result in appreciably higher manufacturing costs.

For this reason, conventional junction boxes for recessed lighting systems are often polygonal in shape with flat sides supporting multiple knockout features. The junction boxes for recessed lighting systems are also often enclosed structures and, thus typically include a mechanism to open one side of the junction box for access, further adding complexity. In comparison, conventional can housings are often round in shape, but tend to have few, if any structural features along its respective surfaces.

The Inventors acknowledge housing assemblies with a single housing that combines together the functions of a can housing and a junction box have been demonstrated. However, the Inventors also recognized housing assemblies with a single housing are generally polygonal in shape similar to conventional junction boxes due, in part, to the integration of various cable routing features, such as knockouts, which are difficult to incorporate on a housing with a round shape. For example, the housing may have a square or an octagonal cross-sectional shape.

Although polygonal-shaped housings may reduce manufacturing costs, installation of such housings may be more challenging compared to round-shaped housings. For example, an installer may be required to cut an opening in the drywall panel of a ceiling or wall that corresponds in shape to the polygonal cross-section of the housing. A polygonal-shaped opening may be more challenging to cut compared to a round-shaped opening as the installer may be more prone to overshooting a vertex of the polygon when cutting the opening, resulting in a larger-sized opening in the drywall panel.

Additionally, the installer may also be required to cut a larger opening in the drywall panel to compensate for the polygonal-shaped housing compared to a round-shaped housing. For example, a round-shaped housing may have a characteristic diameter suitable to contain a round-shaped lighting module. The polygonal-shaped housing may thus have a width greater than or equal the characteristic diameter of the round-shaped housing to accommodate the same round-shaped housing, which results in a larger opening due to the corners of the polygonal-shaped housing. This may be compensated, in part, by the installation of a trim with a larger flange to cover the larger polygonal-shaped opening formed in the drywall panel. However, a trim with a larger flange may require more clearance in the environment (e.g., a lighting system installed in a ceiling may not be placed near a wall). The trim may also require more material for manufacture, thus increasing material costs. Additionally, a trim with a larger flange may not be aesthetically desirable. Said in another way, a lighting system with a polygonal-shaped housing supporting a light source may be unable to support a trim with a smaller flange without exposing a portion of the housing and/or limiting the margin for error when the installer is cutting the opening in the drywall panel.

In view of the foregoing limitations of conventional housings and housing assemblies, the present disclosure is directed to various inventive implementations of housing assemblies for a lighting system with a round-shaped metallic housing (also referred to herein as a "multi-piece housing" or an "outer casing") configured to contain both a light source and associated electrical connections. This may be accomplished, in part, by assembling the housing from a sidewall component(s) and a top component that are separately fabricated. The sidewall component(s) defines the desired round shape of the housing. In some implementations, the housing may include a single sidewall component or as an assembly of two or more sidewall components. The top component encloses one end of the sidewall and may define the various junction box-related structural features disposed along the top and/or sides of the housing, such as circular trade size knockouts and Romex knockouts.

By strategically separating the desired structural features of the housing in this manner, the housings described herein may provide (1) the functionality of both a can housing and a junction box integrated into a single housing, thus simplifying the housing assembly, (2) a round-shaped geometry to facilitate greater ease of installation and support for trims with smaller flanges, and (3) a top component and a sidewall component that individually remain relatively simple in design and, hence, readily manufacturable using conventional sheet metal forming processes using few processing steps.

In one aspect, the integration of can housing-related structural features and junction box-related structural features into one housing may appreciably simplify the housing assembly, in part, by reducing the number of components in the housing assembly. For example, the housing assemblies described herein may not include a separate junction box or a frame (e.g., a pan frame). Instead, the housing assembly may only include mounting components directly coupled to the housing to facilitate installation of the housing onto one or more support structures in the ceiling space or the drywall panel of the ceiling. The simplified housing assembly may also be more compact in size and, hence, able to accommodate smaller ceiling spaces compared to conventional housing assemblies. Additionally, the housing assembly may be lighter in weight, thus improving ease of handling during installation.

Although the housing may contain a light source and associated electrical connections, it should be appreciated that the housing may still be used together with a pan frame and a separate junction box in some installations. For example, a junction box may provide wiring connections for multiple housings and/or lighting systems. In another example, the lighting system may include a ballast containing a battery to provide an alternate source of electrical power to the light source in the event the electrical power supplied by an external power supply system (e.g., building mains) is disrupted. Thus, the housing and the emergency ballast may both be mounted on a pan frame. Additionally, it should be appreciated that, in some applications, the housing assemblies described herein may also be used as a standalone electrical outlet box (also referred to as a "junction box" or an "electrical junction box"). For example, the housing may contain various electrical wires and wire connections (e.g., wire splices) and the housing assembly may include a cover plate to enclose the opening formed on the ceiling instead of a trim.

In another aspect, the round shape of the housing may improve the ease of installation of the housing assembly and may more readily accommodate round trims with a smaller flange. Specifically, the bottom portion of the sidewall disposed near or within the opening formed in the ceiling after installation may have a round shape. Thus, the opening formed in the ceiling may similarly have a round shape. In some implementations, the sidewall may have a circular cross-sectional shape. More generally, the cross-section of the sidewall may include, but is not limited to, a circular section, an elliptical section, a straight section, or any combination of the foregoing.

The round-shaped opening formed in the ceiling may be easier to cut compared to previous polygonal shaped housings. The round shaped housing may also support a round-shaped trim with a smaller flange (e.g., a flange where the difference between an inner radius and an outer radius of the flange is less than or equal to ½ inch) to cover the opening in the ceiling while still providing the installer room to overshoot when cutting the opening in the drywall panel. Additionally, the round-shaped housing may more readily conform in shape with a round-shaped lighting module, which, in turn, may result in a smaller opening formed in the drywall compared to a polygonal-shaped housing with a similar characteristic width.

In some implementations, the cross-sectional shape of the sidewall may remain substantially similar or the same from the bottom end to the top end. For example, the sidewall component(s) forming the sidewall may be shaped as a tube. However, it should be appreciated that, in some implementations, a portion of the sidewall may be substantially flat in shape to accommodate one or more knockouts. For example, the top portion of the sidewall may include one or more flat sections to accommodate corresponding knockouts formed on corresponding tabs of the top component. In some implementations, the sidewall component(s) may have notches to provide space for corresponding tabs of the top component during assembly of the sidewall component(s) and the top component.

In some implementations, the housing may be dimensioned to accommodate a particular trade size housing assembly and/or lighting system (e.g., a 2-inch trade size lighting installation, a 3-inch trade size lighting installation, a 4-inch trade size lighting installation, a 5-inch trade size lighting installation, a 6-inch trade size lighting installation, a 7-inch trade size lighting installation, an 8-inch trade size lighting installation). For example, the housing may be 4-inch trade size housing that fits within an opening having a diameter of approximately 4 inches. In some implementations, the housing may have an exterior width of about 4.2 inches. More generally, the exterior width may range between about 4 inches and about 4.5 inches. In some implementations, the housing may have an exterior height of about 4.5 inches. More generally, the exterior height may range between about 4 inches and about 5 inches.

The housing may also be dimensioned to provide a sufficiently large volume to contain a lighting module, at least a portion of a trim, a desired number of electrical wires of a particular gauge, and a desired number of wire splices. In some implementations, the housing may be dimensioned such that, after a lighting module and a trim are inserted into the cavity of the housing, the remaining portion of the cavity provides a volume allowance to contain a specific number of wires of a particular gauge as specified by Article 314 of the 2020 NEC and, in particular, Section 314.16 entitled, "Number of Conductors in Outlet, Device, and Junction Boxes, and Conduit Bodies." For example, the housing may be dimensioned to provide a volume allowance to contain at least nine 12 AWG wires after a lighting module and a trim are installed.

In some implementations, the housing in the housing assembly may be tailored for a remodel installation where the housing assembly is inserted through an opening in a drywall panel and directly mounted to the drywall panel without requiring removal of the drywall panel. For remodel installations, the housing may not include knockouts formed along the side of the housing to prevent misuse and/or an improper installation. The housing assembly may include a mounting ring with a flange disposed around the bottom end of the housing to abut an bottom surface of a drywall panel. The housing assembly may further include one or more spring clips that are actuated from within the cavity of the housing such that a bent portion of the spring clips physically contacts a top surface of the drywall panel. As a result, the flange and the spring clips together clamp the housing assembly to the ceiling.

In some implementations, the housing in the housing assembly may be tailored for a new construction installation where the housing assembly is installed into a ceiling space prior to be enclosed by a drywall panel. Compared to the remodel installation, the housing for a new construction installation may include knockouts disposed along the sides of the housing. The housing assembly may further include a bar hanger assembly with one or more pairs of bar hangers, a crossmember (or bar hanger head), and bar hanger holders to couple the bar hangers to the housing. Each pair of bar hangers may be telescopically coupled to one another and slidably coupled to the bar hanger older, which enables the bar hangers to traverse a gap between the support structures and the respective crossmembers (or bar hanger heads) for attachment. In some implementations, the bar hanger holders may also be slidably coupled to the housing along an axis different from the longitudinal axes of the bar hangers. For example, the bar hanger holders may be slidably coupled to the housing along a vertical axis while the bar hangers are movable along a horizontal axis. The bar hanger holders may further include a locking mechanism to lock the relative positions of the housing, the bar hanger holders, and the bar hangers.

For both new construction and remodel installations, the housing assemblies described herein may readily accommodate a drywall panel with a thickness ranging between about 0.25 inches and about 2.5 inches and, more preferably, between about 0.5 inches to about 1.75 inches. The housings may also generally provide tool-free adjustment features. For example, the housing a for a new construction installation may include a thumbscrew/nut to adjust the position of the housing relative to the bar hanger holders by hand. In another example, the housing for a remodel installation may include a hand-actuated spring clip to engage the drywall panel once the housing assembly is inserted through the opening of the drywall.

In some implementations, the housing may satisfy one or more standards set forth by various organizations including, but not limited to, the NEC, the UL, the American Society for Testing and Materials (ASTM), and the National Fire Protection Association (NFPA). For example, the housing may satisfy UL1598 for luminaires by providing, in part, a housing with sufficient electrical grounding, volume for sufficient number of wires and/or wire splices, and appropriate suitable connectors (e.g., UL listed connectors) for connection to the lighting module. In another example, the housing may satisfy UL514 for electrical junction boxes when fire-rating certification is desired. This may be accomplished, in part, by tailoring the housing so that only compliant components (i.e., components specified on a label as being compliant with the housing assembly) may be installed into the housing. In other words, the housing may only provide mounting features to support compliant components in order to prevent the installation of non-compliant components. The housing may further be insulation contact (IC) rated and/or sound-rated.

The top and sidewall components of the housing may generally be formed of various metals including, but not limited to, steel alloys (e.g., galvanized steel), aluminum, brass, copper, and any combinations of the foregoing. In some implementations, the thickness or gauge of the sidewall and top components may be thicker than conventional can housings and/or thinner than conventional electrical junction boxes. However, it should be appreciated that, in other implementations, the thickness of the housing may be similar to the thickness of conventional electrical junction boxes, particularly if the housing is being qualified as an electrical junction box (in addition to being qualified as a luminaire housing) in accordance with various NEC, UL, ASTM, and/or NFPA standards. The thickness and material may also vary depending on whether the housing is fire-rated. Typically, the sidewall and top components may have a larger thickness and/or greater galvanization (e.g., a thicker zinc coating) when fire-rated and a smaller thickness and/or less galvanization when not fire-rated. Generally, the thickness of the sidewall component and the top component may generally range between about 0.6 mm and about 2.0 mm when the sidewall and top components are formed from galvanized steel.

As noted above, the top and sidewall components may also be formed from sheet metal. Thus, various sheet metal forming processed may be utilized to fabricate the top and sidewall components. For example, the curved shape of the sidewall components may be formed using a rolling process to bend a sheet into the desired round shape and/or a deep drawing process where the sheet metal is radially drawn into a forming die with the desired curved geometry. The various knockouts formed on the top component may be formed via a stamping process. Furthermore, additional structural features may be more readily integrated into the sidewall component, especially the curved portions of the sidewall component, using the same or similar sheet metal forming processes, such as textured surfaces (e.g., a row of notches) and/or recessed/protruding lips. Once the top and sidewall components are fabricated, they may then be joined together using, for example, one or more rivet connections and/or welding.

Although the exemplary remodel and new construction installations of the housings and housing assemblies described herein are for a ceiling installation, it should be appreciated the same or similar housings and housing assemblies may be installed on a wall or a floor. Furthermore, the housings and housing assemblies are not limited for use with a drywall panel, but may also be used with a wood panel, and flooring materials.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4 shows a table summarizing the minimum thickness of a housing for various dimensions and materials as set forth by UL standard UL1598 for luminaires.

DETAILED DESCRIPTION

Figure 1:
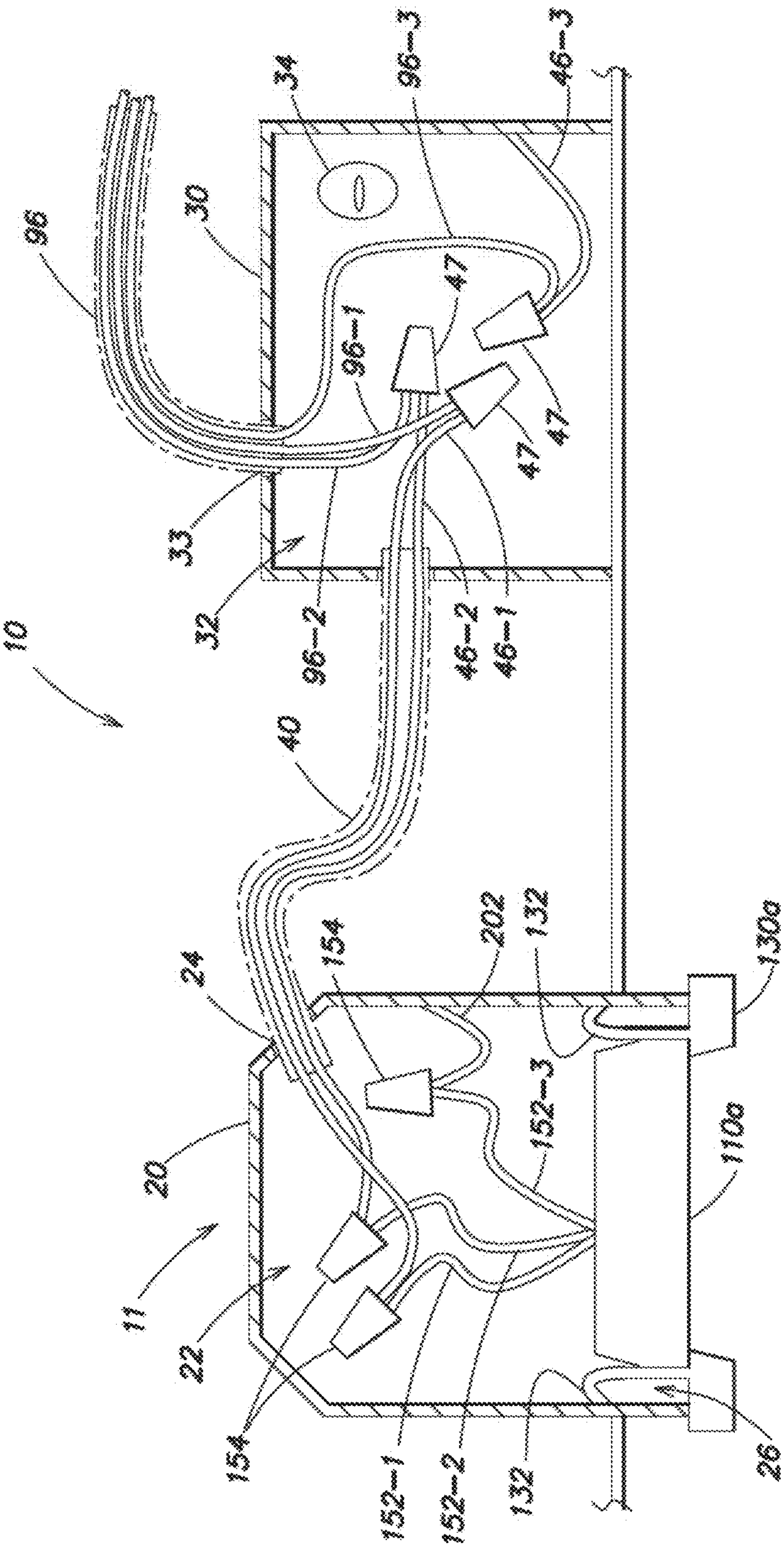
FIG. 1 shows a cross-sectional view of a conventional housing assembly with a can housing and a junction box and an exemplary lighting module.

Following below are more detailed descriptions of various concepts related to, and implementations of, a housing assembly for a lighting system with a housing that integrates together the functionality of a can housing (e.g., the housing may contain a lighting module) and an electrical junction box (e.g., the housing may contain various wire splices and/or electrical connections). The housing may have a round exterior shape to provide greater ease of installation (e.g., cutting a round-shaped opening in a drywall is less prone to error) and an improved aesthetic appearance (e.g., the trim has a smaller flange). It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive lighting systems, housing assemblies, and housings are provided, wherein a given example or set of examples showcases one or more particular features of a lighting module, a sidewall component, a top component, a bottom component, a spring clip assembly, a bar hanger assembly, a trim, a yoke, and a cover plate. It should be appreciated that one or more features discussed in connection with a given example of a lighting system, housing assembly, or housing may be employed in other examples of lighting systems, housing assemblies, or housings according to the present disclosure, such that the various features disclosed herein may be readily combined in a given lighting system, housing assembly, or housing according to the present disclosure (provided that respective features are not mutually inconsistent).

Certain dimensions and features of the housing, housing assembly, and the lighting system are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

A Housing Assembly With a Single Housing

Conventional housing assemblies for recessed lighting systems typically include multiple housings to contain various components of the lighting system. For example, FIG. 1 shows a recessed lighting system 10 with a conventional housing assembly 11 and an exemplary lighting module 110a. As shown, the housing assembly 11 includes a can housing 20 to contain the lighting module 110a and a portion of a trim 130a, a junction box 30 to receive a cable 96 from an external power supply system or power source (e.g., building mains), a conduit cable 40 to electrically couple the lighting module 110a to the cable 96, and a pan frame 12 to mechanically support the can housing 20 and the junction box 30.

As shown, the junction box 30 includes multiple knockouts 34, one of which is removed to form an opening 33 for the cable 96 to pass into a cavity 32 of the junction box 30.

The cable 96 includes multiple wires 96-1, 96-2, and 96-3. The wires 96-1 and 96-2 supply electrical power to the lighting system 10 and the wire 96-3 provides a ground connection to an external electrical ground. The wires 96-1 and 96-2 are spliced with wires 46-1 and 46-2, respectively, of the conduit cable 40 via wire nuts 47. Thus, the conduit cable 40 supplies electrical power to the lighting module 110*a*. The wire 96-3 is spliced with a ground cable 46-3 via a wire nut 47 and the ground cable 46-3, in turn, is connected to a wall of the junction box 30, thus electrically grounding the junction box 30 to the external electrical ground.

The can housing 20 includes an opening 24 to receive the conduit cable 40. As shown in FIG. 1, the lighting module 110*a* is mounted to the trim 130*a*. During installation, the lighting module 110*a* and the trim 130*a* are inserted into the cavity 22 of the can housing 20 through an opening 26. The trim 130*a* includes multiple friction clips 132 to mount the lighting module 110*a* and the trim 130*a* to the walls of the can housing 20. The lighting module 110*a* includes wires 152-1 and 152-2, which are spliced with the wires 46-1 and 46-2, respectively, of the conduit cable 40 via wire nuts 154. The lighting module 110*a* also includes a ground wire 152-3 connected to a ground cable 202 via a wire nut 154. The lighting module 110*a* is electrically connected to the conduit cable 40 before inserting the lighting module 110*a* and the trim 130*a* into the cavity 22 of the can housing 20.

The inclusion of multiple housings in a conventional housing assembly may have several drawbacks for general lighting installations. First, the can housing 20, the junction box 30, and the pan frame 12 are typically manufactured as separate sub-assemblies with multiple parts, which results in a longer manufacturing time and greater material costs. Second, the housing assembly 11 is often bulky in size and heavy, thus making installation more difficult since the installer is often required to hold the housing assembly 11 in place when mounting the housing assembly 11 to various support structures in the environment. Additionally, the housing assembly 11 may be unable accommodate smaller, more confined spaces. Third, the inclusion of multiple wire splices in the can housing 20 and the junction box 30 may make maintenance of the lighting system 10 more difficult since the user would be unable to access the wire splices within the junction box 30 without first removing the drywall panel from a ceiling in the case of a new construction installation or removing the housing assembly 11 in its entirety in the case of a remodel installation.

To address these limitations, the present disclosure describes various inventive implementations of a housing assembly with a single housing that may contain a lighting module, a trim, a cable from an external power supply system, and various electrical connections between the cable and the lighting module. In other words, the housing may consolidate the respective functions of a conventional can housing and a conventional junction box, thus appreciably simplifying the overall design of the housing assembly, in part, by reducing the number of parts and sub-assemblies in the housing assembly.

Figure 2B:
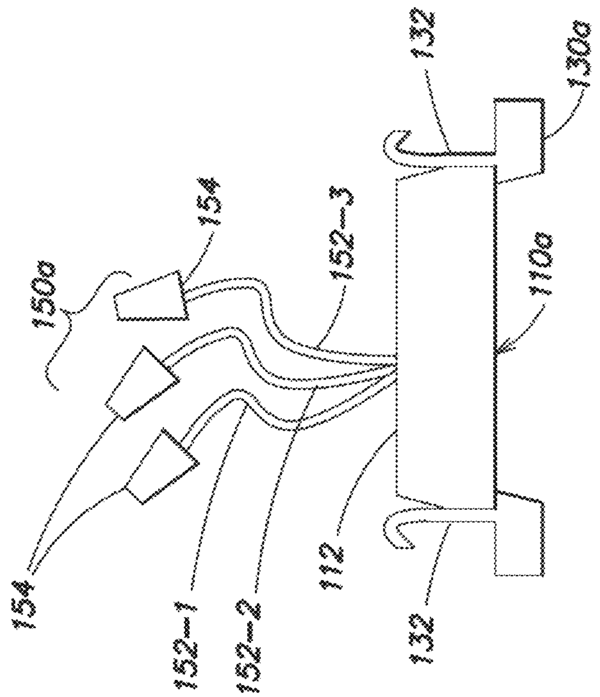
FIG. 2B shows an exemplary lighting module with electrical wires and wire splices.
Figure 2A:
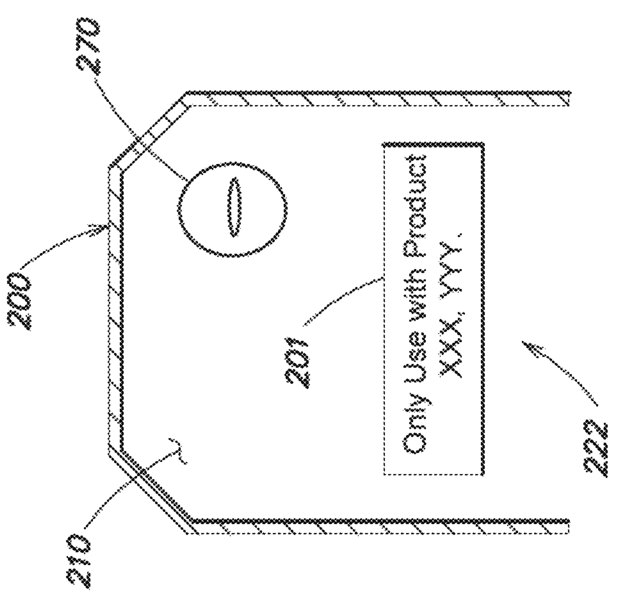
FIG. 2A shows a cross-sectional view of a representative housing according to the inventive implementations of this disclosure.

FIG. 2A shows a general example of a housing 200 representative of the inventive implementations described herein. As shown, the housing 200 may define a cavity 210 with a bottom opening 222 to receive and contain a lighting module and at least a portion of a trim. The housing 200 may further include one or more knockouts 270, which when removed may receive a cable from an external power supply system supplying electrical power to the lighting module.

Figure 3B:
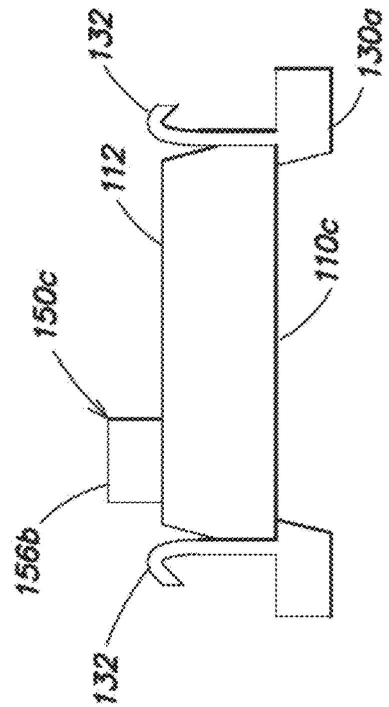
FIG. 3B shows another exemplary lighting module with an electrical connector integrated directly on the module housing.
Figure 3A:
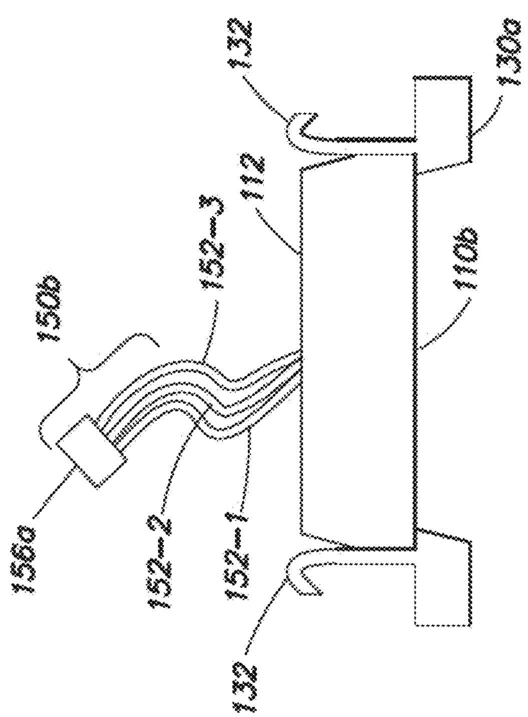
FIG. 3A shows another exemplary lighting module with electrical wires and an electrical connector.

The housing 200 may generally accommodate and support different lighting modules and trims. For example, the housing 200 may support the lighting module 110*a*. FIG. 2B shows another view of the lighting module 110*a* and the trim 130*a*, which includes an electrical connection mechanism 150*a* with multiple wires 152-1, 152-2, and 152-3 and corresponding wire nuts 154 as described above. In some implementations, the wires 152-1, 152-2, and 152-3 may be 18 AWG wires. In another example, FIG. 3A shows another lighting module 110*b* with an electrical connection mechanism 150*b* that includes wires 152-1, 152-2, and 152-3 connected to an electrical connector 156*a*. In yet another example, FIG. 3B shows another lighting module 110*c* with an electrical connection mechanism 150*c* that includes an electrical connector 156*b* integrated directly onto the module housing 112 such that there are no wires outside the module housing 112. The lighting module 110*a* may generally include a LED light source (not shown) and a driver (not shown) with a module housing 112 that functions as a heat sink. The trim 130*a* may also be formed of a thermally conductive material (e.g., aluminum) to dissipate heat generated by the lighting module 110*a*.

Figure 2C:
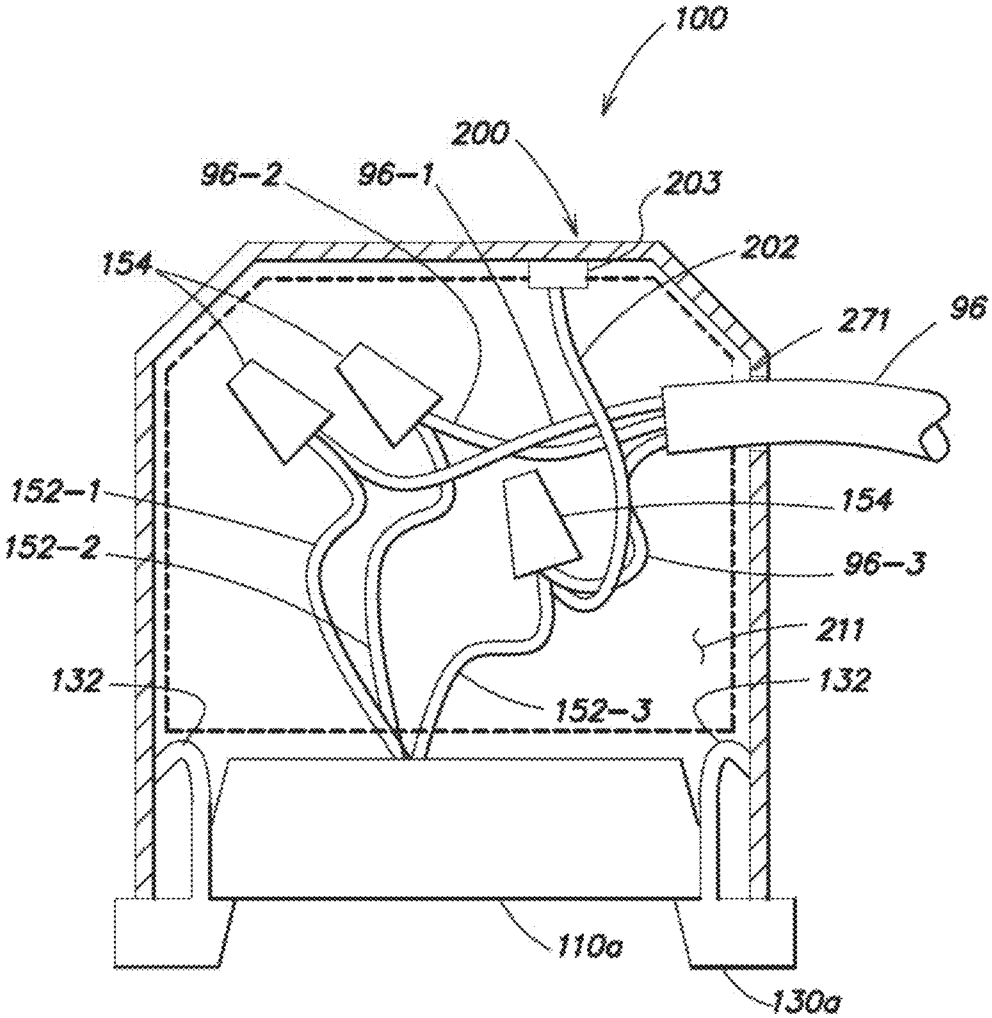
FIG. 2C shows a cross-sectional view of a representative lighting system that includes the housing of FIG. 2A and the lighting module of FIG. 2B.

FIG. 2C shows an exemplary lighting system 100 that includes the lighting module 110*a*, the trim 130*a*, and the cable 96 supported by the housing 200. As shown, the lighting module 110*a* may be disposed in the cavity 210 and supported by the trim 130*a*, which is mounted to the housing 200 via multiple friction clips 132. The cable 96 may be inserted through an opening 271 formed by the removal of one of the knockouts 270. The wires 96-1, 96-2, and 96-3 of the cable 96 may be spliced with the wires 152-1, 152-2, and 152-3, respectively, of the lighting module 110*a* via the wire nuts 154. The housing 200 may additionally include a ground cable 202 connected at one end to a wall of the housing 200 via a fastener 203. The ground cable 202 may be spliced with the wire 152-3 and the wire 96-3 via the same wire nut 154, thus electrically grounding the lighting module 110*a* and the housing 200 to an external electrical ground.

In a typical installation, the housing 200 is mounted to a support structure in the environment (e.g., a wood/metal joist, a T-bar, a hat channel, a drywall panel). The cable 96 may be inserted into the cavity 210 of the housing 200 before or after the housing 200 is mounted to the ceiling depending, in part, whether the installation is a new construction installation or a remodel installation. Once the housing 200 is installed, the lighting module 110*a* may then be electrically connected to the cable 96 and subsequently inserted into the cavity 210 of the housing 200 together with the trim 130*a*.

In some implementations, the housing 200 may be designed to qualify as both an electrical junction box and a luminaire enclosure in accordance with various standards and regulations. In one example, the housing 200 may meet the requirements of UL514 for metallic outlet boxes and/or UL1598 for luminaires. For example, the housing 200 may be formed from galvanized steel with wall thickness of 1.6 mm (1/16 inches) if the housing 200 is fire-rated or 1.0 mm if the housing 200 is not fire-rated. In some implementations, the thickness may range between about 0.6 mm to about 2.0 mm when the sidewall and top components are formed from galvanized steel. The thickness of the walls forming the housing 200 may be chosen, in part, to satisfy the thickness specifications for enclosures in accordance with UL1598, which is summarized in the table shown in FIG. 4. It should be appreciated the housing 200 may be formed of other materials including, but not limited to, steel alloys, aluminum, brass, copper, and any combinations of the foregoing. The wall thicknesses of the housing 200 may be tailored based on the material used to form the housing 200 in accordance with FIG. 4.

The housing 200 may also be dimensioned such that the portion 211 of the cavity 210 remaining after the lighting module 110*a* and the trim 130*a* are mounted to the housing 200 is sufficiently large to contain a specific number of wires of a particular gauge and wire splices specified by the various standards and regulations. The number of wires and wire gauge may generally vary depending, in part, on the trade size of the housing. For example, the portion 211 of the cavity 210 may provide space to contain at least nine 12 AWG wires for a 4-inch trade size installation. This may be accomplished, in part, by dimension the housing 200 such that the portion 211 has a volume greater than or equal to 21 cubic inches. The nine 12 AWG wires may further correspond to three sets of wires that each provide positive, negative, and ground connections for (1) the receipt of electrical power from an external power supply system and (2) the branching of wire connections to two other lighting systems. More generally, the dimensions of the housing 200 and, in particular, the volume of the portion 211 of the cavity 210 may be chosen to comply with the requirements set forth in Article 314 of the 2020 NEC and, in particular, Section 314.16 entitled, "Number of Conductors in Outlet, Device, and Junction Boxes, and Conduit Bodies." The ground connection provided by the housing 200 via the ground cable 202 may also help satisfy the UL standards for electrical junction boxes and/or luminaires. In some implementations, the volume of the cavity 210 may range between about 30 cubic inches and about 80 cubic inches. The term "about," when used to describe the volume of the housing 200, is intended to cover manufacturing tolerances. For example, "about 30 cubic inches" may correspond to the following dimensional ranges: 29.7 to 30.3 cubic inches (+/−1% tolerance), 29.76 to 30.24 cubic inches (+/−0.8% tolerance), 29.82 to 30.18 cubic inches (+/−0.6% tolerance), 29.88 to 30.12 cubic inches (+/−0.4% tolerance), 29.94 to 30.06 cubic inches (+/−0.2% tolerance).

Figure 3C:
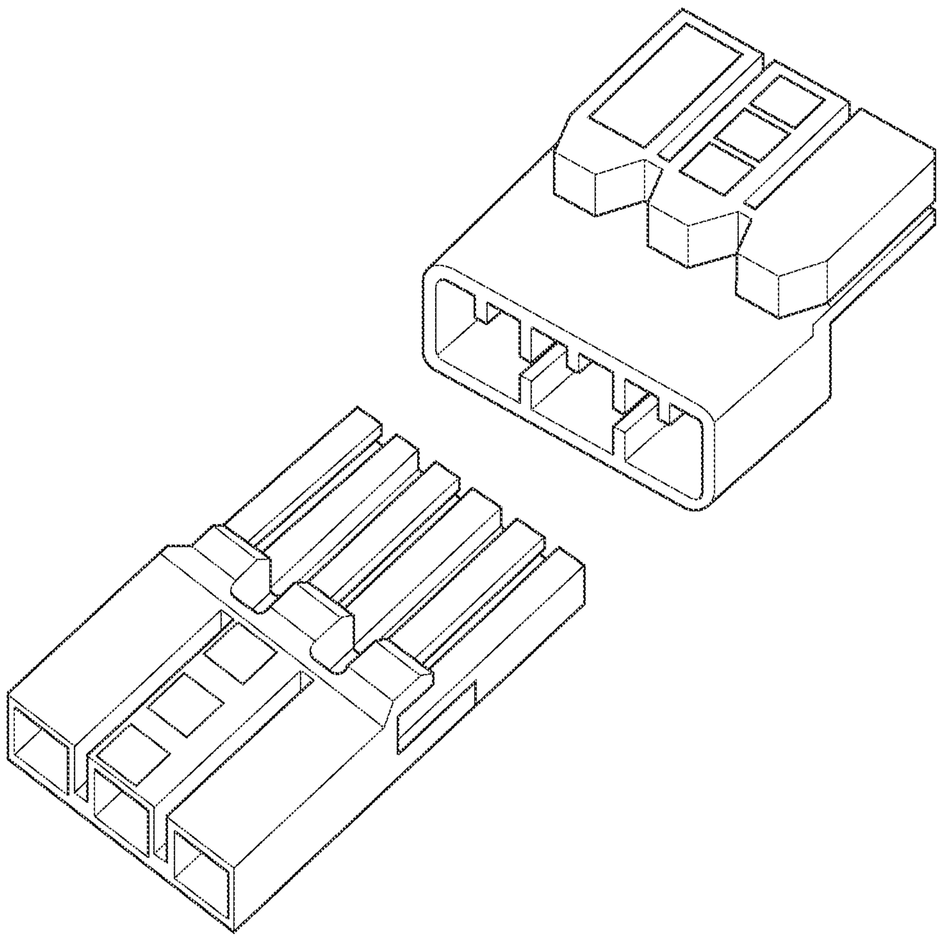
FIG. 3C shows an exemplary UL-listed electrical connector.
Figure 3D:
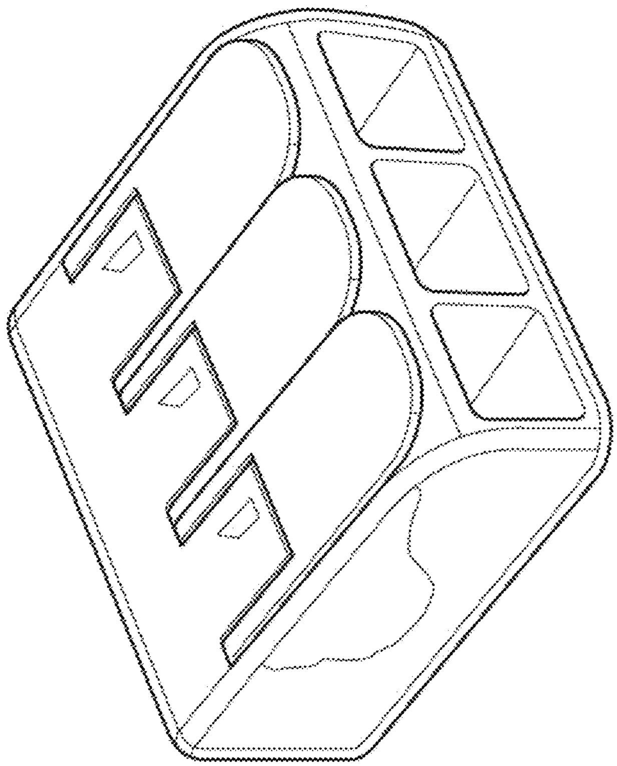
FIG. 3D shows another exemplary UL-listed electrical connector.

It should also be appreciated the lighting module 110*a* may include components that are also compliant with various standards and regulations (e.g., the UL1598 standard) so that the lighting system 100, when installed, meets these standards and regulations. For example, the lighting module 110*a* includes UL-listed wire nuts. In another example, the lighting module 110*b* includes a UL-listed electrical connector 45*a* connected to the wires 152-1, 152-2, and 152-3. In yet another example, the lighting module 110*c* includes a UL-listed electrical connector 45*b* integrated directly onto a module housing of the lighting module 110*c*. FIGS. 3C and 3D further show exemplary electrical connectors that are compliant with UL standards. Specifically, FIG. 3C shows an Ideal PowerPlug 3-Pole Luminaire Disconnect Model 183 (100-Box). FIG. 3D shows a WAGO 221 electrical connector.

In some implementations, the housing 200 may include a label 201 disposed on an interior side of the walls that further specifies the components (e.g., the lighting module, the trim) that are compatible with the housing 200 to meet the various standards and regulations. For example, the label 201 may explicitly state "Only Use with Product XXX, YYY" where XXX and YYY refer to specific products that are deemed compliant with the housing 200.

A Housing Assembly With a Round-Shaped Housing

The housing 200 may generally have a round shape, which provides several benefits to the design and installation of a lighting system. First, the round-shaped opening formed in the ceiling during installation may be easier to cut compared to previous polygonal shaped housings since the installer can continuously guide a saw blade along a curve when cutting whereas a polygonal-shaped opening typically requires the installer to intermittently reposition the sawblade to avoid overshooting a vertex of the polygon. The round shaped housing may also support a round-shaped trim with a smaller flange to cover the opening in the ceiling. A trim with smaller flange may be lighter in weight and smaller, thus enabling lighting installations closer to a corner of an environment (e.g., a corner between a ceiling and a wall). For example, the flange may have an inner radius defining an aperture for light to pass through the trim and an outer radius that defines the lateral extent of the flange. The difference between the inner and outer radii may be less than or equal to ½ inch. Although the flange may be smaller, the trim may still provide room to overshoot when cutting an opening in the drywall. Additionally, lighting modules typically include a round-shaped module housing. Thus, the round-shaped housing may more readily conform in shape with the round-shaped module housing of the lighting module. This, in turn, may allow a smaller opening to be formed in the drywall compared to a polygonal-shaped housing with a similar characteristic width.

Examples of round-shaped housings for housing assemblies and recessed lighting system may be found in U.S. application Ser. No. 15/132,875, filed on Apr. 19, 2016, entitled, "OUTER CASING FOR A RECESSED LIGHTING FIXTURE," which is incorporated by reference herein in its entirety.

Figure 5:
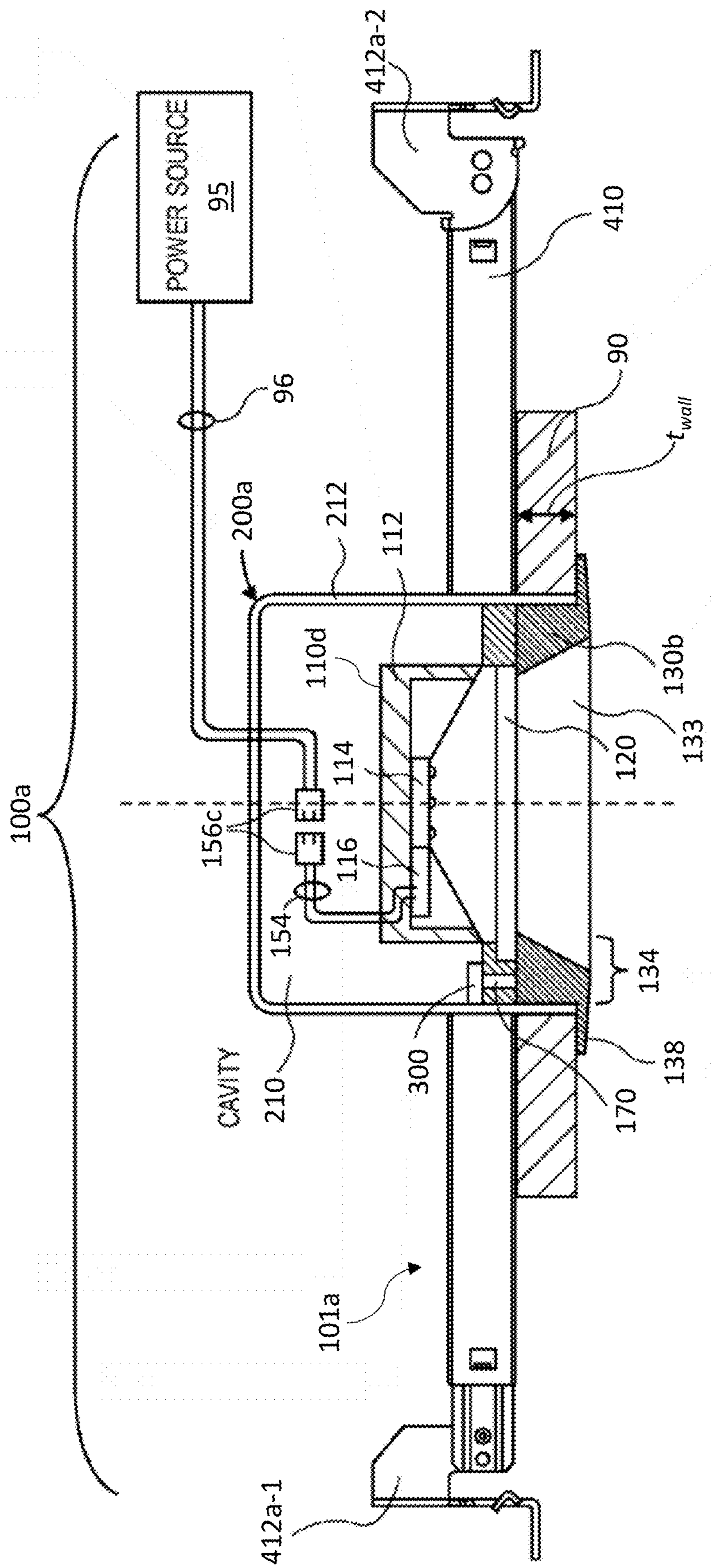
FIG. 5 shows a cross-sectional front view of a housing, with a module housing positioned inside the housing, coupled to bar hangers according to one embodiment.

FIG. 5 shows a cross-section view of a recessed lighting fixture or system 100*a* installed so that the exposed edge of the ceiling or wall 90, where a hole is formed, is covered. The recessed lighting fixture 100*a* may include an outer casing 200*a* (also referred to herein as "a housing 200*a*"), a unified casting 112 (also referred to more generally herein as a "module housing 112") for a lighting module 110*d*, a trim 130*b*, and bar hanger assemblies 400*a* that include a set of hanger bars 410 (also referred to herein as "bar hangers 410") and a set of hanger holders 430 (also referred to herein as "bar hanger holders 430") shown in a side view in FIG. 6 and also in FIG. 8. The outer casing 200*a*, the bar hangers 410, and the bar hanger holders 430 may form a housing assembly 101*a*. The unified casting 112 may house both a light source module 114 (e.g., a module of several LED elements) and a driver 116 in a single compact unit. The light source module 114 is referred to more generally herein as a light source 114. The trim 130*b* serves the primary purpose of covering the exposed edge of the ceiling or wall 90 where a hole is formed in which the recessed lighting fixture 100*a* resides while still allowing light from a light source module 114 to be emitted into a room through an aperture 133 of the trim 130*b* to illuminate the room. In doing so, the trim 130*b* helps the recessed lighting fixture 100*a* appear seamlessly integrated into the ceiling or wall. The trim 130*b* may be attached to the outer casing 200*a* also to hide at least the periphery at the bottom edge of the outer casing 200*a* from view. This can be seen in FIG. 5 where a flange 138 extends outward from a trim base 134 so as to hide from view (below the light fixture) the bottom edge of the casing 200*a*. As will be described in further detail below, the recessed lighting fixture 100*a* provides a more compact and cost effective design that also allows the outer casing 200*a* to be moved so that its position relative to the hanger bars 410 can be adjusted, while complying with various building and safety codes/regulations. Each of the elements of the recessed lighting fixture 100*a* will be explained by way of example below.

Instead of using a junction box that is mounted along with a can to a horizontal platform (which is in turn attached to a joist or other structural member behind the ceiling or wall 90), as is already known in the art, the outer casing 200*a* may be used in such a way that obviates the need for a separate junction box and that also eliminates the horizontal platform. As seen FIG. 6 and in FIG. 7, the outer casing 200*a*, and in particular its sidewall 212, is directly attached to a hanger bar 410 via a hanger holder 430. The hanger bar 410 is in turn attached directly to a joist, beam, or other structural member behind the ceiling or wall 90 at a mounting block 412*a*-1, 412*a*-2 (collectively referred to herein as "mounting blocks 412*a*" or as "bar hanger heads 412*a*"), so that the aperture 133 of the trim 130*b* will be aligned with and covers the hole in the wall 90. The outer casing 200*a* may serve as both a protective barrier between wall insulation materials and wiring junctions inside its cavity, and as a luminaire enclosure. As shown in FIG. 5, the outer casing 200*a* is a structure that separates the inner components of the recessed lighting fixture 100*a*, i.e., those that are located inside the outer casing 200*a*, including electrical wires/cables 96, 154 and connectors 146*a* that electrically connect a driver 116 in the unified casting 112 to an external power source 95, from items such as thermal/heat insulation materials and the power source 95 that are outside of the outer casing 200*a* and inside a ceiling or crawl space in which the outer casing has been installed. In one embodiment, the outer casing 200*a* may accommodate a wall thickness ($t_{env}$) of the ceiling or wall 90 of ½ inch to 2½ inches. The outer casing 200*a* may have a fire rating of up to two hours without any need for modification, where the fire rating is described in the National Electrical Code (NEC) and by the Underwriters Laboratories (UL) such as specified in UL 263. The outer casing 200*a* may receive electrical wires 96 into its cavity from the power source 95, such as an electrical power distribution system (e.g., 120 VAC or 277 VAC) within a building or structure in which the recessed lighting fixture 100*a* is installed. There may be one or more wire connectors 146*a* inside the outer casing 200*a* that join one or more wires 96 which carry 120/277 VAC power and that extend into the casing, to deliver 120/277 VAC power from a circuit breaker or wall switch to the driver 116. The electrical wires 96 from the power source 95 may thus be connected inside the outer casing 200*a* to corresponding wires 154 of the driver 116 which is inside the unified casting 112, as will be described in greater detail below.

Figure 8:
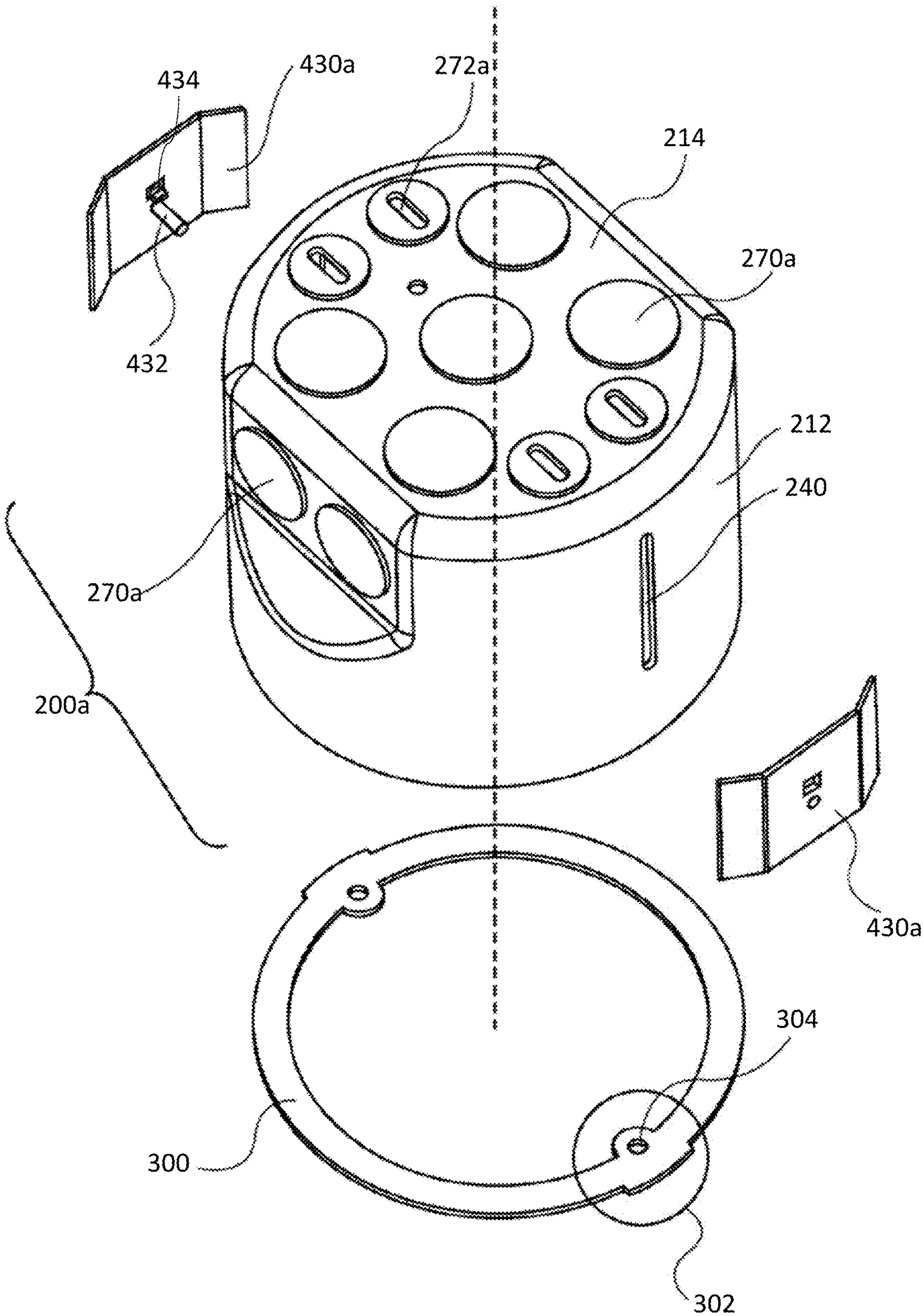
FIG. 8 shows an overhead perspective view of a housing, bar hanger holders, and a mounting ring according to one embodiment.
Figure 9:
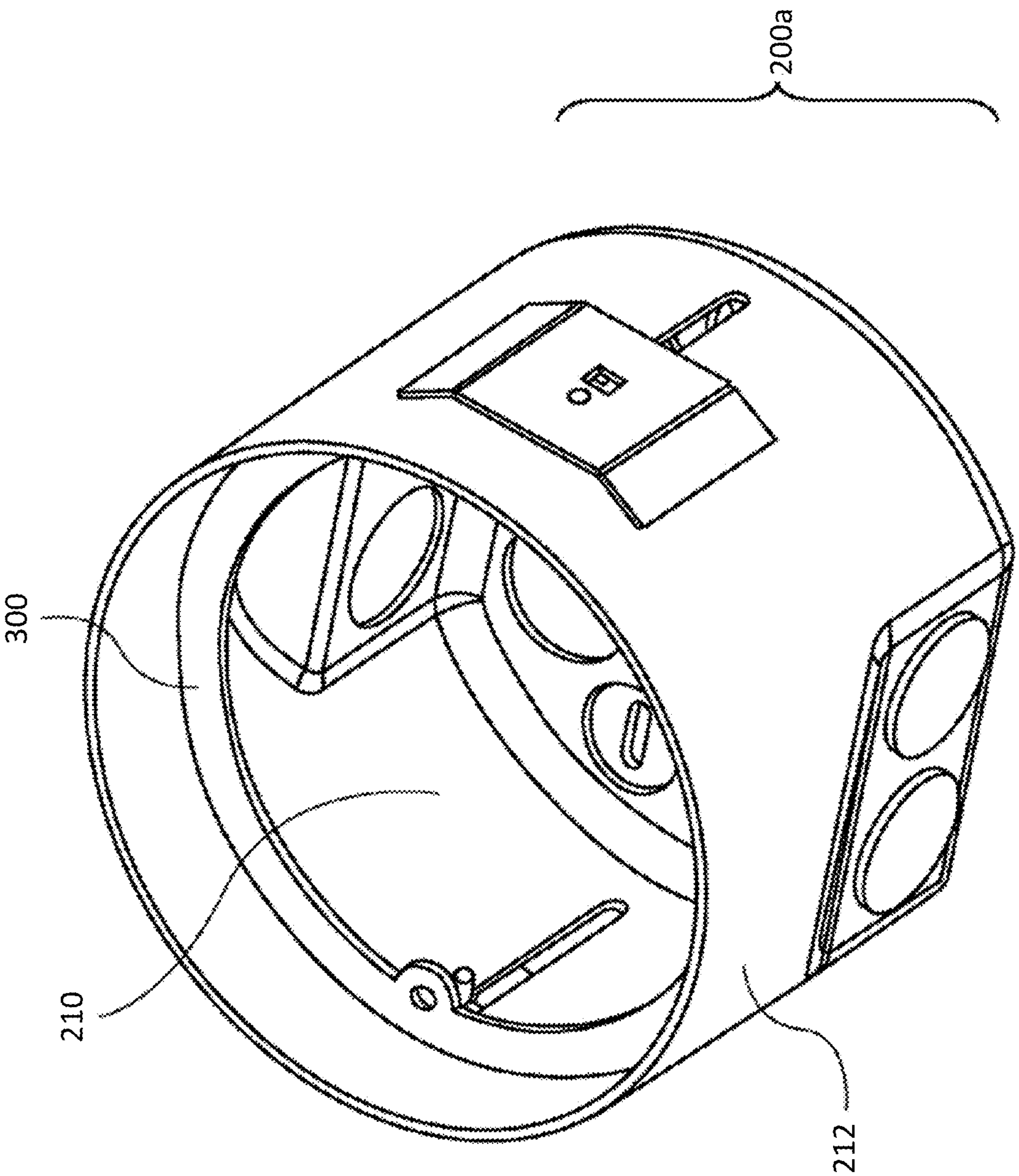
FIG. 9 shows a bottom perspective view of the embodiment of FIG. 8 with the mounting ring inserted into the cavity of the housing.

As shown in FIG. 8, the outer casing 200*a* may have a side wall 212 that extends from and is joined at its upper edge (or upper end) to a closed base end 214, which together define a cavity 210 therein (see FIG. 5 and FIG. 9). The side wall 212 may surround the cavity 210, with its lower edge (or lower end) defining the perimeter of an opening through which various components can be placed inside the cavity 210, including for example, a ring 300, the unified casting 112, and the trim 130*b*, as shown in FIG. 8, FIG. 9, and in FIG. 5. In one embodiment, as shown in FIG. 9, the lower edge (lower end) of the sidewall 212 is devoid of any tabs that extend inward (towards a center vertical axis that is shown as a dotted line). While the side wall 212 is depicted in the relevant figures here as being cylindrical, in other embodiments the side wall 212 of the outer casing 200*a* have any suitable shape, including a polyhedron, ellipsoid, frustoconical, or otherwise curved. The cavity 210 that is formed in the outer casing 200*a* is larger than the outside dimensions of the unified casting 112 such that the entirety of the unified casting 112 fits into the cavity 210—see the front and side views in FIG. 5 and FIG. 6. The unified casting 112 may or may not come into direct contact with the side wall 212 of the outer casing 200*a*. The outer casing 200*a* is less than 5 inches in height between its base end and the other end of its sidewall.

As seen in FIG. 8, the outer casing 200*a* may have on its base end 214 one or more knockouts 270*a* as shown. The knockouts 270*a* may be punched through and removed to leave an opening behind on the base end 214, for electrical wires 96 or 154 to be inserted through the opening (which wires serve to deliver power to the driver 116). As shown in the top view of FIG. 7, one or more knockouts 270*a* may also have smaller openings 272 in them (e.g., a slit, slot, etc., that is smaller than the opening that results when the knockout 270*a* has been removed from the base end 214) that may allow the electrical wires 96 or 154 to be inserted through without the need to punch through the knockouts 270*a*. The knockout 270*a* may have a trade size greater than ½ inches resulting in a diameter larger than ½ inches. In one embodiment, one or more of the knockouts 270*a* allow for the installation therethrough of a non-metallic sheathed cable (as the wires 96). As shown in FIG. 8, one or more of the knockouts 270*a* may also be positioned on the side wall 212 of the outer casing 200*a*.

In one embodiment, as shown in FIG. 5, the electrical wires 96 received by the outer casing 270*a* from a power source 95 (e.g., the electrical system of a building or structure) may be connected to the electrical wires 154 of the unified casting 112. As shown, the electrical wires 96 and 154 are connected together through the use of connectors 146*a* that may be contained within the outer casing 200*a* (together with the unified casting 112). The term "connector" here is used broadly to not just interlocking or mating connector pairs but also cover wire terminal blocks and wire caps or other devices. In one embodiment, the connectors 146*a* may be kept outside the outer casing 200*a* (while the unified casting 112 is retained inside) if the wires 154 are long enough to reach outside of the casing 200*a*. The electrical wires 154 of the unified casting 112 may terminate in a connection with the driver 116 installed within the unified casting 112. When the wires 96 and 154 are connected to each other, electricity may pass from the power source 95 to the driver 116 to enable the driver 116 to power the light source module 114. In one embodiment, the driver 116 has three or more current carrying electrical wires 154.

Figure 10:
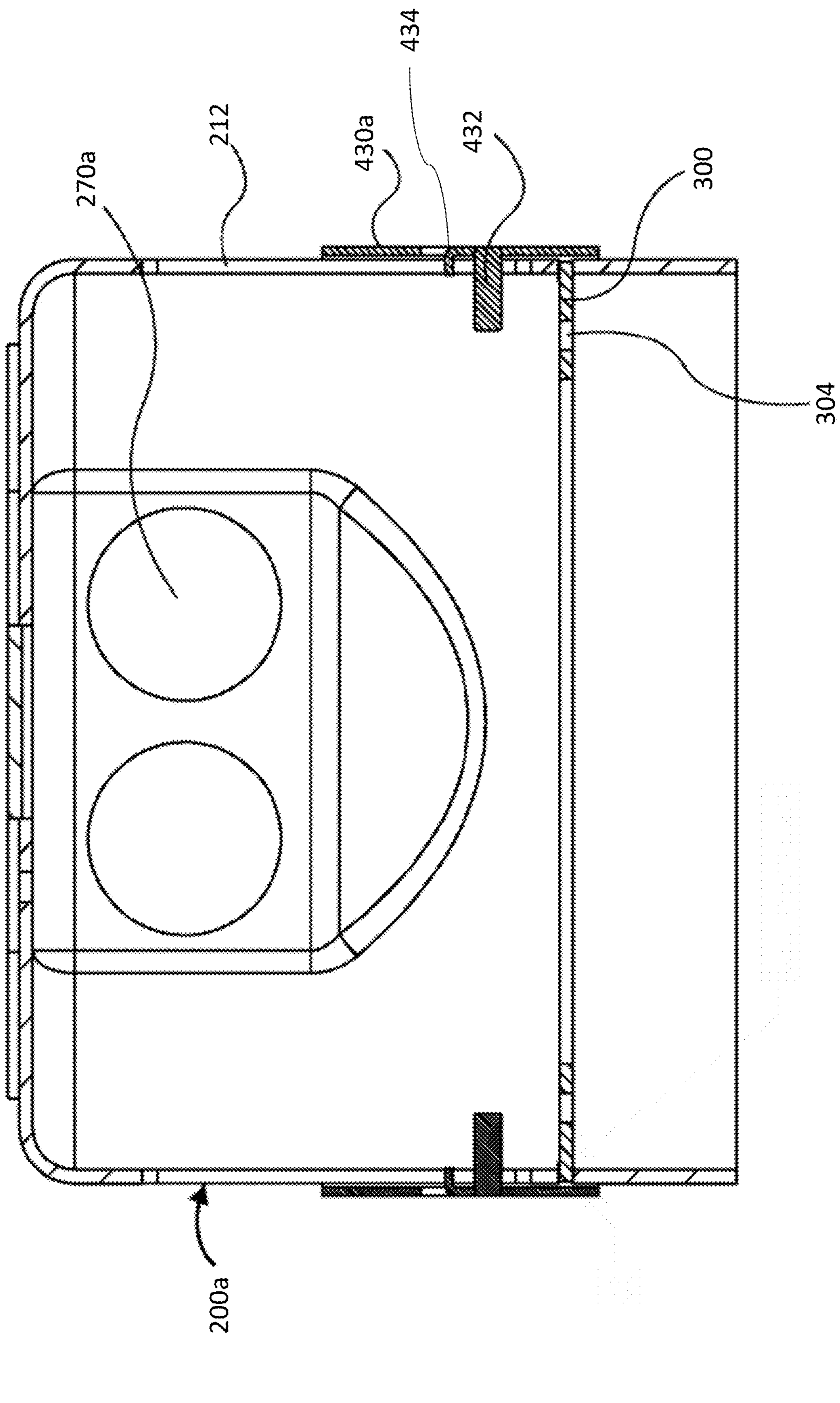
FIG. 10 shows a cross-sectional side view of a housing with bar hanger holders and a mounting ring according to one embodiment.
Figure 11:
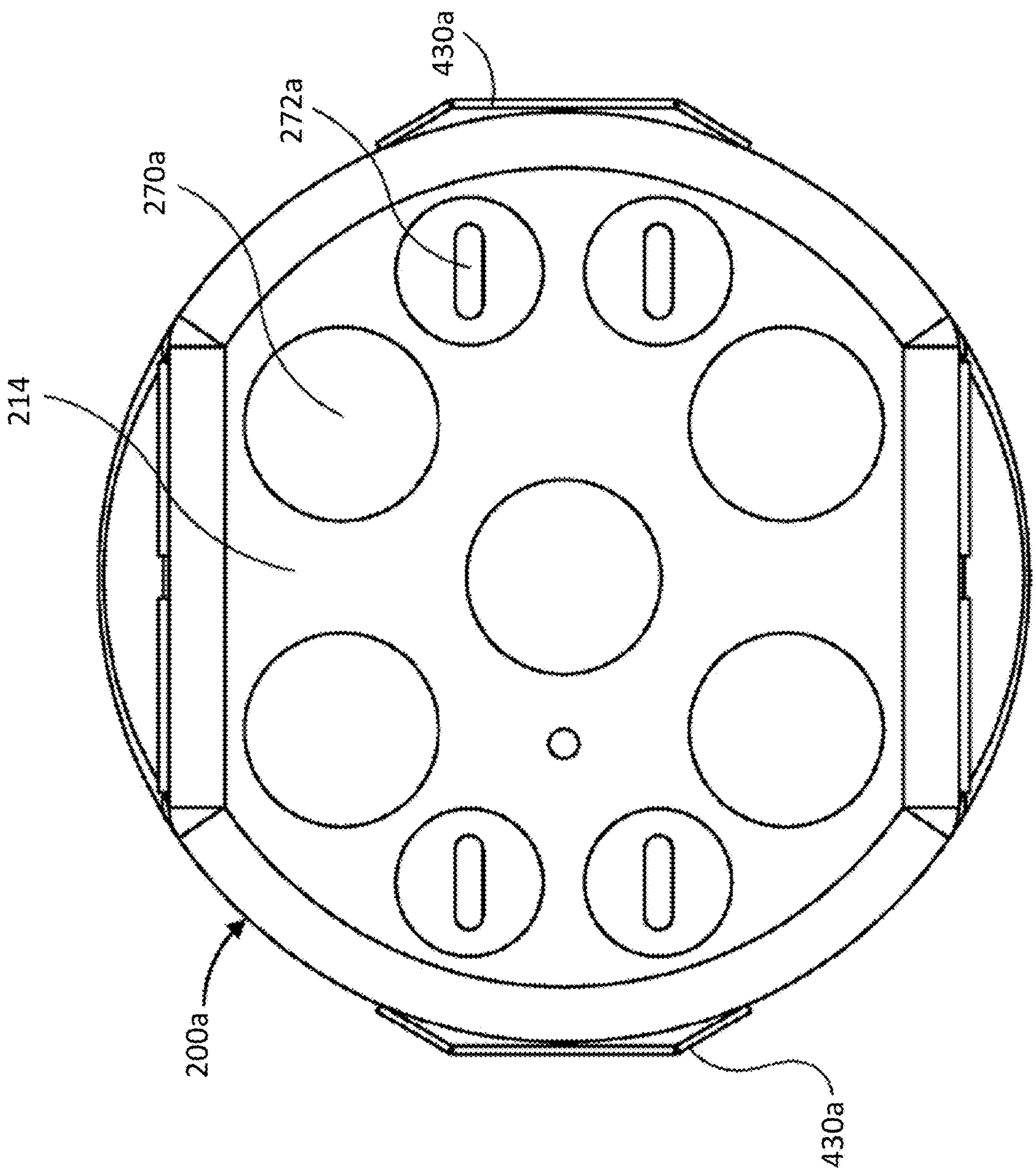
FIG. 11 shows a top view of the embodiment of FIG. 10.

As seen in FIG. 9, the outer casing 200*a* may have within its cavity 210 a ring 300. The ring 300 maybe shaped as a circle (shown), a polygon, or an ellipsoid, where it conforms to the sidewall 212 of outer casing 200*a*. The ring 300 may be inserted into the cavity 210 of the outer casing 200*a* through the open end of the sidewall 212, and then secured to the inner surface of the sidewall 212 of the outer casing 200*a* as seen in FIG. 10. Once the ring 300 has been secured, the unified casting 112 may be inserted into the cavity 210 (through the same open end of the sidewall 212) and then attached to the ring 300 so as to secure the unified casting 112 to the outer casing 200*a* and prevent the unified casting 112 from falling out of the outer casing. The ring 300 has one or more tabs 302 formed as a flat segment of the ring, each having an opening 304 that passes through the ring 300 (from one face to the other face)—see FIG. 8 and FIG. 10. These are used for coupling (fastening) the outer casing 200*a* to the unified casting 112—see FIG. 5. In the embodiment of FIG. 8, there are two tabs 302 located sally opposite each other (along the circumference of the ring). When the ring 300 is fitted inside the casing 200*a* (as seen in FIG. 9), each tab 302 may extend inward from and is perpendicular to an inner surface of the sidewall 212 of the outer casing 200*a*. Each tab 302 and its opening 304 serves to receive a fastener 170, so as to firmly hold the weight of the unified casting 112 including the light source module 114 and the driver 116 contained in the unified casting 112. The fastener 170 may be a screw, bolt, pin, or the like. In other embodiments, the tabs 302 may incorporate other types of fastening mechanisms (to fasten the unified casting 112 to the outer casing 200*a*), such as a twist-and-lock friction connection that does not require the use of separate tools or other devices. The ring 300 should be affixed inside the cavity so that its tabs 302 may be further recessed inside the cavity 210, towards the base end 214, so that the unified casting 112 and trim 130*b* may also be further recessed inside the outer casing 200*a*.

In another embodiment, the tab 302 is formed as a portion of the sidewall 212 that has been bent inward, without the need for a ring 300. In this embodiment, the ring 300 is not necessary, as long as the unified casting 112 can otherwise be secured to the outer casing 200*a* via the tab 302, so as to be prevented from falling out of the outer casing 200*a*.

Figure 12:
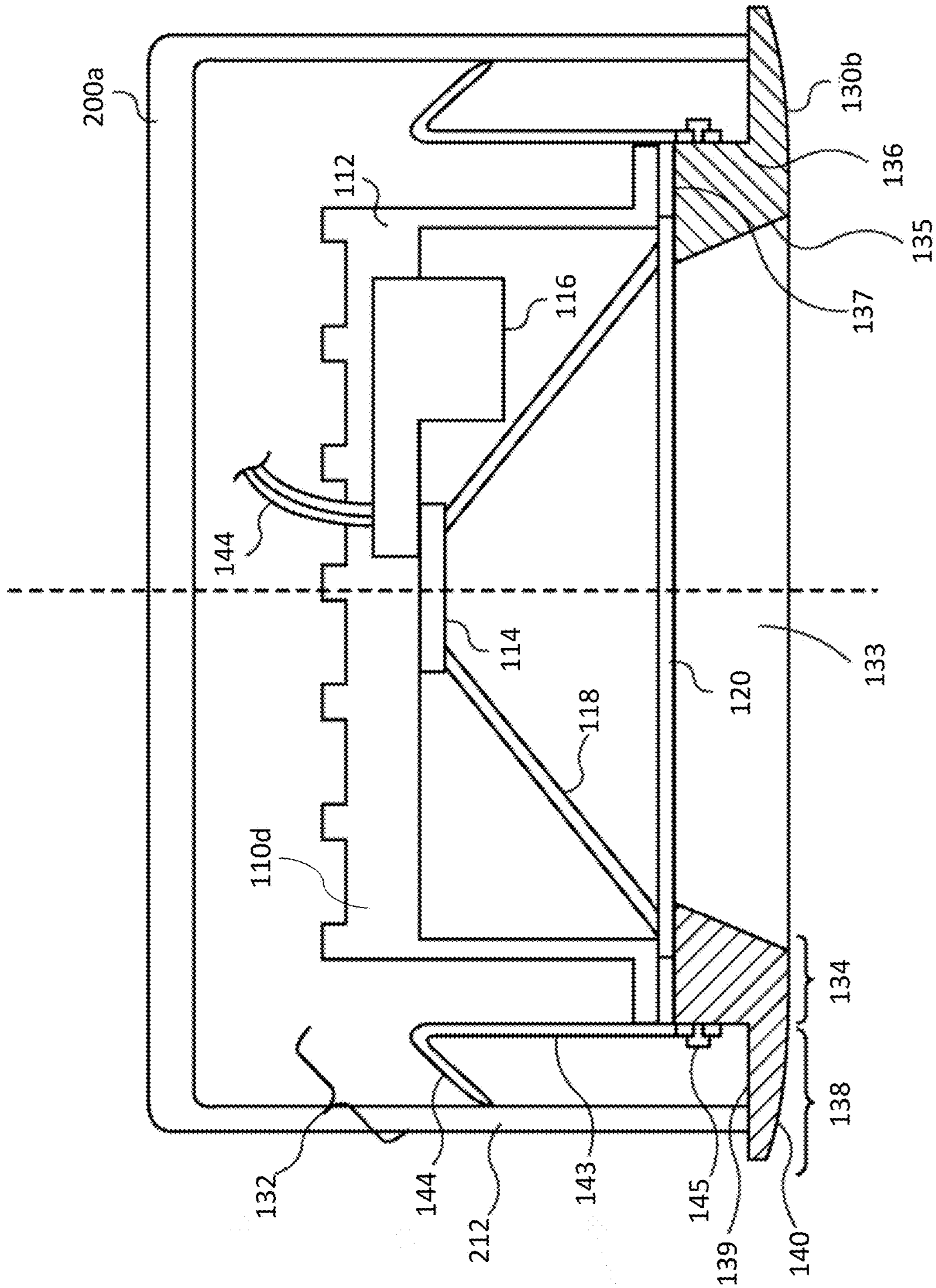
FIG. 12 shows a cross-sectional side view of a housing, a module housing, a trim, and two friction clips according to one embodiment.

In other embodiments, as shown in FIG. 12, the unified casting 112 may be held inside the outer casing 200*a*, without being directly fastened to any tabs 302. Friction clips 132 (or tension clips) may be utilized to retain the unified casting 112 inside the outer casing 200*a*. Each friction clip 132 may be attached via a screw 145 (or other fastening mechanism such as a bolt, resin, glue, or the like) to a trim base 134 of the trim 130*b*, or directly to the unified casting 112. The friction clip 132 may be flexible and resilient. The friction clip 132 may be a piece of metal that has a straight portion 143 extending from the screw 145 and is then bent backward to form a bent portion 144. The bent portion 144 of the friction clip 132 may directly contact the inner surface of the sidewall 212 of the outer casing 200*a*, as shown, preventing the unified casting 112 and the trim 130*b* from falling out of the outer casing 200*a*.

The unified casting 112 is a shell and/or enclosure that further prevents the exposure of heat from the light source module 114 and the driver 116 to the items inside a ceiling or crawl space (e.g., insulation) in which the recessed lighting fixture 100*a* has been installed. The unified casting 112 may be formed of metals, polymers, metal alloys, and/or other heat insulating materials. As shown in FIG. 5, the unified casting 112 may be a cylindrical structure; however, in other embodiments, the unified casting 112 may be any suitable shape, including an ellipsoid, cone, or polyhedron that is capable of housing the light source module 114 and the driver 116.

In one embodiment, the unified casting 112 includes one or more heat sinks to dissipate heat generated by the light source module 114 and/or the driver 116. Although the heat sinks are shown as fins (in FIG. 6 and FIG. 12) which are passive components (formed on the outer surface of the end wall and/or the side wall of the unified casting 112) that cool the combined unified casting 112, light source module 114, and driver 116, by dissipating heat into the surrounding air, active heat sinks (e.g., fans) may also be used. In one embodiment, the heat sinks are defined by a set of fins surrounding the unified casting 112, which are formed in the same casting (manufacturing) process that results in the unified casting 112 being formed. The heat sinks may be composed of any thermally conductive material. For example, the heat sinks may be made of aluminium alloys, copper, copper-tungsten pseudoalloy, AlSiC (silicon carbide in aluminium matrix), Dymalloy (diamond in copper-silver alloy matrix), E-Material (beryllium oxide in beryllium matrix), and/or thermally conductive plastics or ceramics.

Still referring to FIG. 12, the recessed lighting fixture 100*a* may include the driver 116 contained within the unified casting 112. The driver 116 is an electronic circuit or device that supplies and/or regulates electrical energy to the light source module 114 and thus powers the light source module 114 to emit light. The light source module 114 and the driver 116 may be coupled to the end wall of the unified casting 112 as shown in FIG. 12, using any suitable connecting mechanism, including screws, resins, clips, or clamps. The driver 116 may be any type of electrical power supply, including power supplies that deliver an alternating current (AC) or a direct current (DC) voltage to the light source module 114. Upon receiving electricity through the wires 144, the driver 116 may regulate current or voltage to supply a stable voltage or current within the operating parameters of the light source module 114. The driver 116 receives an input current from the power source 95 and may drop the voltage of the input current to an acceptable level for the light source module 114 (e.g., from 120V-277V to 36V-48V). The driver 116 may transfer electrical power to the light source module 114 through an electrical connector (not shown). For example, the driver 116 may deliver electricity to the light source module 114 through an electrical cable (not shown) coupled between the light source module 114 and the driver 116 through removable or permanent connectors or soldered leads originating from the driver 116. The driver 116 may include a magnetic transformer or additional or alternative circuitry for voltage conversion and for regulating the input current or voltage to the light source module 114.

The light source module 114 may be any electro-optical device or combination of devices for emitting light. For example, the light source module 114 may have a single type of light emitting element, as a light emitting diode (LED), organic light-emitting diode (OLED), or polymer light-emitting diode (PLED). In some embodiments, the light source module 114 may have multiple light emitting elements (e.g., LEDs, OLEDs, and/or PLEDs). The light source module 114 receives electricity from the driver 116, as described above, such that the light source module 114 may emit a controlled beam of light into a room or surrounding area. The driver 116 is designed to ensure that the appropriate voltage and current are fed to the light source module 114 to enable the emission of light by the one or more light sources within the light source module 114.

In some embodiments, the recessed lighting fixture 100*a* may include a reflector 118 contained in the unified casting 112, as shown in FIG. 12. The reflector 118 may surround the entire light source module 114 as shown, or it may surround just a light emitting element of the light source module 114, to adjust the way light emitted by the light source module 114 is directed into a room or surrounding area. In one embodiment, the reflector 118 surrounds the entirety of the light source module 114 and also separates the light source module 114 from the driver 116. This separation allows light from the light source module 114 to be emitted into a room or surrounding area, while shielding the driver 116 from being exposed to the room or surrounding area. For example, in one embodiment, the reflector 118 and the unified casting 112 may together create a sealed structure to shield the driver 116 from the outside environment and the light source module 114. By shielding the driver 116 from the outside environment, the reflector 118 might reduce the risk of fire or other dangers and may help ensure the recessed lighting fixture 100*a* complies with building and safety codes/regulations. The reflector 118 may be formed of any fire retardant material, including steel, aluminum, metal alloys, calcium silicate, and other similar materials.

The reflector 118 may be formed in any shape that may direct and/or focus light. For example, the reflector 118 may be parabolic or spherical. In one embodiment, the front surface of the reflector 118 may be coated with a reflecting material or include one or more reflecting elements that assists in the adjustment of light emitted by the light source module 114. For example, the reflector 118 may be coated with a shiny enamel or include one or more mirrors or retroreflectors or a microcellular polyethylene terephthalate (MCPET) material to adjust the focus of light emitted by the light module 8. In other embodiments, the reflector 118 may include various other optic elements to assist in the focusing of light emitted by the light source module 114.

Still referring to FIG. 12, in one embodiment, the recessed lighting fixture 100*a* may include a lens 120. The lens 120 may be formed to converge or diverge light emitted by the light source module 114. The lens 120 may be a simple lens 120 comprised of a single optical element or a compound lens 120 comprised of an array of simple lenses 120 (elements) with a common axis. In one embodiment, the lens 120 also provides a protective barrier for the light source module 114 and shields the light source module 114 from moisture or inclement weather. The lens 120 may also assist in the diffusion of light and increase the uniformity of light over the surface of the recessed lighting fixture 100*a*. The lens 120 may be made of any at least partially transparent material, including glass and hard plastics. In one embodiment, the lens 120 and the reflector 118 are contained in a single indivisible unit of the unified casting 112, to work in conjunction to focus and adjust light emitted by the light source module 114. In one embodiment, the reflector and the lens are housed together with the driver and the light source module in the unified casting 112 as a single, indivisible unit. In other embodiments, the lens 120 and the reflector 118 may be separate, divisible elements.

Still referring to FIG. 12, in one embodiment, the recessed lighting fixture 100*a* may include a trim 130*b*. The trim 130*b* may be attached directly to the unified casting 112 as well as to the outer casing 200*a* as shown, while in other embodiments the trim 130*b* is to only be attached to the outer casing 200*a* (where in that case the unified casting 112 is separately attached to the casing 200*a*, as in FIG. 5 for example). The trim 130*b* may be attached to the unified casting 112 and/or the outer casing 200*a* using any suitable connecting mechanism, including resins, clips, screws, bolts, or clamps. In one embodiment, the trim 130*b* may include grooves and/or slots that are designed to engage with corresponding bumps or tabs of the unified casting 112 and/or the outer casing 200*a* to form a rotate and lock (or friction lock) connection which prevents axial separation (in FIG. 12, in the vertical or longitudinal direction) of the trim 130*b* and the outer casing 200*a*, and without the use of separate tools or other devices.

Figure 6:
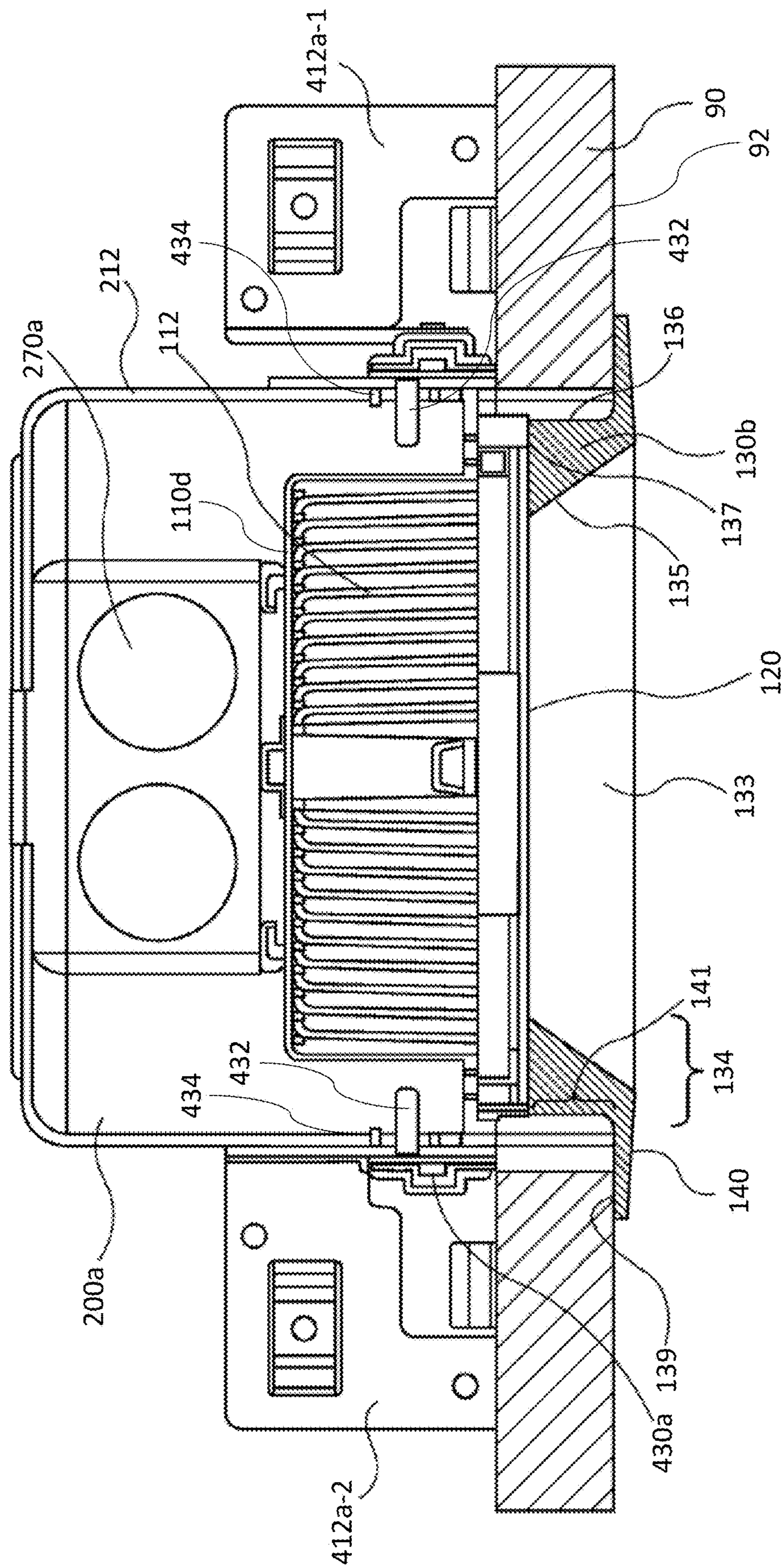
FIG. 6 shows a cross-sectional side view of the embodiment of FIG. 5.
Figure 7:
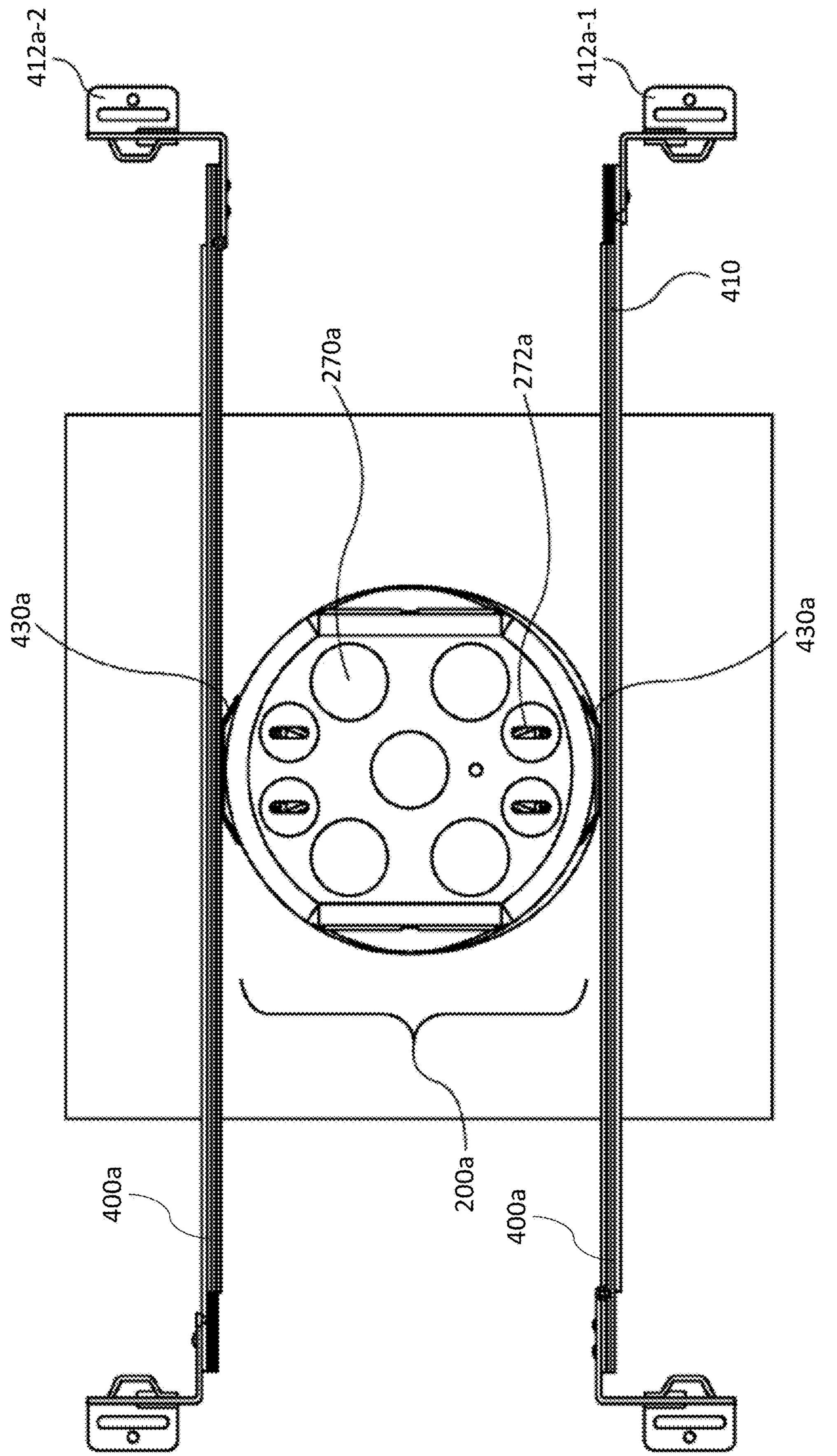
FIG. 7 shows a top view of the embodiment of FIG. 5.

In one embodiment, the entire height 141 of the trim 130*b*, which may or may not be attached to the casting 112, may be inserted into the cavity 210 of the outer casing 200*a*. This is where the unified casting 112 is positioned further (deeper) into the outer casing 200*a* so that glare from the emitted light is reduced. As seen in FIG. 5 and FIG. 6, for example, the trim 130*b* may have a trim base 134 (an annular segment) having a height 141, with an inner circumferential surface 135 that is open to the central, light passing aperture 133 and an outer circumferential surface 136 that is closer to the sidewall 212 of the outer casing 200*a*. The trim base 134 may have a top surface 137 that extends, in a lateral or horizontal direction, from the inner surface 135 to the outer surface 136 and may be in contact with the lower most surface of the unified casting 112. The height 141 of the trim base 134 may be increased so as to position the lens 120 further into the outer casing 200*a*. It is preferred that the height 141 of the trim base 134 is less than. The trim 130*b* may have a flange 138 that extends laterally outward from the base 134, with a top surface 139 and a bottom surface 140 as shown. In one embodiment, referring now back to FIG. 5, the trim base 134 may be shaped and sized such that the outer surface 136 thereof conforms to an inner surface of the sidewall 212 of the outer casing 200*a* so that the trim 130*b* and the outer casing 200*a* are in direct contact. In one embodiment, the trim 130*b* may be fitted tightly to the sidewall 212 of the outer casing 200*a* (friction fit) so that the trim 130*b* does not fall out of the outer casing 200*a* (when the trim 130*b* is not also separately attached to the unified casting 112). In another embodiment, the outer surface 136 of the trim base 134 of the trim 130*b* may be attached to the inner surface of the sidewall 212 of the outer casing 200*a* through any connecting mechanism. The trim 130*b* may be pushed into the outer casing 200*a* so that the bottom end or edge of the sidewall 212 of the outer casing 200*a* comes into direct contact with the top surface 139 of the flange 138 of the trim 130*b*, for a tight, snug fit as shown in FIGS. 5 and 6. However, it is not necessary for the end of the sidewall 212 of the outer casing 200*a* to directly contact the top surface 139 of the flange 138 of the trim 130*b*. In yet another embodiment, the outer surface 136 of the trim base 134 need not contact the inner surface of the sidewall 212 of the outer casing 200*a* (e.g., when friction clips 132 are used as shown in FIG. 12).

In one embodiment, different diameter trims 130*b* may be capable of being coupled to the same unified casting 112 and/or the same outer casing 200*a*, where the diameter is measured at the periphery of the flange 138. The size and design of the trims 130*b* may depend on the size of the hole the wall 90 in which the recessed lighting fixture 100*a* has been fitted to cover the exposed wall or ceiling edge that defines the hole. The recessed lighting system 100*a* may include two or more trims 130*b* of different sizes to cover ceiling or wall openings of different sizes. The trim 130*b* may need to meet the aesthetic demands of the consumer. The trim 130*b* may be made of aluminum plastic polymers, alloys, copper, copper-tungsten pseudoalloy, AlSiC (silicon carbide in aluminum matrix), Dymalloy (diamond in copper-silver alloy matrix), and E-Material (beryllium oxide in beryllium matrix).

In one embodiment, the recessed lighting fixture 100*a* may include a set of hanger bars 410 as shown in FIG. 5. The hanger bars 410 may be rigid, elongated members that are connected to adjacent joists and/or beams in the walls or ceilings of a structure. In one embodiment, each of the hanger bars 410 may be telescoping such that each hanger bar 410 may be extended or retracted to meet the gap between the joists and/or beams. In one embodiment, each of the hanger bars 410 may include a set of mounting blocks 412*a*. The mounting blocks 412*a* may be used to directly attach the hanger bars 410 to the joists and/or beams in the walls or ceilings of a structure. For example, as shown in FIG. 5, the mounting blocks 412*a* may include holes for receiving screws and/or nails or other fasteners that enable the hanger bars 410 to be securely attached to a building structure. Although shown in FIG. 5 and described above in relation to holes and screws, in other embodiments, other mechanisms of attachment may be used in conjunction with the mounting blocks 412*a*, including resins, clips, or clamps to attach the bars 410 to the building structure. In one embodiment, the mounting blocks 412*a* may be integrated in one indivisible structure along with the hanger bars 410, while in other embodiments, as shown in FIG. 5, the mounting blocks 412*a* may be coupled to the hanger bars 410 through the use of one or more attachment mechanisms (e.g., screws, bolts, resins, clips, or clamps). Using the above telescoping and mounting features, the recessed lighting fixture 100*a* may be installed in almost all the 2"×2" through 2"×18" wood joist constructions, metal stud constructions, and T-bar ceiling constructions.

In one embodiment, referring back to FIG. 7, the recessed lighting fixture 100*a* may have a mounting mechanism that includes a set of hanger holders 430 (two are shown) that couple the outer casing 200*a* to the hanger bars 410, respectively. The hanger holder 430 may be a plate that is configured to slide substantially horizontally or otherwise move along the length of a corresponding hanger bar 410 that has a fixed length. Alternatively, the hanger holder 430 may be fixed to a telescoping section of the hanger bar (having a variable length).

FIG. 8 shows a perspective view of the hanger holder 430 according to one embodiment. The hanger holder 430 has an attachment mechanism 432 for coupling with the outer casing 200*a*, so that the outer casing 200*a* can be coupled to a hanger bar 410, as seen in FIG. 10. The attachment mechanism 432 may be a pin attached to and extending inward from the inner face of the plate of hanger holder 430. The attachment mechanism 432 may be inserted into an elongated opening 240 (e.g., slot, slit, etc.) in the sidewall 212 of the outer casing 200*a*. The hanger holder 430 may also include a tab 434 located near the attachment mechanism 432 that is inserted into the opening 240. The opening 240 may be vertically or substantially vertically oriented (parallel to the direction of the wall thickness $t_{env}$, or perpendicular to the longitudinal axis of the hanger bar 410—see FIG. 5) so that when the outer casing 200*a* is coupled to the hanger holder 430, the outer casing 200*a* may be moved up or down as desired (while restricted in the sideways or lateral direction due to the attachment mechanism 432 being captured within the elongated opening 240). The outer casing 200*a* may be moved along the length of the elongated opening 240 before being locked in a particular position. It is preferred that the elevation of the casing 200*a* behind the ceiling or wall 90 be adjusted in this manner so that the flange 138 of the trim 130*b* is flush with the ceiling or wall 90 as seen in FIG. 5 (i.e., the top surface 139 of the trim 130*b* physically contacts and is coplanar with a bottom surface 92 of the ceiling 90).

In another embodiment, the attachment mechanism 432 may be a screw that couples the hanger holder 430 to the outer casing 200*a*. When the screw is inserted into the opening 240 of the outer casing 200*a* and turned, the outer casing 200*a* may move up or down relative to the hanger bar 410 depending on the direction the screw is turned. Accordingly, the outer casing 200*a*, along with the light source module 114 and the driver 116, may be moved and adjusted so that the flange 138 is flush or sufficiently close to the ceiling or wall during installation. In yet another embodiment, the location of the attachment mechanism 432 and the elongated opening 240 are reversed, so that the opening 240 is formed in the hanger holder 430 rather than in the sidewall 212 of the outer casing 200*a*, and the attachment mechanism 432 is affixed to and extending outward from the outside surface of the sidewall 212 of the casing 200*a*.

By being moveably coupled to the hanger holders 430, the outer casing 200*a*, along with the light source module 114 and the driver 116 therein, may be moved in a length direction of the hanger bars 410 to a desired location. The outer casing 200*a* may also be moved substantially vertically relative to the hanger bars 410. For example, the outer casing 200*a* may be adjusted vertically more than one inch upwards and one inch downwards. The hanger holders 430 may then be fixed to the hanger bars 410 so that they no longer move substantially horizontally or vertically relative to the hanger bars 410.

As described above, the combination of a hanger bar 410 and a hanger holder 430 allows the outer casing 200*a* to be moved in a direction parallel to a longitudinal axis of the hanger bar 410, as well as in a direction not parallel (e.g., perpendicular) to the hanger bar 410. Accordingly, the outer casing 200*a* may be moved to a preferred location between a set of joists or beams in a structure and at a desired height before the being locked into position using the attachment mechanism 432. The unified casting 112 is then positioned inside the outer casing 200*a*, by being inserted into the cavity 210 through the opening defined by the lower end, edge or periphery of the sidewall 212. By being configured such that the outer casing 200*a*, along with the light source module 114 and the driver 116 therein, is coupled to a unified set of moveable elements that assist in positioning the combined structure, the recessed lighting fixture 100*a* eliminates the added bulk and size of traditional recessed lighting fixtures. In particular, the recessed lighting fixture 100*a* allows adjustment of the position of the light source module 114 between joists or beams, without the need for both a compartment or can that is dedicated to housing the light source module 114 and a separate compartment that is dedicated to housing the driver 116. Instead, the light source module 114 may be housed along with the driver 116 in the same cavity 210 of the outer casing 200*a*, where the latter itself can be directly moved to a desired position. This compact design provides an affordable design by cutting the cost of raw materials and other components and reduces shipping costs by reducing bulk. Also, by having the driver 116 and the light source module 114 placed in the same cavity of the outer casing 200*a*, serviceability and replacement of the driver 116 will be easier to perform and more convenient. In contrast, traditional housings have the driver 116 mounted on the outer casing 200*a* and contractors are forced to spend a significant amount of time removing parts to gain access to the outer casing 200*a* and the driver 116.

A Round-Shaped Housing With Multiple Sidewall Components

The housing 200, as described above, may generally be formed of metal. In some implementations, the housing 200 may be preferably formed of sheet metal to facilitate manufacture using various sheet metal forming processes. Although the housing 200 may appreciably simplify the overall design of the housing assembly and improve the ease of installation by combining (1) the functions of a conventional can housing and a conventional junction box together with (2) a round shape, the fabrication of a curved sheet metal component with complex structural features using conventional sheet metal forming processes can be challenging and costly if not designed carefully. Herein, the housing 200 may be an assembly of several components that together provide the desired structural features described above while each component remains relatively simple in design and, hence, readily manufacturable.

For example, FIGS. 13A-13J show several views of an exemplary housing 200*b* for a housing assembly 101*b* and a recessed lighting system 100*b* assembled from multiple sidewall components 220*a*-1 and 220*a*-2 (collectively referred to herein as "a sidewall component 220*a*") and a top component 260*a*. As shown, the sidewall components 220*a*-1 and 220*a*-2 may define the round shape of the sidewall 212 of the housing 200*b* when joined together. The top component 260*a* may include substantially flat or flat sections that define, in part, the base end 214 of the housing 200*b* and support various junction box-related structural features, such as circular knockouts 270*b* and 270*c* and Romex knockouts 270*d*. By dividing the curved round-shaped structure and the more complex structural features (e.g., the junction-box related features) between the sidewall components 220*a* and the top component 260*a*, respectively, each of the sidewall components 220*a* and the top component 260*a* may be simpler in design and easier to manufacture.

It should be appreciated that, in the housing 200*b*, the top component 260*a* may include knockout tabs 263*a* and Romex tabs 267 disposed along the sides of the housing 200*b* and hence, may overlap portions of the sidewall components 220*a*-1 and 220*a*-2. However, for the purposes of defining the sidewall 212 and the base end 214, the sidewall components 220*a*-1 and 220*a*-2 may be viewed as defining together the sidewall 212 of the housing 200*b* and the top component 260*a* may be viewed as defining the base end 214 of the housing 200*b*.

The housing 200*b* may generally be shaped and/or dimensioned to contain a lighting module, at least a portion of a trim, one or more electrical wires, and one or more wire splices. As described above, the housing 200*b*, in some implementations, may be dimensioned to provide a volume allowance in accordance with Article 314.16 of the 2020 NEC. In some implementations, the housing 200*b* may have an exterior width of about 4.2 inches. More generally, the exterior width may range between about 4 inches and about 4.5 inches. In some implementations, the housing may have an exterior height of about 4.5 inches. More generally, the exterior height may range between about 4 inches and about 5 inches. The term "about," when used to describe the exterior dimensions of the housing 200, is intended to cover manufacturing tolerances. For example, "about 4 inches" may correspond to the following dimensional ranges: 3.96 to 4.04 inches (+/−1% tolerance), 3.968 to 4.032 inches (+/−0.8% tolerance), 3.976 to 4.024 inches (+/−0.6% tolerance), 3.984 to 4.016 inches (+/−0.4% tolerance), 3.992 to 4.008 inches (+/−0.2% tolerance).

In some implementations, the sidewall components 220*a*-1 and 220*a*-2 may be substantially identical or identical to one another and may each form one half of the sidewall 212. This may further simplify manufacturing of the housing 200*b* by reducing the number of unique components fabricated since the sidewall components 220*a*-1 and 220*a*-2 represent one unique component.

FIGS. 14A-14D show several additional views of the sidewall component 220*a* of the housing 200*b*. As shown, the sidewall component 220*a* may generally have a have a curved portion 217 with a bottom end 221, a top end 224, a side tab 241-1 and a side portion 241-2. Specifically, the bottom portion of the sidewall component 220*a* including the bottom end 221 may generally have a circular cross-sectional shape. In this manner, the portion of the housing 200*b* disposed near or within an opening formed in the ceiling during installation may have a round shape, thus simplifying the shape of the opening cut into the ceiling. In some implementations, the round shape of the housing 200*b* may also reduce the size of the opening cut into the ceiling especially if the lighting module has a round-shaped module housing, which would allow the housing 200*b* to conform in shape and dimensions with the lighting module.

In some implementations, the sidewall component 220*a* may also include one or more flat sections formed on or near the top end 224 to accommodate the knockouts on the top component 260*a*. The flat sections may be formed together with the curved portion 217 such that the sidewall component 220*a* remains a single unitary component. This may be accomplished, in part, by fabricating the sidewall component 220*a* using a deep drawing process where the sheet metal is radially drawn into a forming die with the desired curved and flat geometry.

Specifically, the sidewall component 220*a* may include a flat section 231 with an opening 233 that aligns with the circular knockout 270*b* disposed on the knockout tabs 263*a* of the top component 260*a*. The flat section 231 may generally be larger than the opening 233 to provide sufficient clearance around the opening 233. The flat section 231 may extend from the top end 224 down towards the bottom end 221 by a distance approximately equal to the height of the knockout tab 263*a* of the top component 260*a*. The sidewall component 220*a* may further include a sloped section 232 disposed directly below the flat section 231 to transition between the flat section 231 and the curved portion 217.

The sidewall component 220*a* may also include a flat section 234 offset approximately 90 degrees with respect to the flat section 231 about a centerline axis 209 of the housing 200*b* (i.e., an axis intersecting the center of the base section 261 of the top component 260*a*). The flat section 234 may include multiple openings 236 that align with the Romex knockouts 270*d* disposed on the Romex tabs 267 of the top component 260*a*. The flat section 234 may also extend from the top end 224 down towards the bottom end 221 by a distance approximately equal to the height of the Romex tab 267 of the top component 260*a*. The sidewall component 220*a* may also include a sloped section 235 disposed directly below the flat section 234 to transition between the flat section 234 and the curved portion 217. The sloped sections 232 and 235 may each taper downwards towards the bottom end 221.

Figure 14A:
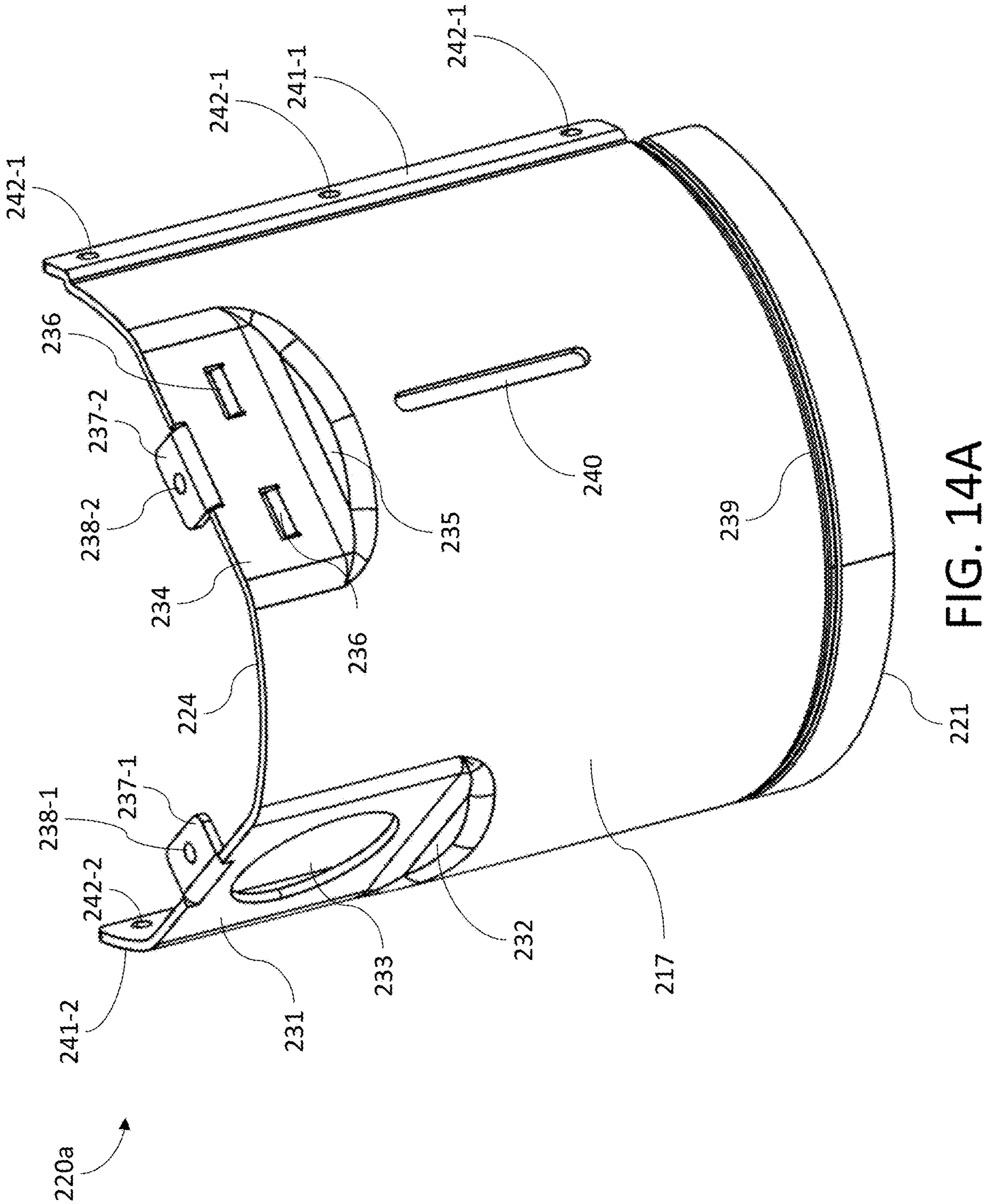
FIG. 14A shows a top, front, right perspective view of the sidewall component in the housing of FIG. 13A.
Figure 14B:
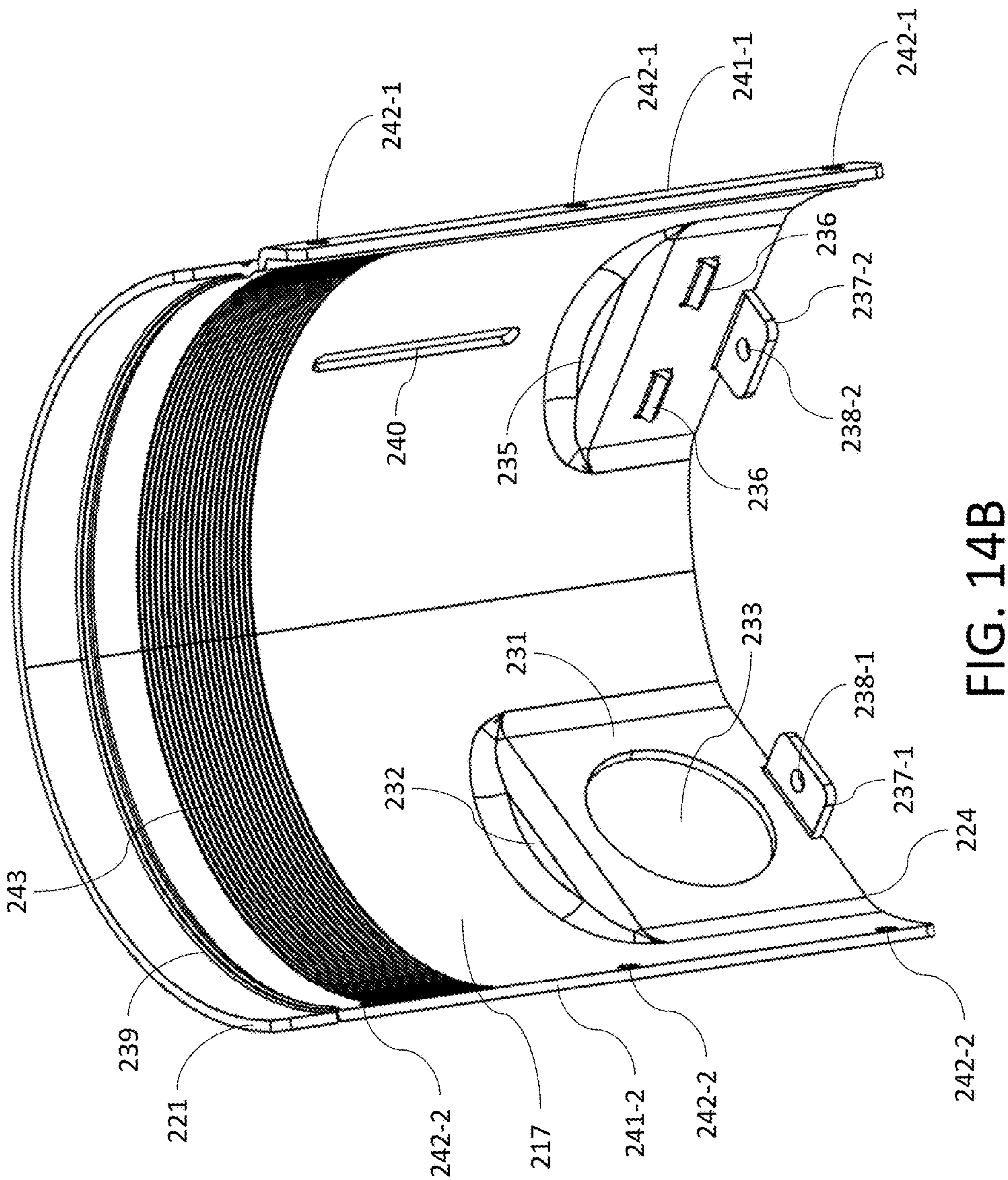
FIG. 14B shows a bottom, rear, left perspective view of the sidewall component of FIG. 14A.
Figure 14C:
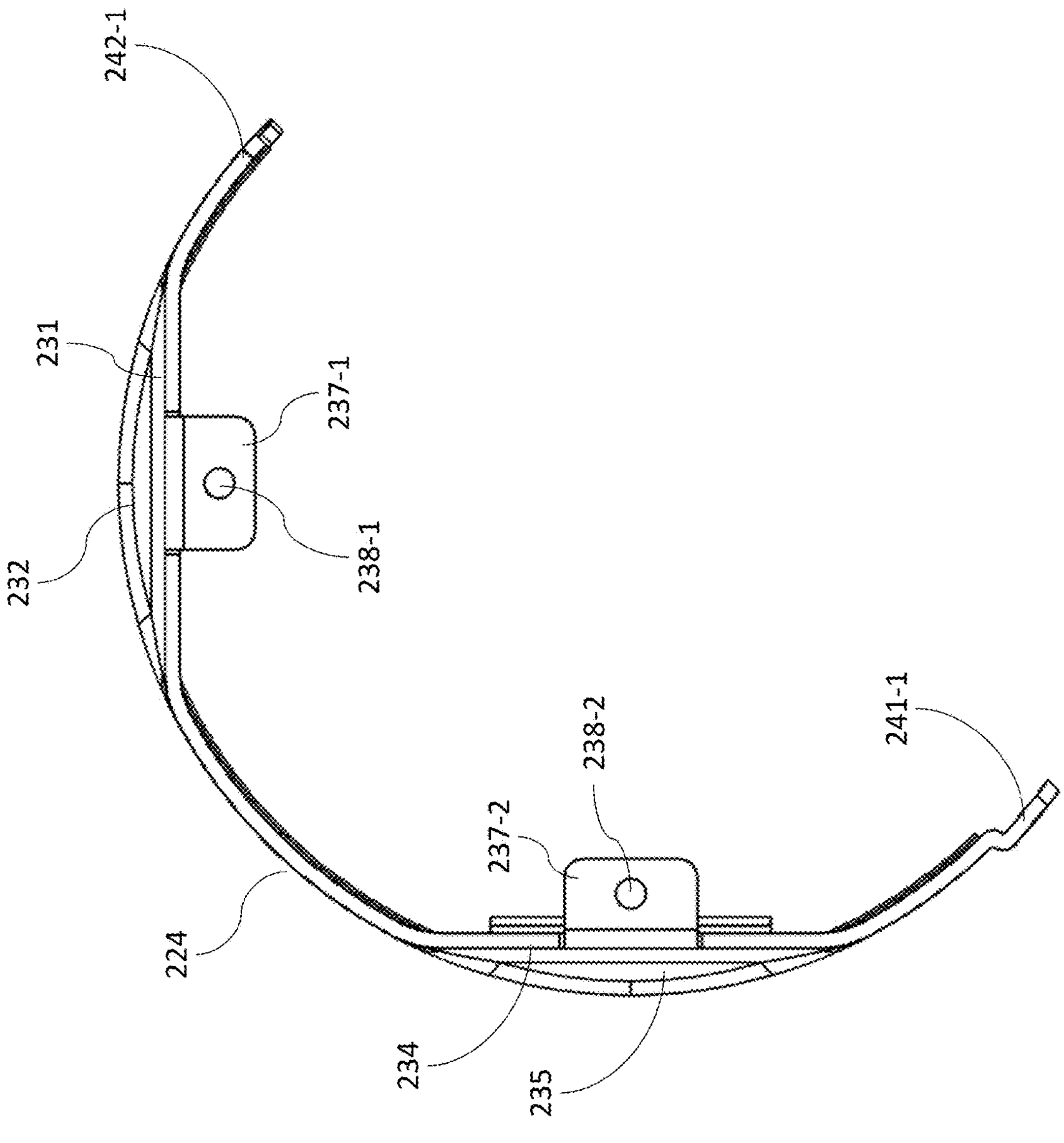
FIG. 14C shows a top view of the sidewall component of FIG. 14A.
Figure 14D:
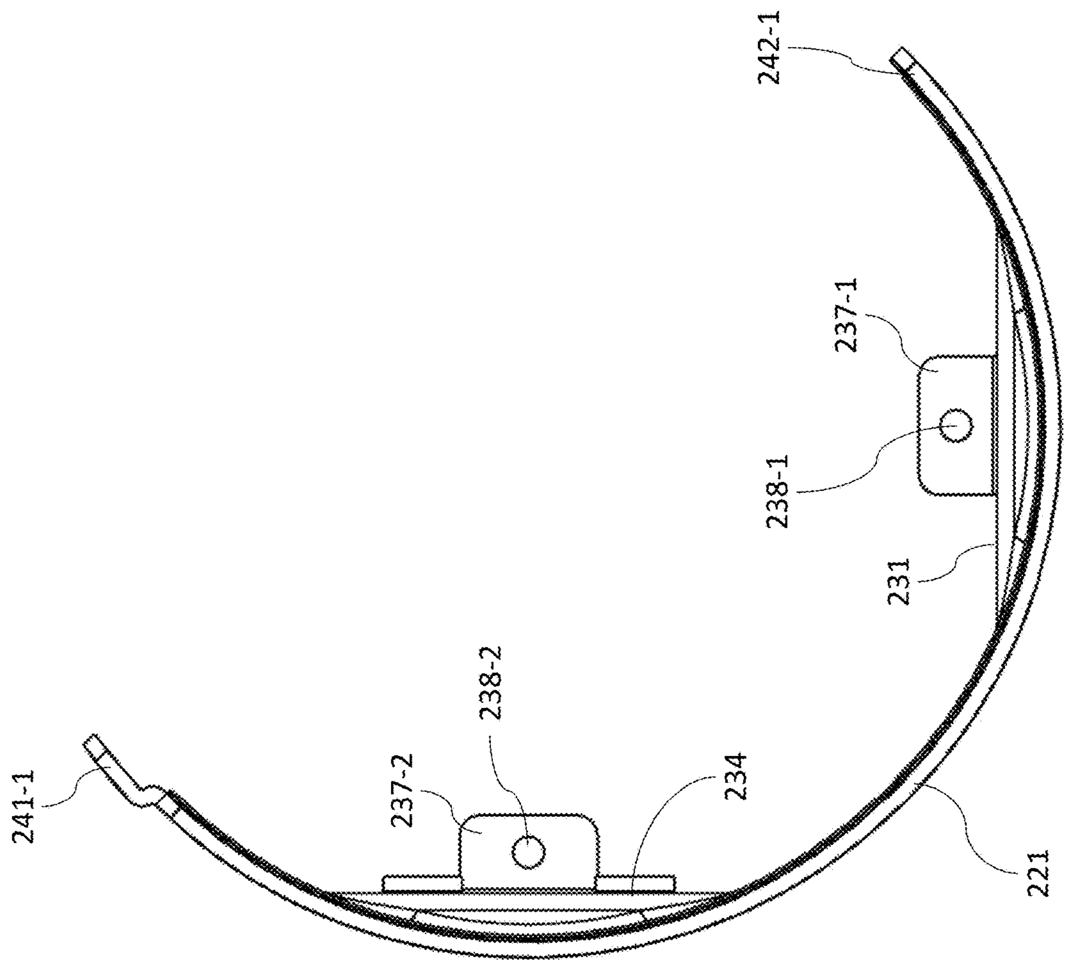
FIG. 14D shows a bottom view of the sidewall component of FIG. 14A.

As shown in FIGS. 14A and 14C, the flat section sections 231 and 234 may be separated by the curved portion 217 of the sidewall component 220*a*. Thus, the top portion of the sidewall component 220*a* including the top end 224 may have a cross-sectional shape that includes a first straight section corresponding to the flat section 231, a second straight section corresponding to the flat section 234, and circular sections corresponding to the circular portion 217 between and to the sides of the first and second straight sections. It should be appreciated the height of the flat sections 231 and 234 may not be equal, hence, the cross-sectional shape may only include one of the first or second straight sections depending on whether the cross-sectional plane intersects the flat sections 231 and/or 234.

The sidewall component 220*a* may thus have a cross-sectional shape that varies along its height. Depending on the location of the cross-sectional plane along the height of the sidewall component 220*a*, the cross-sectional shape of the sidewall component 220*a* may generally include, but is not limited to, a circular section, an elliptical section, a straight section, or any combinations of the foregoing. In some implementations, the sidewall components 220*a* may define a sidewall 212 that is shaped as a right cylinder. Said in another way, the interior and/or exterior sides of the curved portion 217 and/or the flat sections 231 and 234 of the sidewall component 220*a* may be oriented substantially vertical or vertical.

Figure 13A:
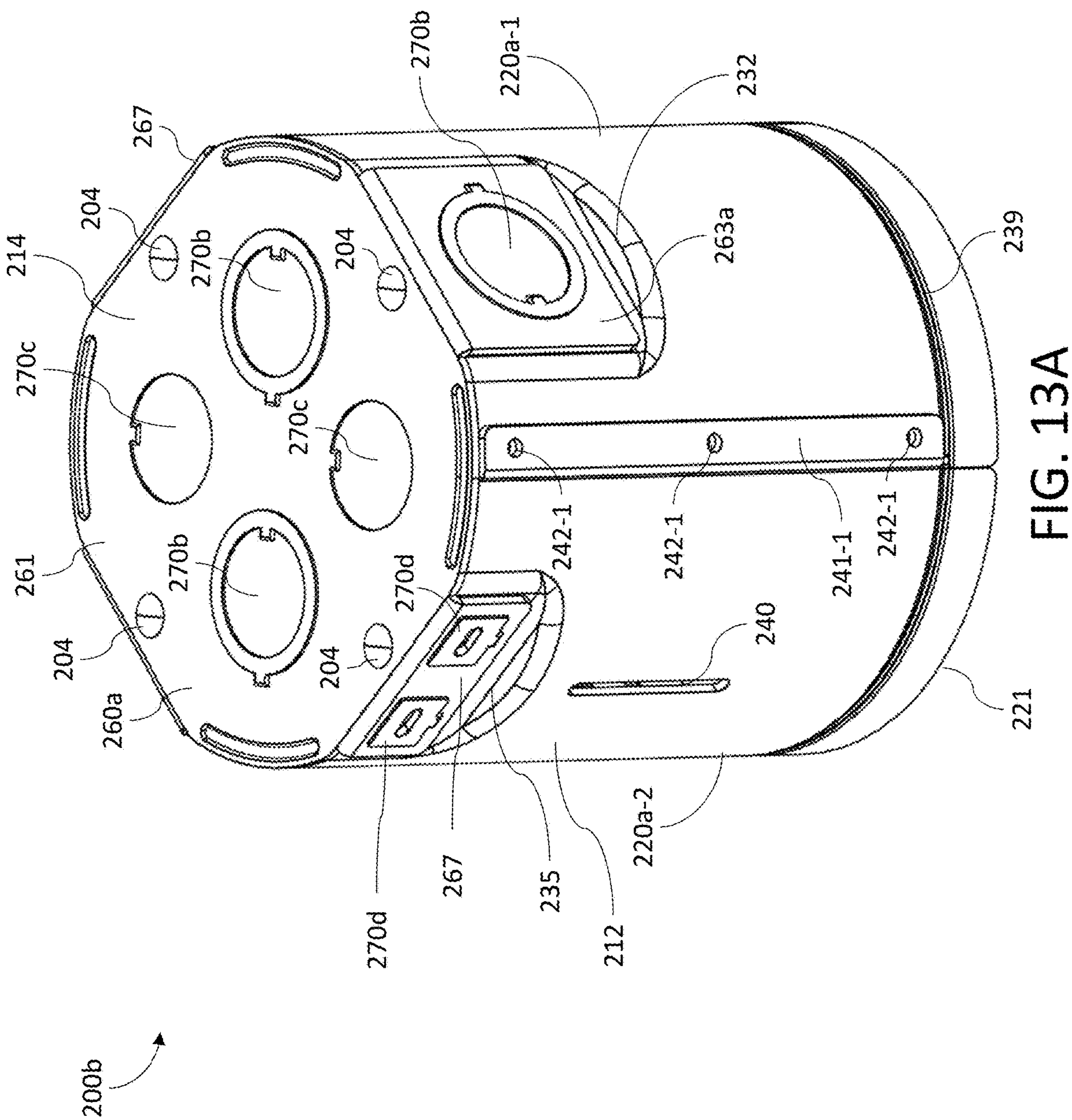
FIG. 13A shows a top, front, left perspective view of another exemplary round-shaped housing with multiple sidewall components.
Figure 13B:
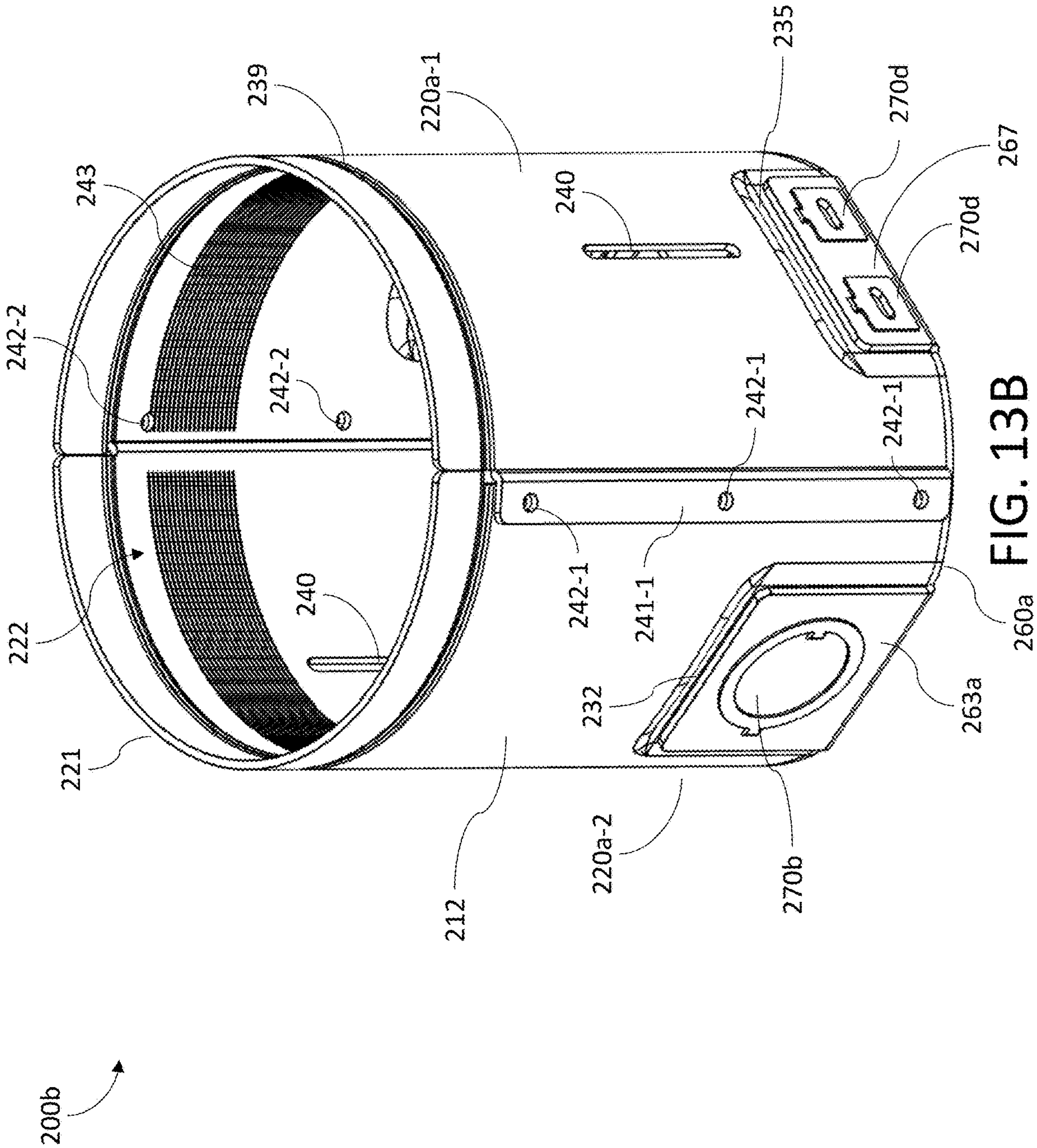
FIG. 13B shows a bottom, rear, right perspective view of the housing of FIG. 13A.
Figure 13C:
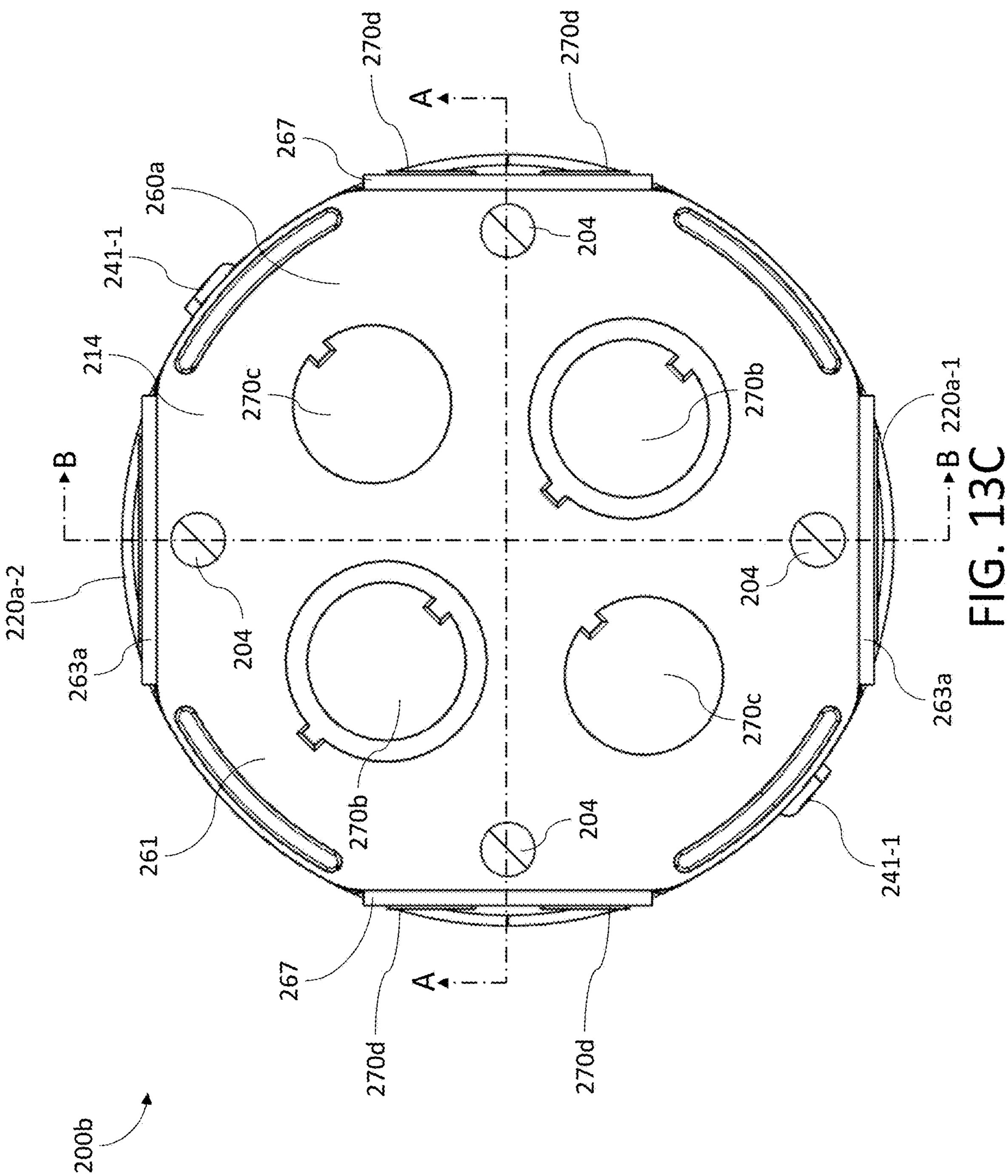
FIG. 13C shows a top view of the housing of FIG. 13A.
Figure 13D:
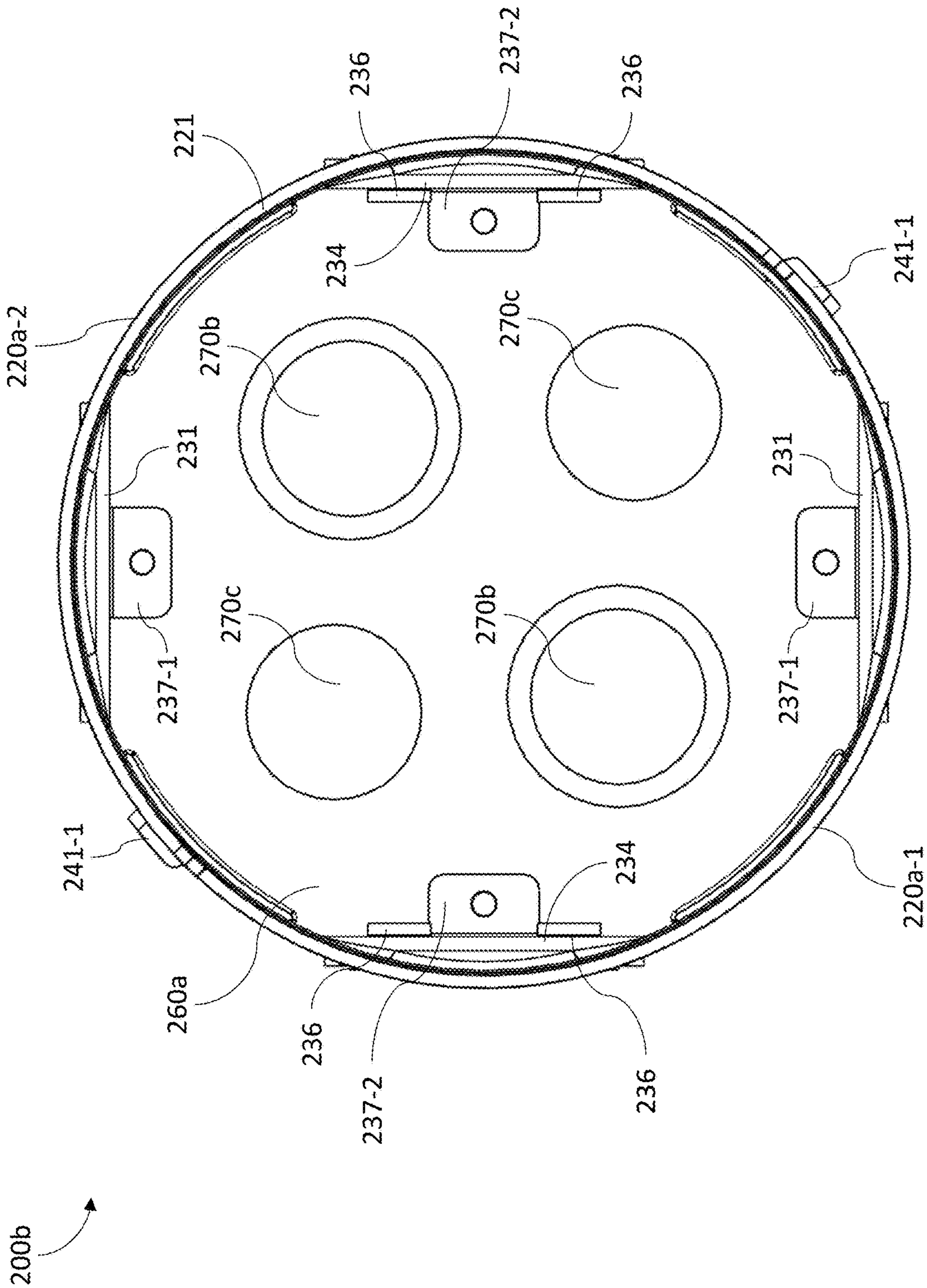
FIG. 13D shows a bottom view of the housing of FIG. 13A.

The side tab 241-1 of the sidewall component 220*a* may protrude radially outwards with respect to the side portion 241-2. In this manner, the side tab 241-1 of one sidewall component 220*a* may overlap and abut the side portion 241-2 of the other sidewall component 220*a* as shown in FIGS. 13C and 13D. The side tab 241-1 may further include multiple fastener openings 242-1 that align with corresponding fastener openings 242-2 disposed on the side portion 241-2. During assembly, respective fasteners (e.g., rivets, screw fasteners, bolt fasteners) may be inserted through respective pairs of openings 242-1 and 242-2 to join the sidewall components 220*a*-1 and 220*a*-2 together. It should be appreciated that, in some implementations, the respective side tabs 241-1 and side portions 241-2 of the sidewall components 220*a*-1 and 220*a*-2 may be welded together and, hence, may not include any fastener openings or fasteners.

When the sidewall components 220*a*-1 and 220*a*-2 are coupled together, the sidewall components 220*a*-1 and 220*a*-2 may surround and define the cavity 210 of the housing 200*b*. The respective bottom ends 221 of the sidewall components 220*a*-1 and 220*a*-2 may further define the bottom opening 222, which provides access to the cavity 210. The top ends 224 of the sidewall components 220*a*-1 and 220*a*-2 may further provide a surface onto which the top component 260*a* may be disposed and connected to the sidewall components 220*a*-1 and 220*a*-2.

Figure 13E:
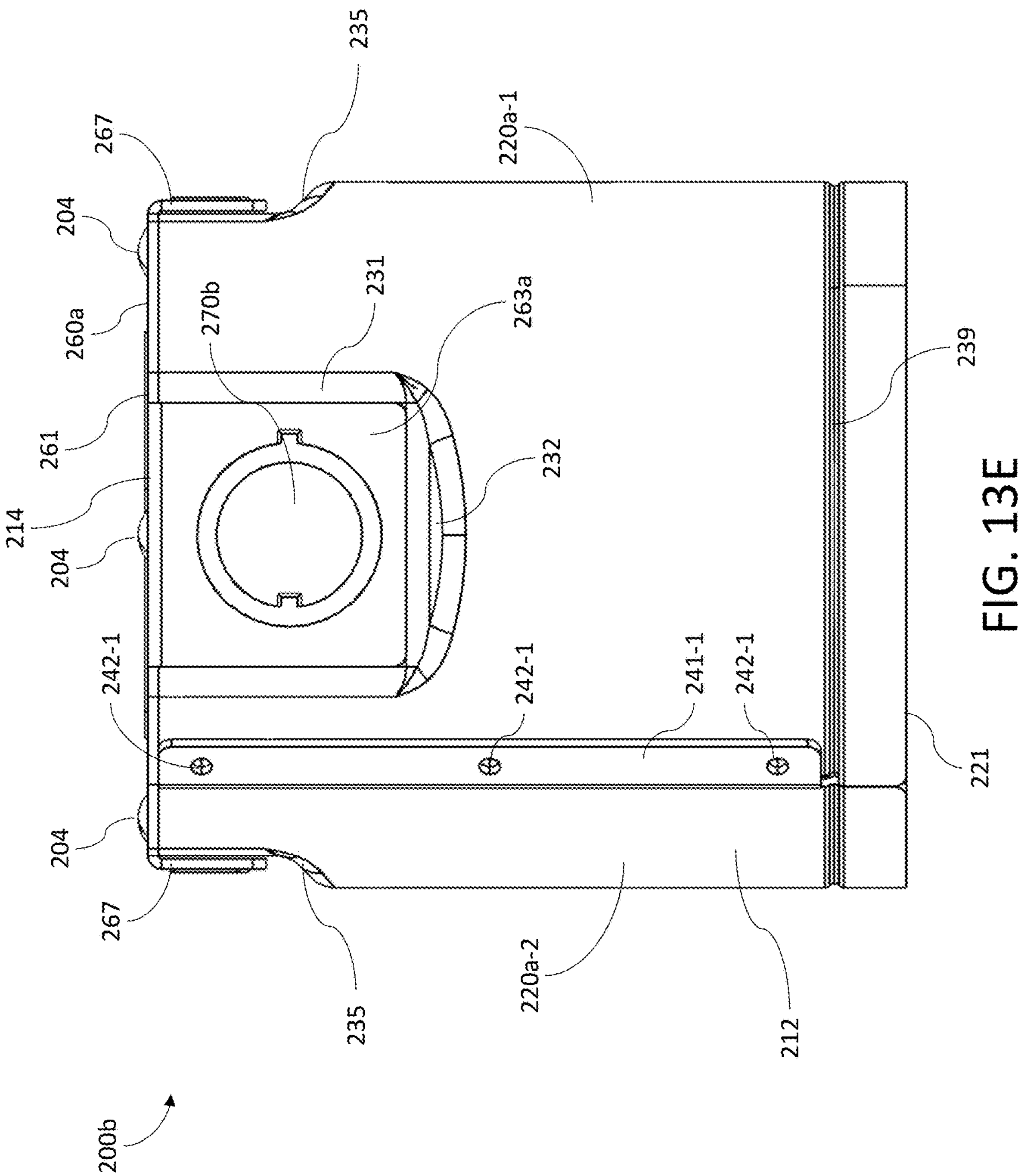
FIG. 13E shows a front view of the housing of FIG. 13A.

In some implementations, the top end 224 of the sidewall component 220*a* may further include mounting tabs 237-1 and 237-2 that are oriented along a horizontal plane with respect to the sidewall 212. The tabs 237-1 and 237-2 may further include fastener openings 238-1 and 238-2, respectively, which align with corresponding fastener openings 281 on the base section 261 of the top component 260*a*. During assembly, rivet fasteners 204 may be inserted through the openings 281 and the openings 238-1 or 238-2 to couple the top component 260*a* to the sidewall components 220*a*-1 and 220*a*-2 as shown in FIGS. 13I and 13J. In some implementations, the tabs 237-1 and 237-2 may be positioned along the portions of the top end 224 that join the flat sections 231 and 234, respectively. This may improve manufacturability of the sidewall component 220*a* since the tabs 237-1 and 237-2 may initially be formed on the same plane as the flat sections 231 and 234 and, hence, may be easier to bend to the desired orientation shown in FIGS. 14A and 14C especially if sidewall component 220*a* is formed with the curved portion 217 and the flat sections 231 and 234.

Figure 16:
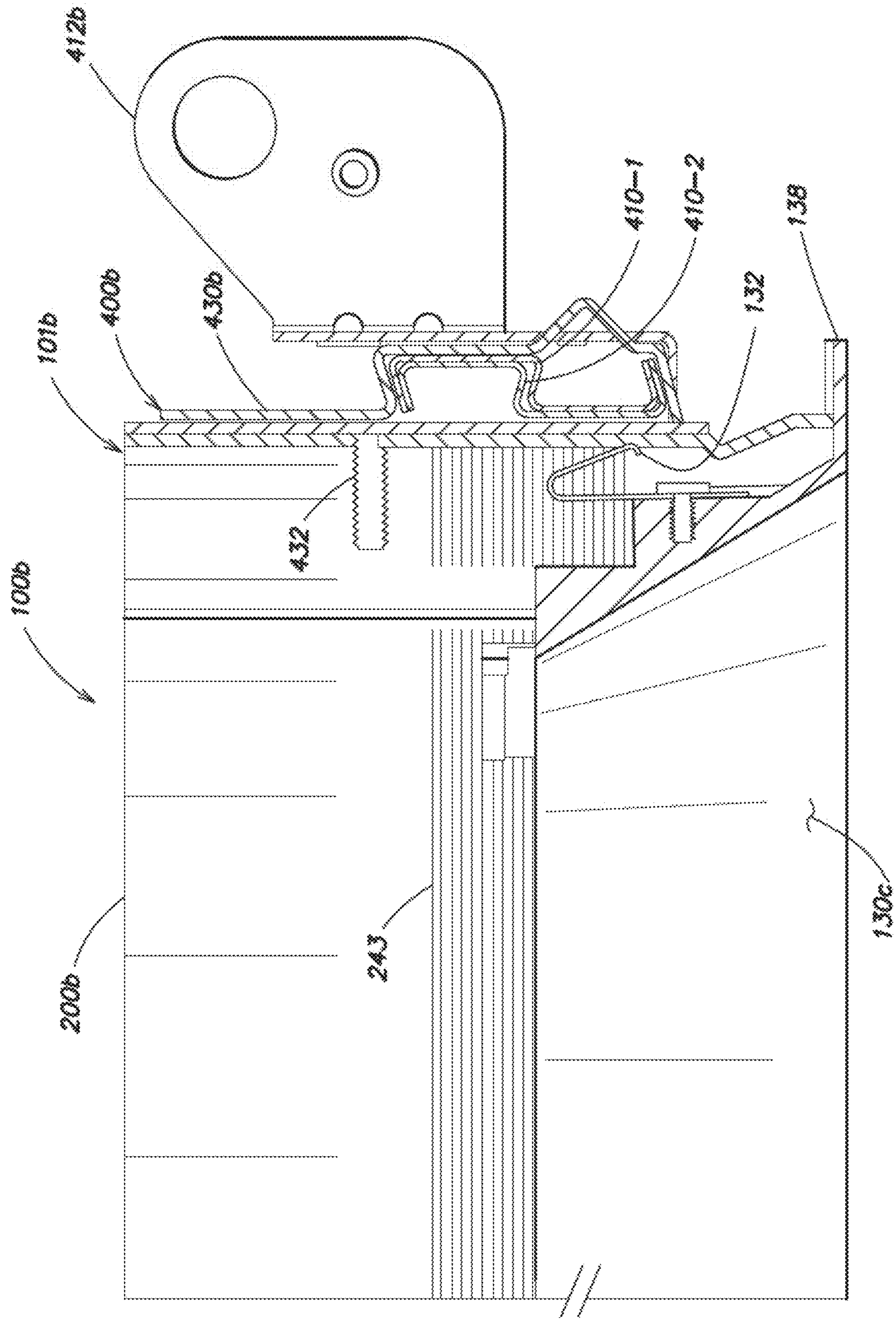
FIG. 16 shows a cross-sectional view of the housing of FIG. 13A with a bar hanger assembly and a trim coupled to the housing.

In some implementations, the sidewall component 220*a* may further include an opening 240 disposed on the curved portion 217 to couple a bar hanger assembly to the housing 200*b* for a new construction installation. For example, FIG. 16 shows an exemplary lighting system 100*b* with the lighting module removed to show a trim 130*c* and a bar hanger assembly 400*b* mounted to the housing 100*b*. As shown, the bar hanger assembly 400*b* may include a bar hanger holder 430*b* with a rod 432 inserted through the opening 240 to couple the bar hanger holder 430*b* to the housing 200*b*. The bar hanger holder 430*b* may further support a pair of bar hangers 410-1 and 410-2 that are slidably coupled to the bar hanger holder 430*b* and telescopically coupled to each other. Each bar hanger 410-2 and 410-2 may further include a bar hanger head (e.g., the bar hanger heads 412*a*, 412*b*) to mount the housing assembly 101*b* to support structures in the environment.

Figure 13F:
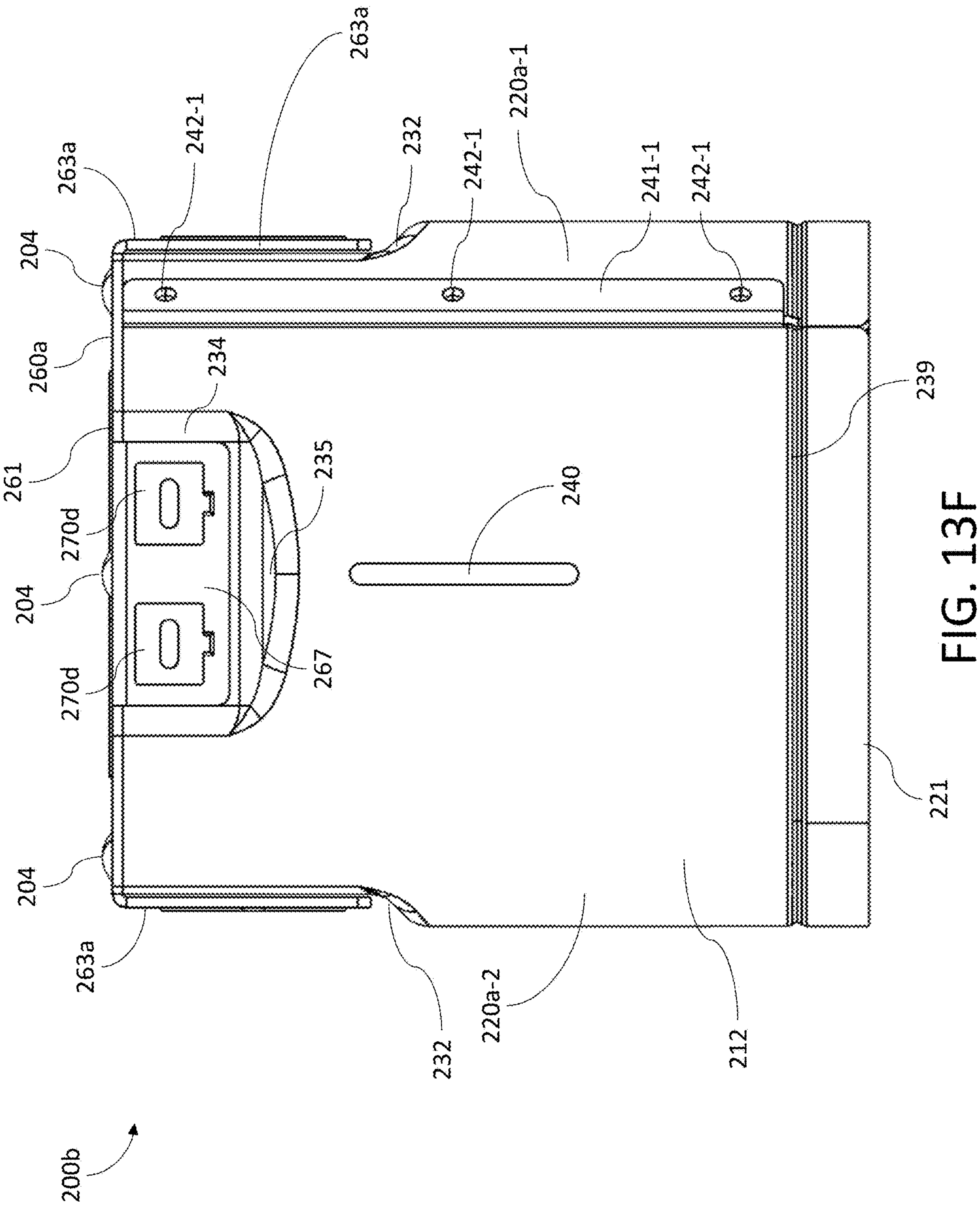
FIG. 13F shows a right-side view of the housing of FIG. 13A.
Figure 13G:
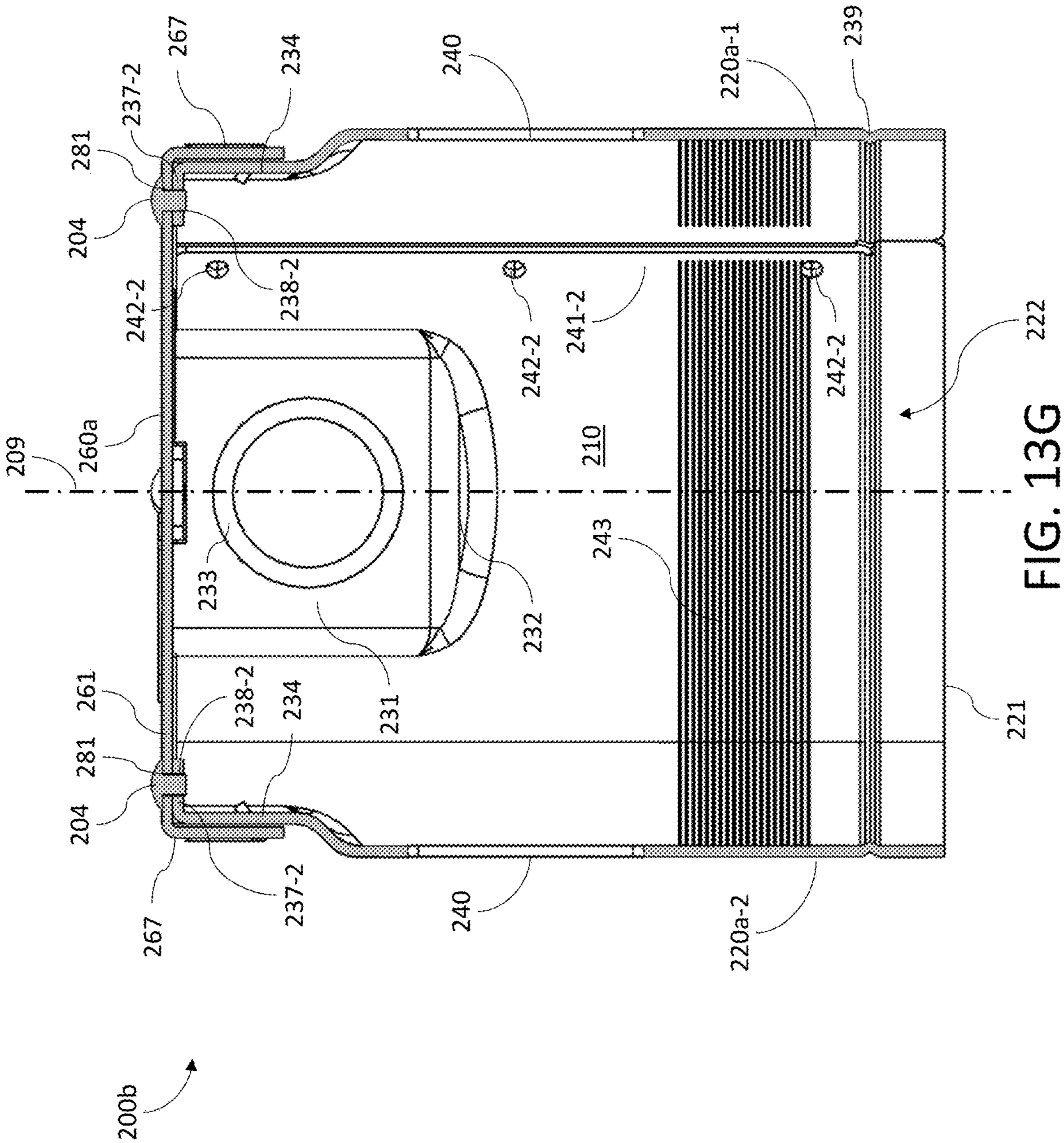
FIG. 13G shows a cross-sectional front view of the housing corresponding to the plane A-A of FIG. 13C.

As shown in FIG. 13F, the opening 240 may be shaped as a vertical slot, to enable vertical adjustment of the housing 200*b* with respect to the bar hanger holder 430*b* by allowing the rod 432 to slidably move along the opening 240. The bar hanger holder 430*b*, in turn, may enable horizontal adjustment of the housing 200*b* with respect to the bar hangers and, hence, the support structures in the environment. It should be appreciated that respective openings 240 of the sidewall components 220*a*-1 and 220*a*-2 are disposed diametrically opposite to one another when the sidewall components 220*a*-1 and 220*a*-2 are joined together due to the sidewall components 220*a*-1 and 220*a*-2 being identical to one another. The housing assembly 101*b* may thus include a bar hanger assembly 400*b* disposed on opposing sides of the housing 200*b*.

Figure 13H:
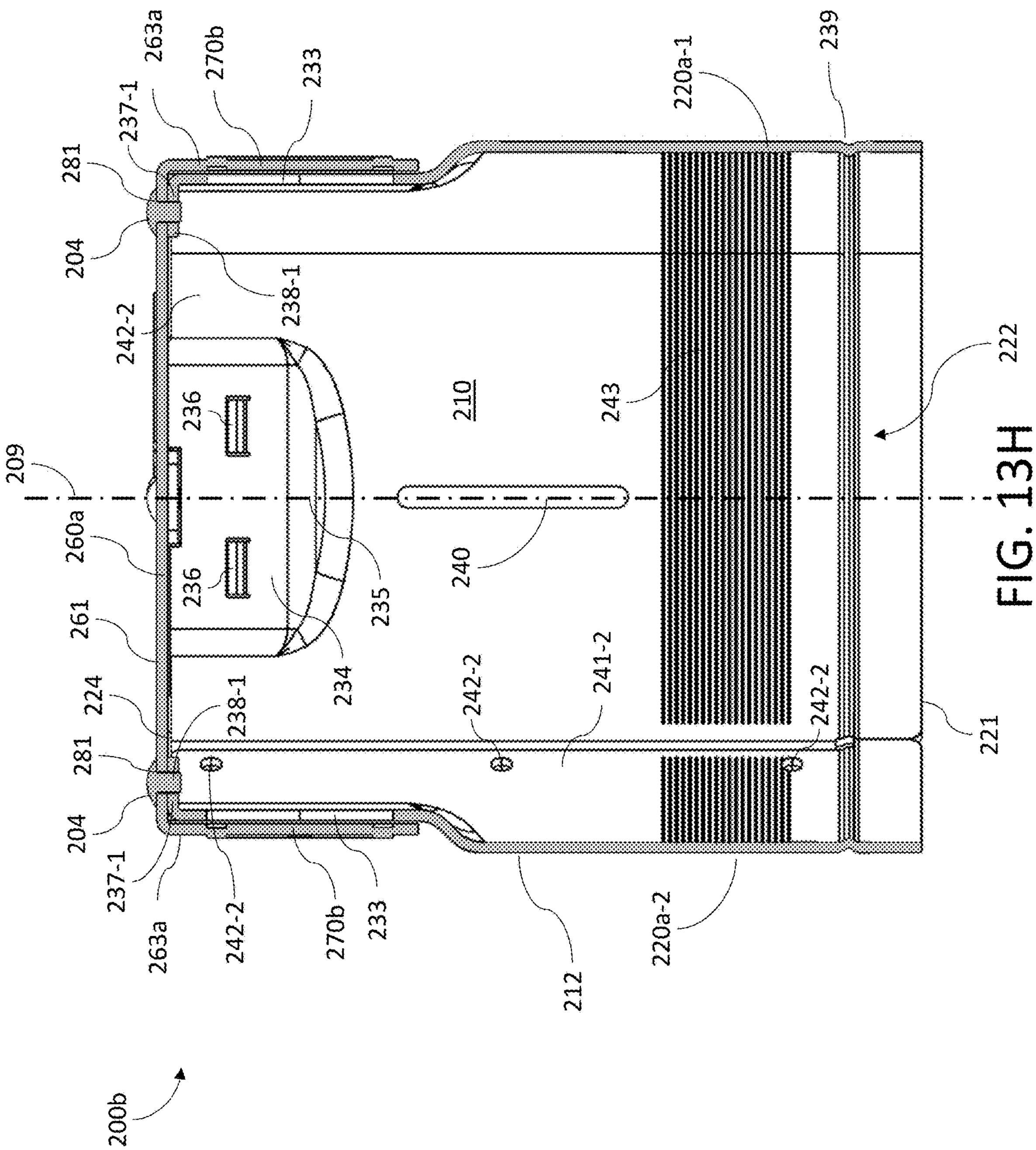
FIG. 13H shows a cross-sectional right-side view of the housing corresponding to the plane B-B of FIG. 13C.
Figure 13I:
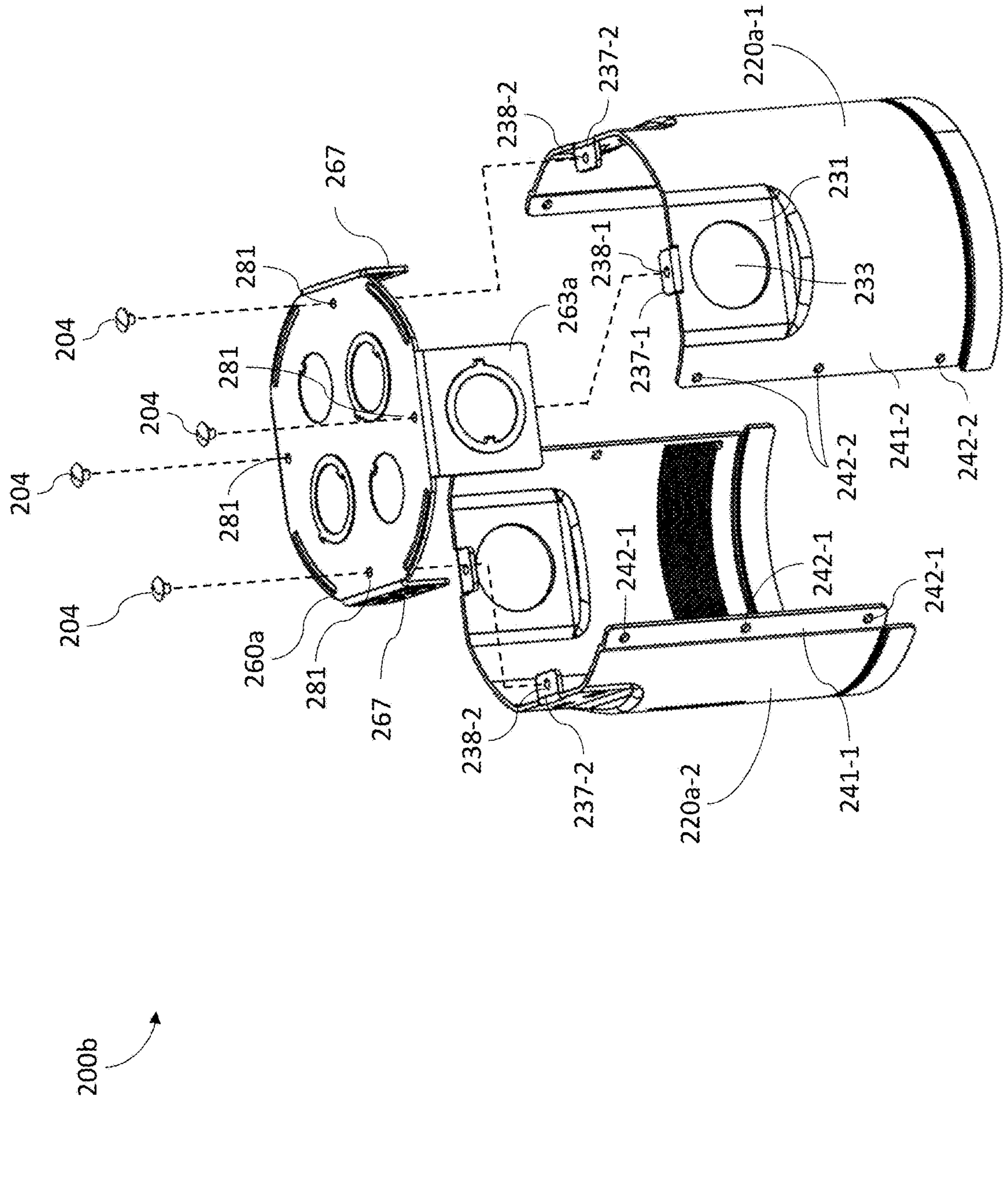
FIG. 13I shows an exploded top, front, left perspective view of the housing of FIG. 13A.
Figure 13J:
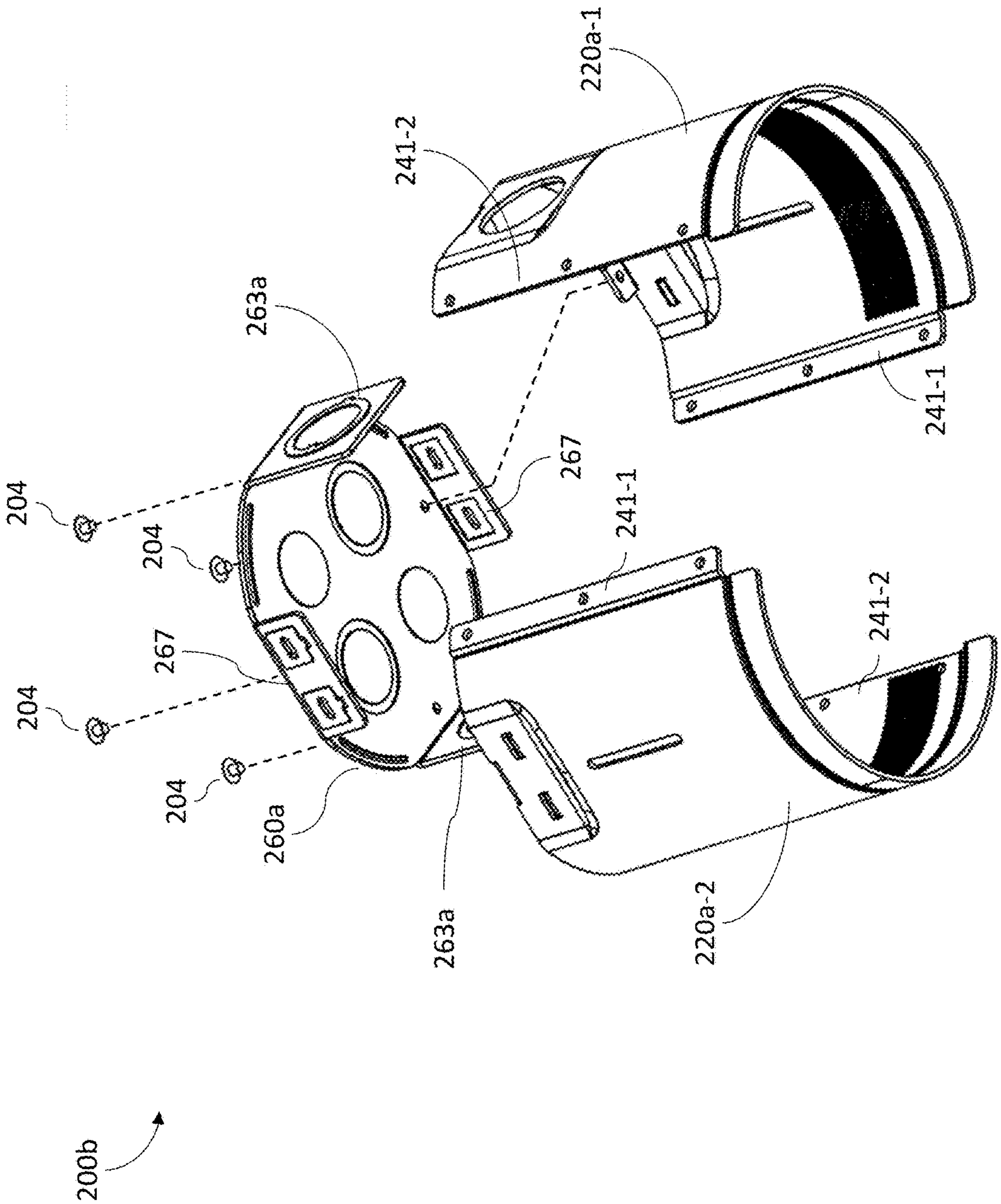
FIG. 13J shows an exploded bottom, rear, left perspective view of the housing of FIG. 13A.

In some implementations, the sidewall component 220*a* may also include a series of grooves 243 disposed on an interior side of the curved portion 217 near the bottom end 221. The grooves 243 may provide a textured surface for the friction clips 132 of the trim 130*c* to contact, thus increasing the frictional force holding the trim 130*c* onto the housing 200*b*. FIG. 16 shows the friction clip 132 in physically contact with the grooves 243 when the trim 130*c* is sufficiently inserted into the cavity 210 such that a flange 138 abuts the bottom end 221 of the housing 200*b*. As shown in FIGS. 13H and 13I, the grooves 243 may be oriented in parallel alignment with the bottom end 221 and may also extend from the side tab 241-1 to the side portion 241-2. The sidewall component 220*a* may include multiple grooves 243 spanning a portion of the height of the sidewall component 220*a* to accommodate different sized trims and/or trims with different sized spring clips.

As described above, the lighting module may generally be electrically grounded to the housing 200*b*. In some implementations, this may be accomplished by connecting a ground wire or cable on the lighting module to a ground cable connected to the housing 200*b*. In some implementations, the trim 130*c* may provide an electrical pathway to ground the lighting module to the housing 200*b*. For example, the body of the trim 130*c* and the friction clips 132 may be formed of metal. To ground the trim 130*c* to the housing 200*b*, a portion of the interior surfaces of the sidewall components 220*a* may be uncoated and/or unpainted to expose the underlying metal. For example, the sidewall components 220*a* may have exposed metal along the grooves 243. When the trim 130*c* is inserted into the housing 200*b*, the physical contact between the friction clips 132 and the exposed portions of the sidewall component 220*a* may electrically ground the trim 130*c* to the housing 200*c*. The trim 130*c*, in turn, may be electrically grounded to the module housing of the lighting module.

In some implementations, the installation of conventional housing assemblies often leads to gaps formed between the housing and the opening in the ceiling resulting in unwanted air leaks. For example, the user may accidentally cut an opening in the ceiling that is larger than required to accommodate the housing 200*b*. If not compensated properly, air leaks may lead to higher energy consumption and/or costs for cooling and/or heating of the environment. Air leaks may also leave the ceiling space susceptible to moisture accumulation and mold growth.

To mitigate potential air leaks formed between the housing 200*b* and the opening formed in the ceiling, the sidewall components 220*a* may include a groove 239 formed on the exterior side of the curved portion 217 near the bottom end 221 to support a gasket (not shown). As shown in FIGS. 13E and 13F, the groove 239 may be in parallel alignment with the bottom end 221 and recessed into the cavity 210. The groove 239 may further extend from the side tab 241-1 to the side portion 241-2. The groove 239 may be offset vertically from the bottom end 221 such that the gasket may fill the gaps formed between the housing 200*b* and the edges of the ceiling defining the opening when the bottom end 221 of the housing 200*b* is inserted into the opening during installation. In some implementations, the groove 239 may be disposed below the grooves 243. It should be appreciated that other sealing mechanisms may be utilized to mitigate air leak including, but not limited to, a curable sealant and flexible tape.

In some implementations, the groove 239 may also provide a safety feature to prevent the trim 130*c* from falling out from the housing 200*b* in the event the friction clips 132 disengage from the grooves 243 or, more generally, the curved portion 217 of the sidewall component 220*a*. Specifically, the groove 239, as described above, may be recessed into the cavity 210, which results in a lip formed along the interior sides of the sidewall 212. When the trim 130*c* is installed, the friction clips 132 may be disposed above the lip. Thus, in the event the friction clips 132 loses contact with the grooves 243 and/or otherwise becomes loose, the lip formed by the groove 239 may catch the spring clip 132 thus preventing the trim 130*c* from falling out of the housing 200*b*.

FIGS. 15A-15F show several additional views of the top component 260*a* of the housing 200*b*. As shown, the top component 260*a* may include a base section 261 that covers the top ends 224 of the sidewall components 220*a*-1 and 220*a*-2. The base section 261 may generally be shaped and dimensioned to conform with the top ends 224 of the sidewall components 220*a*-1 and 220*a*-2 such that an outer edge 262 of the base section 261 is substantially flush or flush with the sidewall components 220*a*-1 and 220*a*-2 (i.e., the outer edge 262 is aligned with an exterior edge of the top end 224) as shown in FIGS. 13A and 13C. For example, the outer edge 262 of the base section 261 may have multiple straight sections corresponding to the flat sections 231 and 234 of the sidewall components 220*a*-1 and 220*a*-2 separated by circular sections.

As described above, the top component 260*a* may also include a pair of knockout tabs 263*a* and a pair of Romex tabs 267 that extend from the base section 261 and oriented to cover the respective flat sections 231 and 234 of the sidewall components 220*a*-1 and 220*a*-2. Specifically, each knockout tab 263*a* may include an interior side 265 that abuts the exterior side of one flat section 231. Similarly, each Romex tab 267 may include an interior side 268 that abuts the exterior side of one flat section 234.

In some implementations, the knockout tabs 263*a* and the Romex tabs 267 may be offset 90 degrees with respect to one another about the centerline axis 209 of the housing 200*b*. The pair of knockout tabs 263*a* may further be disposed diametrically opposite with respect to one another. The pair of Romex tabs 267 may also be disposed diametrically opposite with respect to one another. It should be appreciated that, in some implementations, the pair of knockout tabs 263*a* and/or the pair of Romex tabs 267 may be offset at any angle about the centerline axis 209 so long as the knockout tabs 263*a* and the Romex tabs 267 do not interfere in a manner that would prohibit the placement of a knockout (e.g., the circular knockout 270*b*, the Romex knockout 270*d*). It should be appreciated the flat sections 231 and 234 of the sidewall component 220*a* may be repositioned to align with the knockout tabs 263*a* and the Romex tabs 267. In some implementations, this may result in the sidewall components 220*a*-1 and 220*a*-2 having a different geometry. In one example, the knockout tabs 263*a* and the Romex tabs 267 may be disposed on one side of the housing 200*b* (e.g., the knockout tabs 263*a* and the Romex tabs 267 are offset by 60 degrees with respect to one another with one pair of knockout tabs 263*a* and the Romex tabs 267 offset by 180 degrees).

Figure 15A:
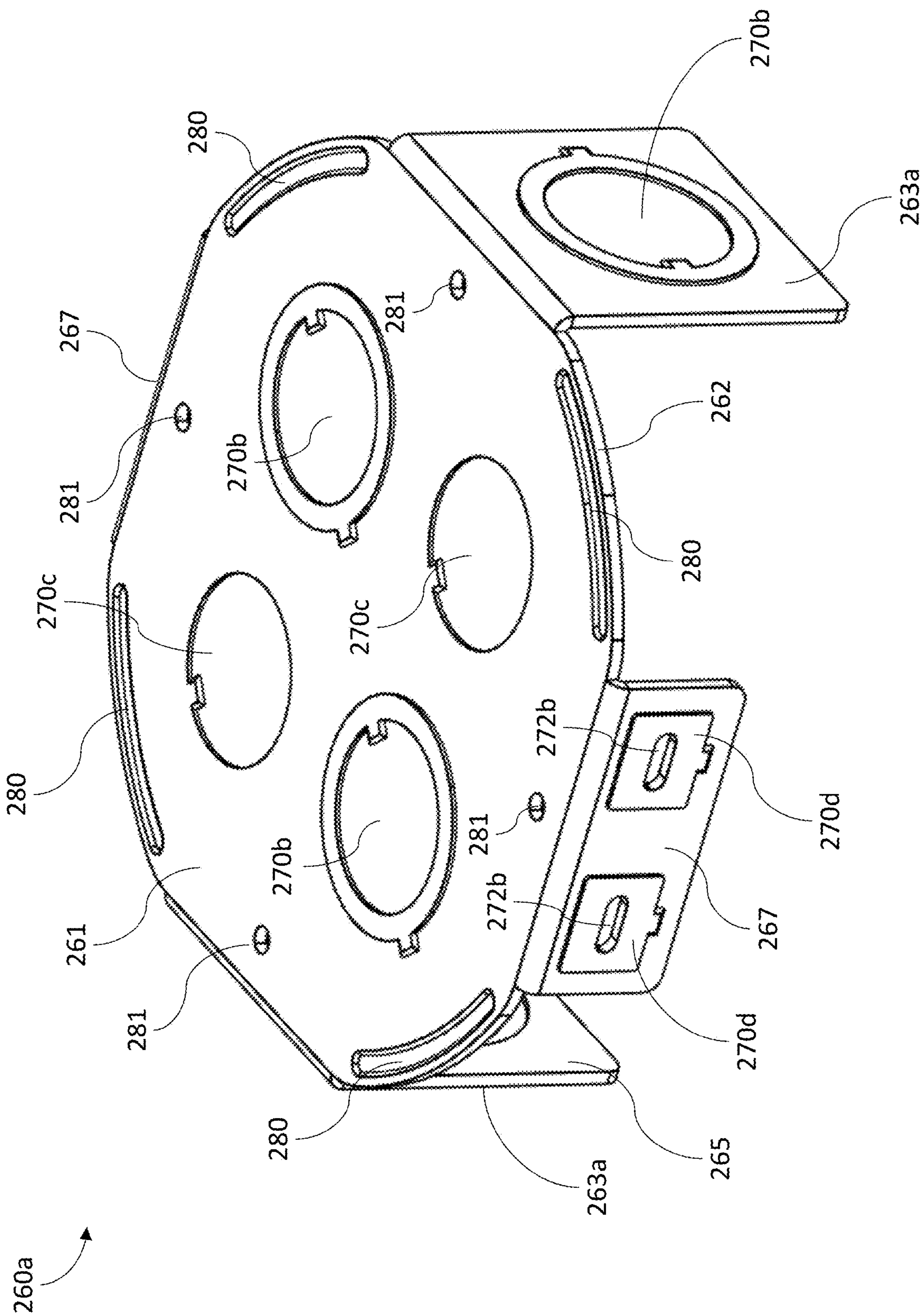
FIG. 15A shows a top, front, left perspective view of a top component in the housing of FIG. 13A.
Figure 15B:
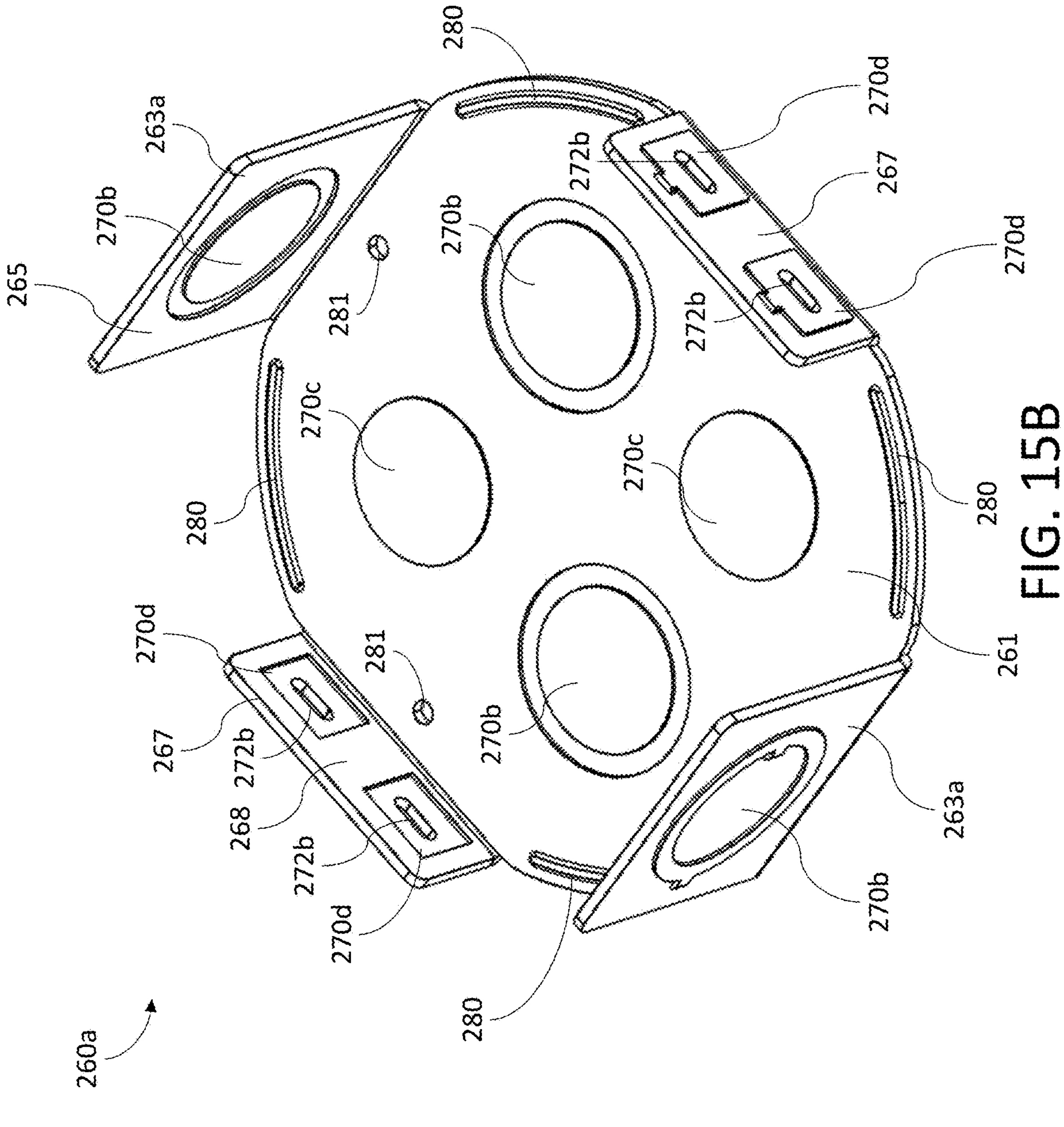
FIG. 15B shows a bottom, rear, right perspective view of the top component of FIG. 15A.
Figure 15C:
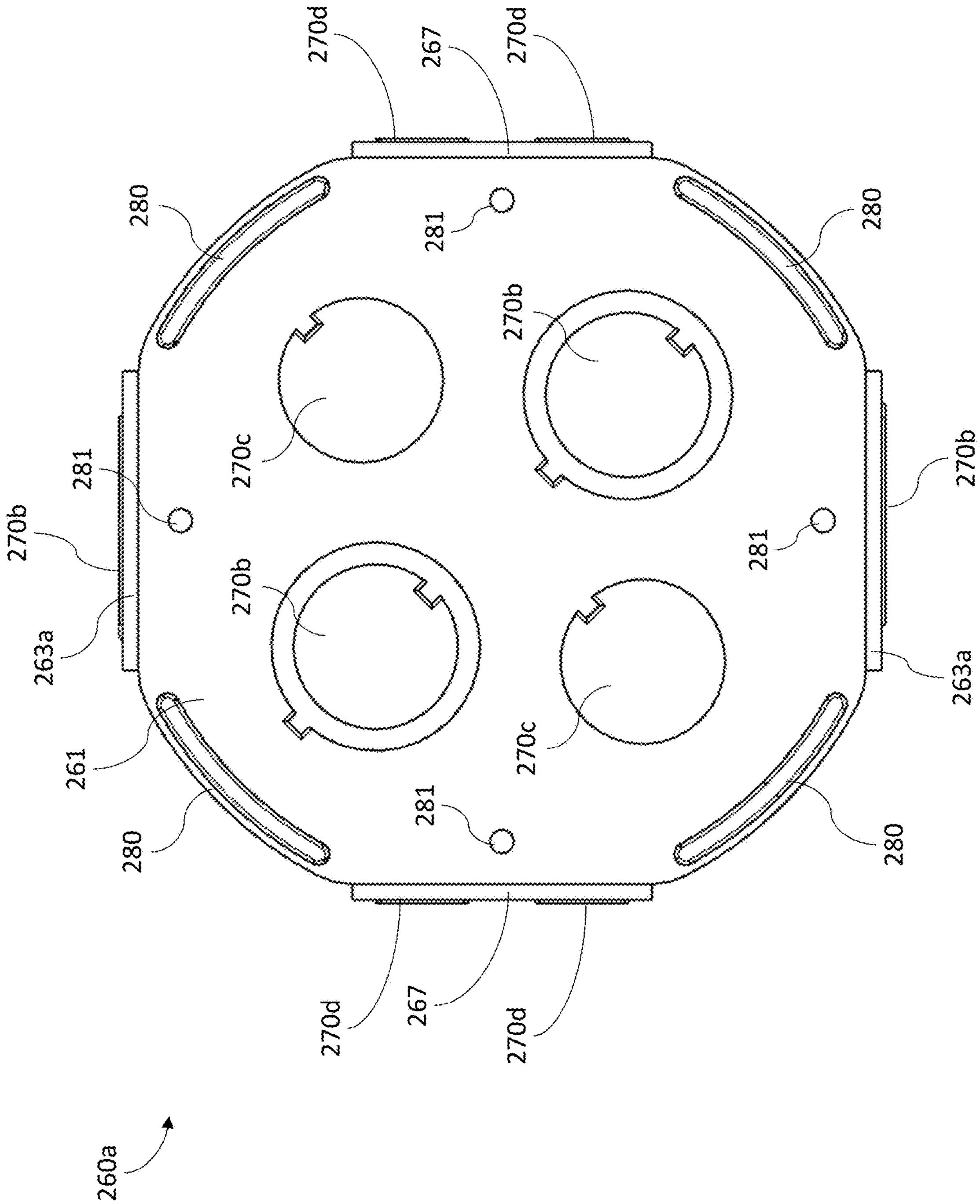
FIG. 15C shows a top view of the top component of FIG. 15A.
Figure 15D:
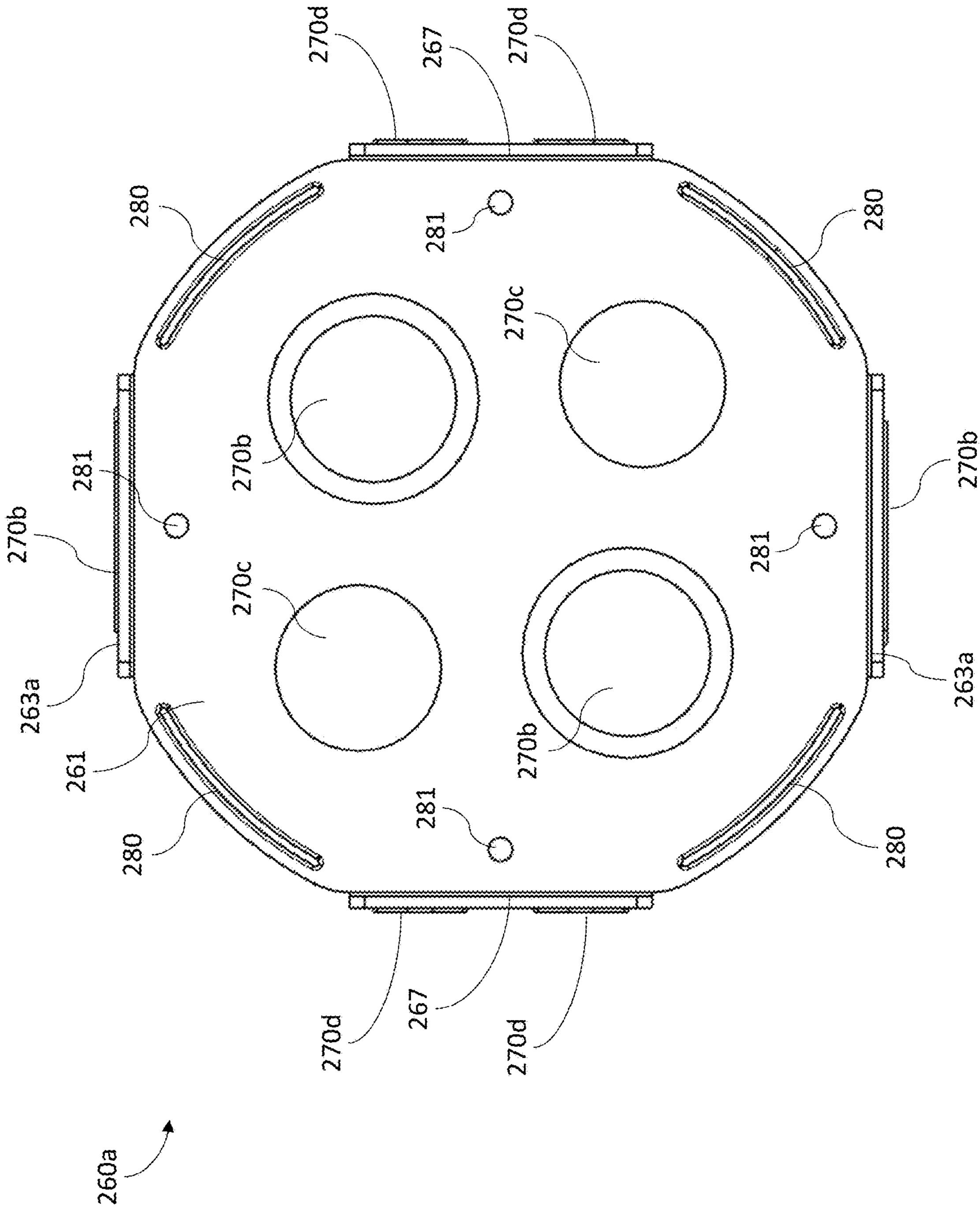
FIG. 15D shows a bottom view of the top component of FIG. 15A.
Figure 15E:
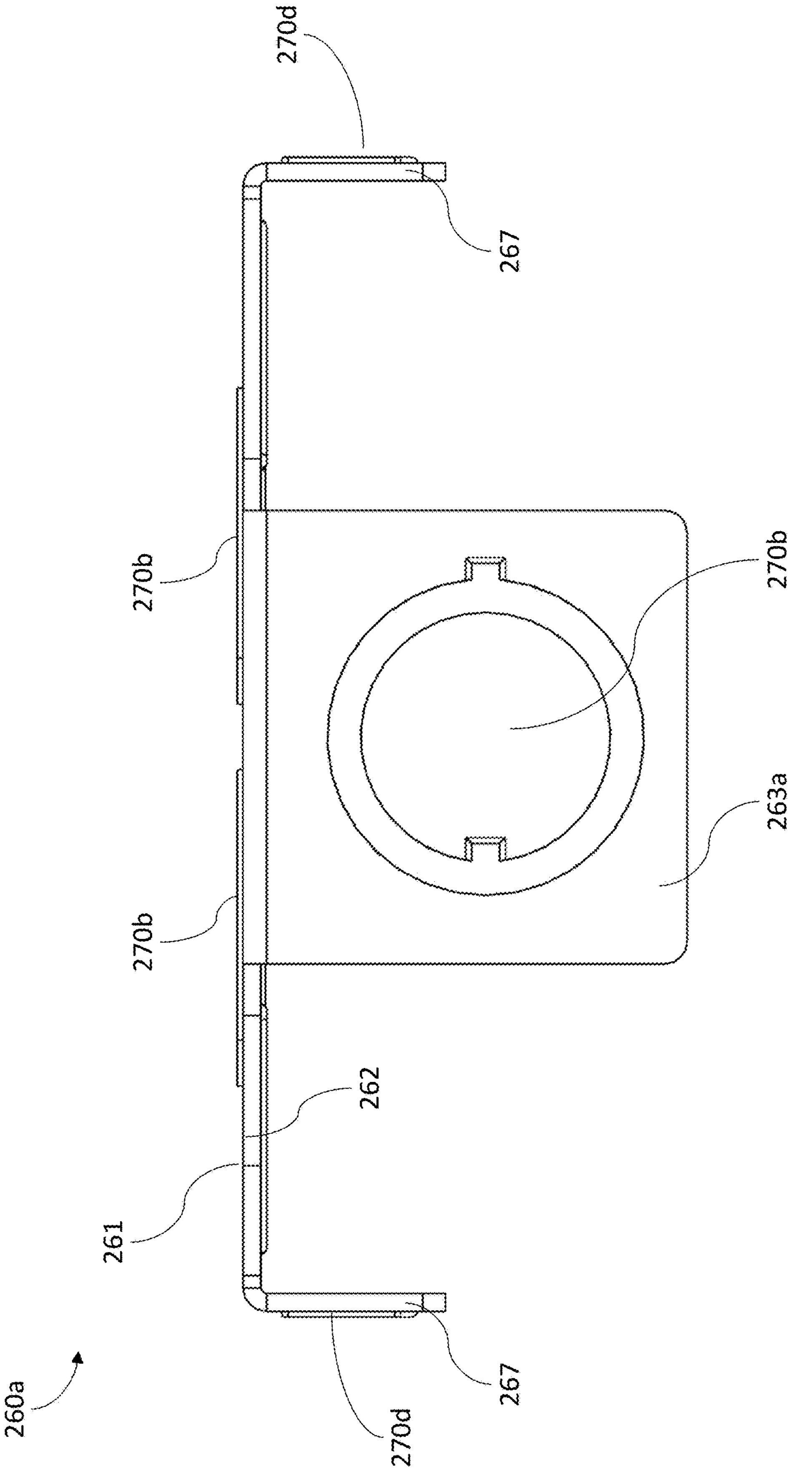
FIG. 15E shows a front view of the top component of FIG. 15A.
Figure 15F:
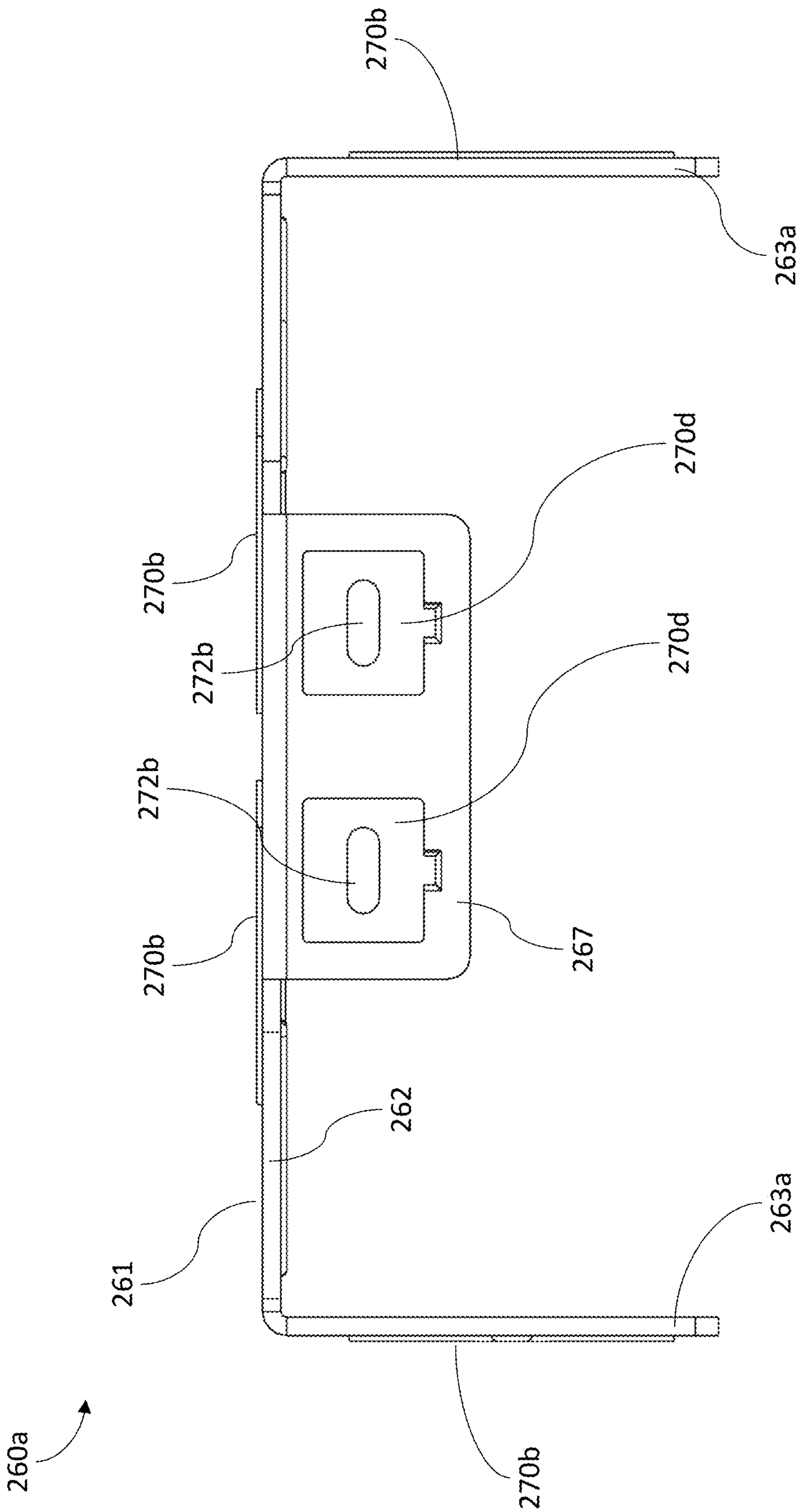
FIG. 15F shows a right-side view of the top component of FIG. 15A.

As shown in FIGS. 15E and 15F, the knockout tabs 263*a* and the Romex tabs 267 may also be oriented substantially vertical or vertical while the base section 261 may be oriented substantially horizontal or horizontal. In other words, the knockout tabs 263*a* and the Romex tabs 267 may be oriented at a right angle with respect to the base section 261. However, it should be appreciated that, in some implementations, one or more of the knockout tabs 263*a* and/or the Romex tabs 267 may be oriented at any angle relative to the base section 261. For example, the knockout tab 263*a* or the Romex tab 267 may taper outwards away from the centerline axis 209 or inwards towards the centerline axis 209 of the housing 200*b*.

In some implementations, the base section 261, the knockout tabs 263*a*, and the Romex tabs 267 may be substantially flat or flat in shape. The flat geometry of the top component 260*a* may improve the ease of manufacture since the knockout tabs 263*a* and the Romex tabs 267 may initially be formed along the same plane as the base section 261 and subsequently bent to the desired orientation. Additionally, complex structural features may be more readily formed on the flat surfaces of the top component 260*a*.

For example, the base section 261 may include multiple circular knockouts 270*b* and 270*c*. Each knockout tab 263*a* may include one circular knockout 270*b*. Each Romex tab 267 may include a pair of Romex knockouts 270*d*. The knockout 270*b* may be a concentric knockout that allows the installer to remove an inner portion to form a smaller opening and, optionally, an outer portion to form a larger opening. For example, the removal of the inner portion of the knockout 270*b* may result in an opening that is ½ inch in diameter. If the outer portion of the knockout 270*b* is removed, the opening may be ¾ inch in diameter. The knockout 270*c* may be a single knockout that provides an opening with one size. For example, the knockout 270*c*, when removed, may form an opening that is ½ inch in diameter. More generally, the knockouts 270*b* and 270*c*, when removed, may provide an opening with a diameter that ranges between about 0.5 inches to about 1.25 inches.

The Romex knockouts 270*d* may be similarly removed to provide an opening into the cavity 210. Compared to the circular knockouts 270*b* and 270*c*, the Romex knockouts 270*d* may provide a relatively smaller opening when removed. For example, the opening formed by the removal of the Romex knockout 270*d* may have a width or height that ranges between about 0.25 inches to about 0.75 inches. In some implementations, each Romex knockout 270*d* may further include a slot 272*b* shaped to receive an end of a tool (e.g., a flathead screwdriver) to facilitate removal of the Romex knockout 270*d*.

The term "about," when used to describe the openings formed by the removal of the circular and Romex knockouts, is intended to cover manufacturing tolerances and variances in dimensions due to the removal of the knockouts. For example, "about 0.5 inches" may correspond to the following dimensional ranges: 0.495 to 0.505 inches (+/−1% tolerance), 0.496 to 0.504 inches (+/−0.8% tolerance), 0.497 to 0.503 inches (+/−0.6% tolerance), 0.498 to 0.502 inches (+/−0.4% tolerance), 0.499 to 0.501 inches (+/−0.2% tolerance).

In some implementations, the placement of the knockout tabs 263*a* and the Romex tabs 267 may also allow for straight conduit runs where a conduit cable may extend through the housing 200*b* by passing through openings formed on opposite sides of the housing 200*b*. For example, the removal of the circular knockouts 270*b* on the knockout tabs 263*a* may provide openings that allow a straight conduit cable to pass through the housing 200*b*. Similarly, the removal of Romex knockouts 270*d* disposed directly opposite to one another on the Romex tabs 267 may similarly allow a smaller conduit cable to pass straight through the housing 200*b*.

As noted above, the base section 261 may include multiple fastener openings 281 to facilitate attachment with the sidewall components 220*a*-1 and 220*a*-2 via rivet fasteners 204. FIGS. 15A-15D also show the base section 261 may include ribs 280 formed along the periphery near the curved portions of the outer edge 262 that extend into the cavity 210. In some implementations, the ribs 280 may help align the top component 260*a* to the sidewall components 220*a*-1 and 220*a*-2 during assembly. Specifically, the ribs 280 may abut the interior edge of the top end 224 of the sidewall components 220*a*-1 and 220*a*-2 to align the openings 281 to the openings 238-1 and 238-2 on each sidewall component 220*a*. In some implementations, the base section 261 may further include an opening (not shown) to connect a ground cable directly to the housing 200*b*.

A Round-Shaped Housing With a Single Sidewall Component

Figure 17:
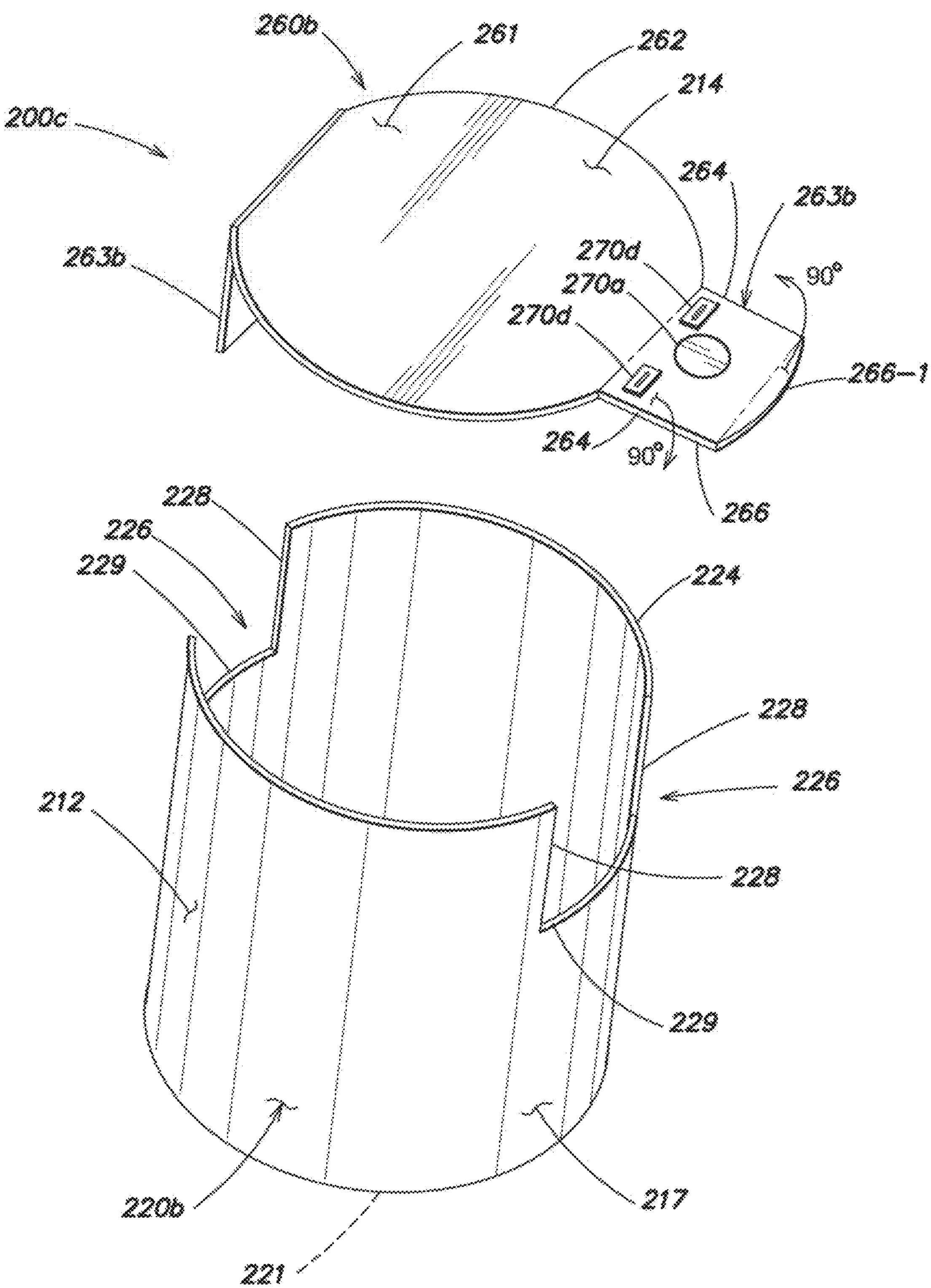
FIG. 17 shows a top front, left perspective view of another exemplary round-shaped housing with a single sidewall component.

FIG. 17 shows another exemplary housing 200*c* assembled using a sidewall component 220*b* and a top component 260*b*. As shown, the sidewall component 220*b* may define the round shape of the sidewall 212 in the same manner as the sidewall components 220*a* in the housing 200*b*. In this implementation, however, the housing 200*c* may include a single sidewall component 220*b* with a curved portion 217 that surrounds and defines the cavity of the housing 200*c*. The sidewall component 220*b* may further include a bottom end 221 that defines a bottom opening (not shown) into the cavity 210. Said in another way, the sidewall component 220*b* is a single unitary component that defines at least a portion of the sidewall 212 in a similar manner as the assembly of the sidewall components 220*a*-1 and 220*a*-2 in the housing 200*b*. The top component 260*b* may once again cover a top end 224 of the sidewall component 220*b* and provide various knockout features. Thus, the housing 200*c* may be assembled from only two components.

This may be accomplished, in part, by simplifying the geometry of the sidewall component 220*b* such that there are no flat sections or, more generally, no portions that deviate in shape from the curved geometry of the sidewall 212. In other words, the sidewall component 220*b* may only include a curved portion 217. This may simplify manufacture of the sidewall component 220*b* by eliminating additional process steps to form the sidewall component 220*b* into the desired shape. For example, the sidewall component 220*b* may be formed by rolling a single piece of sheet metal into a round shape. In some implementations, the sidewall component 220*b* may be formed as a tube with a uniform thickness. Once rolled, the opposing sides of the sidewall component 220*b* may form a seam, which may be welded together (see for example, the housings 200*d*, 200*g*, and 200*i* of FIGS. 18A-18J, 28A-28N, and 30A-30I, respectively). It should be appreciated that other sheet metal forming processes may be used to fabricate the sidewall component 220*b* including, but not limited to, drawing and deep drawing.

Although the sidewall component 220*b* may not include any flat sections, the housing 200*b*, when assembled, may nevertheless provide flat sections along the top and sides of the housing 200*b* to support one or more circular knockouts and/or Romex knockouts to support both new construction and remodel installations. For example, FIG. 17 shows one or more notches 226 may be formed along the top end 224 of the sidewall component 220*b* to provide space to accommodate corresponding knockout tabs 263*b* of the top component 260*b*. Specifically, the sidewall component 220*b* may include opposing side edges 228 joined to the top end 224 and a curved bottom edge 229 joining the side edges 228 where the side edges 228 and the bottom edge 229 define the notch 226. The top component 260*b* may include a base section 261 to abut and cover the top end 224 and the knockout tab 263*b* may extend from the base section 261 at an angle (e.g., a right angle, an angle that results in knockout tab 263*b* tapering outwards away from the centerline axis 209 or inwards towards the centerline axis 209 of the housing 200*b*) to cover the notch 226. As shown, the knockout tab 263*b* may include opposing side edges 264 that align and abut the side edges 228.

Although the knockout tabs 263*b* are disposed along the sides of the housing 200*c*, for the purposes of defining the sidewall 212 and the base end 214, the sidewall components 220*b* may be viewed as defining the sidewall 212 of the housing 200*c* and the top component 260*b* may be viewed as defining the base end 214 of the housing 200*c*.

In some implementations, the notches 226 may be formed when the sidewall component 220*b* is initially a flat piece of sheet metal before being rolled into the desired round shape. In some implementations, the notches 226 may be cut into the sidewall component 220*b* after the sidewall component 220*b* is formed with a round shape. For example, the sidewall component 220*b* may be formed as a tube, which is then cut along the top end 224 to form the notches 226. The side edges 228 and the bottom edge 229 may generally form a notch 227 with various shapes including, but not limited to, a square, a rectangle, a trapezoid, a semi-circle, a semi-ellipse, or any combinations of the foregoing. For example, the side edges 228 and the bottom edge 229 may define a notch 226 that is shaped as a rectangle or a square when viewing the front side of the housing 200*c* (see, for example, FIGS. 18E and 18G for the housing 200*d*).

The knockout tab 263*b* may be substantially flat or flat in shape, which results in a gap forming between the bottom of the knockout tab 263*b* and the bottom edge 229 of the sidewall component 220*b*. The knockout tab 263*b* may include an end portion 266 that extends from the bottom of the knockout tab 263*b* at an angle (e.g., a right angle, an angle that results in the end portion 266 tapering outwards away from the centerline axis 209 or inwards towards the centerline axis 209 of the housing 200*b*) to cover the gap. As shown in FIG. 17, the end portion 266 may have a curved edge 266-1 that aligns with the curved bottom edge 229 of the sidewall component 220*b*. In this manner, the base section 261, the knockout tabs 263*b*, and the end portions 266 of the top component 260*b* may enclose the top end 224 and the notches 226 of the sidewall component 220*b*. In some implementations, the outer edge 262 of the base section 261, the side edges 264 of the knockout tabs 263*b*, and the edge 266-1 of the end portion 266 may be welded to the top end 224, the side edges 228, and the bottom edge 229, respectively, to form the housing 200c. In some implementations, the top component 260b may be joined to the sidewall component 220b to form an airtight cavity.

The base section 261 and the end portions 266 of the top component 260b may also be substantially flat or flat in shape. In some implementations, the base section 261 may be oriented substantially horizontal or horizontal to abut the top end 224 of the sidewall component 220b. The knockout tabs 263b may be oriented substantially vertical or vertical. The end portions 266 may be oriented substantially horizontal or horizontal. In some implementations, the top component 260b may initially be formed from a flat piece of sheet metal with the knockout tabs 263b and the end portions 266 aligned coplanar with the base section 261. The knockout tabs 263b and the end portions 266 may subsequently be bent into the desired orientation.

The base section 261 and the knockout tabs 263b of the top component 260b may support various knockouts to provide entry into the cavity of the housing 200b for various wiring connections. For example, FIG. 17 shows the knockout tab 263b may include a circular knockout 270a and a pair of Romex knockouts 270d. Although FIG. 17 shows the base section 261 without any knockouts, it should be appreciated that one or more circular or Romex knockouts may be disposed on the base section 261 similar to the housing 200b.

It should be appreciated that, in some implementations, certain design aspects of the housing 200c may be incorporated into the housing 200b. For example, the housing may include two (or more) sidewall components similar to the housing 200b where each sidewall component does not include any flat sections similar to the housing 200c, thus simplifying the manufacture of the respective sidewall components. Each sidewall component may be fabricated using, for example, a rolling process. The sidewall components may be joined together via welding and/or one or more rivet connections.

A Round-Shaped Housing for a Remodel Installation

In some implementations, the housings and housing assemblies disclosed herein may be tailored to support a remodel installation of a lighting system. In a typical remodel installation, a built environment is modified to facilitate installation of the lighting assembly. For example, the environment may include a previously installed drywall panel on the ceiling. To install the lighting system, the housing assembly is inserted through an opening on the drywall panel, which may have been formed for a previous installation or may be newly formed for the new installation. The housing assembly may then be secured directly to the drywall panel. In this manner, the housing assembly may be installed without removing the drywall panel and/or accessing the ceiling space above the drywall panel. Once the housing assembly is installed, a lighting module and a trim may then be inserted into the housing.

FIGS. 18A-18J show several views of an exemplary implementation of a housing assembly 101c tailored for remodel installations. As shown, the housing assembly 101c may include a housing 200d defining a cavity 210 to contain and support a lighting module, at least a portion of a trim, and various electrical wire and wiring connections with an external power supply system. The housing assembly 101c may further include a spring clip assembly 500a mounted to the housing 200d to provide an attachment mechanism to couple the housing 200d to a drywall panel. The spring clip assembly 500a may include a mounting ring 510a and multiple spring clips 530a that together defining a clamping mechanism to mount the housing 200d onto the bottom and top surfaces of the drywall panel as discussed in more detail below.

The housing 200d may be assembled using a single sidewall component 220c that defines the sidewall 212 and a top component 260c that defines the base end 214 similar to the housing 200c. In this implementation, the sidewall component 260c may provide additional mounting features (e.g., openings) to support the spring clip assembly 500a without appreciably increasing the complexity of the component or cost of manufacture. For example, the sidewall component 260c may still be readily formed via a rolling process. The top component 260c may once again provide multiple knockouts and a ground connection to support various wiring connections in the lighting system. Although the housing 200d is assembled using a single sidewall component 220c, it should be appreciated that, in some implementations, multiple sidewall components may be assembled to form the sidewall 212 similar to the housing 200b.

Figure 19A:
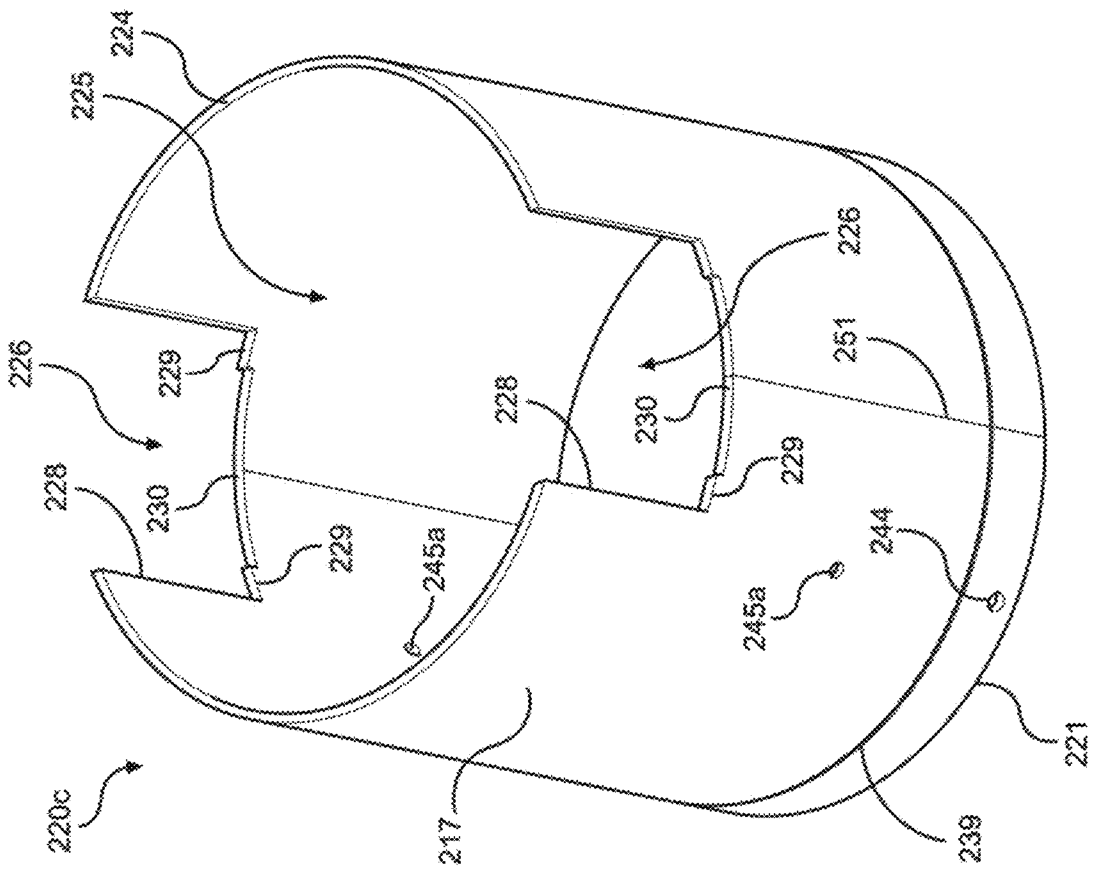
FIG. 19A shows a top, front, left perspective view of the sidewall component in the housing assembly of FIG. 18A.
Figure 19B:
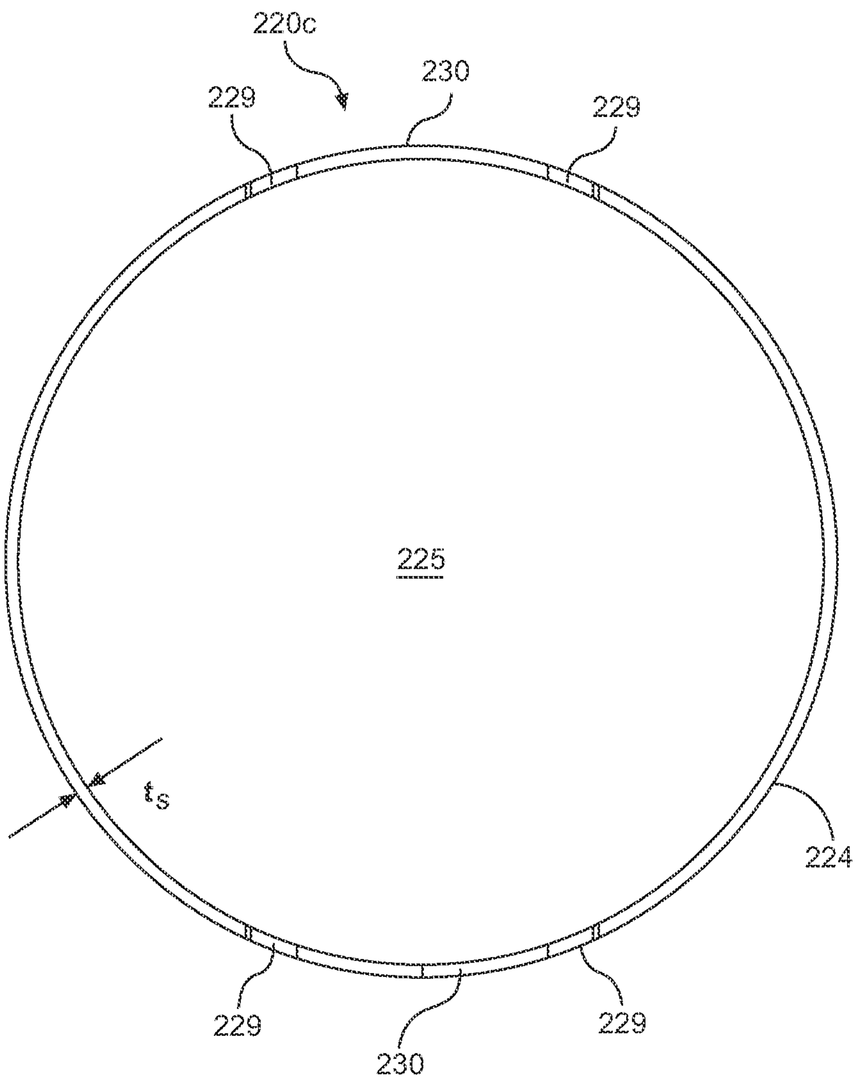
FIG. 19B shows a top view of the sidewall component of FIG. 19A.

FIGS. 19A and 19B show several additional views of the sidewall component 220c. As shown, the sidewall component 220c may have a curved portion 217 that surrounds the cavity 210. The sidewall component 220c may also have a bottom end 221 that defines an opening 222 into the cavity 210 and a top end 224 that defines, in part, a top opening 225 into the cavity 210. In some implementations, the round shape of the sidewall component 220c may be formed by rolling a flat piece of sheet metal. The opposing sides of the sheet metal may be joined together to form a seam 251 that is welded. In some implementations, the sidewall component 220c may have a circular cross-sectional shape that extends from the bottom end 221 to the top end 224. Said in another way, the sidewall component 220c may be shaped as a tube as shown in FIG. 19B. In some implementations, the sidewall component 220c may have a uniform thickness ($t_s$). The thickness $t_s$ may range between about 0.6 mm to about 2.0 mm when the sidewall and top components are formed from galvanized steel. The term "about," when used to describe the thickness of the sidewall component 220c, is intended to cover manufacturing tolerances. For example, "about 0.6 mm" may correspond to the following dimensional ranges: 0.594 to 0.606 mm (+/−1% tolerance), 0.5952 to 0.6048 mm (+/−0.8% tolerance), 0.5964 to 0.6036 mm (+/−0.6% tolerance), 0.5976 to 0.6024 mm (+/−0.4% tolerance), 0.5988 to 0.6012 mm (+/−0.2% tolerance).

The sidewall component 220c may further include a pair of notches 226 formed along the top end 224 and on the curved portion 217 to provide space to accommodate the tabs 263c on the top component 260c. Specifically, each notch 226 may once again be defined by opposing side edges 228 joined to the top end 224 and a bottom edge 229 joining the opposing side edges 228. In this implementation, however, the bottom edge 229 may further include a recessed edge 230 that forms a secondary notch. The secondary notch may provide space for the end portion 266 on the tabs 263c on the top component 260c to reside. As shown in FIG. 19A, the pair of notches 226 may be disposed diametrically opposite with respect to one another corresponding to the arrangement of the tabs 263c on the top component 260c. More generally, the notches 226 and the tabs 263c may be offset at any angle relative to one another about the centerline axis 209.

The sidewall component 220c may further include multiple fastener openings 244 disposed around its periphery and near the bottom end 221 that align with corresponding fastener openings 516 on a collar 512 of the mounting ring 510*a*. In some implementations, the fastener openings 244 and 516 may also align with a fastener opening 540 on each spring clip 530*a*. Thus, the number and location of the fastener openings 244 and 516 may depend on the number and placement of the spring clips 530*a* in the housing assembly 101*c*. For example, the housing assembly 101*c* may include three spring clips 530*a* disposed uniformly around the sidewall 212 of the housing 200*d* (i.e., the spring clips 530*a* are rotationally offset by 120 degrees about the centerline axis 209 of the housing 200*d*). The housing assembly 101*c* may include fasteners 520 inserted through the respective openings 244, 516, and 540 to couple the spring clip 530*a* and the mounting ring 510*a* to the housing 200*d*. In some implementations, the fasteners 520 may be rivet fasteners.

Figure 18A:
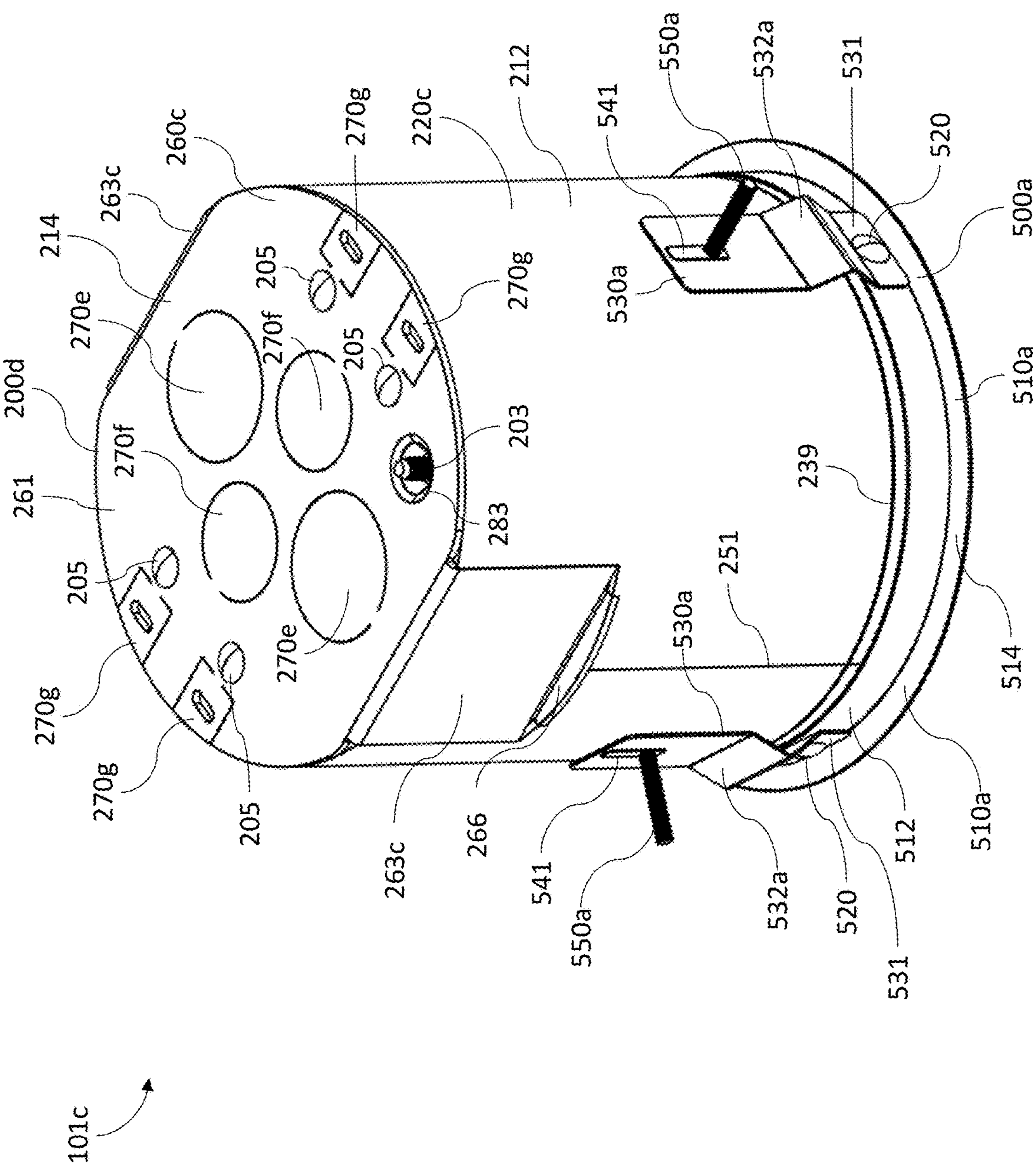
FIG. 18A shows a top, front, right perspective view of an exemplary housing assembly that includes a housing with a single sidewall component for a remodel installation.
Figure 18B:
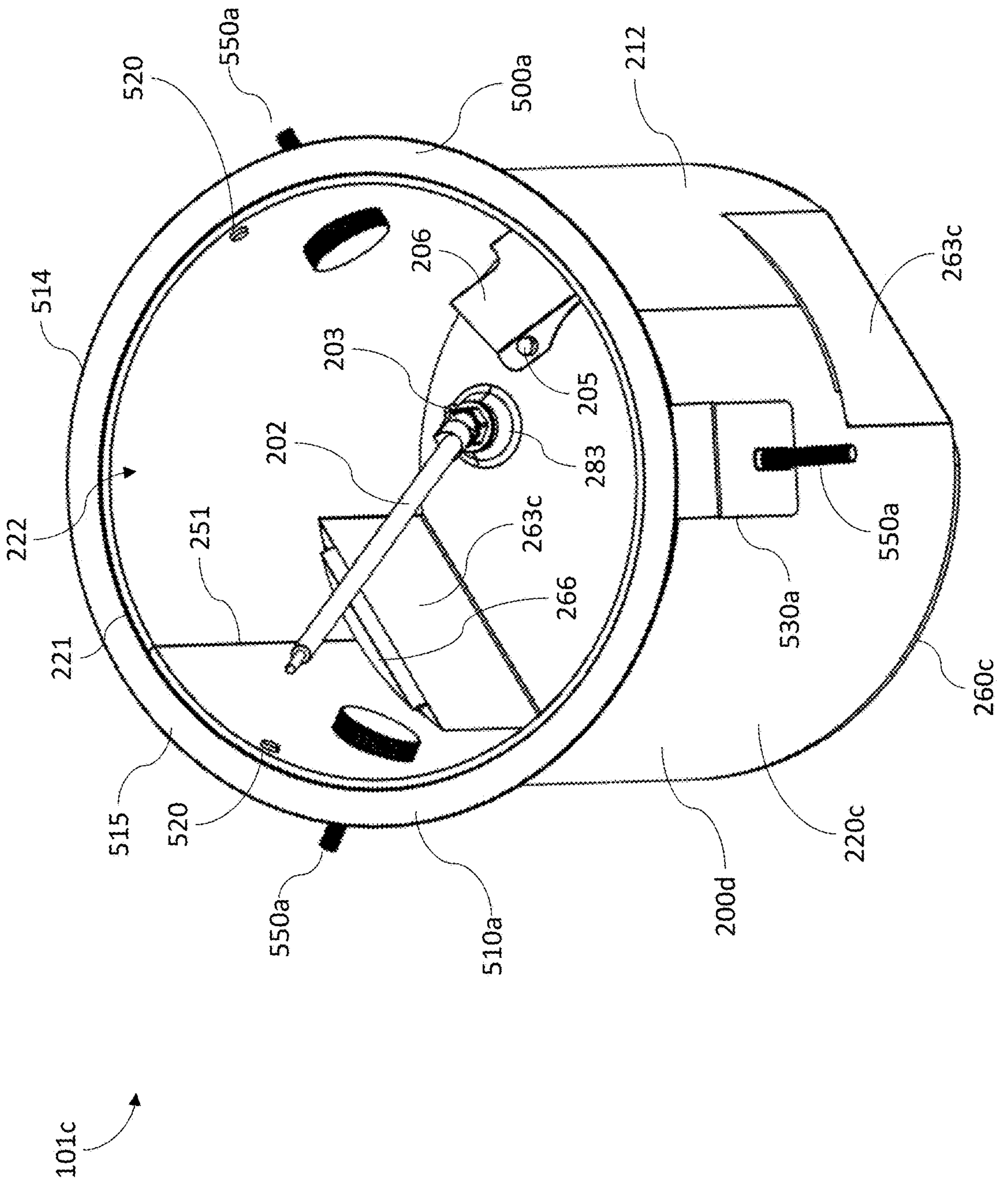
FIG. 18B shows a bottom, rear, left perspective view of the housing assembly of FIG. 18A.
Figure 18C:
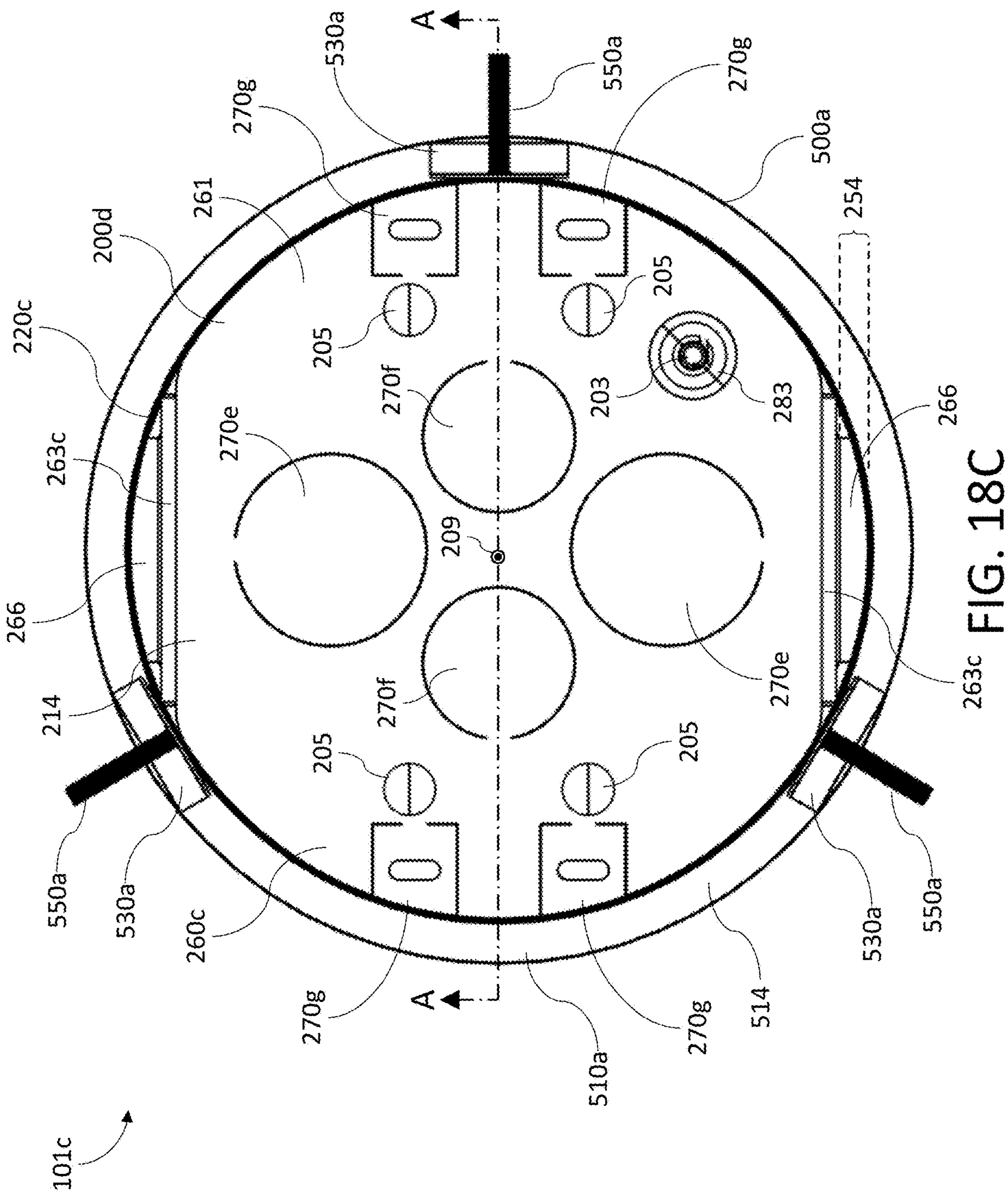
FIG. 18C shows a top view of the housing assembly of FIG. 18A.
Figure 18D:
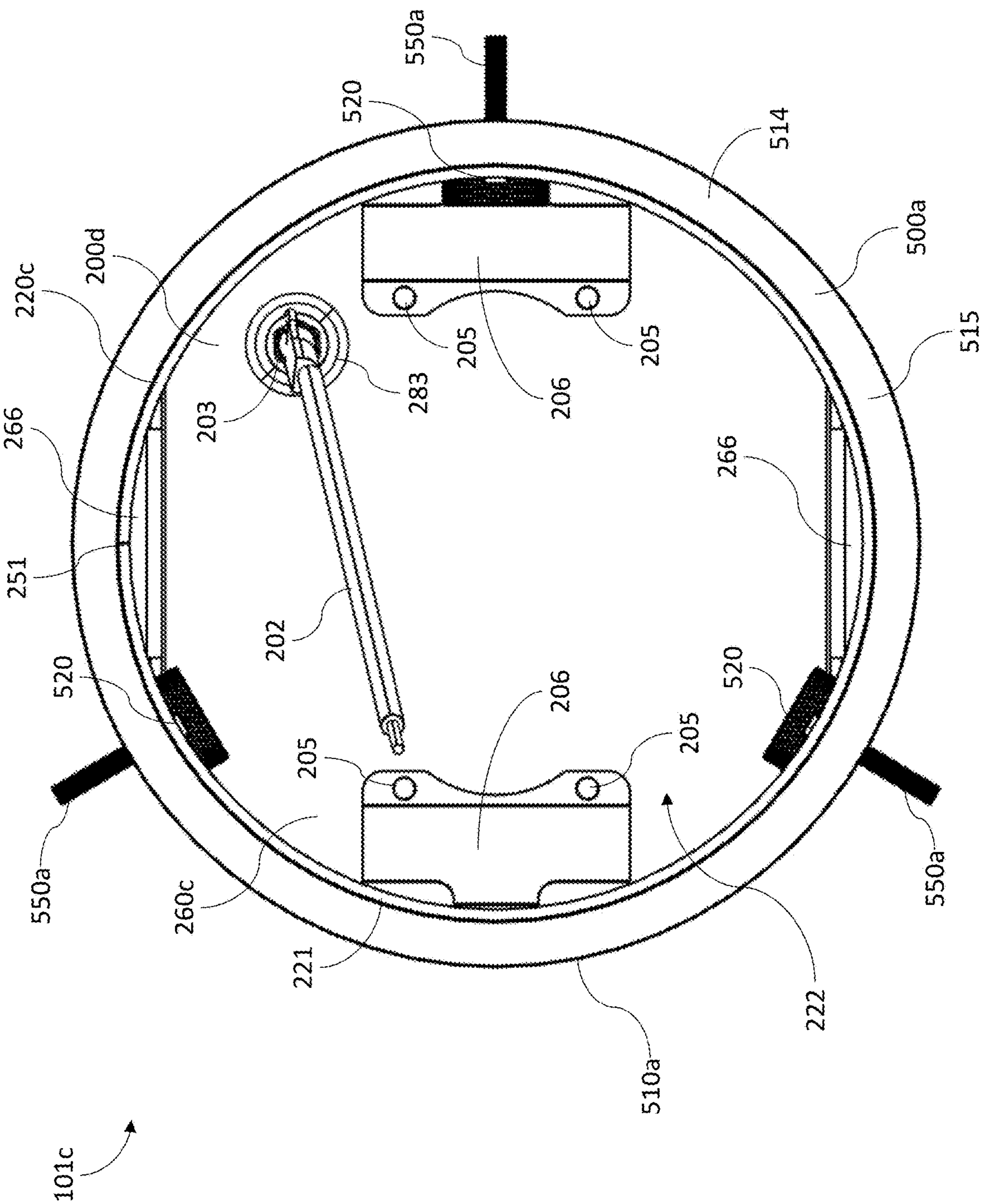
FIG. 18D shows a bottom view of the housing assembly of FIG. 18A.
Figure 18E:
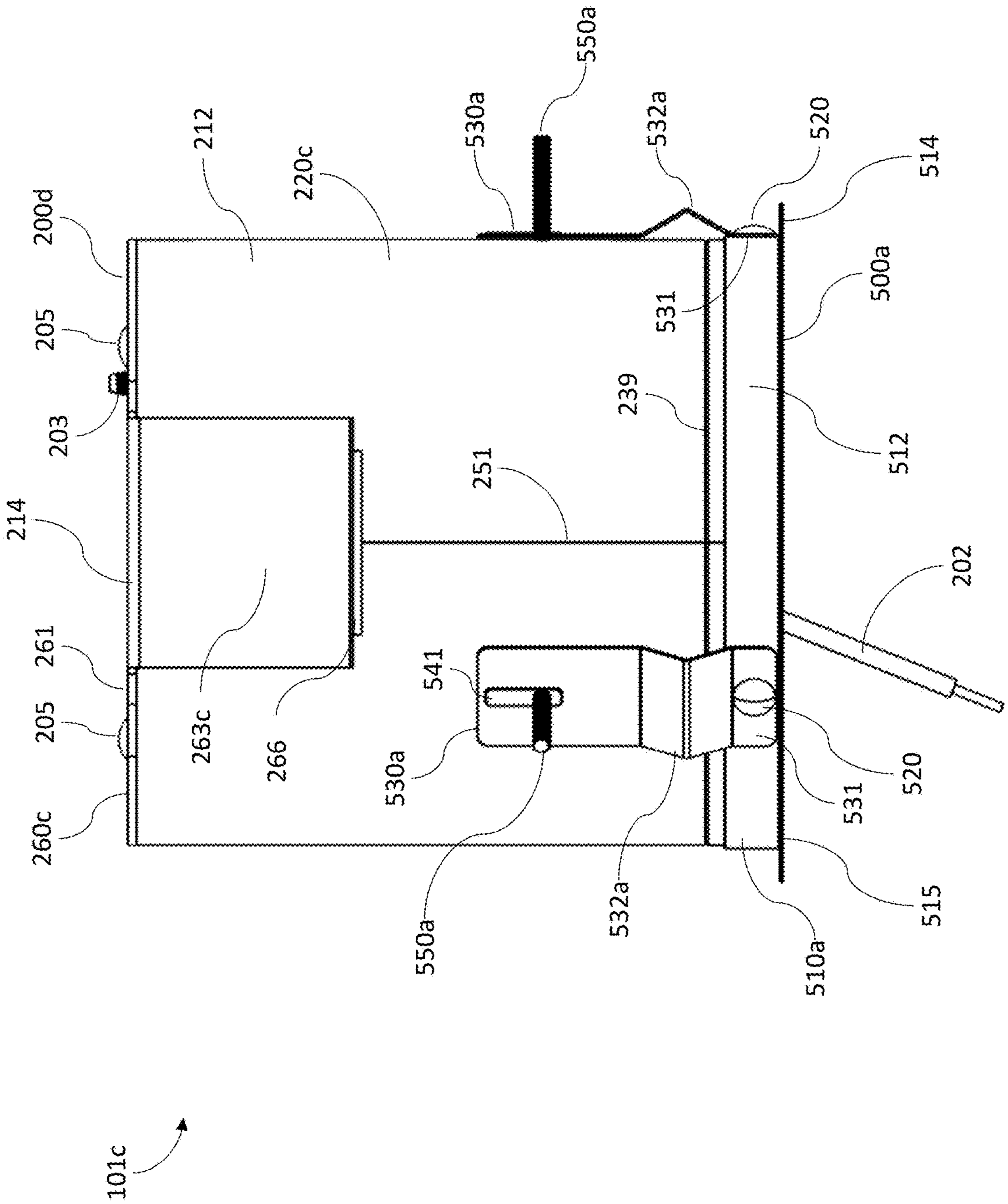
FIG. 18E shows a front view of the housing assembly of FIG. 18A.
Figure 18F:
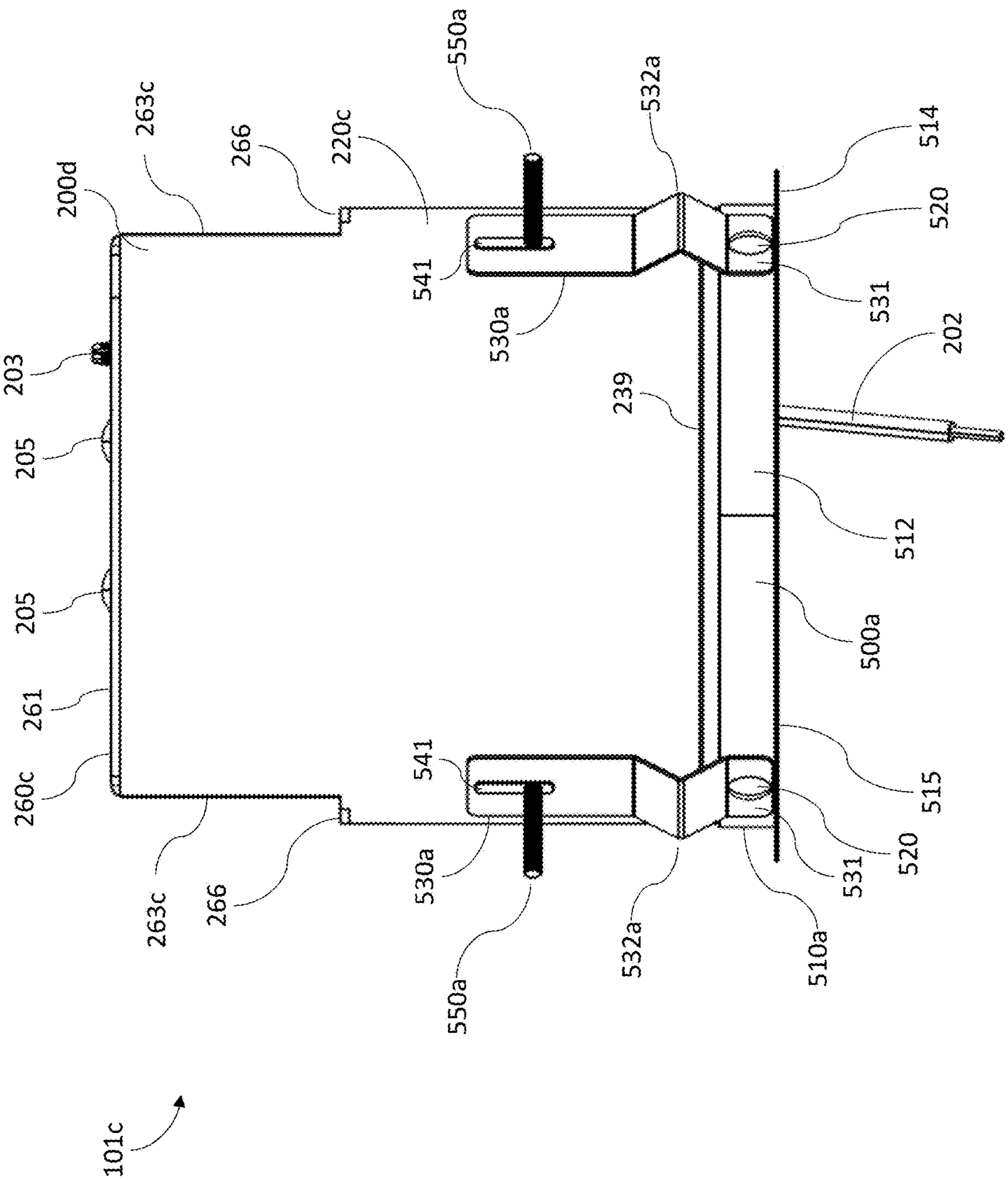
FIG. 18F shows a left-side view of the housing assembly of FIG. 18A.
Figure 18G:
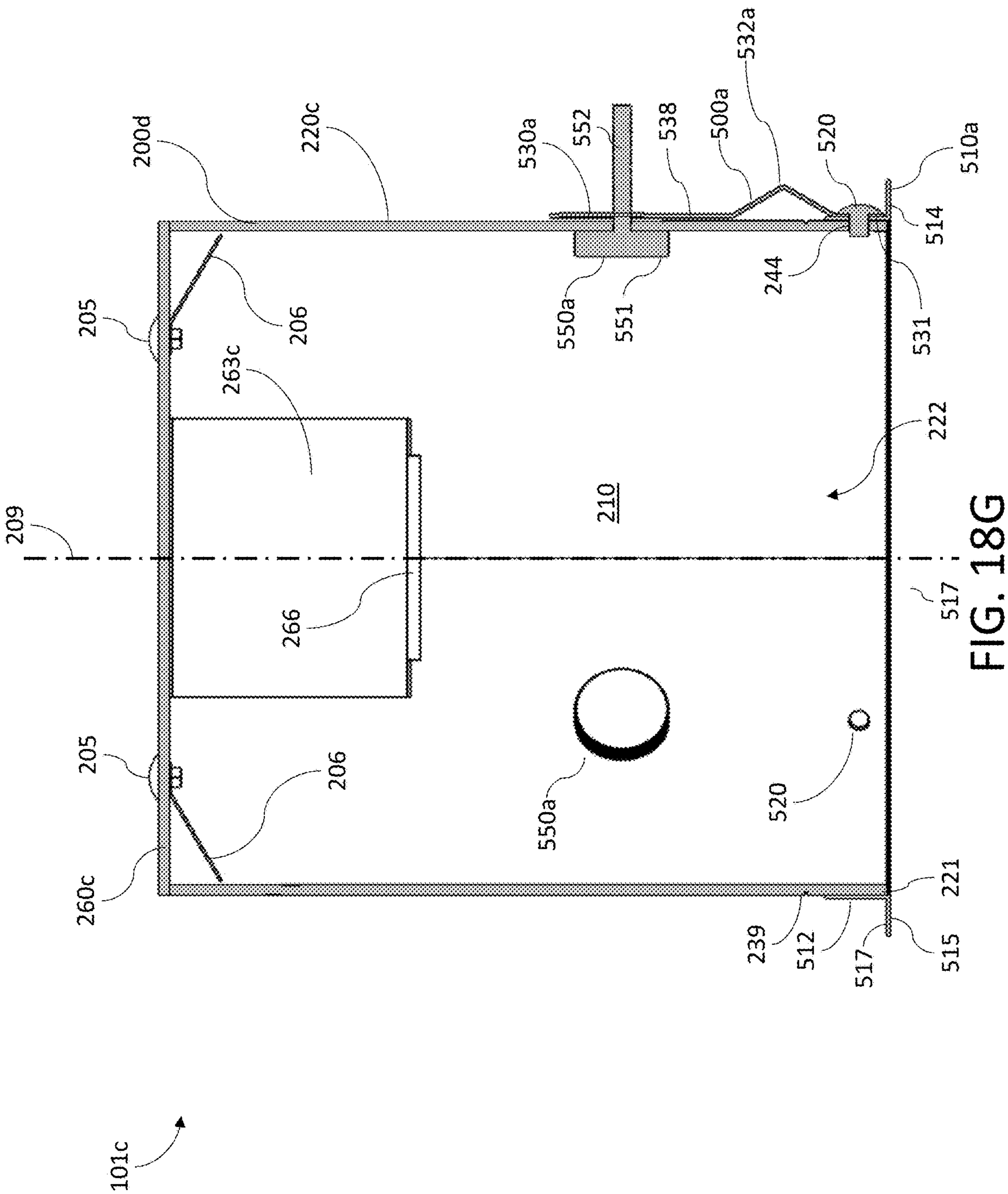
FIG. 18G shows a cross-sectional front view of the housing assembly of FIG. 18A corresponding to the plane A-A of FIG. 18C.
Figure 18H:
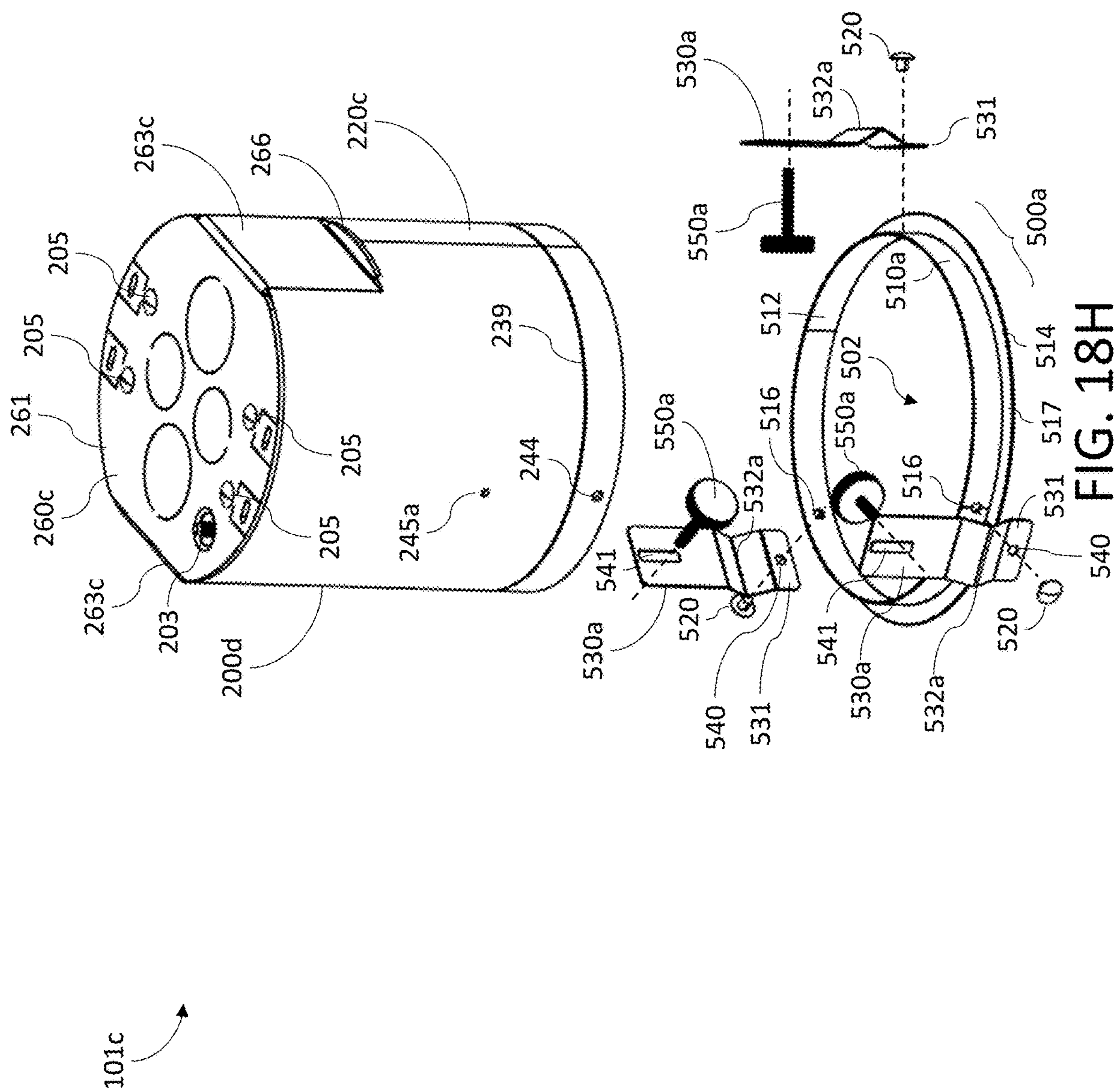
FIG. 18H shows an exploded top, front, left perspective view of the housing assembly of FIG. 18A where a mounting ring is separated from the housing.
Figure 18I:
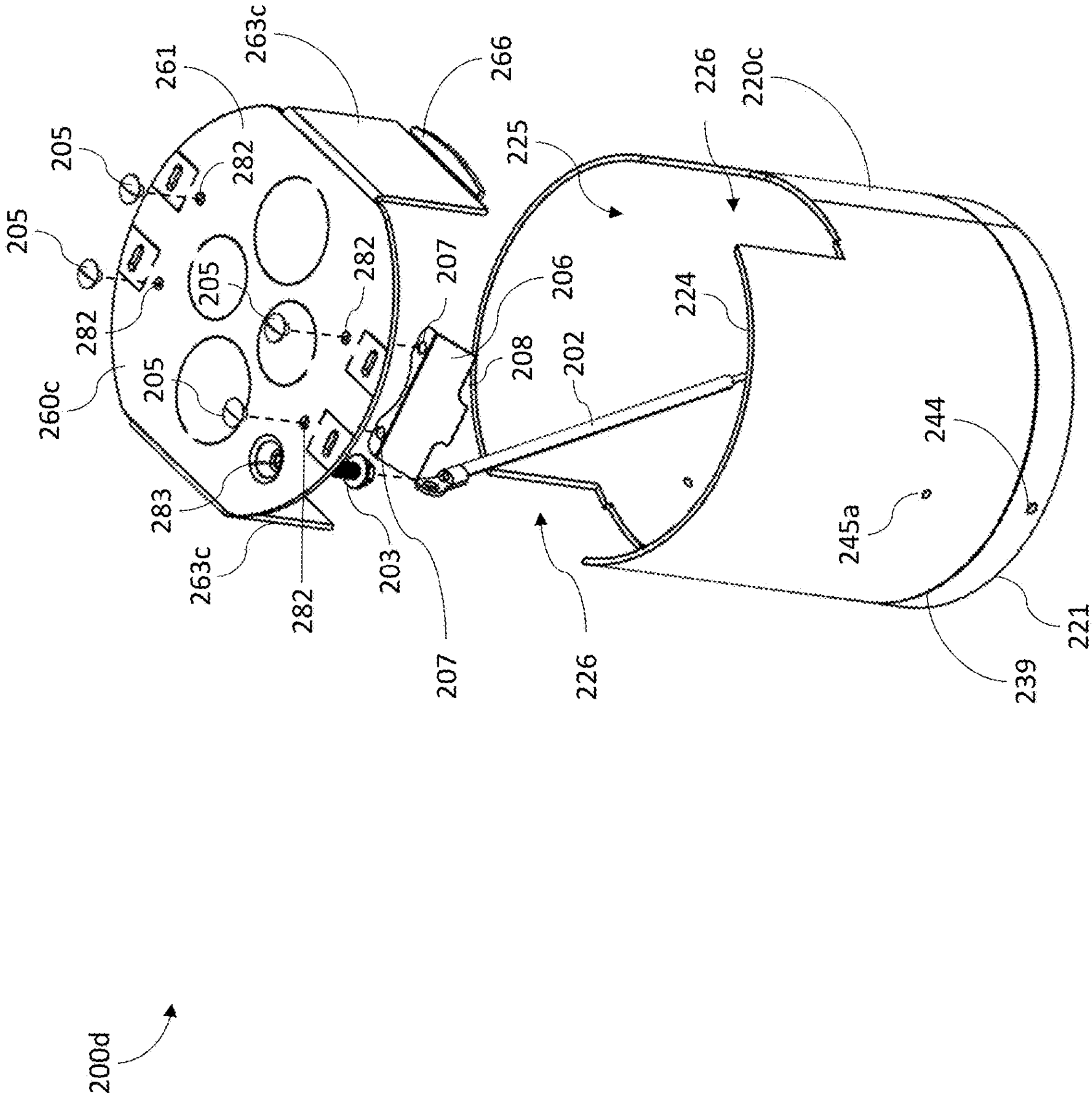
FIG. 18I shows an exploded top, front, left perspective view of the housing in the housing assembly of FIG. 18A with a top component separated from the sidewall component. The mounting ring and spring clips are not shown for clarity.

The sidewall component 220*c* may also include fastener openings 245*a* disposed above the openings 244 to support an actuation mechanism for each spring clip 530*a*. Thus, the number and placement of the fastener openings 245*a* may correspond with the fastener openings 244. The opening 245*a* may be shaped to receive a threaded shank 552 of a thumbscrew fastener 550*a* used to actuate the spring clip 530*a*. For example, the opening 245*a* may be threaded and/or dimensioned to retain the thumbscrew fastener 550*a* as it is rotated. Specifically, FIGS. 18G and 18H show the shank 552 of the thumbscrew fastener 550*a* may be inserted through an opening 541 on the spring clip 530*a* while the head 551 of the thumbscrew fastener 550*a* may remain disposed within the cavity 210 of the housing 200*d*. This arrangement may provide access to the thumbscrew fastener 550*a* from within the cavity 210 through the bottom opening 222 once the housing assembly 200*d* is inserted into an opening of a ceiling. In some implementations, the thumbscrew fastener 550*a* may be shaped and/or dimensioned such that the head 551 may be disposed proximate to the interior surface of the sidewall component 220*c* or, in some instances, in contact with the interior surface when the housing assembly 101*c* is securely coupled to the drywall panel to provide more room within the cavity 210 of the housing 200*d* to insert, for example, a lighting module and/or a trim.

The sidewall component 220*c* may also include the groove 239 disposed between the fastener openings 244 and 245*a* and extending around the periphery of the sidewall component 220*c*. In this implementation, the groove 239 may provide an alignment mark to position and align a gasket (not shown) disposed around the collar 512 of the mounting ring 510*a* and the spring clips 530*a*.

Figure 20A:
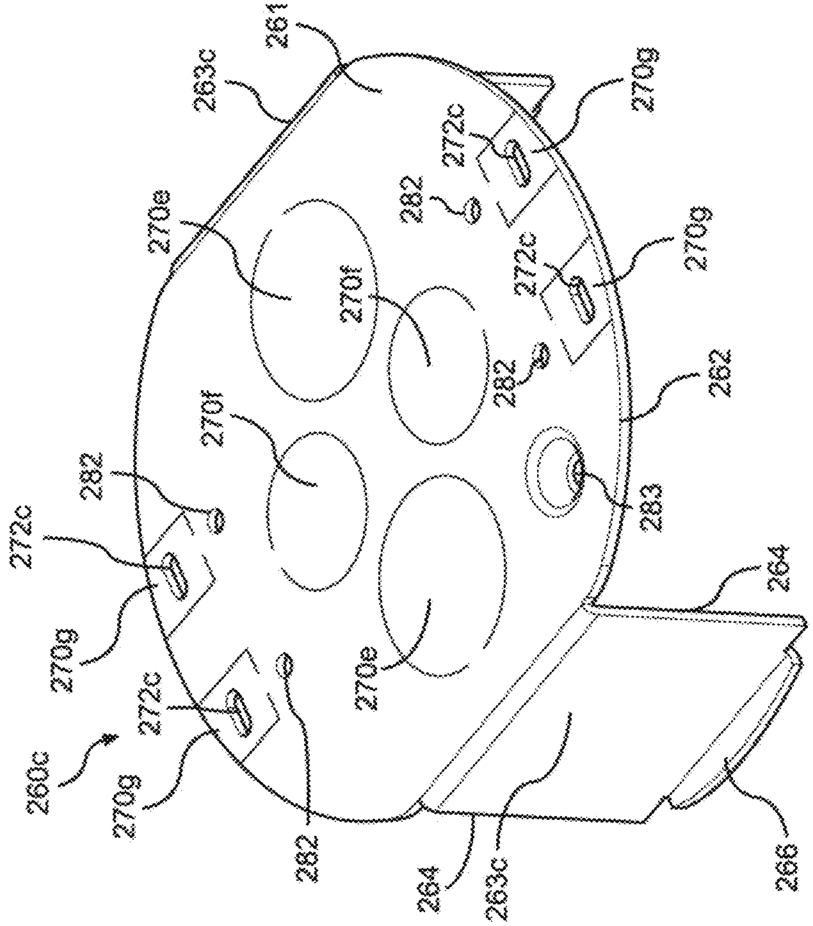
FIG. 20A shows a top, front, right perspective view of the top component in the housing assembly of FIG. 18A.
Figure 20B:
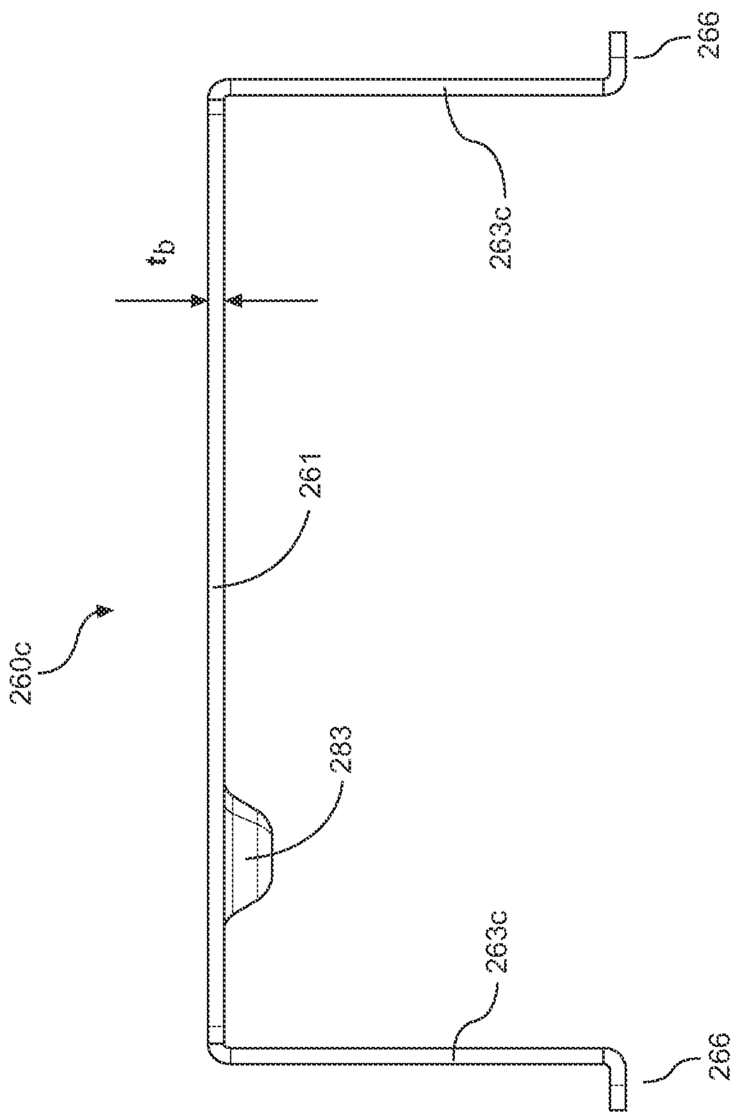
FIG. 20B shows a right-side view of the top component of FIG. 20A.

FIGS. 20A and 20B show several additional views of the top component 260*c*. As shown, the top component 260*c* may include a base section 261 that is once again substantially flat or flat in shape. The base section 261 may have an outer edge 262 shaped and/or dimensioned to be substantially flush or flush with the top end 224 of the sidewall component 220*c*. Thus, the base section 261 may cover and enclose the top end 224 and the top opening 225 of the sidewall component 220*c*. The top component 220*c* may further include tabs 263*c* that extend from the base section 261 and oriented at an angle (e.g., a right angle, an angle that results in knockout tab 263*c* tapering outwards away from the centerline axis 209 or inwards towards the centerline axis 209 of the housing 200*d*) with respect to the base section 261 to cover the notches 226 of the sidewall component 220*c*. Specifically, each tab 263*c* includes side edges 264 that aligns and abuts with the side edges 228 forming each notch 226. Each tab 263*c* may further include an end portion 266 to a cover a gap 254 formed between each tab 263*c* and the bottom edge 229 of each notch 226. As shown in FIGS. 18A, 18E, and 18F, the end portion 266 is disposed within the secondary notch formed by the recessed edge 230. Similar to the housing 200*c*, the outer edge 262 of the base section 261, the side edges 264 of the tabs 263*c*, and the edge of the end portion 266 of the top component 260*c* may be welded to the top end 224, the side edges 228, the bottom edge 229, and the recessed edge 230 of the sidewall component 220*c*.

Once again, the tabs 263*c* may provide flat sections along the side of the housing 200*d*. However, in this implementation, the tabs 263 may not include any knockouts to prevent misuse and/or an improper remodel installation of the housing (e.g., mounting the housing to a conduit cable disposed within the ceiling).

Figure 28A:
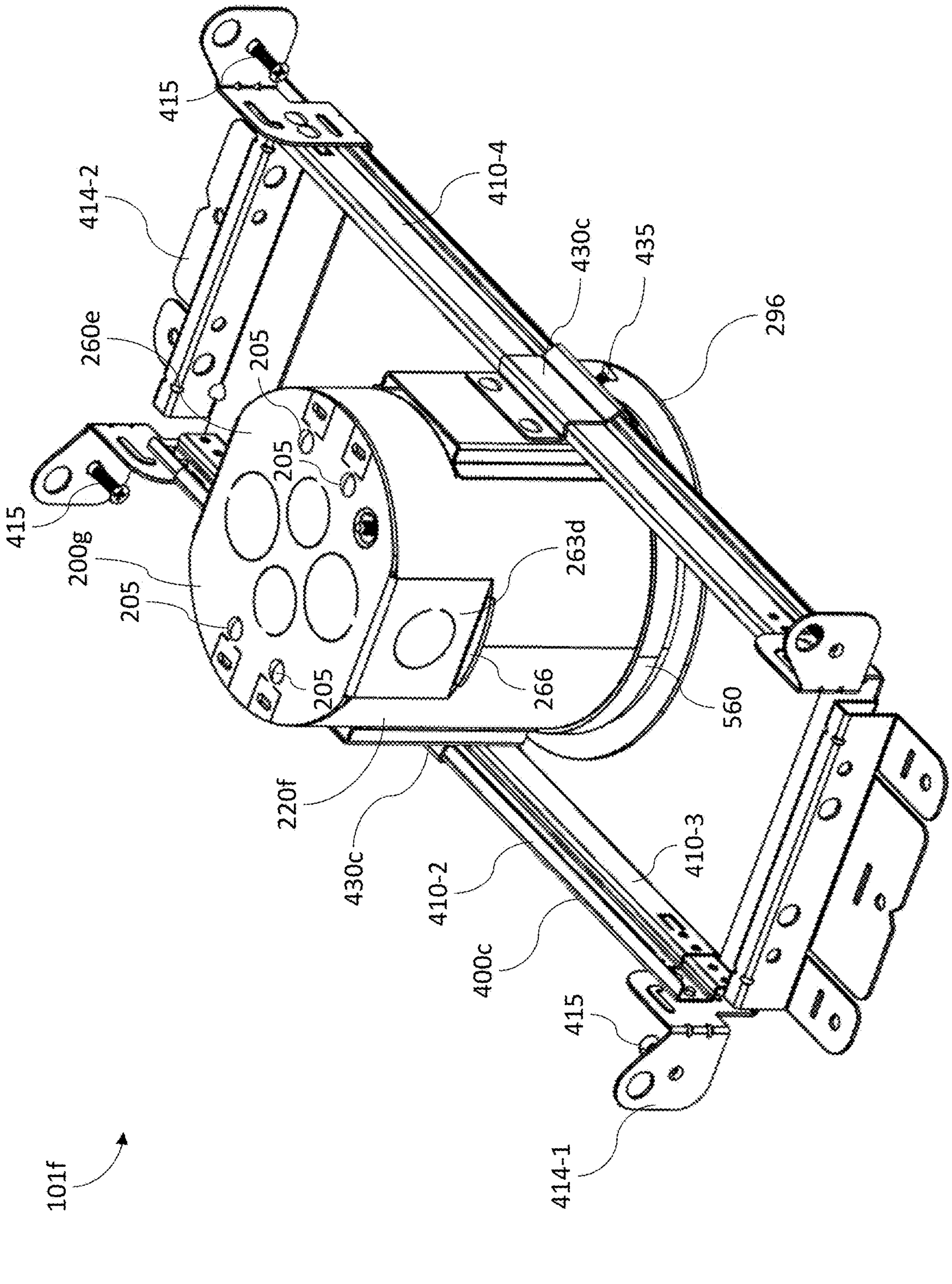
FIG. 28A shows a top, front, right perspective view of an exemplary housing assembly that includes a housing with a single sidewall component for a new construction installation.
Figure 28B:
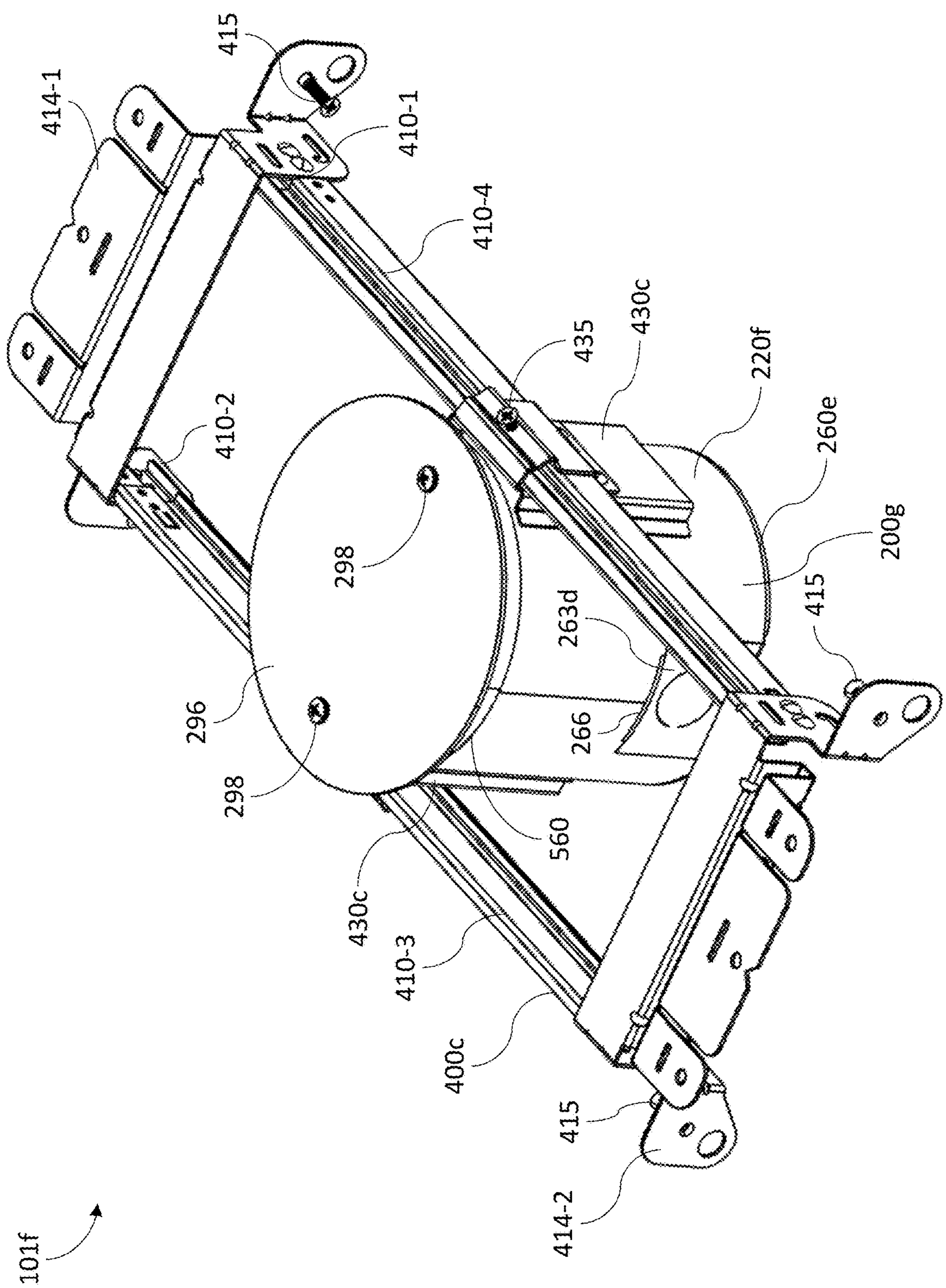
FIG. 28B shows a bottom, rear, right perspective view of the housing assembly of FIG. 28A.
Figure 28C:
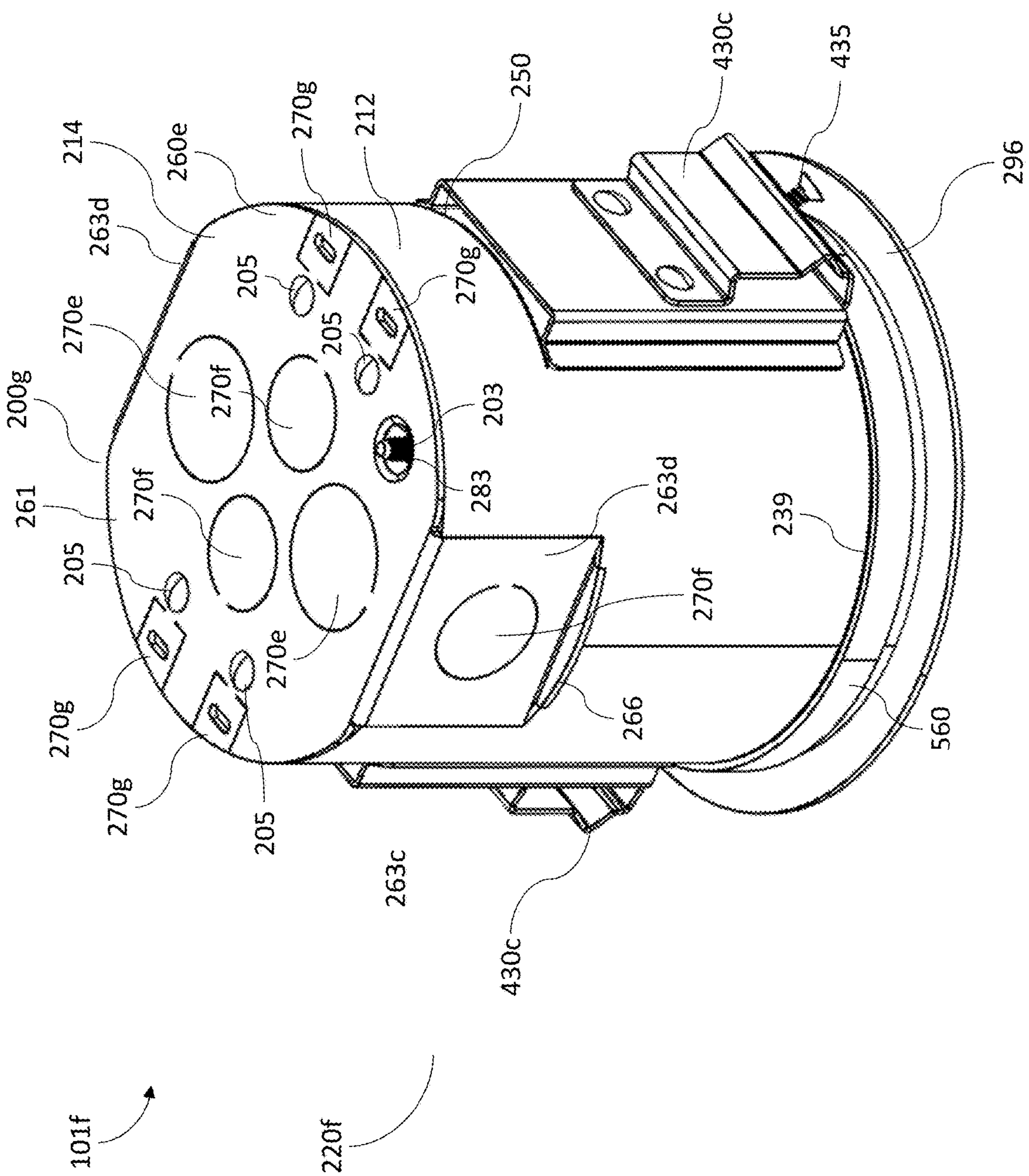
FIG. 28C shows a top, front, right perspective view of the housing assembly of FIG. 28A with the bar hanger assembly removed.
Figure 28D:
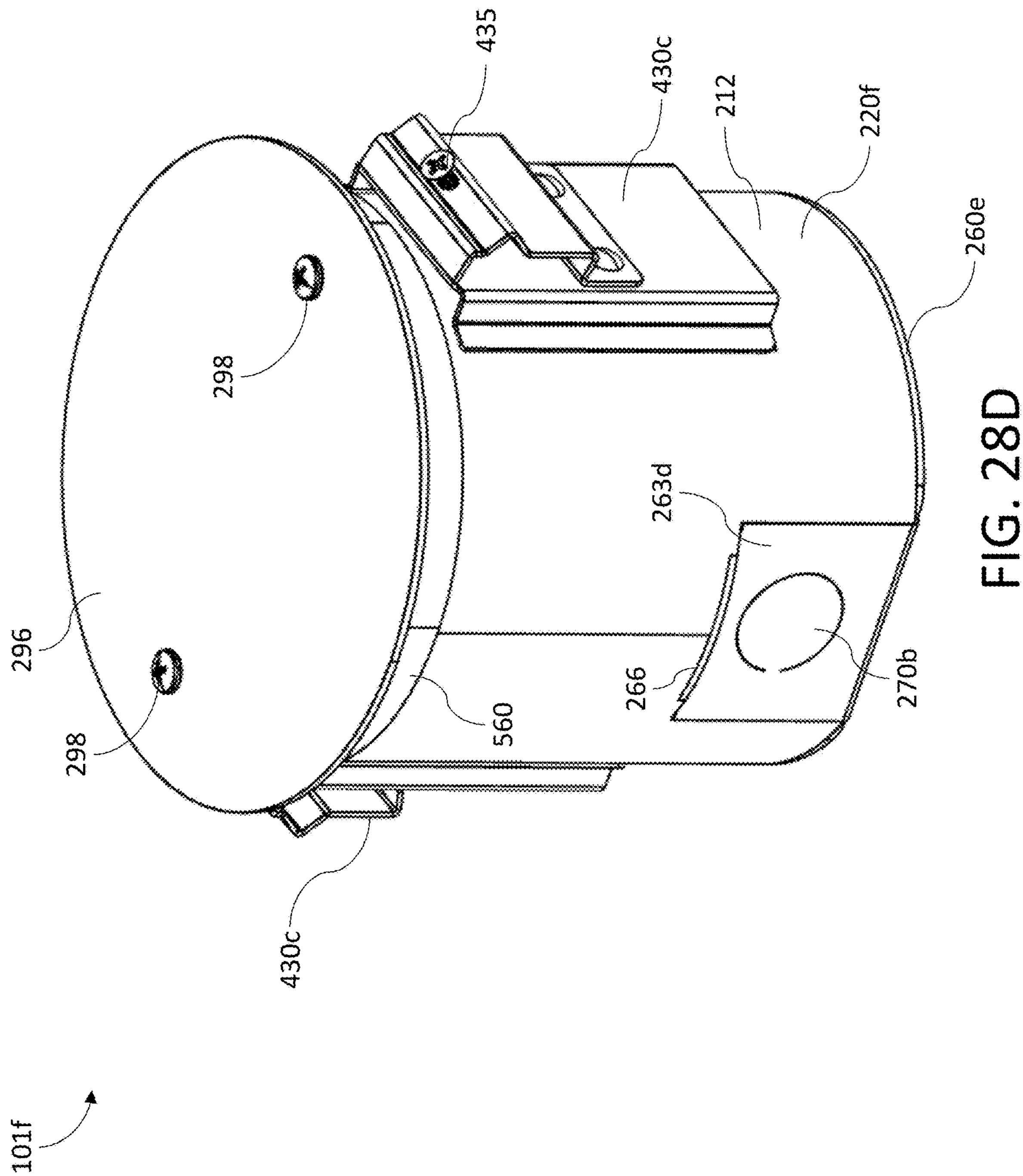
FIG. 28D shows a bottom, rear, right perspective view of the housing assembly of FIG. 28C.
Figure 28E:
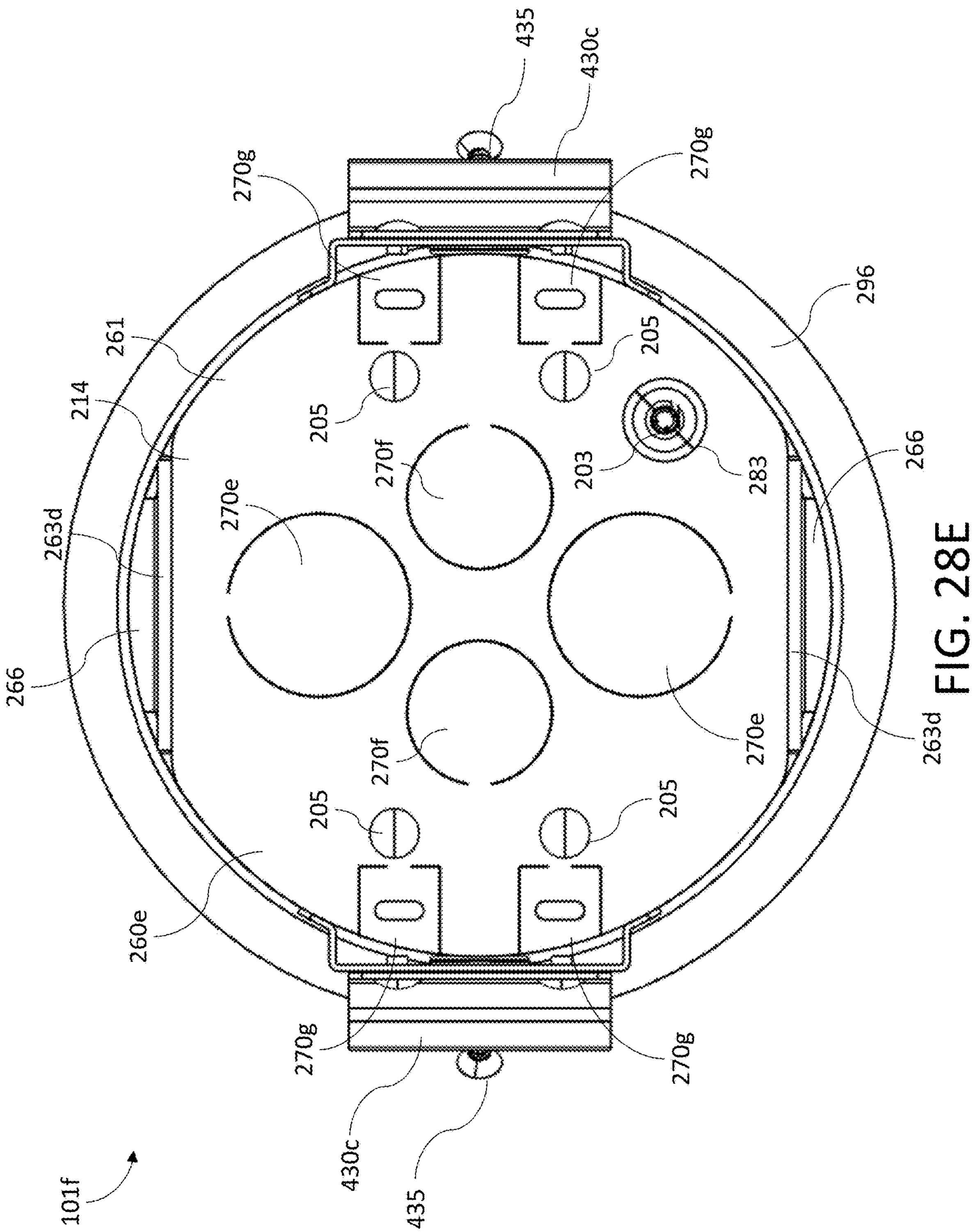
FIG. 28E shows a top view of the housing assembly of FIG. 28C.
Figure 28F:
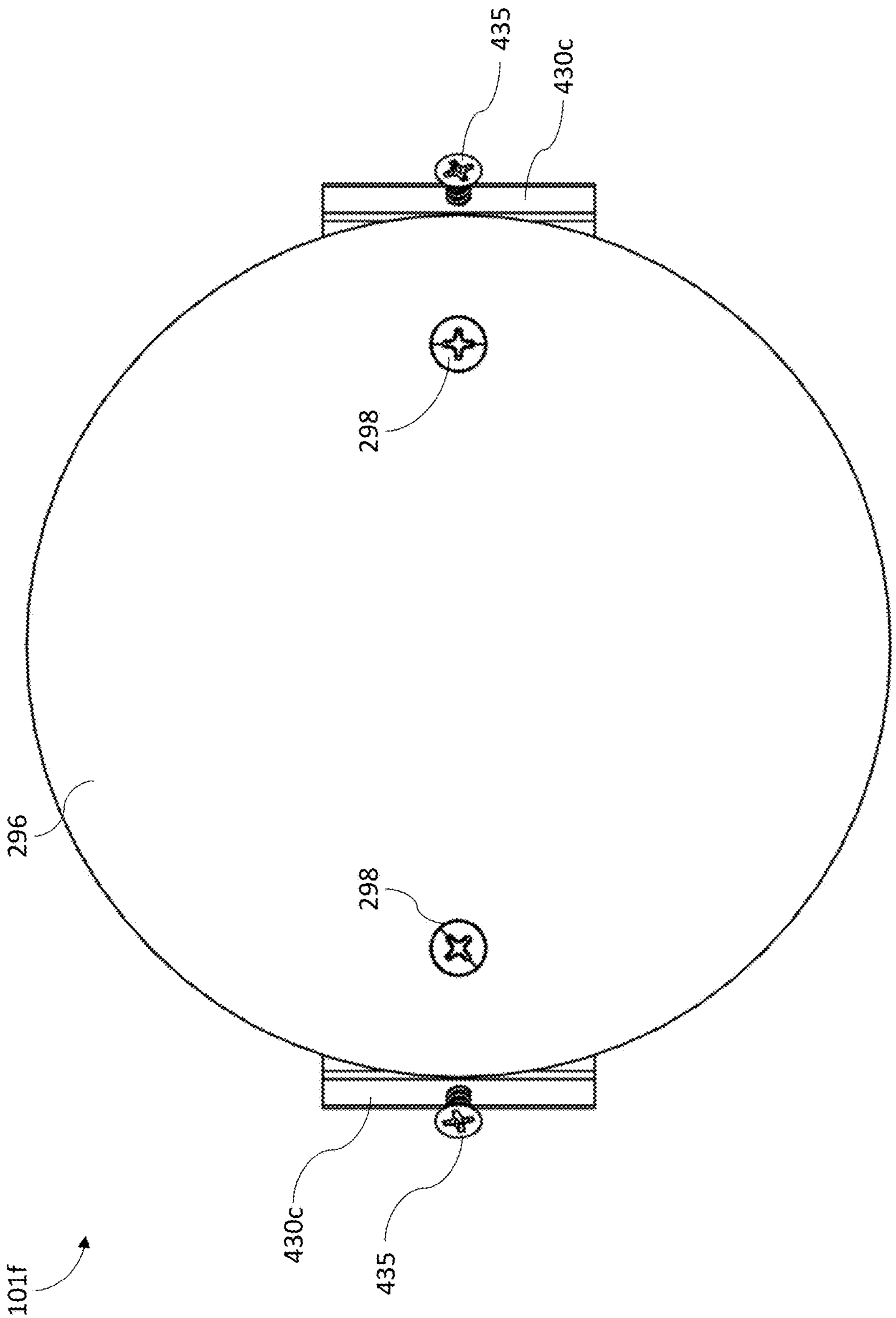
FIG. 28F shows a bottom view of the housing assembly of FIG. 28C.
Figure 28G:
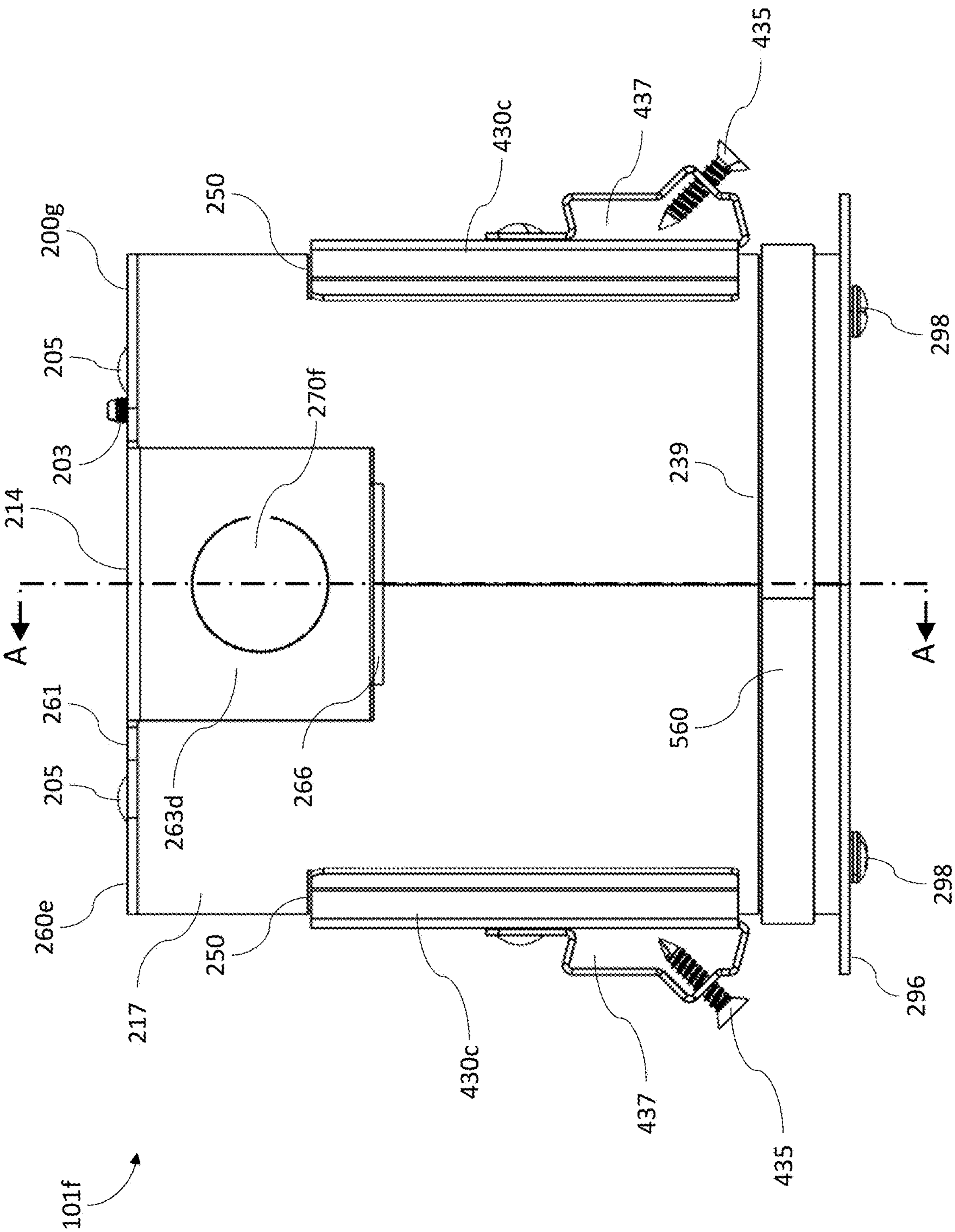
FIG. 28G shows a front view of the housing assembly of FIG. 28C.
Figure 28H:
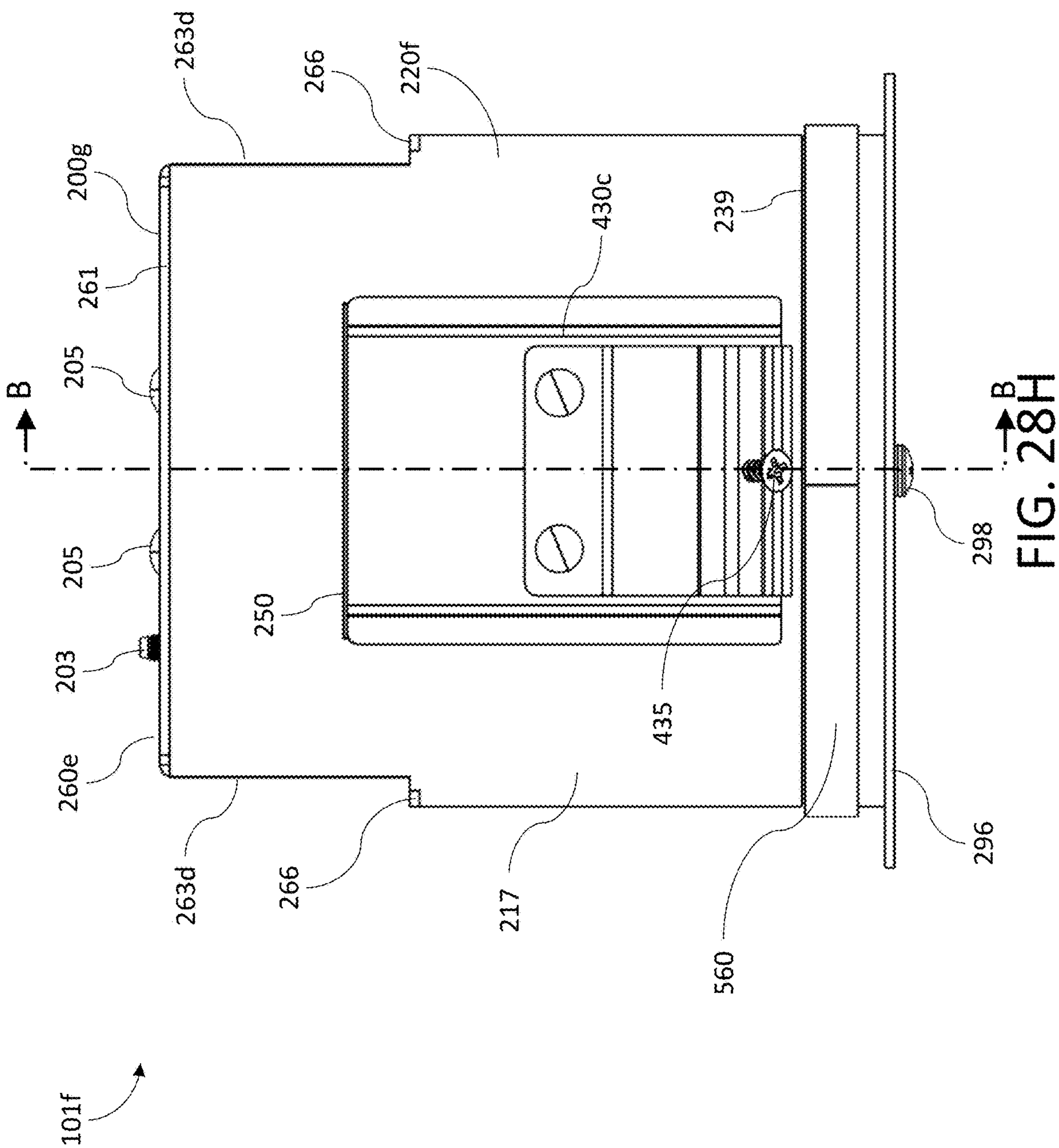
FIG. 28H shows a right-side view of the housing assembly of FIG. 28C.
Figure 28I:
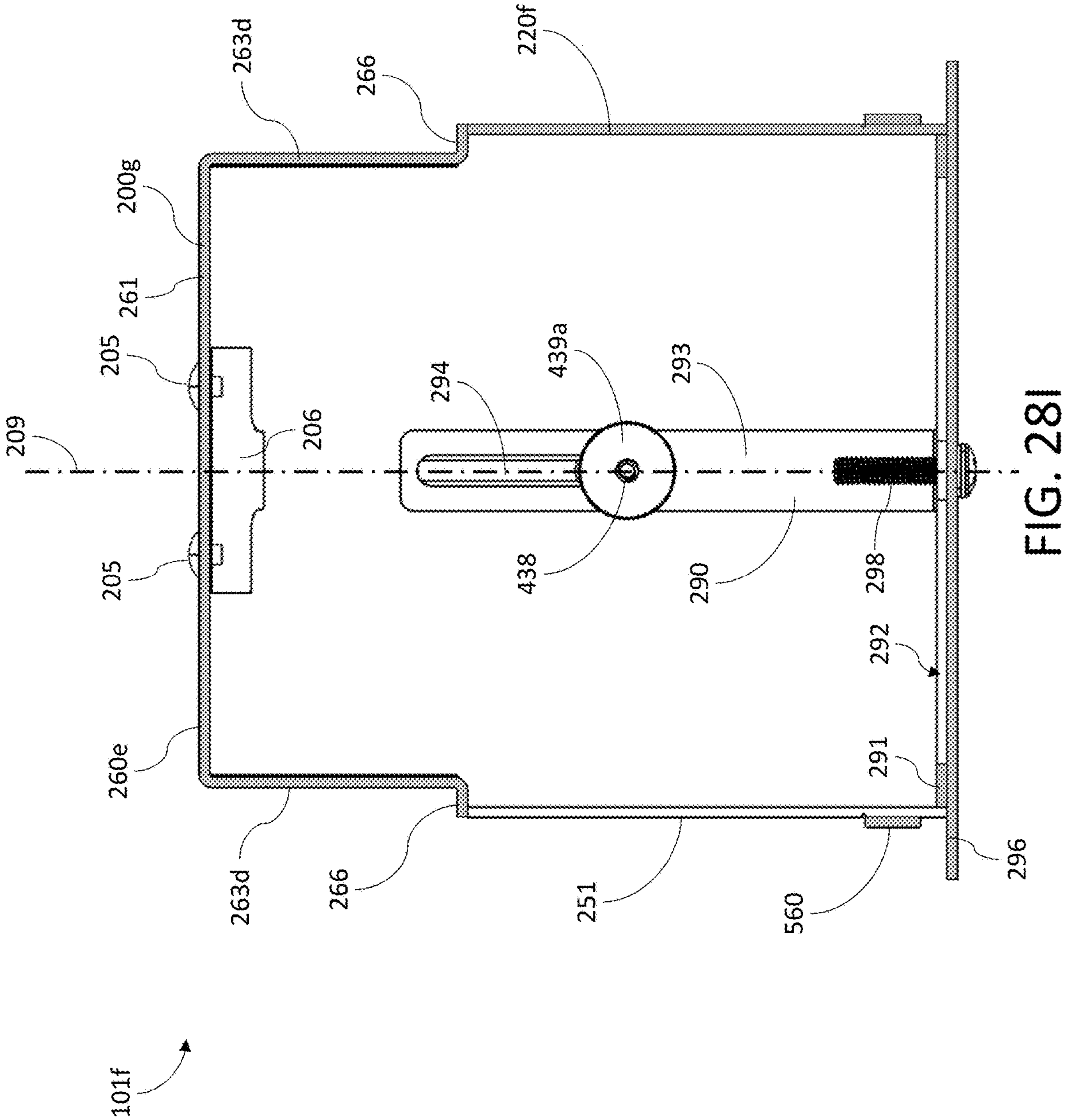
FIG. 28I shows a cross-sectional right-side view of the housing assembly of FIG. 28C corresponding to the plane A-A of FIG. 28G.
Figure 28J:
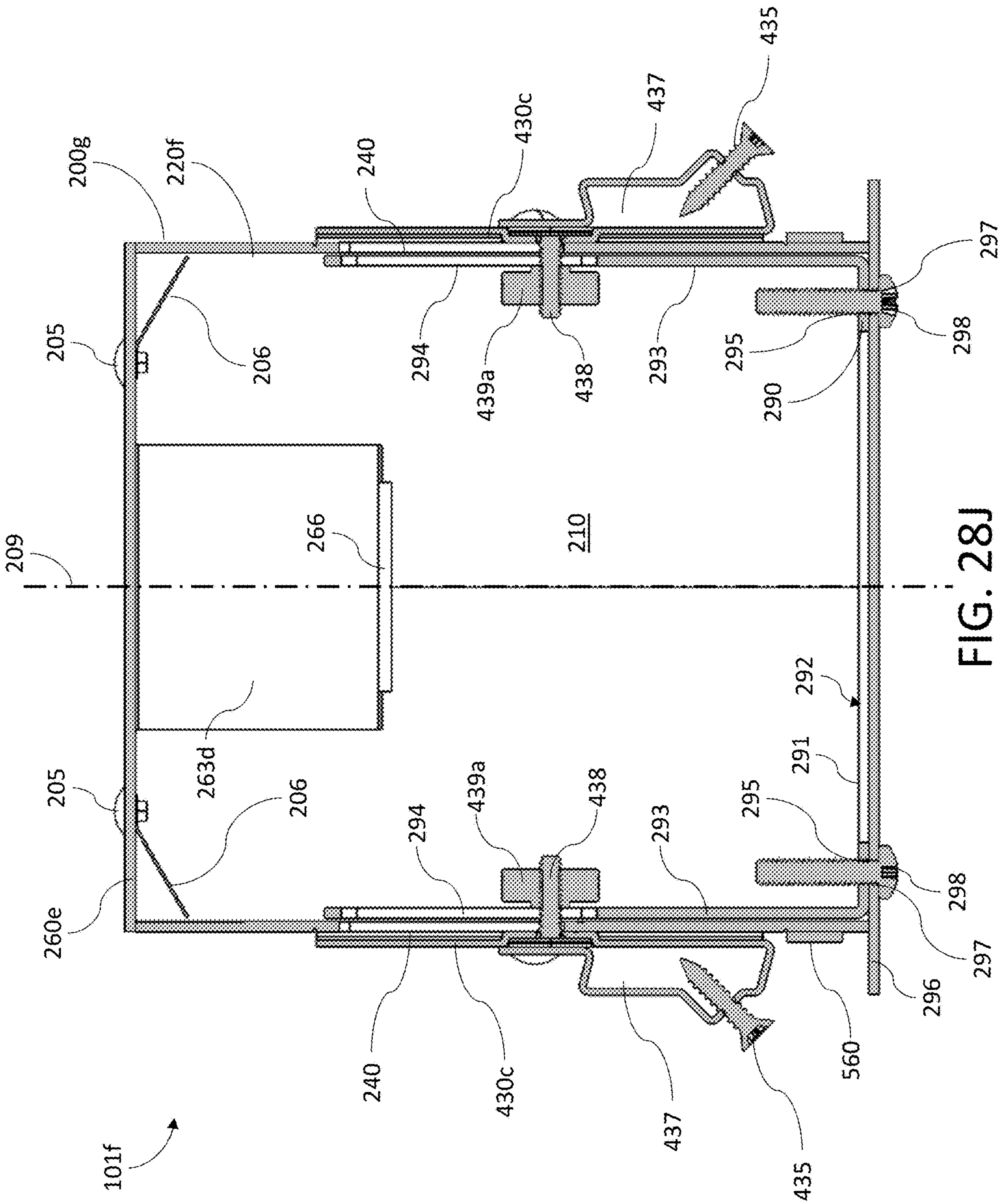
FIG. 28J shows a cross-sectional front view of the housing assembly of FIG. 28C corresponding to the plane B-B of FIG. 28H.
Figure 28K:
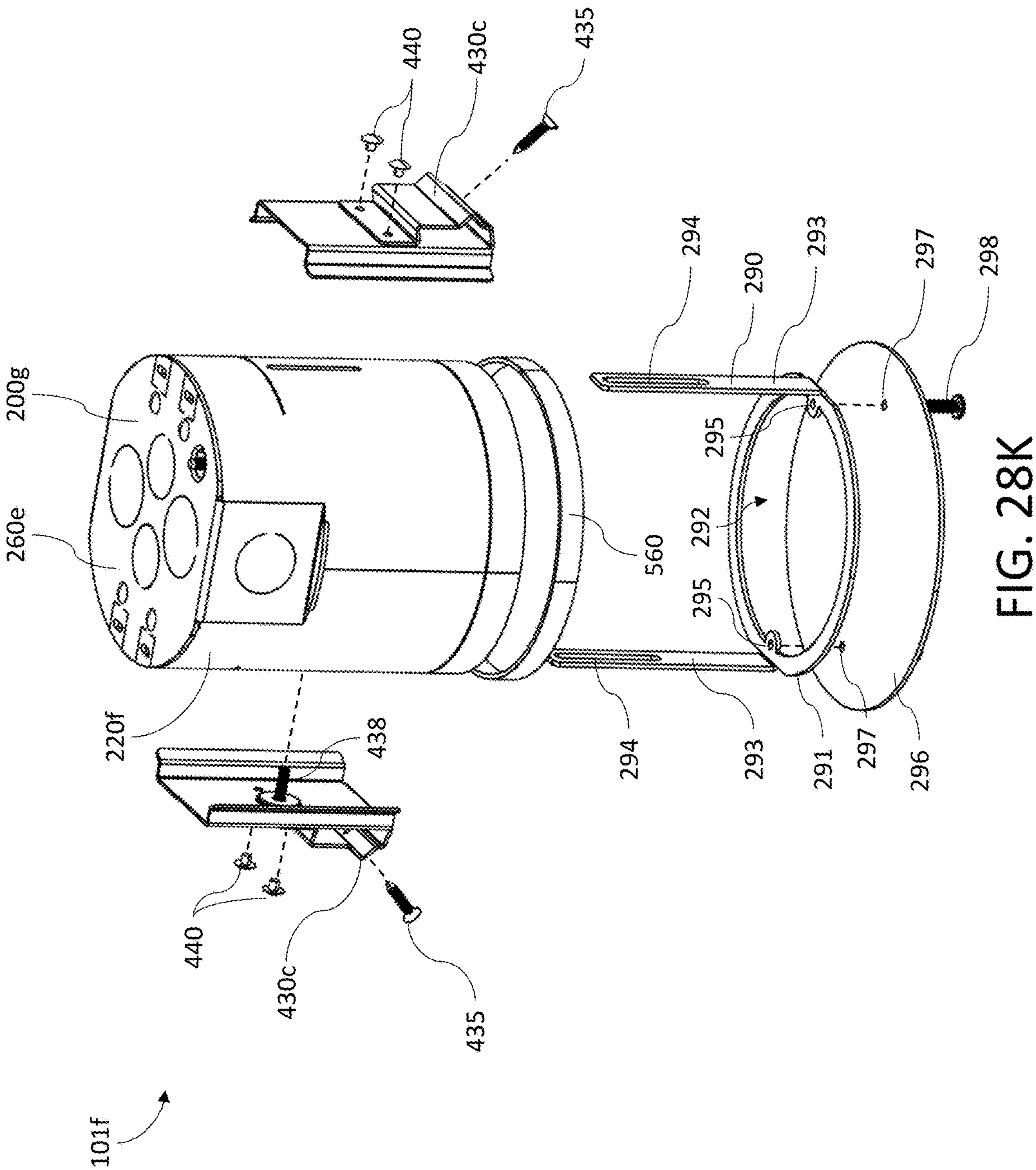
FIG. 28K shows an exploded top, front, right perspective view of the housing assembly of FIG. 28C with bar hanger holders, a cover plate, and a yoke separated from the housing.
Figure 28L:
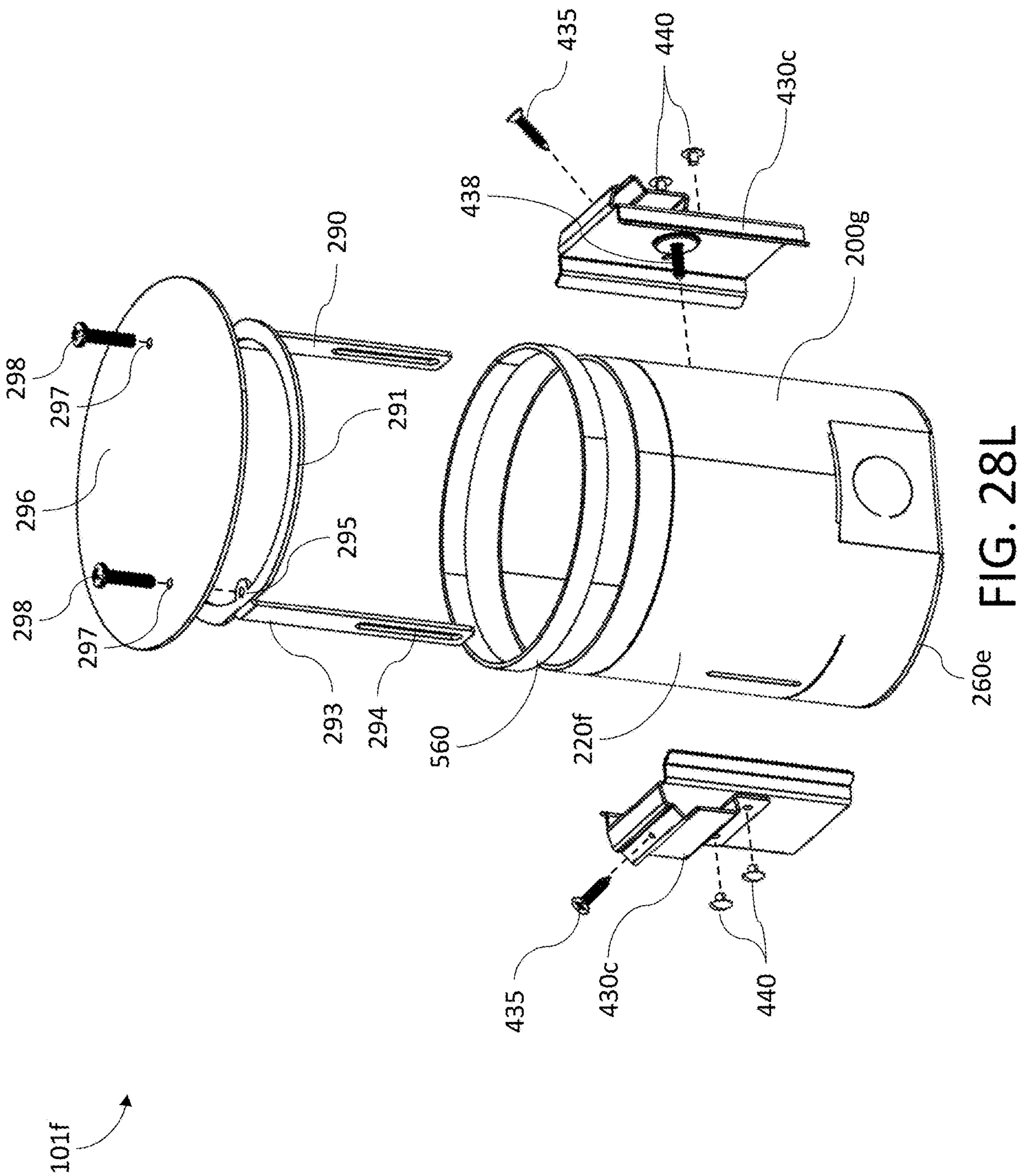
FIG. 28L shows an exploded bottom, rear, left perspective view of the housing assembly of FIG. 28K.
Figure 28M:
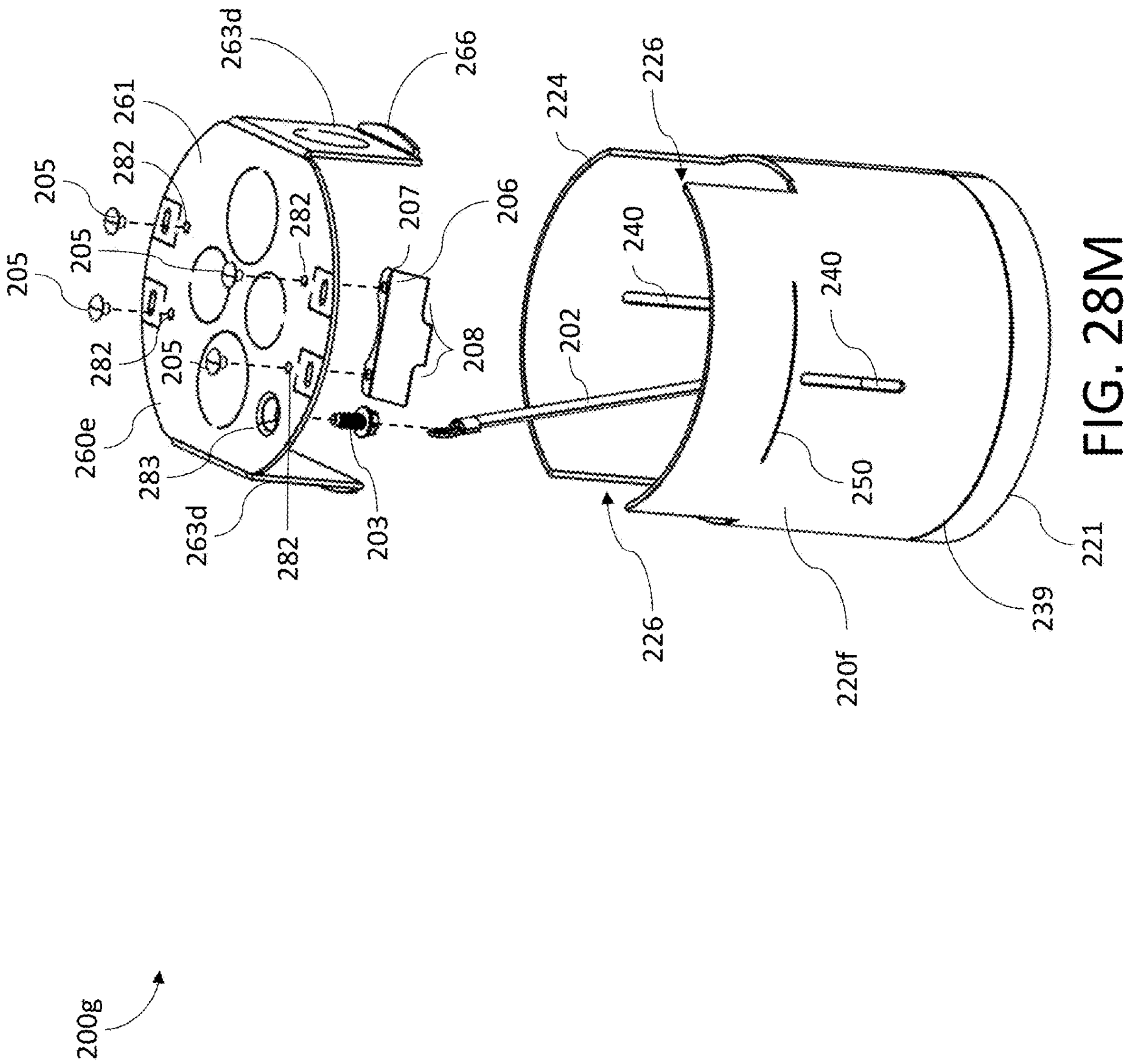
FIG. 28M shows an exploded top perspective view of a housing in the housing assembly of FIG. 28A with a top component separated from the sidewall component. The bar hanger holders, the cover plate, and the yoke are not shown for clarity.
Figure 28N:
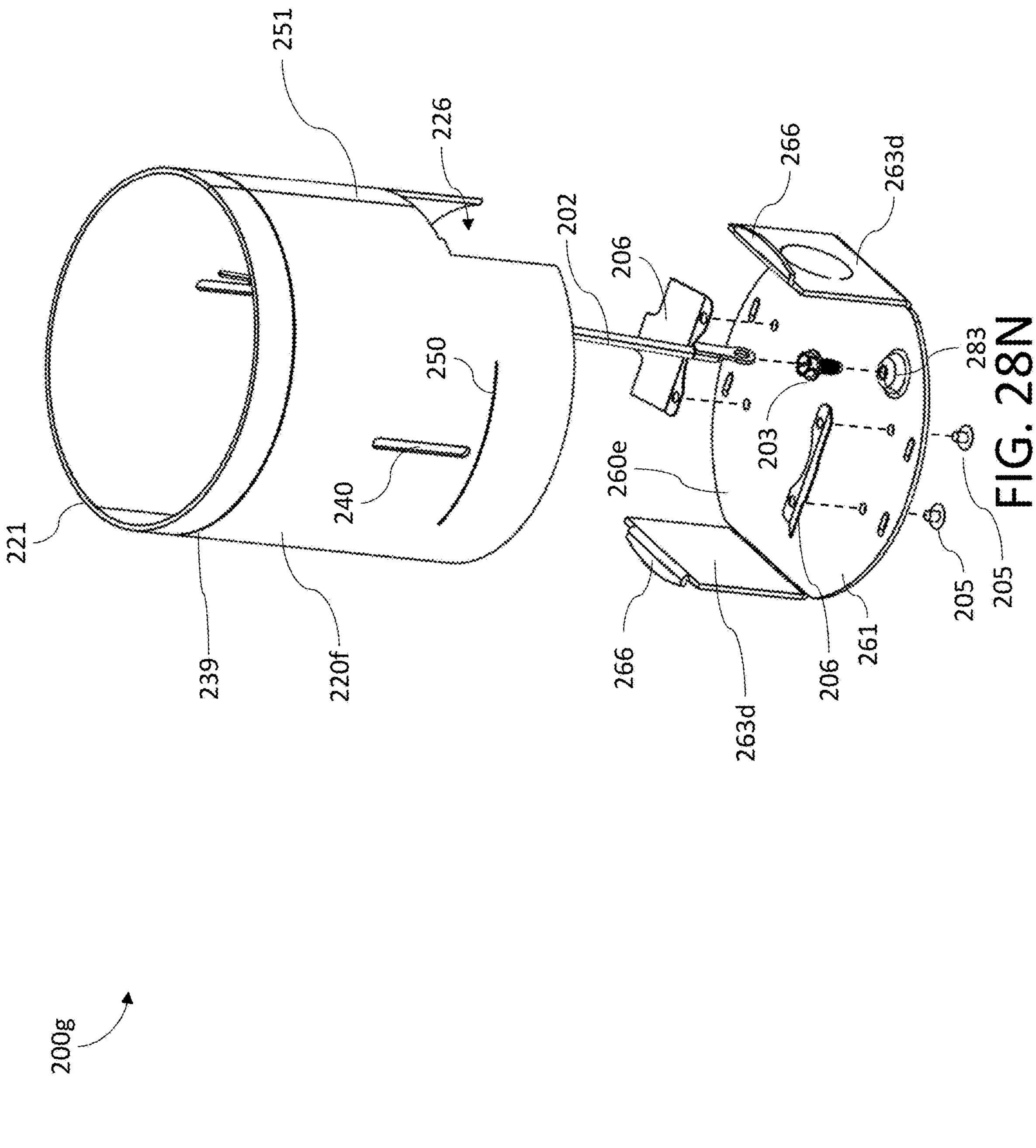
FIG. 28N shows an exploded bottom, front, right perspective view of the housing of FIG. 28M.

The tabs 263 and the notches 226 may be included in the housing 200*d*, in part, to leverage the same manufacturing processes used to manufacture housings and housing assemblies tailored for new construction installations (see, for example, the housing 200*g* in FIGS. 28A-28N). For example, the omission of knockouts on the tabs 263*c* may make the top component 220*c* suitable for remodel installations. For a new construction installation, the top component 220*c* may be modified by adding a knockout on each tab 263*c*. In this manner, the manufacture of a top component suitable for new construction installations may leverage the same processing steps as the top component 260*c* with the addition of one processing step to form the knockouts on the tabs 263*c*. The manufacture of the sidewall component 220*c*, which is suitable for a remodel installation, and a sidewall component suitable for a new construction installation may also utilize the same or similar processing steps with some minor modifications related to the formation of different mounting features for the respective installations.

The base section 261 may include one or more knockouts 270*e* and 270*f*. The knockouts 270*e* and 270*f* may be half-shear knockouts and/or flush knockouts of varying size. For example, the knockouts 270*e*, when removed, may form an opening with a diameter of about 1.1 inches. The knockouts 270*f*, when removed, may form an opening with a diameter of about 0.85 inches. More generally, the knockouts 270*e* and 270*f*, when removed, may provide an opening with a diameter that ranges between about 0.5 inches to about 1.25 inches. The base section 261 may also include multiple Romex knockouts 270*g* with slots 272*c* formed along the periphery and adjoining portions of the outer edge 262. The Romex knockouts 270*g* may be arranged in pairs disposed on opposing sides of the bases section 261. Similar to the Romex knockouts 270*d*, a tool, such as a flathead screwdriver, may be inserted into the slot 272*c* to facilitate removal of the Romex knockout 270*g*. The opening formed by the removal of the Romex knockout 270*g* may have a width or depth that ranges between about 0.25 inches to about 0.75 inches.

The base section 261 may also include a ground connection feature 283 with an opening to receive a fastener 203 to couple a ground cable 202 to the base section 261. As shown in FIG. 20B, the ground connection feature 283 may be formed as a recessed structure that extends into the cavity 210 to accommodate at least a portion of the fastener 203 so that the fastener 203 does not protrude appreciably above the base end 214 of the housing 200*d*. Generally, at least a portion of the ground connection feature 283 around the opening (e.g., the threads) may have exposed metal to electrically ground the ground cable 202 to the housing 200*d*.

In some implementations, the housing 200*d* may further include a retainer 206 coupled to the base section 261 and disposed within the cavity 210 for each pair of Romex knockouts 270*g*. The retainer 206 may be used to clamp electrical wires and/or cables against the sidewall 212 of the housing 200*d* when inserted through openings formed by the removal of the Romex knockouts 270*g*. For example, the retainer 206 may be deflected when wires and/or cables are inserted into the housing 200*d*, which results in the retainer 206 generating an internal restoring force that pushes the wires and/or cables against the sidewall component 220*c*. In some implementations, the retainer 206 may also function as a strain relief features by limiting or, in some instances, preventing the electrical wire or cable from moving in or out of the cavity 210 once inserted. The retainer 206 may generally be formed of the same material as the housing 200*d*, such as sheet metal.

Figure 18J:
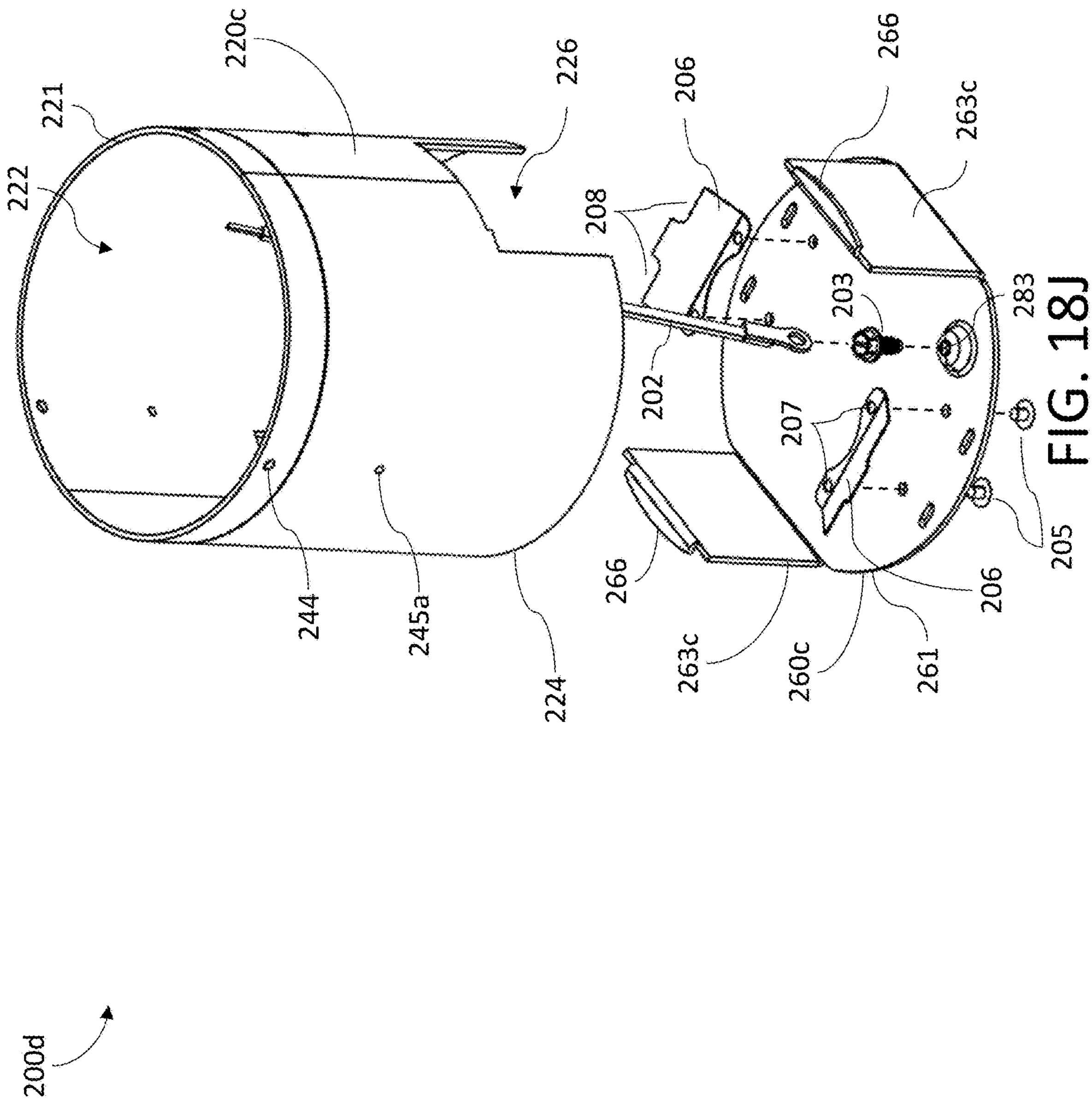
FIG. 18J shows an exploded bottom, rear, left perspective view of the housing of FIG. 18I.

As shown in FIGS. 181 and 18J, each retainer 206 may include fastener openings 207 that align with fastener openings 282 on the base section 261 of the top component 260*c*. Fasteners 205 may be inserted through the openings 282 and 207 to couple the retainer 207 to the top component 260*c*. The retainer 206 may further include notches 208 to provide a narrow opening for electrical wires or cables to pass between the retainer 206 and the sidewall component 220*c*. In some implementations, the retainer 206 may be oriented at an angle relative to the interior surface of the sidewall component 220*c* so that the wires and/or cables may be readily fed into the cavity 210 of the housing 200*d* while reducing or, in some instances, preventing the wires from slipping out of the housing 200*d*. For example, FIG. 18G shows the retainer 206 may be angled downwards towards the bottom end 221 of the housing 200*d*. When the wires and/or cables are inserted into the cavity 210, any subsequent attempt to pull the wires and/or cables out from the housing 200*d* may cause the wires and/or cables to get caught on the retainer 206.

As noted above, the spring clip assembly 500*a* may provide a mounting mechanism to facilitate installation of the housing assembly 101*c* onto a drywall panel. FIGS. 18E-18H show the mounting ring 510*a* may be directly coupled to the housing 220*c*. Specifically, the collar 512 of the mounting ring 510*a* may define an opening 502 that is shaped and/or dimensioned to allow the sidewall component 220*c* to pass through the opening 502 so that the collar 512 may surround and abut an exterior portion of the sidewall component 220*c* located near the bottom end 221. As described above, the collar 512 may include multiple openings 516 to receive a fastener 520 to couple the mounting ring 510*a* to the housing 200*d* and the spring clips 530*a* to the mounting ring 510*a*. The mounting ring 510*a* may further include a flange 514 joined to the collar 512. The flange 514 may extend radially from the housing 200*d* along a horizontal plane and may include a top surface 517 that abuts a bottom surface of the ceiling and a bottom surface 515 that is substantially flush or flush with the bottom end 221 of the housing 200*d* (i.e., the bottom surface 515 and the bottom end 221 lie on the same horizontal plane). It should be appreciated that, in some implementations, the bottom surface 515 may extend below the bottom end 221 of the housing 200*d*. The mounting ring 510*a* may generally be formed from metal or plastic.

FIGS. 18G and 18H show the spring clip 530*a* may include a base section 531 that includes the fastener opening 540 and abuts the collar 512 of the mounting ring 510*a*. The spring clip 530*a* may further include a bent section 532*a* (also referred to herein as a "clamping surface 532*a*" or a "contact section 532*a*") that is shaped to physically engage a top surface of the drywall panel when the spring clip 530*a* is actuated by the thumbscrew fastener 550*a*. The spring clip 530*a* may further include an end section 538 joined to the bent section 532*a* and defining the opening 541. In some implementations, the opening 541 may be shaped as a slot for the threaded shank 552 of the thumbscrew fastener 550*a* to move along as the spring clip 530*a* is deflected outwards when actuated. The spring clip 530*a* may be generally formed of the same materials as the housing 200*d*. For example, the spring clip 530*a* may be formed of galvanized steel in the form of sheet metal.

The following describes an exemplary remodel installation of the housing assembly 101*c* for a ceiling. It should be appreciated that the same or similar steps may be used to install the housing assembly 101*c* in a wall or a floor.

Figure 21A:
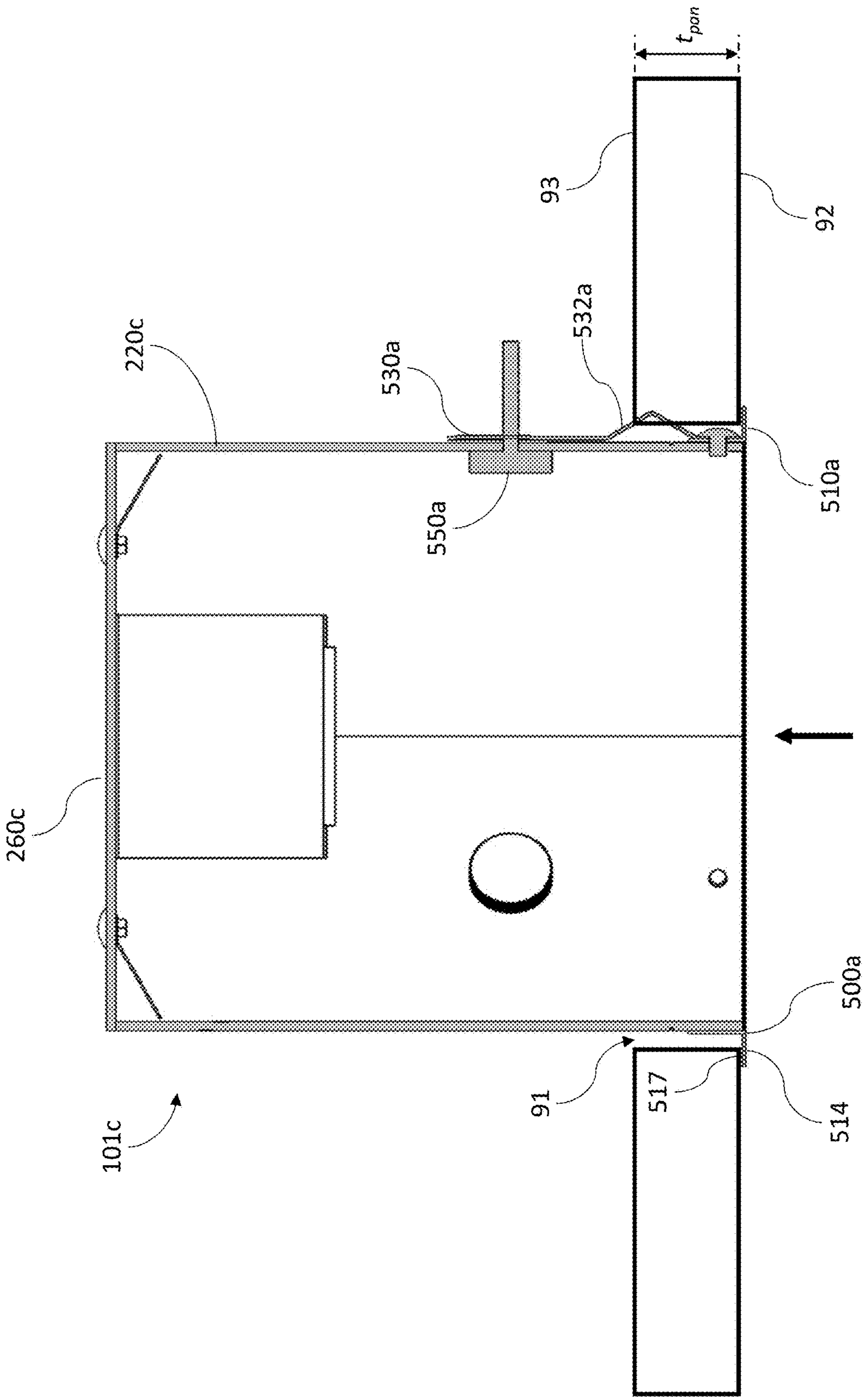
FIG. 21A shows a cross-sectional front view of the housing assembly of FIG. 18A corresponding to the plane A-A of FIG. 18C where the housing assembly is inserted into an opening of a ceiling.
Figure 21B:
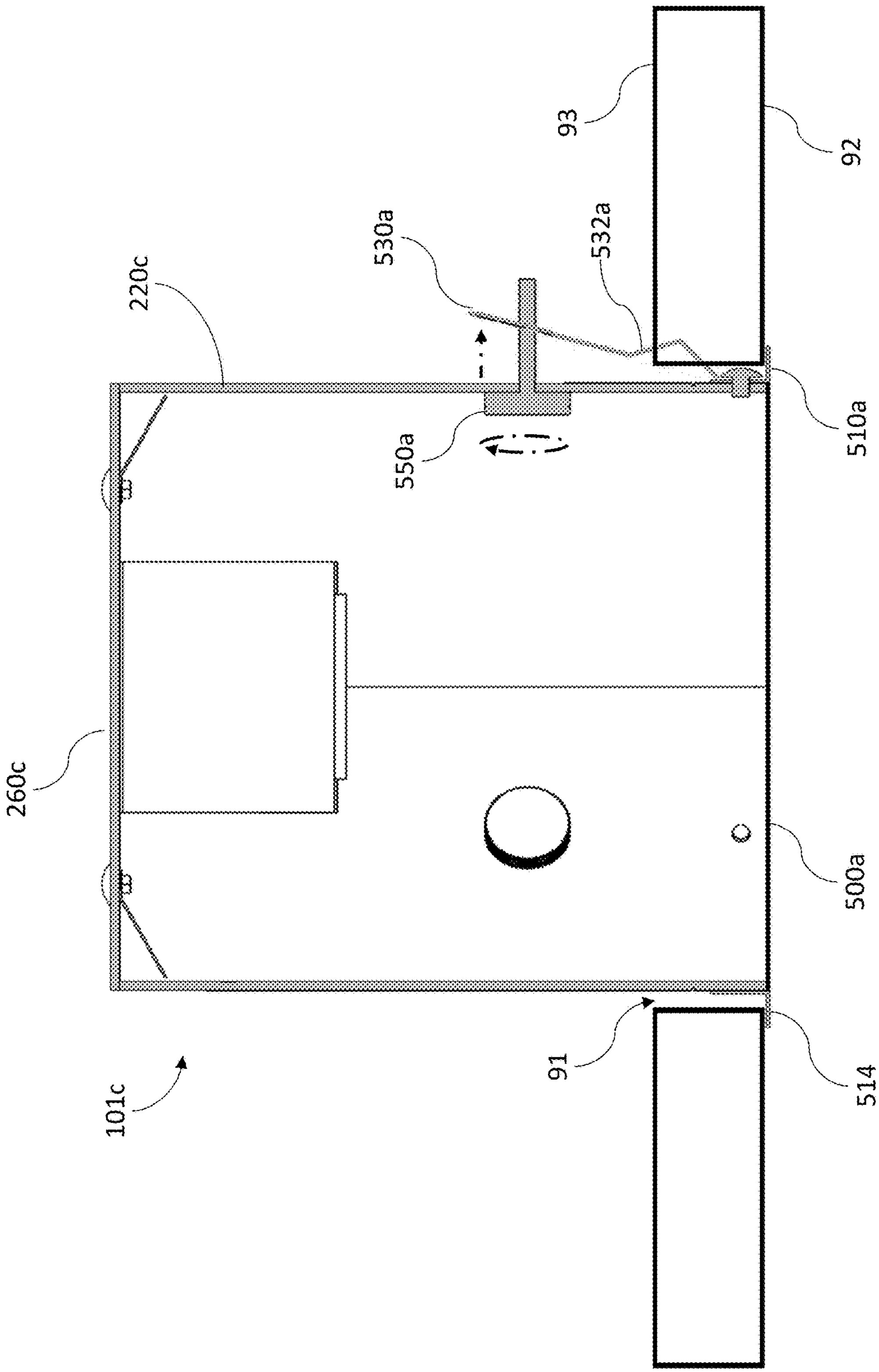
FIG. 21B shows the cross-sectional front view of FIG. 21A where a spring clip is actuated by a fastener to securely couple the housing assembly to the ceiling.

In a typical remodel installation, one or more of the knockouts 270*e*-270*g* may be removed to route electrical wires and/or cables (e.g., the cable 96 from an external power supply system) into the cavity 210 of the housing 200*d*. Once the external electrical wire connections are inserted into the housing 200*d*, FIG. 21A shows the housing 200*d* may then be inserted through an opening 91 formed on a ceiling drywall panel 90 until the top surface 517 of the flange 514 abuts an bottom surface 92 of the drywall panel 90. Once the housing 200*d* is disposed within the ceiling space, the installer may then actuate each spring clip 530*a* may reaching into the cavity 210 and rotating the head 551 of each thumbscrew fastener 550*a*. As the thumbscrew fastener 550*a* is rotated, the threaded shank 552 may cause the end section 538 and the bent section 532*a* to deflect outwards and physically contact and engage a top surface 93 of the drywall panel 90 as shown in FIG. 21B. The opening 541 may be shaped to retain the threaded shank 552 of the thumbscrew fastener 550*a* so that the spring clip 530*a* remains engaged to the drywall panel 90. In this manner, the spring clips 530*a* and the flange 514 of the mounting ring 510*a* may clamp onto opposing sides of the drywall panel 90, thus securing the housing assembly 101*c* to the drywall 90.

As noted above, the housing assembly 101*c* may include three spring clips 530*a* disposed uniformly around the housing 200*d*. Each spring clip 530*a* may be actuated and engaged to the drywall panel 90 to provide multiple points of attachment between the housing assembly 101*c* and the drywall panel 90 to improve mechanical stability. To uninstall and remove the housing assembly 101*c*, each of the thumbscrew fasteners 550*a* may be rotated to return the spring clips 530*a* to their original, undeflected orientations.

The bent section 532*a* of the spring clip 530*a* may be shaped and/or positioned to provide a large contact area to engage the drywall panel 90 and, hence, provide a more secure mechanical connection with the drywall panel 90. The bent section 532*a* may have various shapes including, but not limited to, a V-shaped bend, a round-shaped bend, an arc where the spring clip 530*a* bends outwards to clasp the drywall panel 90. The bent section 532*a* may also be shaped to reduce the degree with which the spring clip 530*a* is displaced to securely couple the housing assembly 101*c* to the drywall panel 90. In some implementations, the bent section 532*a* may extend outwards from the sidewall 212 of the housing 200*d* by a distance less than the width of the flange 514 of the mounting ring 510*a* when the spring clip 530*a* is not actuated. This may ensure the opening 91 in the drywall panel 90 remains sufficiently small so that the top surface 517 of the flange 514 may abut the bottom surface 92 of the drywall panel 90.

In some implementations, the bent section 532*a* may also be shaped to accommodate drywall panels with different thicknesses ($t_{pan}$). For example, the spring clip 530*a* may be deflected outwards less to engage a thicker drywall panel or deflected outwards more to engage a thinner drywall panel. Generally, the spring clips 530*a* may be tailored to accommodate drywall panels with a thickness $t_{pan}$ ranging between about ⅜ inches and about 1-¼ inches. In some implementations, the spring clip 530*a* or, more generally, the spring clip assembly 500*a* may also be compatible with wood panels or stacks of drywall panels provided the overall thickness remains within the desired operating range.

Figure 22A:
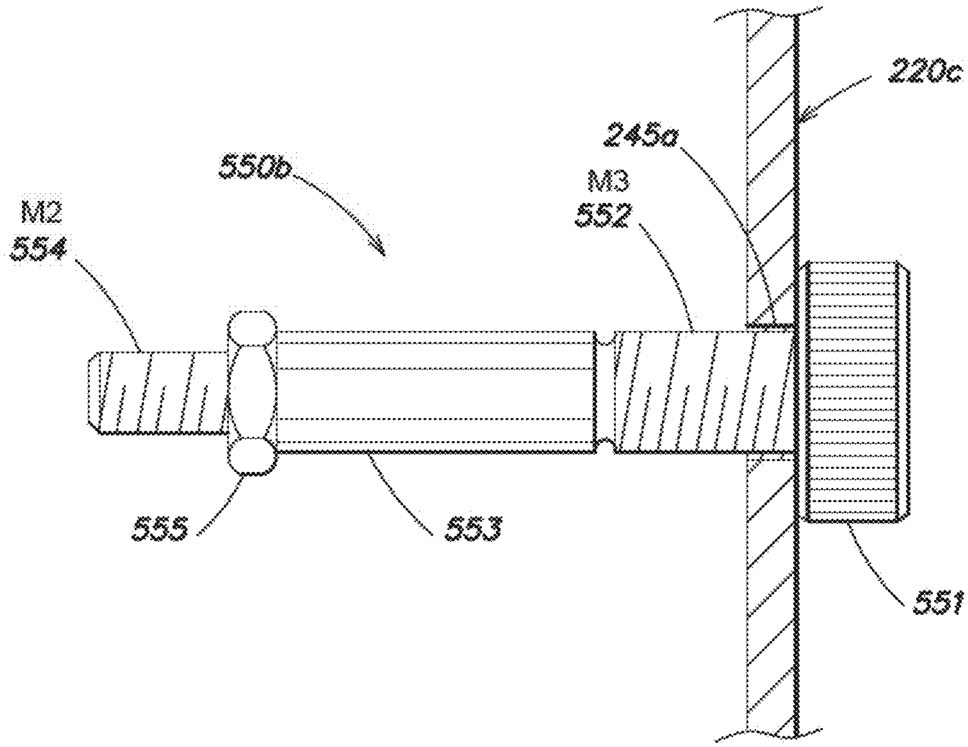
FIG. 22A shows a cross-sectional front view of an exemplary captive fastener to actuate the spring clip in the housing assembly of FIG. 18A with a partially threaded shank and a nut.

In some implementations, the thumbscrew fastener 550*a* used to actuate the spring clip 530*a* may be a captive fastener. In other words, the fastener may not be removed from the housing 200*d* to prevent accidental loss or removal of the fastener from the housing 200*d* during installation. For example, FIG. 22A shows an exemplary captive fastener 550*b*. As shown, the shank of the fastener 550*b* may include an unthreaded portion 553 and a threaded portion 552 to engage the opening 245*a* of the sidewall component 220*c* and/or the opening 541 on the spring clip 530*a*, which is removed in FIG. 22A for clarity.

The unthreaded portion 533 may allow the installer to initially push the fastener 550*b* through the opening 245*a* to initially displace the spring clip 530*a* more quickly during installation. Once the bent section 532*a* of the spring clip 530*a* is nearly engaged to the drywall panel 90, the threaded portion 552 may then engage the opening 245*a* to maintain the fastener 550*b* in the tightened position on the housing 200*d* and, hence, maintain the displacement of the spring clip 530*a*. The threaded portion 552 may remain engaged with the opening 541 on the spring clip 530*a* as the spring clip 530*a* is deflected outwards.

Figure 22B:
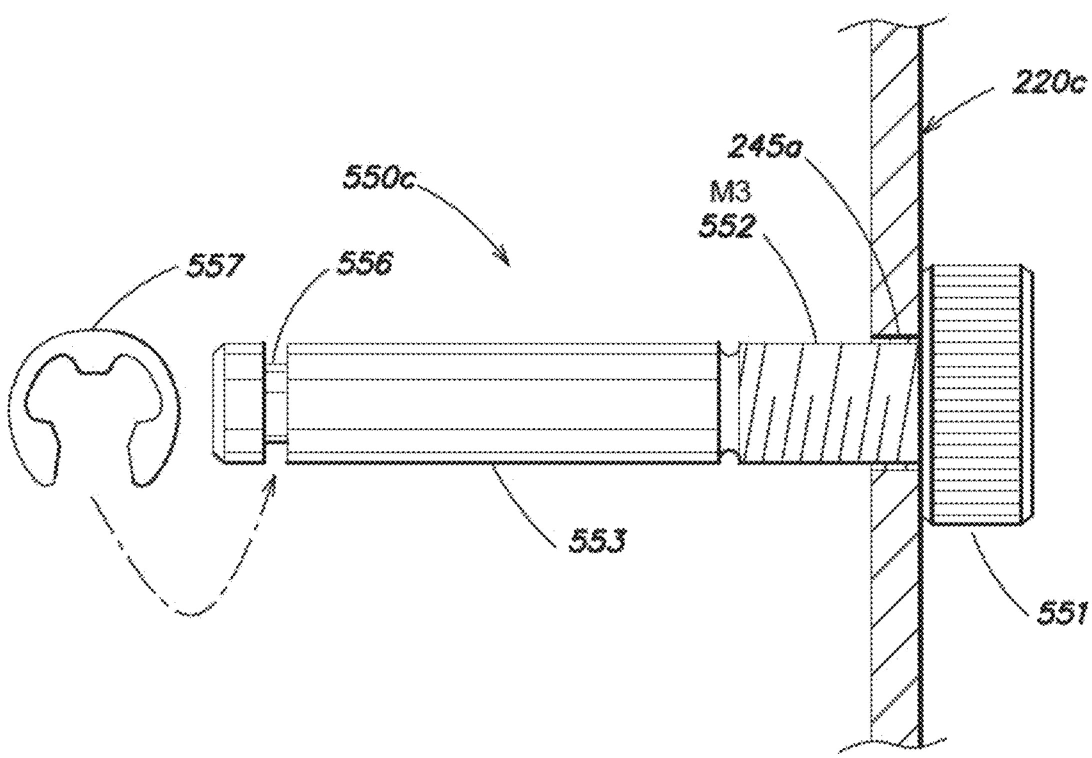
FIG. 22B shows a cross-sectional front view of another exemplary captive fastener to actuate the spring clip in the housing assembly of FIG. 18A with a partially threaded shank and an e-clip.

Additionally, the fastener 550*b* may include a threaded end section 554 and a nut 555 may be fastened to the end section 554 to prevent removal of the fastener 550*b* from the housing 200*d*. In some implementations, the threaded portion 552 of the shank and the threaded end section 554 may have different threads (e.g., M2 and M3 threads). FIG. 22B shows another exemplary captive fastener 550*c*. The fastener 550*c* may be similar to the fastener 550*b* of FIG. 22A with the difference being the fastener 550*c* may have a notched end section 556 to support an e-clip 557. The e-clip 557 may function in a similar manner as the nut 555 in the fastener 550*b* by preventing removal of the fastener 550*c* from the housing 200*d*.

FIGS. 23A-23H show another exemplary housing assembly 101*d* for a remodel installation that includes a spring clip assembly 500*b* with a push-based actuation mechanism. As shown, the housing assembly 101*d* may include a housing 200*e* assembled using a single sidewall component 220*d* and a top component 260*d*. The spring clip assembly 500*b* may include a mounting ring 510*b* and a pair of spring clips 530*b* that collectively form a clamping mechanism to securely couple the housing assembly 200*e* to a drywall panel in the same manner as the housing assembly 101*c*. In some implementations, the housing assembly 101*d* may further include a gasket 560 supported by the mounting ring 510*b* to seal any gaps formed between the housing 200*d* and the edges of the ceiling defining the opening through which the housing assembly 101*d* is inserted during installation.

Figure 23A:
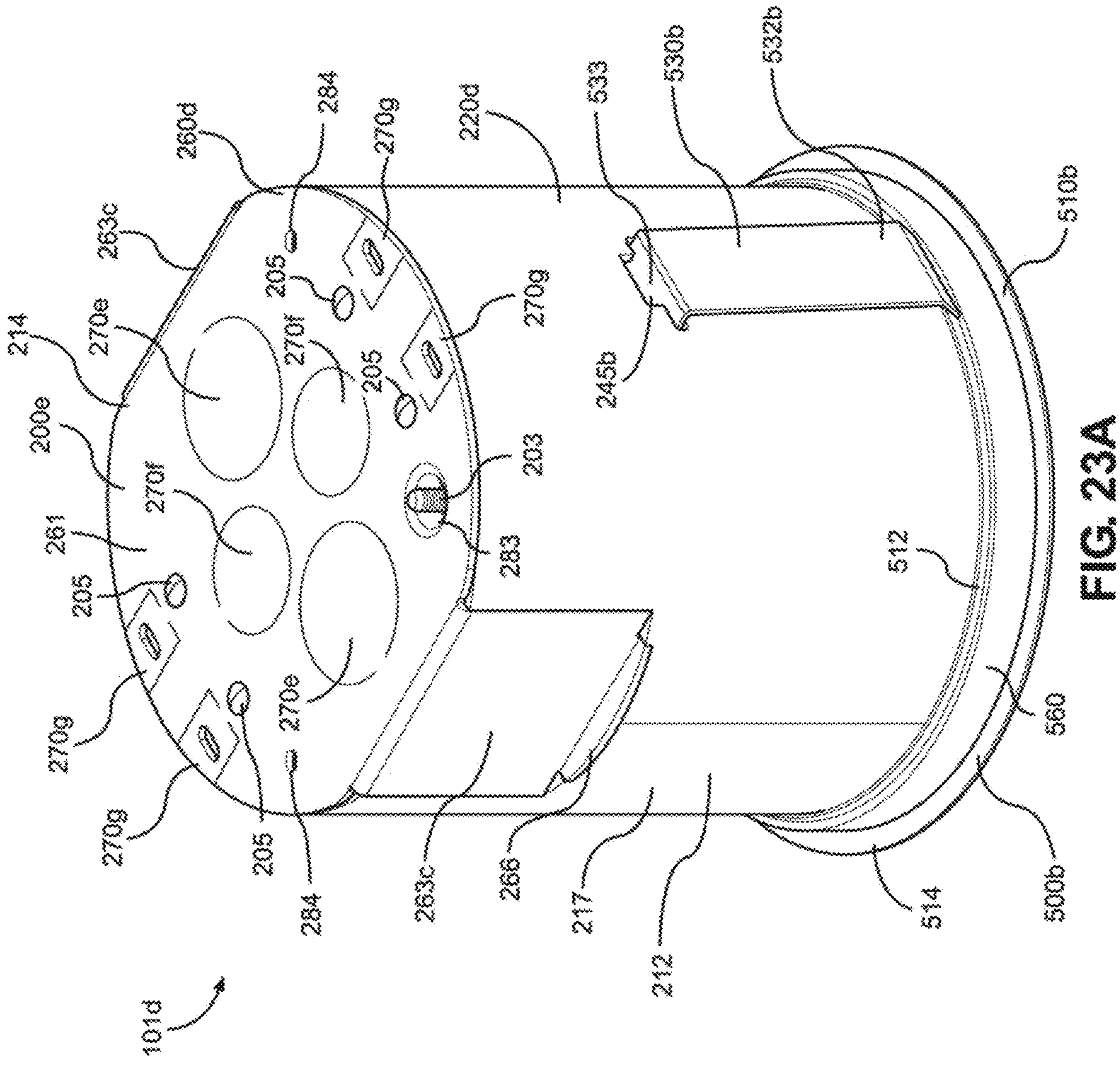
FIG. 23A shows a top, front, right perspective view of another exemplary housing assembly that includes a housing with a single sidewall component and two spring clips with respective push flanges for a remodel installation.
Figure 23B:
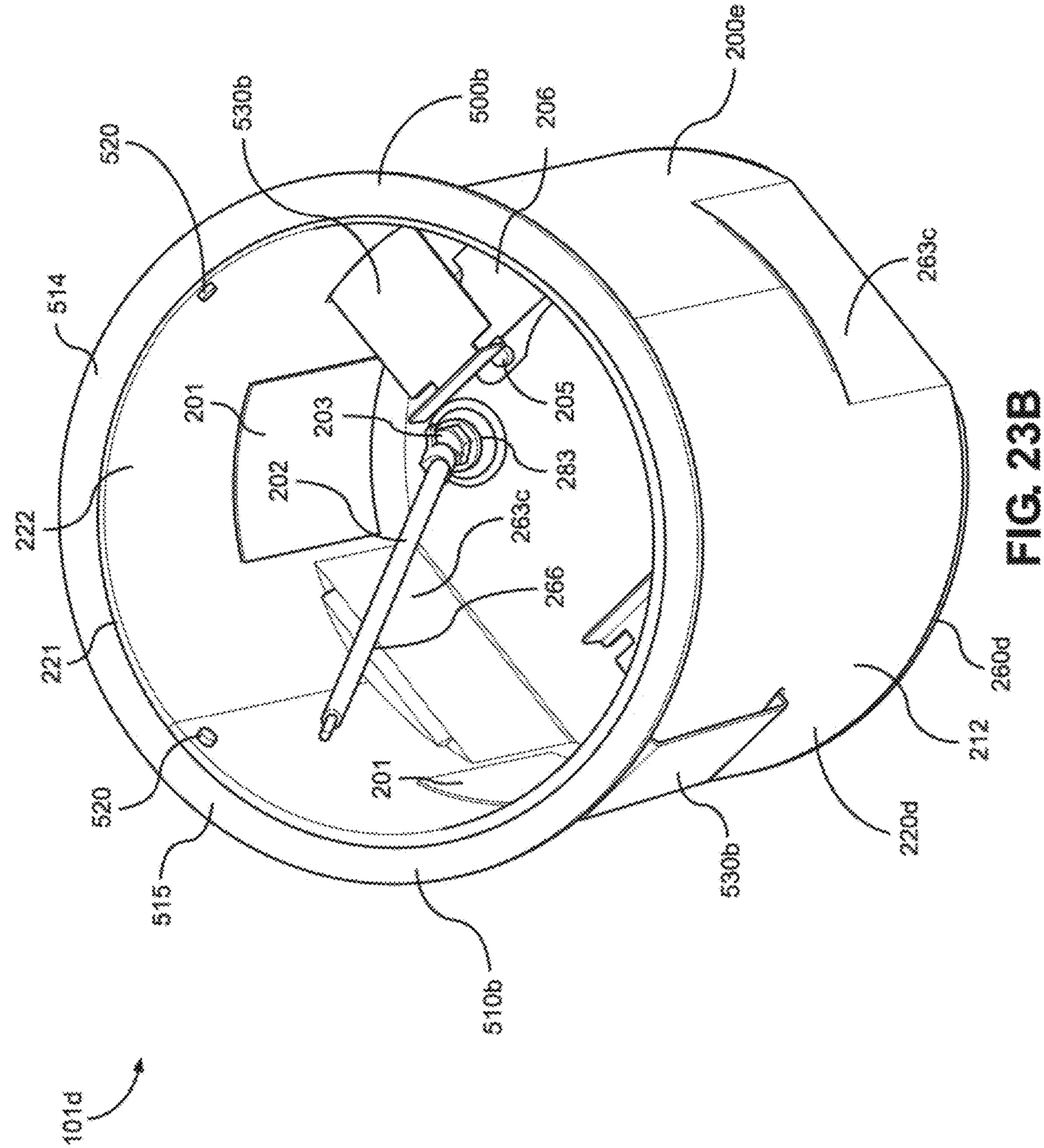
FIG. 23B shows a bottom, rear, left perspective view of the housing assembly of FIG. 23A.
Figure 23C:
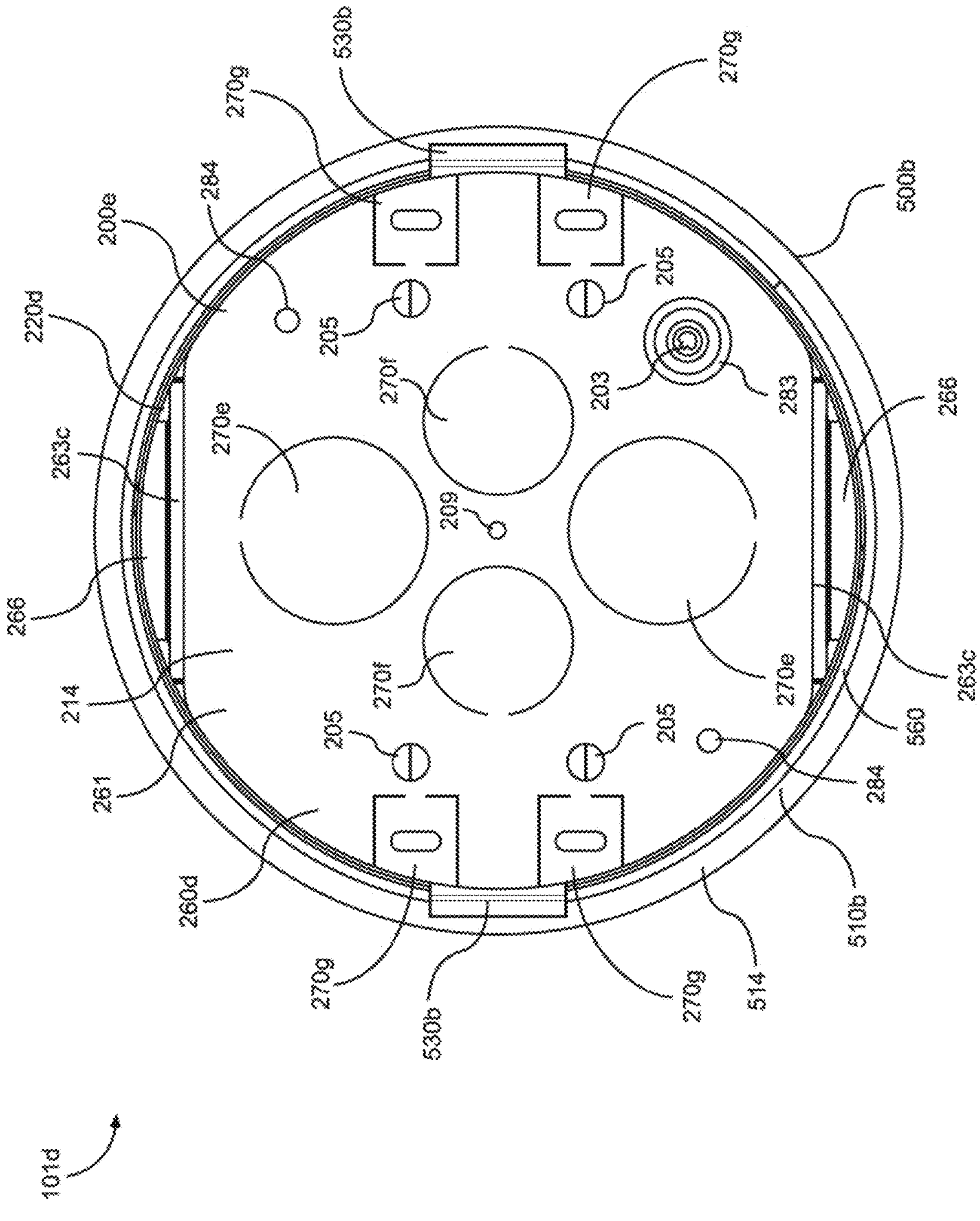
FIG. 23C shows a top view of the housing assembly of FIG. 23A.
Figure 23D:
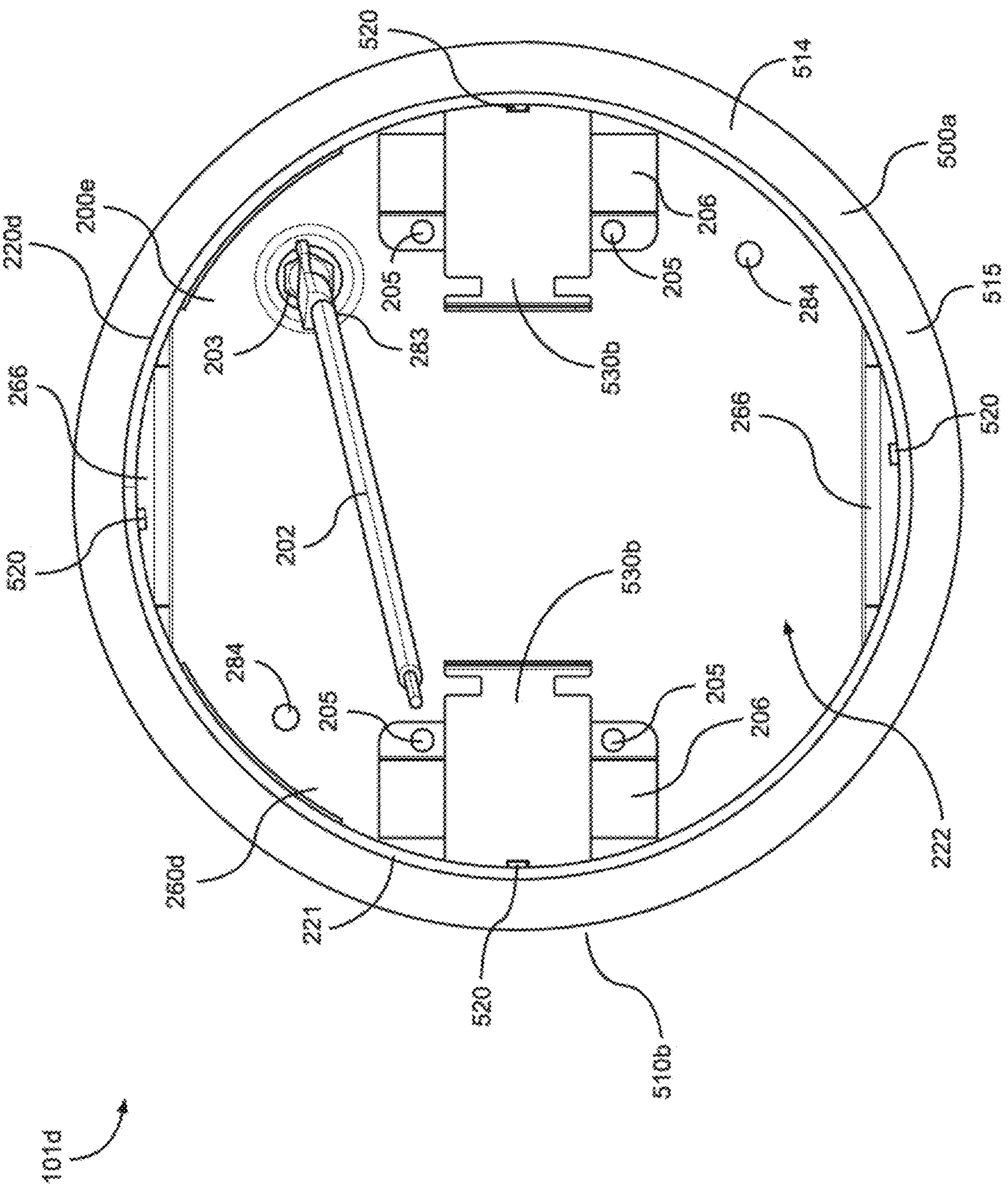
FIG. 23D shows a bottom view of the housing assembly of FIG. 23A.
Figure 23E:
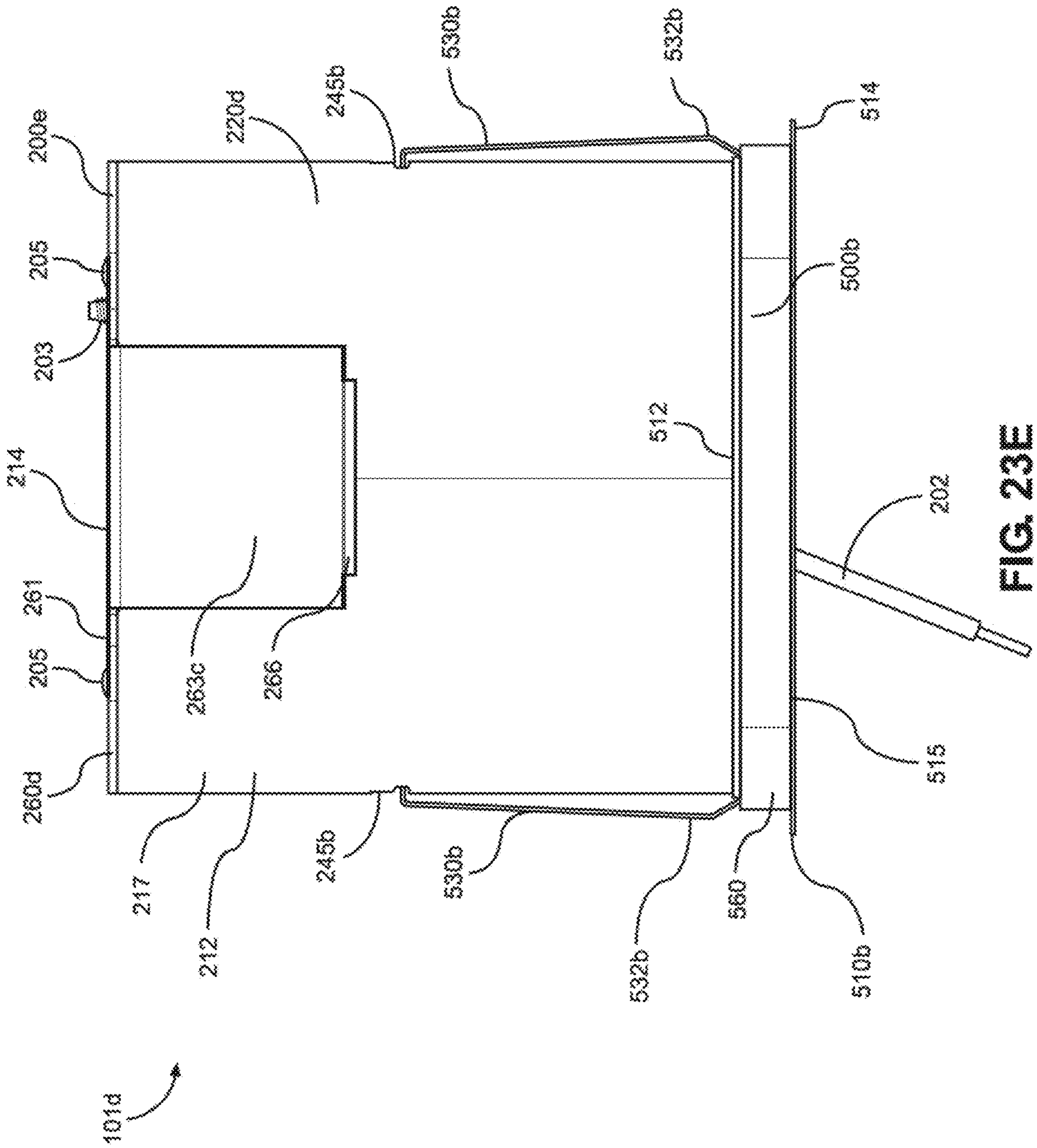
FIG. 23E shows a front view of the housing assembly of FIG. 23A.

The sidewall component 220*d* may include several of the same or similar structural features as the sidewall component 220*c*. For example, the sidewall component 220*d* may have a curved portion 217 formed by rolling a flat piece of sheet metal into the desired round shape and welding a seam 251 formed by the opposing sides of the sheet metal. The curved portion 217 may thus surround and define a cavity 210. The sidewall component 220*d* may further include a bottom end 221 that defines a bottom opening 222 into the cavity 210 and a top end 224 that defines a top opening 225. The sidewall component 220*d* may further include a pair of notches 226 disposed diametrically opposite to one another, which are each defined by respective pairs of side edges 228, a bottom edge 229, and a recessed edge 230. More generally, the notches 226 and the tabs 263*c* may be offset at any angle relative to one another about the centerline axis 209. In some implementations, one or more labels 201 may be disposed along the interior surfaces of the sidewall component 220*d* as shown in FIG. 23B. As described above, the labels 201 may explicitly state the various components that may be mounted to the housing 200*d* to comply with the various UL and NEC standards and regulations.

The sidewall component 220*d* may further include multiple fastener openings 244 disposed near the bottom end 221 to align with corresponding fastener openings 516 on the mounting ring 510*b* to facilitate attachment of the mounting ring 510*b* to the housing 200*e* via fasteners 520. As shown in FIG. 23H, the sidewall component 220*d* and the mounting ring 510*b* may include four fastener openings 224 and 516, respectively, which are rotationally offset by 90 degrees with respect to one another about the centerline axis 209 of the housing 200*e*. In this implementation, the housing assembly 101*d* may only include a pair of spring clips 530*b*. In some implementations, the pair of spring clips 530*b* may be disposed diametrically opposite to one another. Thus, one pair of fastener openings 244 and 516 disposed on opposing sides may also align with respective fastener openings 240 on each spring clip 530*b* and the corresponding fasteners 520 may couple the spring clips 530*b* to the mounting ring 510*b*.

Figure 23F:
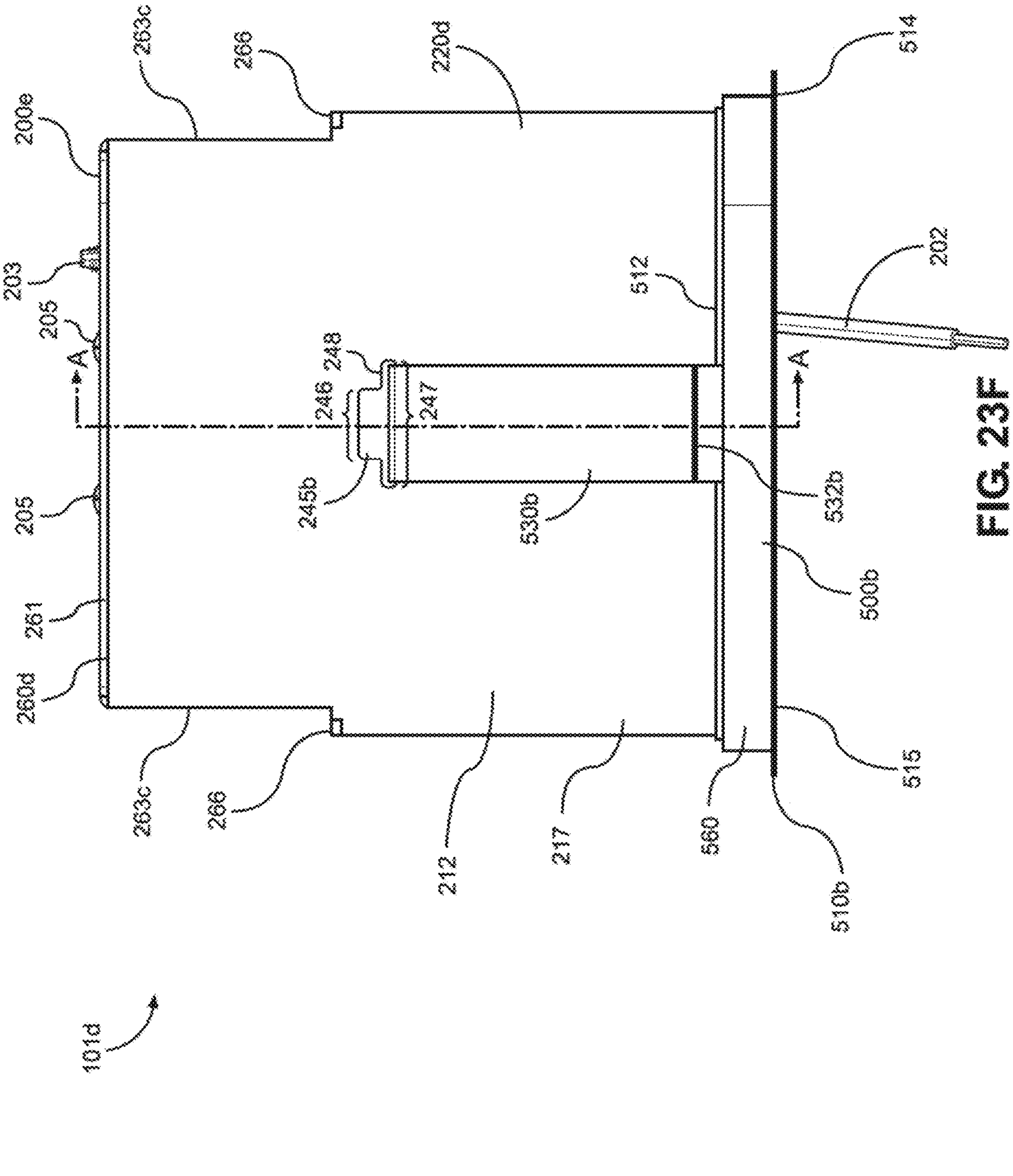
FIG. 23F shows a left-side view of the housing assembly of FIG. 23A.

As shown in FIG. 23F, the sidewall component 220*d* may include a pair of T-shaped openings 245*b* to receive portions of the spring clips 530*b*. Specifically, each T-shaped opening 245*b* may include wide portion 247 and a narrow portion 246 disposed directly above and adjoining the wide portion 247. The narrow and wide portions 246 and 247 may be centered about a vertical plane intersecting the centerline axis 209 of the housing 200*e*. The wide portion 247 may be shaped and/or dimensioned to receive a wide section 535 of a push flange 533 on the spring clip 530*b* while the narrow portion 246 may be shaped and/or dimensioned to receive a narrow section 536 of the push flange 533. During installation, the spring clip 530*b* may be deflected outwards by pushing the wide section 535 through the wide portion 247 of the opening 245*b*. The narrow section 533 may engage the narrow portion 246 of the opening 245*b* to lock the spring clip 530*b* in place once engaged with the drywall panel as will be discussed in more detail below.

The top component 260*d* may also include several of the same or similar structural features as the top component 260*c*. For example, the top component 260*d* may include a base section 261 to cover the top end 224 and the top opening 225 of the sidewall component 220*d*. The top component 260*d* may further include tabs 263*c* that extend from the base section 261 and cover the respective notches 226 of the sidewall component 220*c*. Each tab 263*c* may further include an end portion 266 to cover a gap 254 formed between the tab 263*c* and the curved sidewall component 220*c*. The base section 261 may further include the circular knockouts 270*e* and 270*f* as well as the Romex knockouts 270*g*. The top component 260*d* may further support a pair of retainers 206 coupled to the base section 261 via fasteners 205. The base section 261 may also include a ground connection feature 283 to connect a ground cable 202 to the top component 260*d* via a fastener 203. In this implementation, the top component 260*d* may further include additional openings 284 disposed on the base section 261.

FIG. 23H shows the mounting ring 510*b* may also include several of the same or similar features as the mounting ring 510*a*. For example, the mounting ring 510*b* may include a collar 512 defining an opening 502 for the bottom portion of the housing 200*d* to pass through. The collar 512 may abut the exterior side of the sidewall component 220*d*. As described above, the collar 512 may include four fastener openings 516 that align with the fastener openings 244 on the sidewall component 220*d*. The mounting ring 510*b* may further include a flange 517 with a top surface 517 that abuts an bottom surface of a ceiling and a bottom surface 515 that is substantially flush or flush with the bottom end 221 of the housing 200*d*.

Figure 23G:
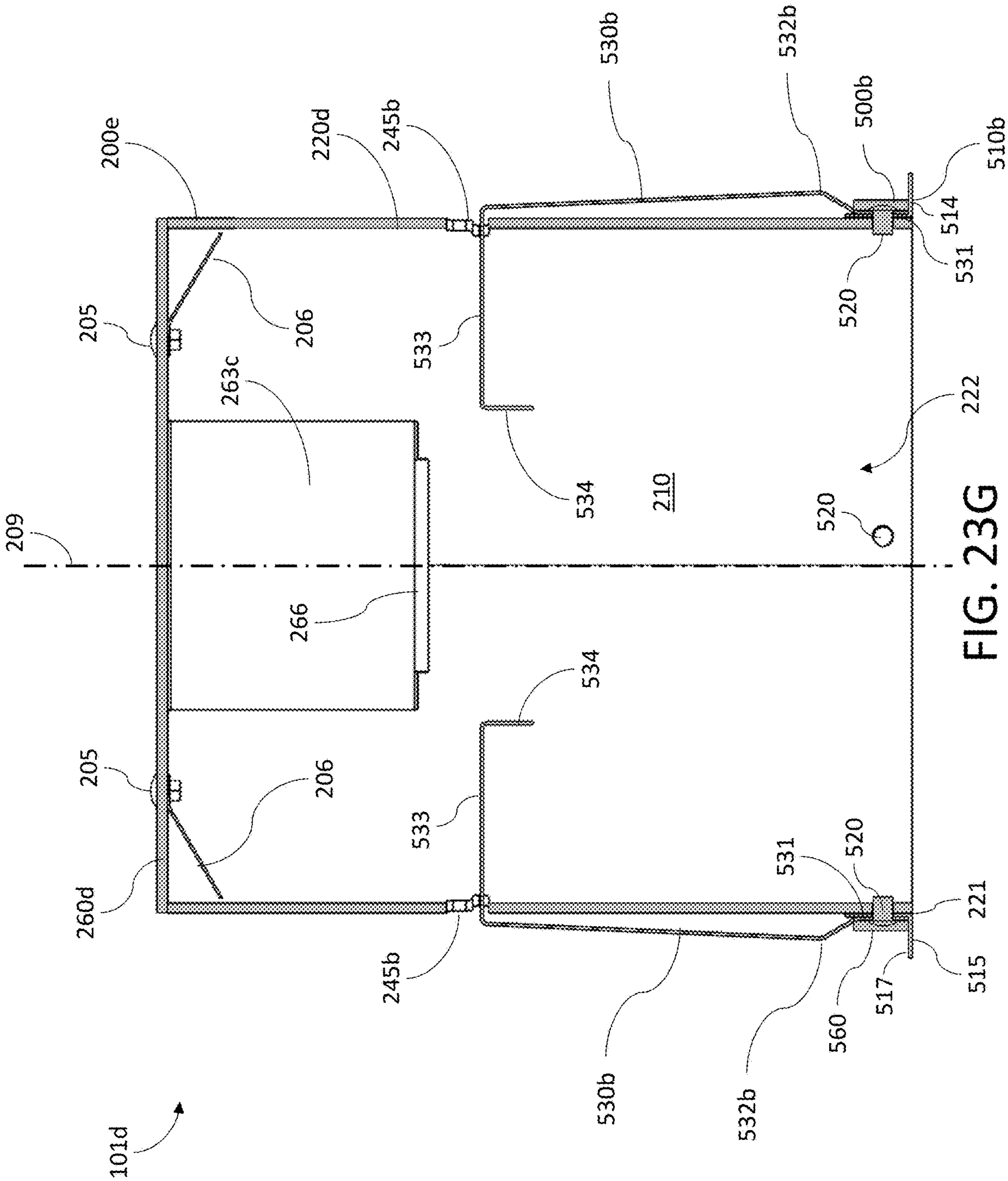
FIG. 23G shows a cross-sectional front-side view of the housing assembly of FIG. 23A corresponding to the plane A-A of FIG. 23F.
Figure 23H:
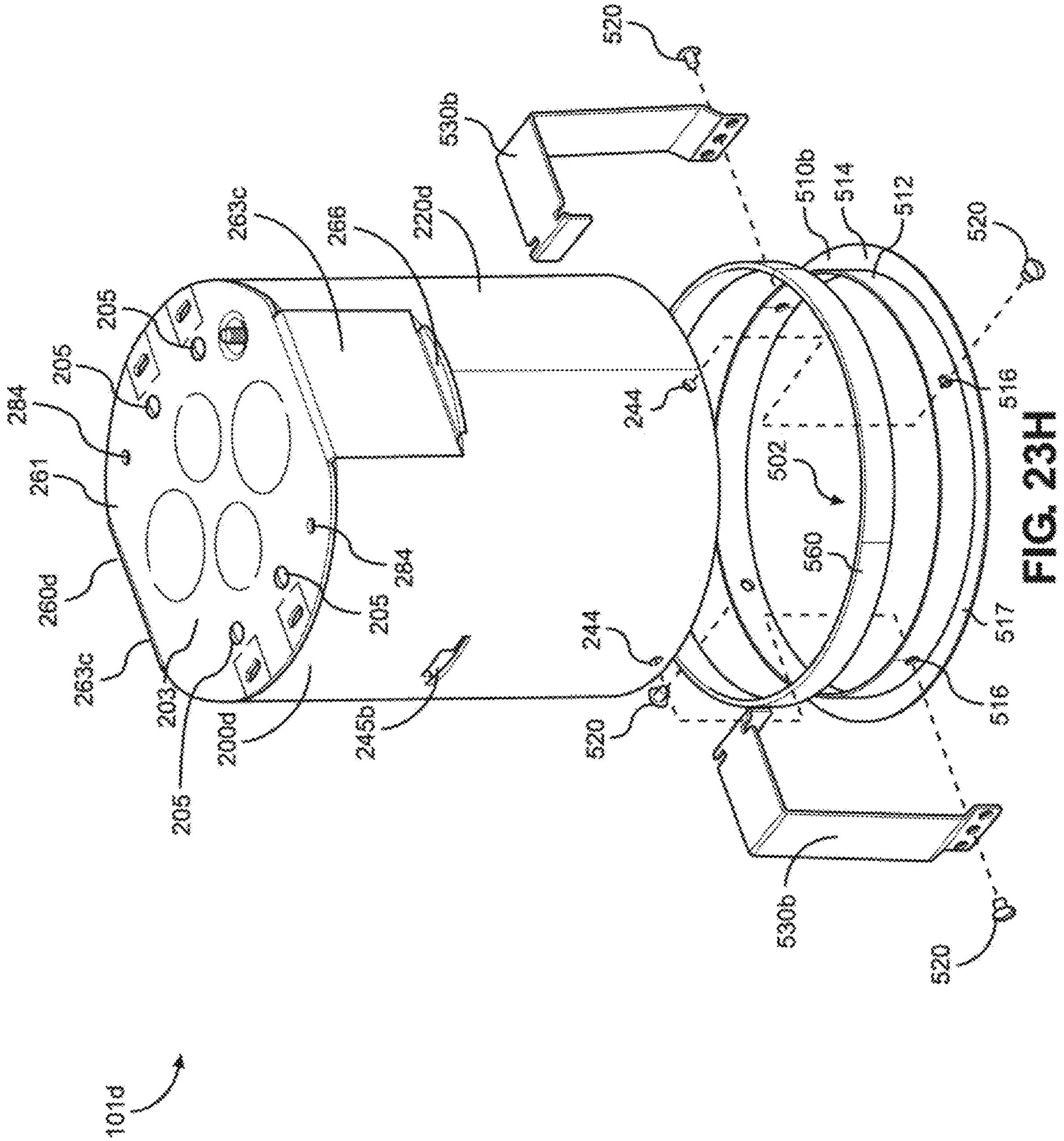
FIG. 23H shows an exploded top, front, left perspective view of the housing assembly of FIG. 23A where a mounting ring and the spring clips are separated from the housing.

In some implementations, the housing assembly 101*d* may also include the gasket 560 to seal any gaps formed between the housing 200*d* and the edges of the ceiling defining the opening. FIG. 23G shows the gasket 560 may be disposed around the exterior side of the collar 512, the exterior portion of the mounting section 531 of each spring clip 530*b*, and the fasteners 520. The gasket 560 may generally wrap tightly around the various components of the spring clip assembly 500*b* to reduce or, in some instances, eliminate gaps between the gasket 560 and the spring clip assembly 500*b*. In some implementations, the gasket 560 may be an elastic component that is stretched (i.e., put in tension) when mounted to the spring clip assembly 500*b*. The gasket 560 may thus provide a compliant component to contact and seal the edges of the ceiling defining the opening. The gasket 560 may be formed from various types of polymers including, but not limited to, polyethylene foam, silicone rubber, and neoprene rubber.

Figure 24B:
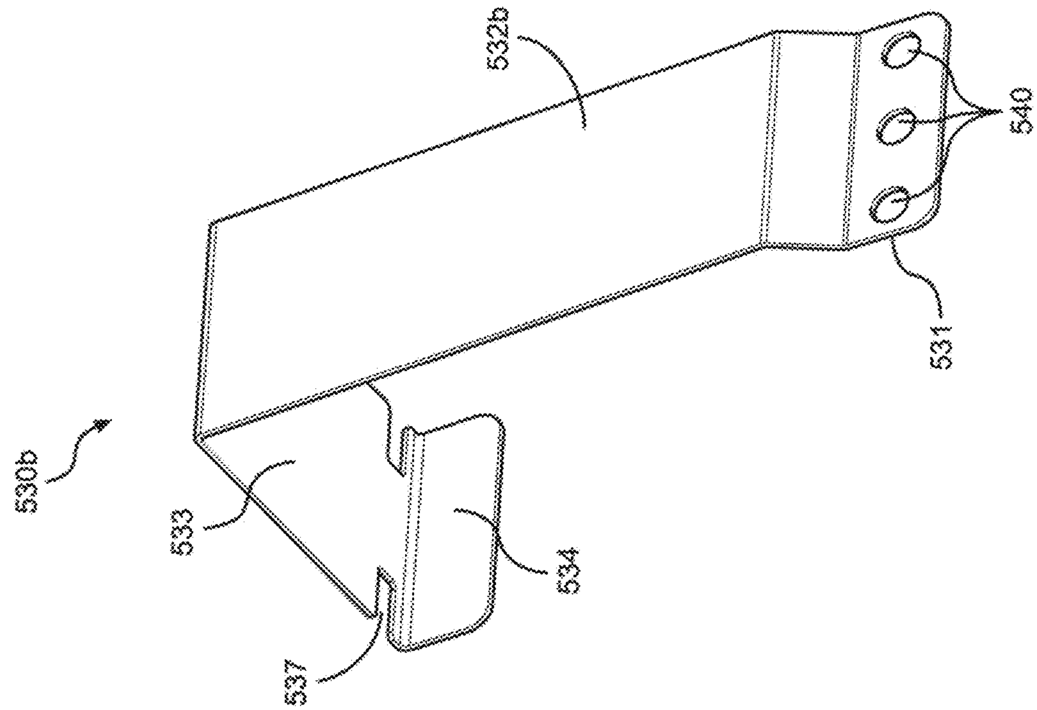
FIG. 24B shows a bottom, front, right perspective view of the spring clip of FIG. 27A.
Figure 24A:
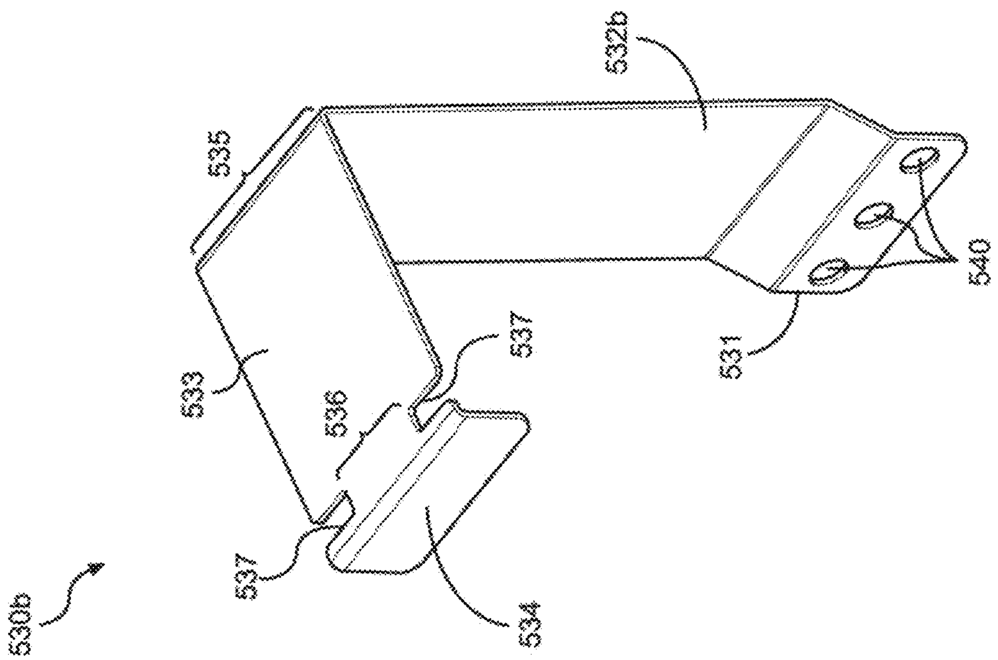
FIG. 24A shows a top, front, left perspective view of one of the spring clips in the housing assembly of FIG. 23A.

FIGS. 24A and 24B show several additional views of the spring clip 530*b*. As shown, the spring clip 530*b* may include a base section 531 that abuts the collar 512 of the mounting ring 510*b*. In some implementations, the base section 531 may include multiple fastener openings 540. During assembly, one of the fastener openings 540 may be used to couple the spring clip 530*b* to the mounting ring 510*b*. The spring clip 530*b* may further include a bent section 532*b* joined to the base section 531. The bent section 532*b* may protrude outwards to engage a top surface of a drywall panel for installation. As shown, the bent section 532*b* may extend up to the push flange 533, which is disposed within the opening 245*b* of the sidewall component 220*d* as described above. The bent section 532*b* may be tapered in shape such that the bent section 532*b* includes flat sections that are not oriented vertically. This geometry may provide more leverage to deflect the bent section 532*b* about the portion of the spring clip 530*b* where the base section 531 joins the bent section 532*b*. More generally, the bent section 532*b* may have various shapes including, but not limited to, a V-shaped bend, a round-shaped bend, an arc where the spring clip 530*a* bends outwards to clasp the drywall panel. The push flange 533 may pass through the opening 245*b* as described above. In some implementations, the push flange 533 may be oriented horizontally. In some implementations, the push flange 533 may not be oriented at an angle relative to a horizontal plane. The spring clip 530*b* further include a handle 534 joined to the push flange 533 to provide a surface the installer may press on to push the push flange 533 through the opening 245*b* and deflect the bent section 532*b* outwards. The push flange 533 may include a wide section 535 and a narrow section 536 disposed near the handle 524. The narrow section 536 may be formed by a pair of notches 537 disposed on opposing sides of the push flange 533 as shown in FIG. 24A. The spring clip 530*b* may be generally formed of the same materials as the housing 200*e*. For example, the spring clip 530*b* may be formed of galvanized steel in the form of sheet metal.

The following describes an exemplary remodel installation of the housing assembly 101*d* for the ceiling 90. It should be appreciated that the same or similar steps may be used to install the housing assembly 101*d* in a wall or a floor.

Figure 25A:
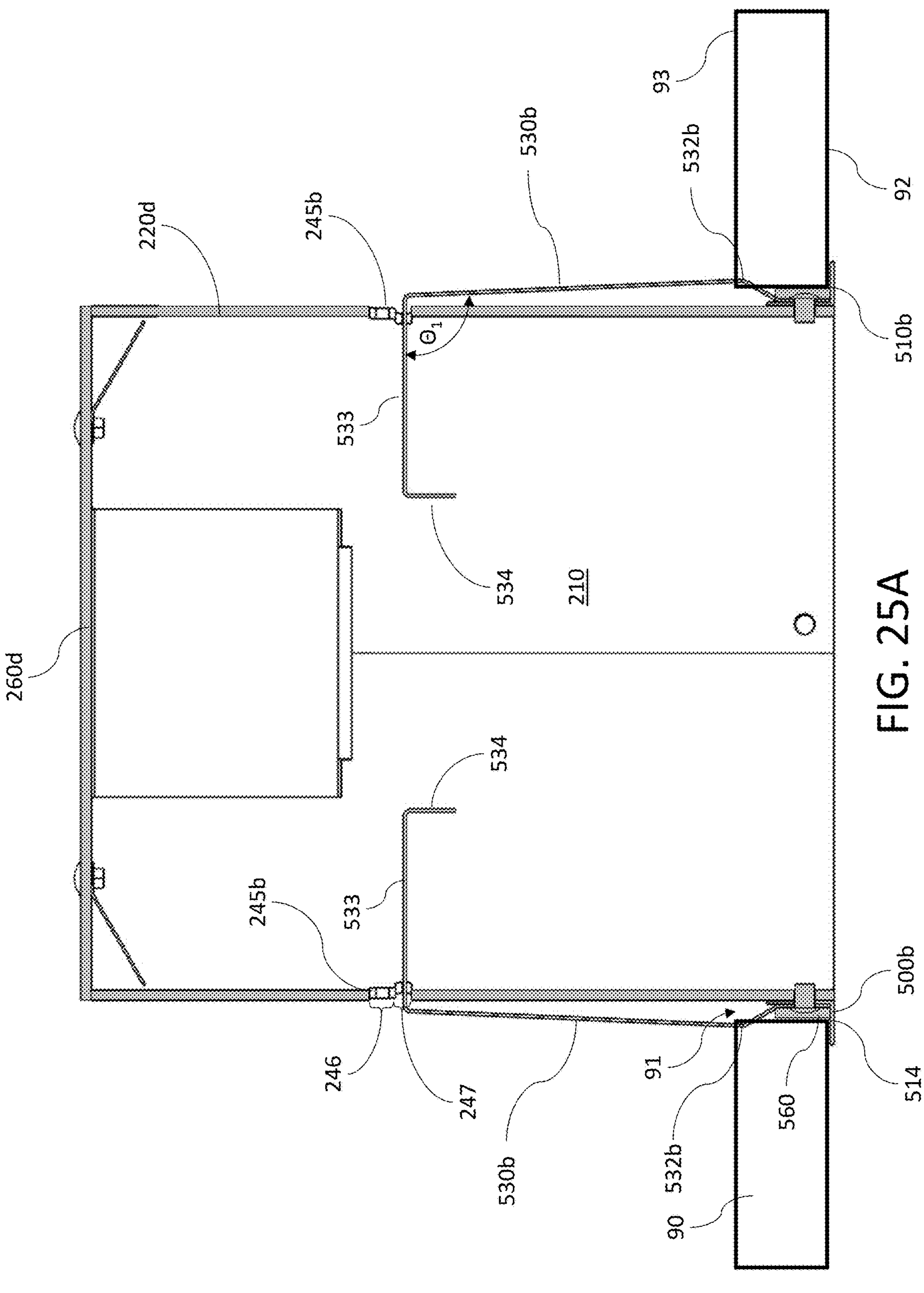
FIG. 25A shows a cross-sectional front view of the housing assembly of FIG. 23A corresponding to the plane A-A of FIG. 23F where the housing is inserted into a ceiling.

Similar to the housing assembly 101*c*, the installation of the housing assembly 101*d* may first begin with the removal of one or more of the knockouts 270*e*-270*g* to provide an opening for one or more electrical wires and/or cables to be inserted into the cavity 210 of the housing 200*e*. As before, once the external electrical wire connections are inserted into the housing 200*e*, FIG. 25A shows the housing 200*e* may then be inserted through the opening 91 formed on the ceiling drywall panel 90 until the top surface 517 of the flange 514 abuts the bottom surface 92 of the drywall panel 90. Once the housing assembly 200*e* is disposed within the ceiling space, the installer may then press the handle 534 of each spring clip 530*b* to deflect the bent section 532*b* of the spring clip 530*b* outwards.

Figure 25B:
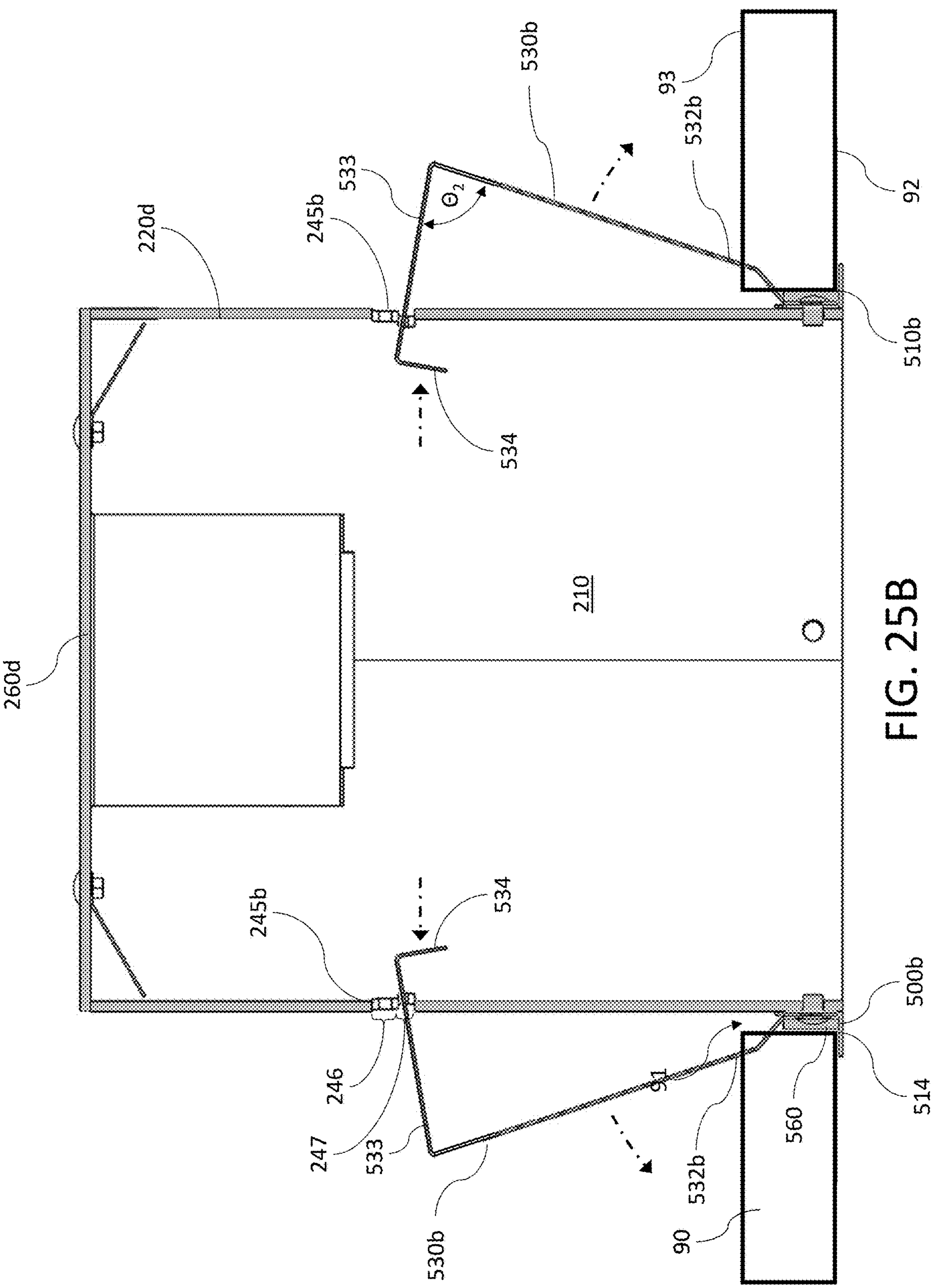
FIG. 25B shows the cross-sectional front view of FIG. 25A where the spring clips are pushed outwards to engage the ceiling.

FIG. 25B shows that as the user presses the handle 534, the wide section 535 of the push flange 533 passes through the wide portion 247 of the opening 245*b* and the bent section 532*b* rotates about the portion of the spring clip 530*b* where the base section 531 joins the bent section 532*b* towards the top surface 93 of the drywall panel 90. As the bent section 532*b* is deflected closer towards the top surface 93, the rotational motion of the bent section 532*b* causes the push flange 533 to displace upwards towards the base end 214 of the housing 200*e*. However, the upward displacement of the push flange 533 is limited due to physical contact between the top surface of the wide section 535 and the edge 248 of the opening 245*b*. The constraints imposed by the wide portion 247 of the opening 245*b* may cause the push flange 533 to bend towards the bent section 532*b* as the bent section 532*b* is deflected further outwards. Said in another way, the angle between the push flange 533 and the bent section 532*b* may decrease from Θ1 to Θ2 as shown in FIGS. 25A and 25B.

Figure 25C:
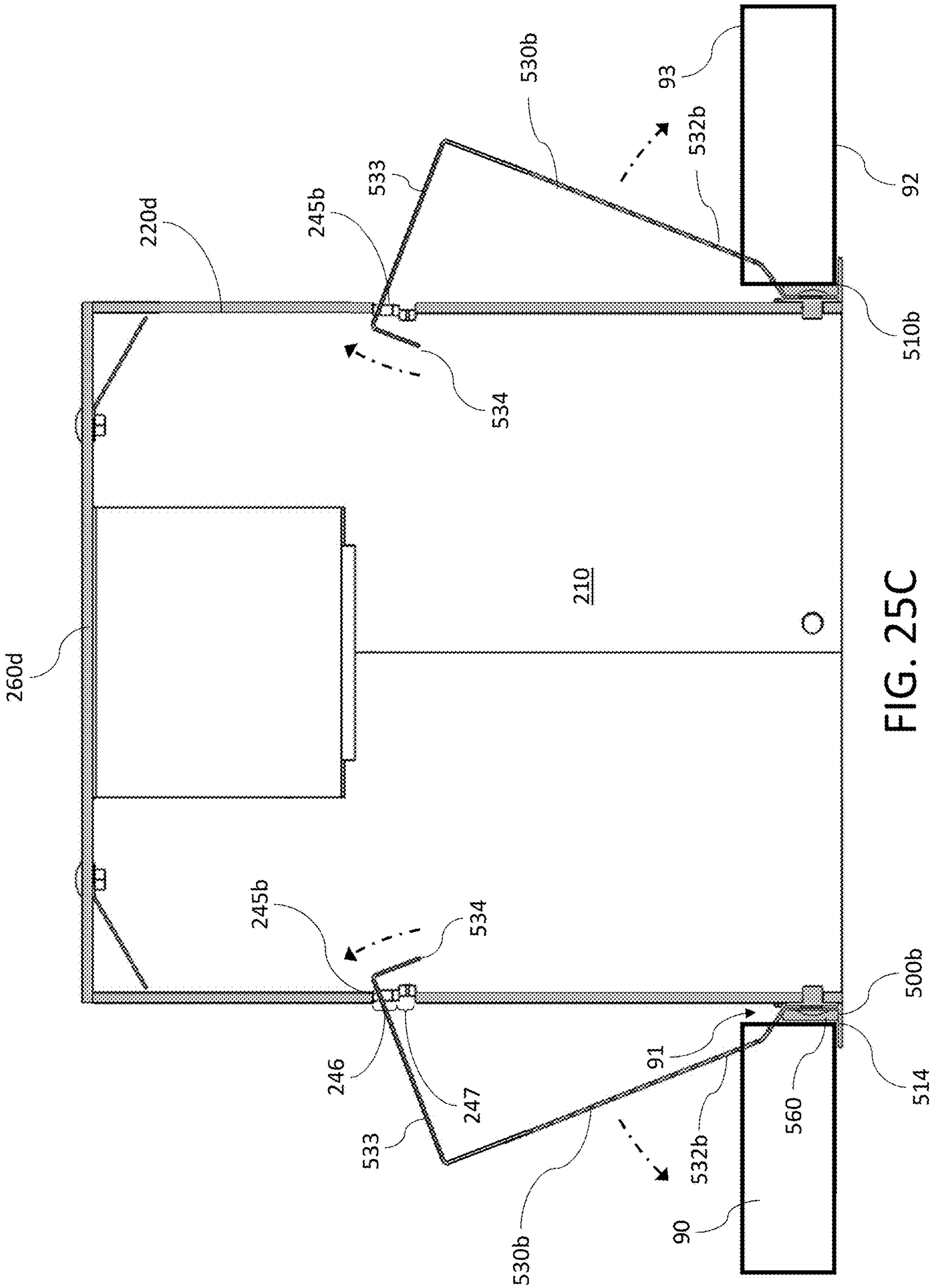
FIG. 25C shows the cross-sectional front view of FIG. 25A where the spring clips are locked in place to securely couple the housing assembly to the ceiling.

When the push flange 533 is sufficiently displaced through the opening 245*b* such that the narrow section 536 is disposed within the wide portion 247 of the opening 245*b*, the edge 248 of the opening 245*b* may no longer constrain the push flange 533. Once this occurs, the internal restoring force generated within the spring clip 530*b* by the deflection of the push flange 533 relative to the bent section 532*b* may cause the push flange 533 to move upwards such that the narrow section 536 is disposed within the narrow portion 246 of the opening 245*b* as shown in FIG. 25C. Once this occurs, the edges of the push flange 533 defining the notches 537 may prevent the push flange 533 from moving in or out through the opening 245*b*, thus locking the bent section 532*b* in place. In this manner, the spring clip 530*b* and the flange 514 of the mounting ring 510*b* may clamp onto the drywall panel 90.

During installation, the installer may actuate both spring clips 530*b* by pressing on the corresponding handle 524, thus providing multiple points of attachment between the housing assembly 101*d* and the drywall panel 90. As described above, the pair of spring clips 530*b* may be disposed diametrically opposite to one another, thus providing two attachment points on opposite sides of the housing assembly 101*d*. To uninstall and remove the housing assembly 101*d*, the handle 534 of each spring clip 530*b* may be pulled downwards, causing the push flange 533 to move downwards into the wide portion 247 of the opening 245*b*. Once this occurs, the handle 534 may then be pulled inwards into the cavity 210 to disengage the bent section 532*b* from the drywall panel 90.

Figure 26A:
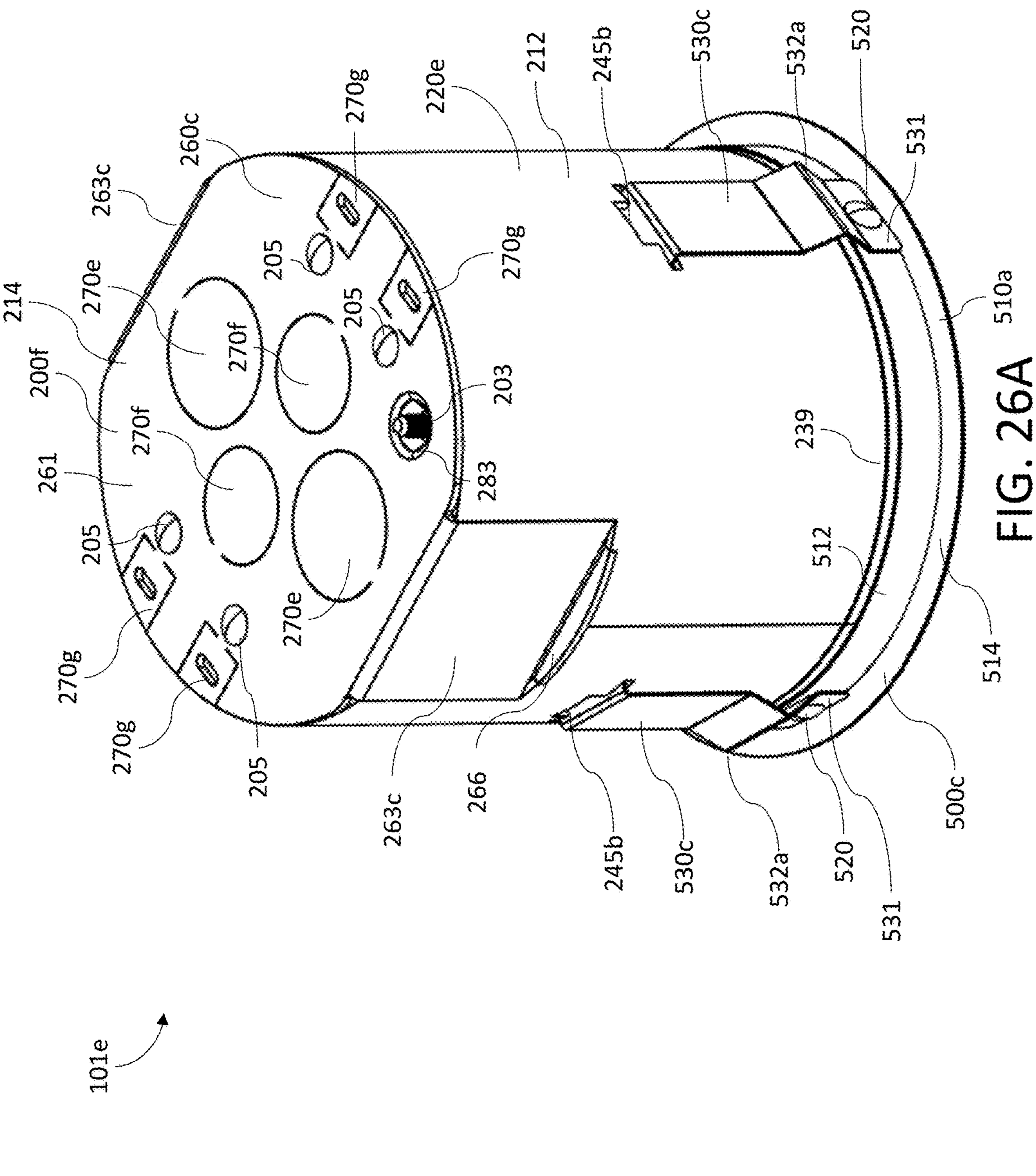
FIG. 26A shows a top, front, right perspective view of an exemplary housing assembly that includes a housing with a single sidewall component and three spring clips with respective push flanges for a remodel installation.
Figure 26B:
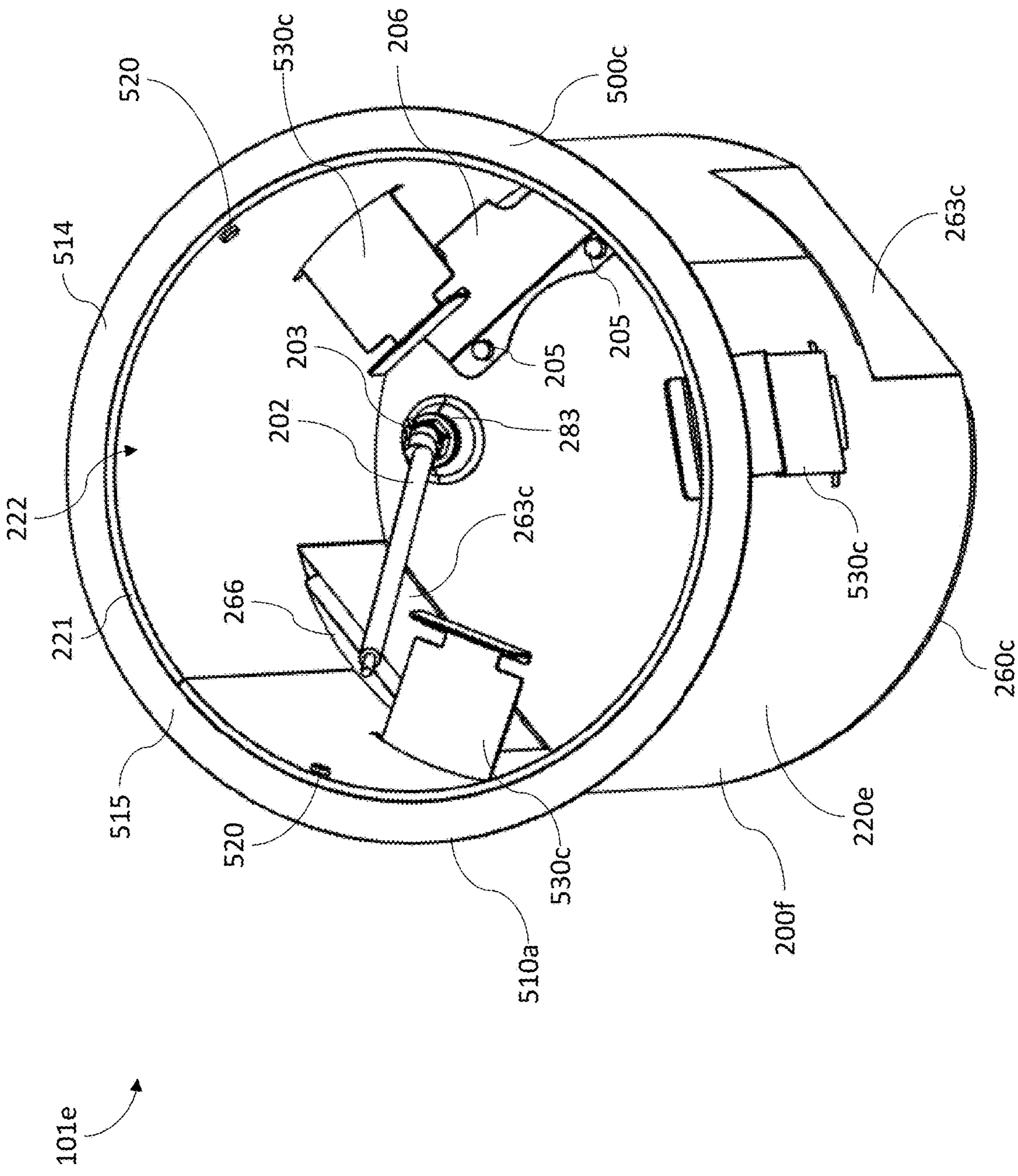
FIG. 26B shows a bottom, rear, left perspective view of the housing assembly of FIG. 26A.
Figure 26C:
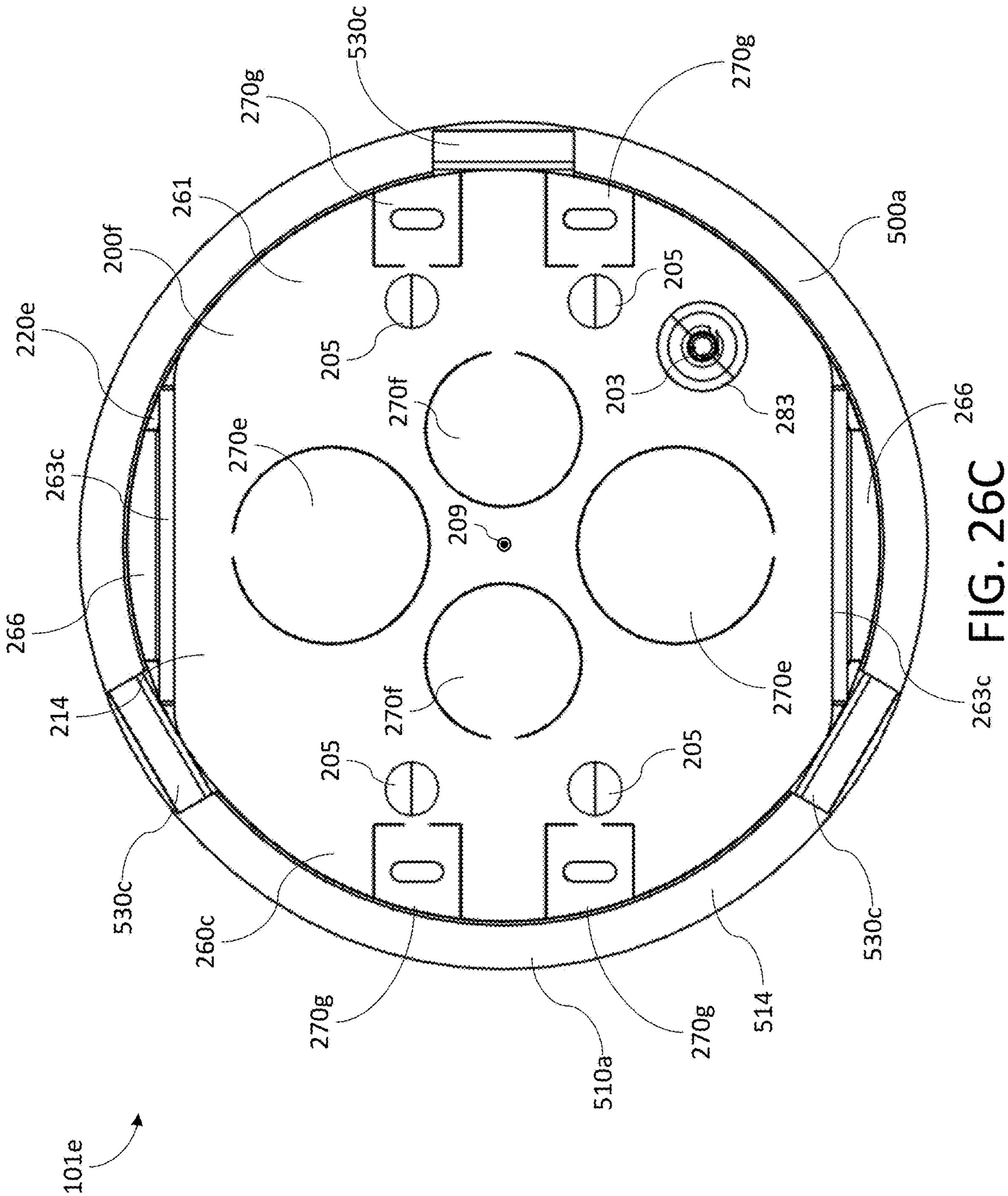
FIG. 26C shows a top view of the housing assembly of FIG. 26A.
Figure 26D:
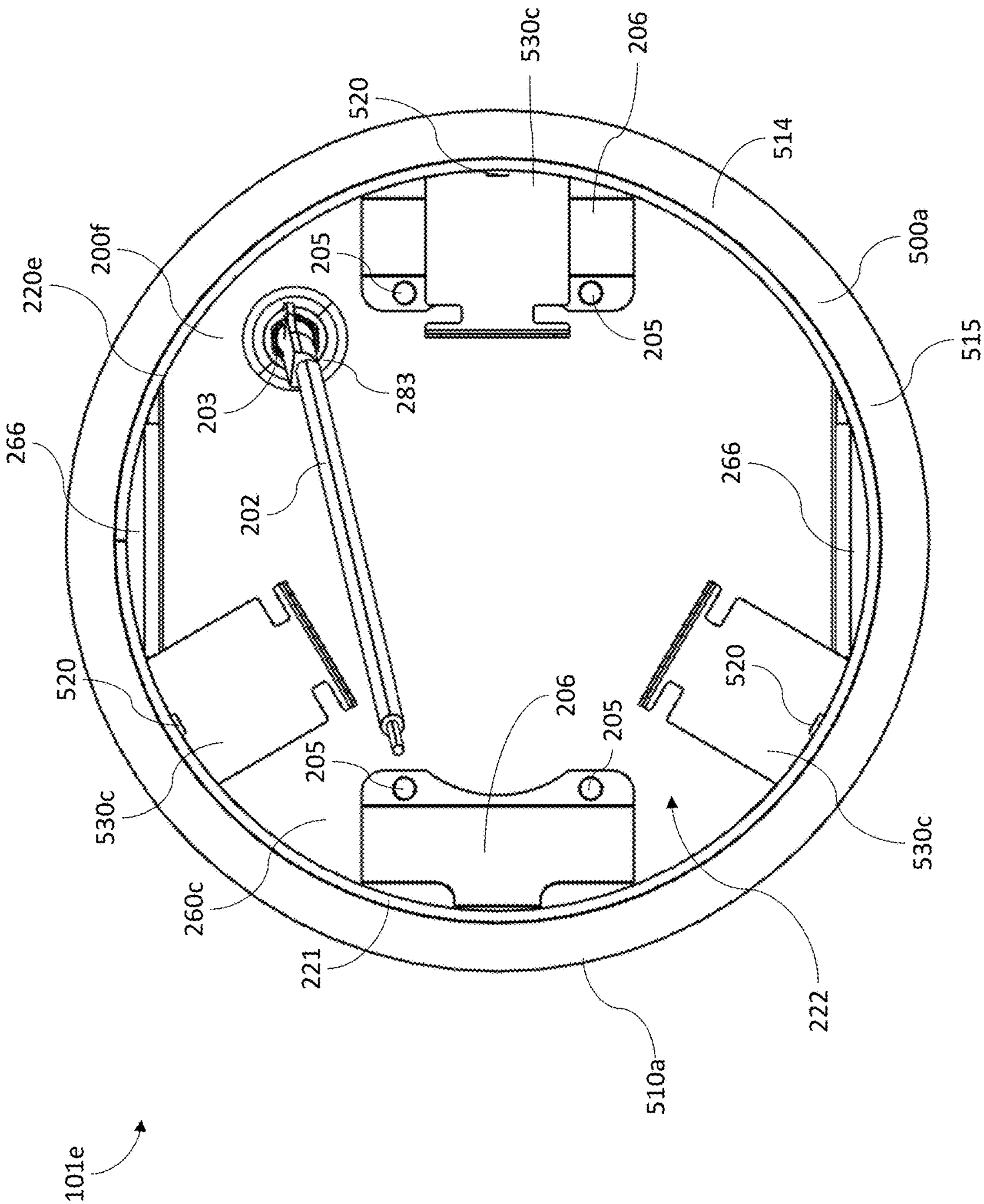
FIG. 26D shows a bottom view of the housing assembly of FIG. 26A.
Figure 26E:
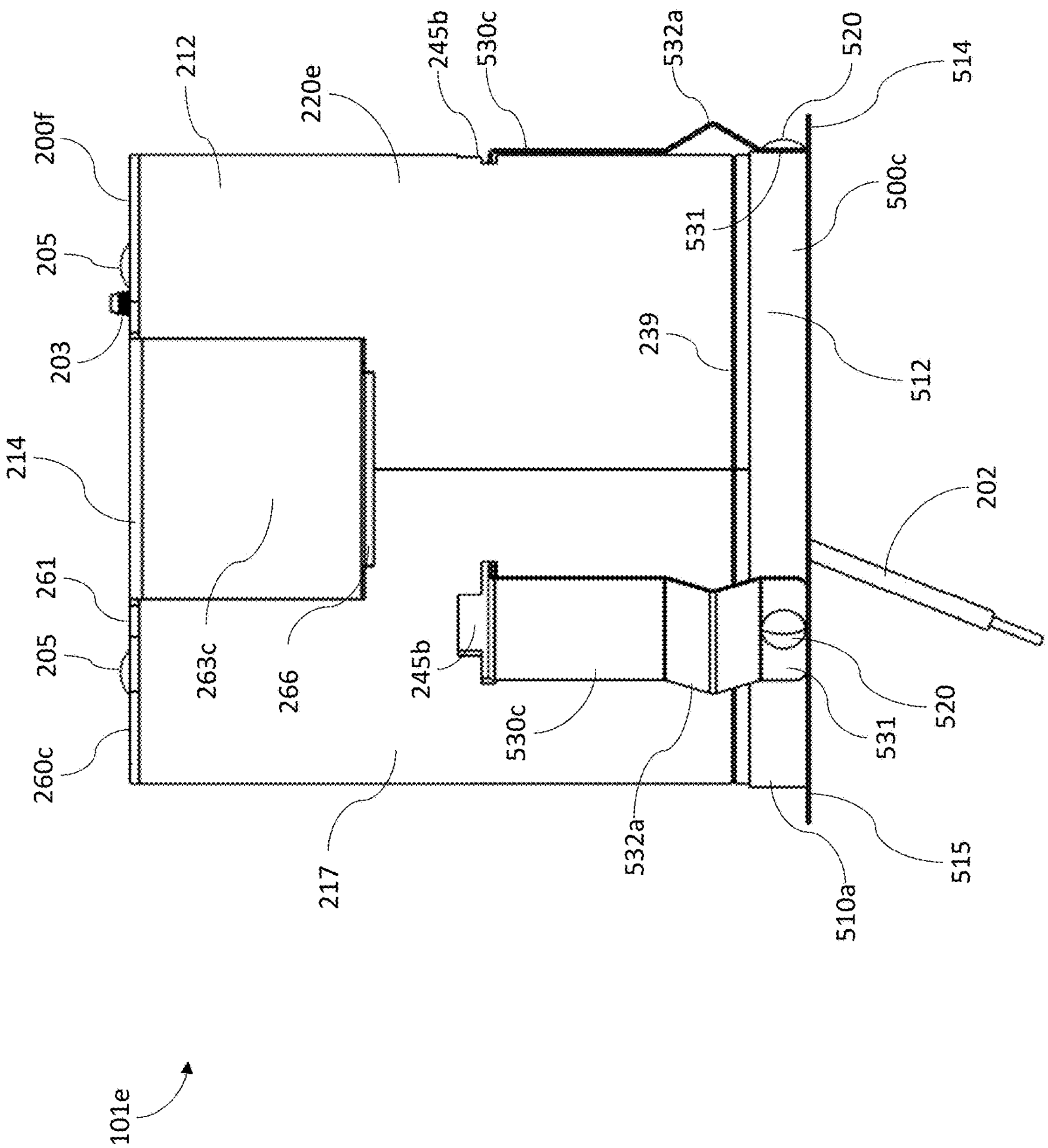
FIG. 26E shows a front view of the housing assembly of FIG. 26A.
Figure 26F:
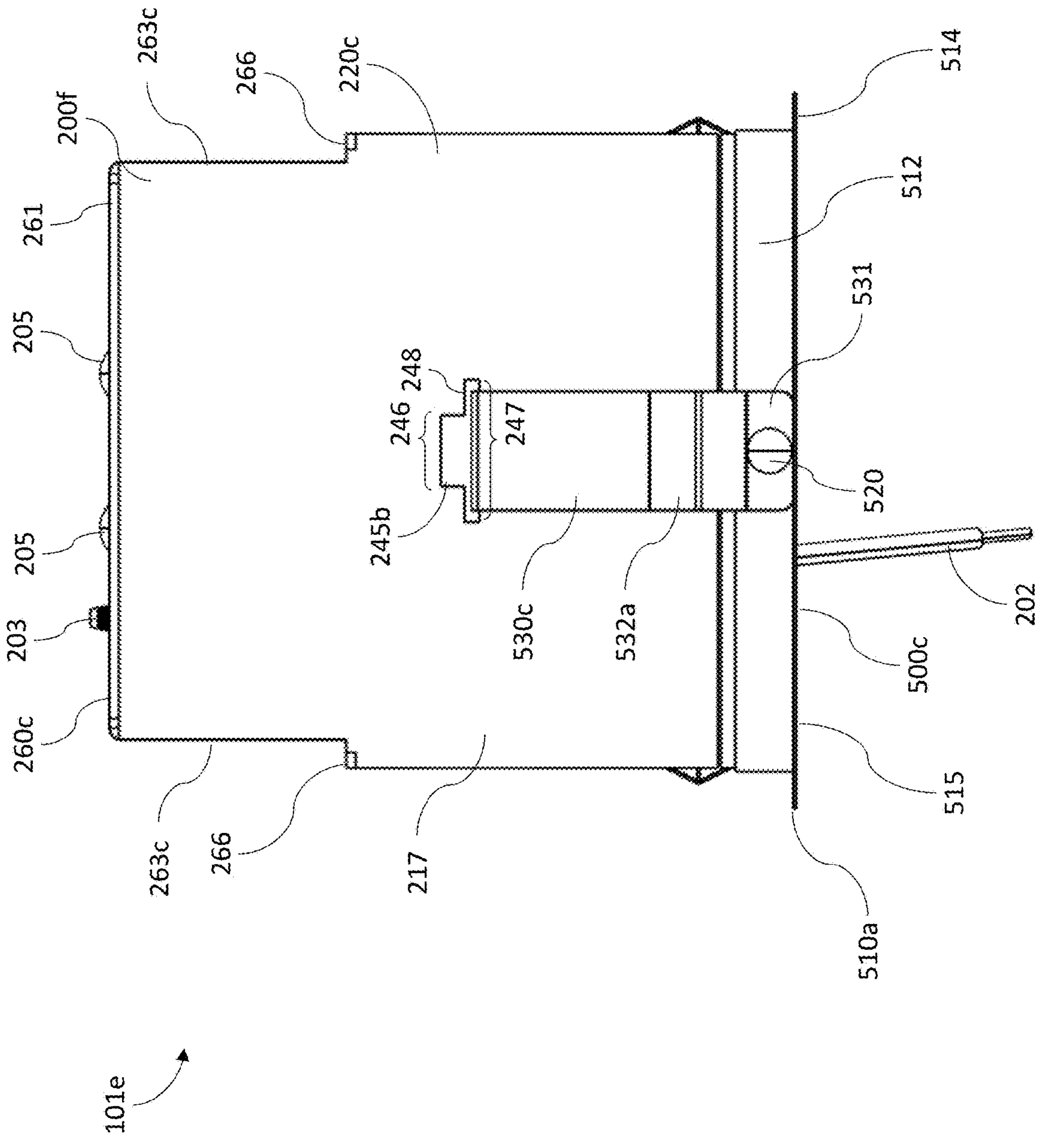
FIG. 26F shows a right-side view of the housing assembly of FIG. 26A.

FIGS. 26A-261 show yet another exemplary housing assembly 101*e* for a remodel installation that includes a spring clip assembly 500*c* with another push-based actuation mechanism. As shown, the housing assembly 101*e* includes a housing 200*f* assembled from a sidewall component 220*e* and the top component 260*c* of the housing 200*d*. The spring clip assembly 500*c* may further include the mounting ring 510*a* of the spring clip assembly 500*a* and multiple spring clips 530*c*. The housing assembly 101*e* may thus utilize several of the same components in the housing assemblies 101*c* and 101*d*, which illustrates the components in the housing and housing assemblies described herein may be interchangeable to provide housings with different structural features and/or housing assemblies with different mounting features.

Figure 26G:
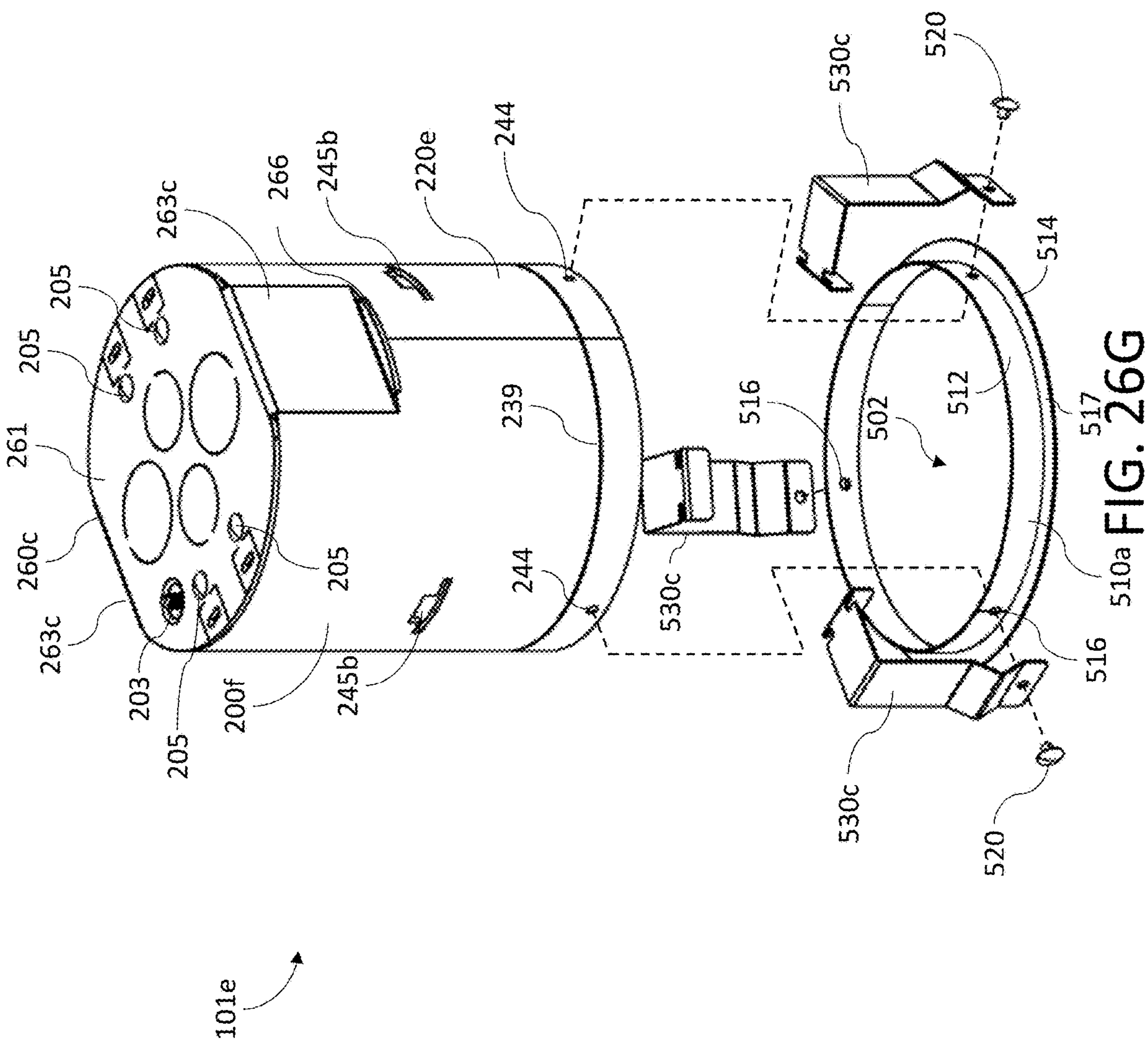
FIG. 26G shows an exploded top, rear, right perspective view of the housing assembly of FIG. 26A.

The sidewall component 220*e* may also incorporate several features from both the sidewall components 220*c* and 220*d*. Specifically, the sidewall component 220*e* may be a variant of the sidewall component 220*c* with the difference being the openings 245*a* are each replaced with the opening 245*b* of the sidewall component 220*d*. As shown in FIG. 26G, the sidewall component 220*e* may include three openings 245*b* disposed directly above corresponding fastener openings 244 to align with the three spring clips 530*c*. As before, each of the openings 245*b* include a wide portion 247 to receive a wide section 535 of a push flange 533 on the spring clip 530*c* and a narrow portion 246 disposed directly above the wide portion 247 to receive a narrow section 536 of the push flange 533.

Figure 27A:
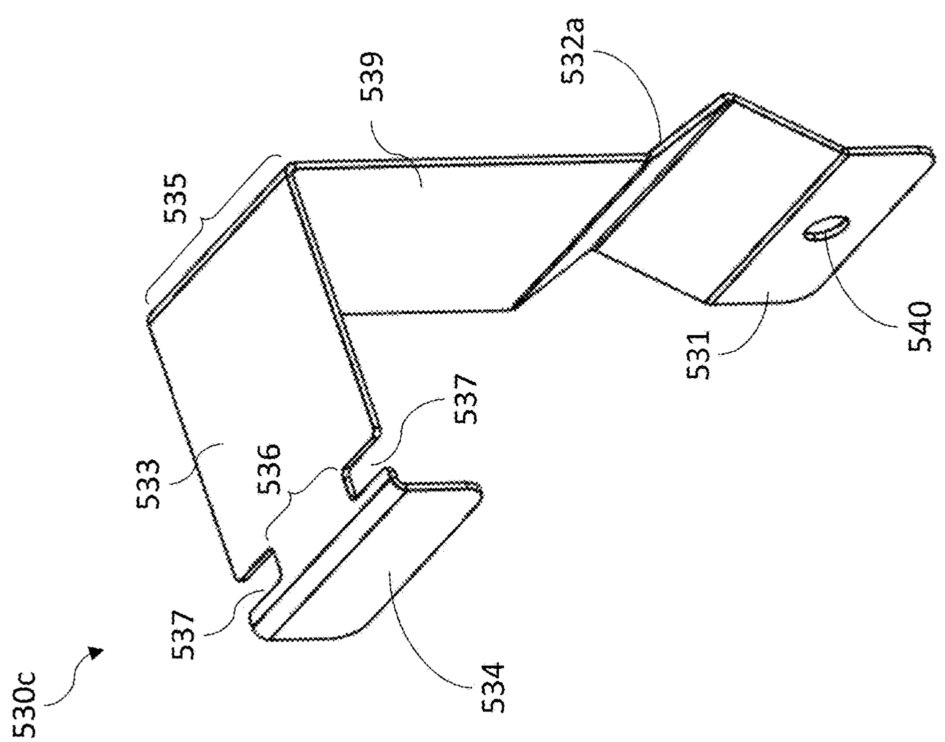
FIG. 27A shows a top, front, left perspective view of one of the spring clips in the housing assembly of FIG. 26A.
Figure 27B:
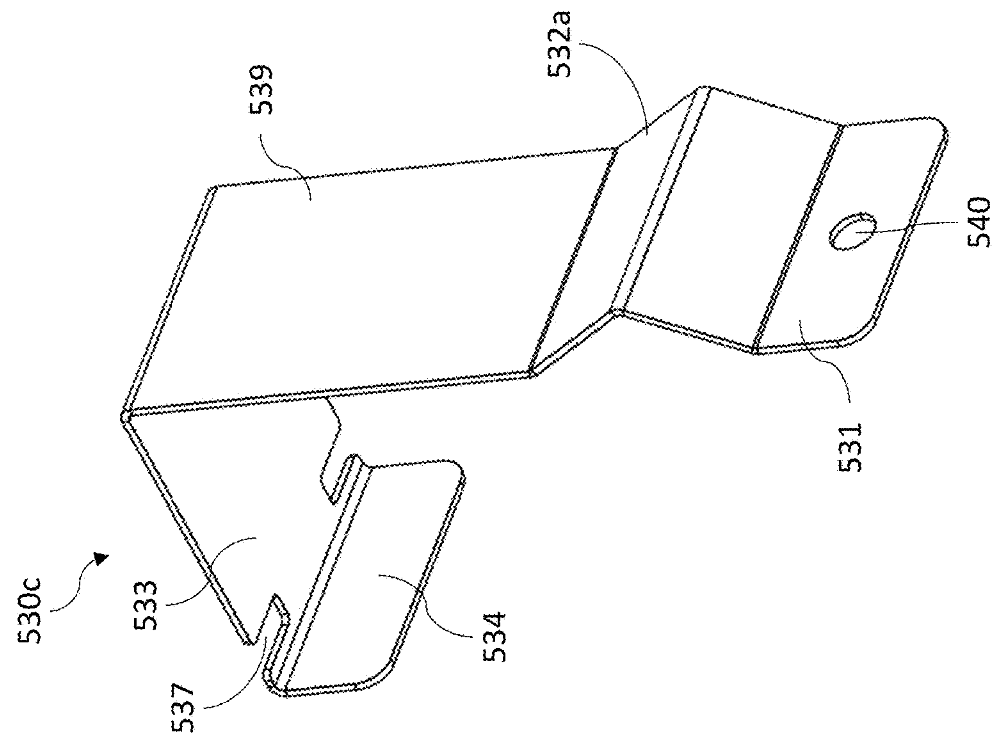
FIG. 27B shows a bottom, front, right perspective view of the spring clip of FIG. 27A.

FIGS. 27A and 27B show several additional views of the spring clip 530*c*. As shown, the spring clip 530*c* may also incorporate several features from both the spring clips 530*a* and 530*b*. For example, the spring clip 530*c* may include the base section 531 with the fastener opening 540 and the bent section 532*a* from the spring clip 530*a*. The spring clip 530*c* may further include an intermediate section 539 similar in shape with the end section 538 of the spring clip 530*a* with the difference being the intermediate section 539 does not include any openings. The spring clip 530*c* may further include a push flange 533 and a handle 534 similar in shape and dimensions with the spring clip 530*b*. The narrow section 536 of the push flange 533 may once again be disposed near the handle 534 and may further be defined by a pair of notches 537 disposed on opposing sides of the push flange 533.

Each of the spring clips 530*c* may be actuated in a similar manner as the spring clips 530*b*. Specifically, the installer may press the handle 534 of each spring clip 530*c* to displace the respective push flange 533 through the opening 245*b* so that the bent section 532*a* and, by extension, the intermediate section 539 is deflected outwards towards the top surface of a drywall panel. The wide section 535 of the push flange 533 may be constrained by the wide portion 247 of the opening 245*b*, thus causing the push flange 533 to bend relative to the bent section 532*a* as the bent section 532*a* deflects closer to the drywall panel. Once the push flange 533 is sufficiently displaced such that the narrow section 536 is disposed within the wide portion 247 of the opening 245*b*, the internal restoring force generated by the relative deflection between the push flange 533 and the intermediate section 539 and/or the bent section 532*a* causes the push flange 533 to deflect upwards such that the narrow section 536 is disposed within the narrow portion 246 of the opening 245*b*. In this manner, the spring clip 530*c* may be locked in position once engaged with the drywall panel.

A Round-Shaped Housing for a New Construction Installation

In some implementations, the housings and housing assemblies disclosed herein may be tailored to support a new construction installation. In a typical new construction installation, the housing assembly of the lighting system is installed before the construction of the environment is complete. For example, the environment may not include a ceiling enclosed by a drywall panel, thus exposing various support structures (e.g., a wood/metal joist, a T-bar, a hat channel) in the ceiling space. To install the lighting system, the housing assembly may be mounted to one or more of the support structures using, for example, a bar hanger assembly. In some implementations, the housing assembly may be directly mounted to one single support structure. Once the housing assembly is mounted, a drywall panel may then be installed to enclose the ceiling and an opening may then be cut to expose the housing through the drywall panel. In some implementations, the housing may then be lowered such that a bottom end of the housing is disposed within the opening. Once the housing is exposed, a lighting module and a trim may then be inserted into the housing.

FIGS. 28A-28N show several views of an exemplary housing assembly 101*f* tailored for a new construction installation. As shown, the housing assembly 101*f* may include a housing 200*g* that may be similar in construction with the housings 200*b*-200*f*. For instance, the housing 200*g* may include a single sidewall component 220*f* and a top component 200*g* that together define a cavity 210 to contain and support a lighting module, at least a portion of a trim, and various electrical wire and wiring connections with an external power supply system. The housing assembly 101*f* may further include a bar hanger assembly 400*c* to mount the housing assembly 101*f* to two or more support structures in the environment. The housing assembly 101*f* is also shown with a cover plate 296 and a yoke 290 to illustrate the use of the housing assembly 101*f* as an electrical outlet box as discussed in more detail below. It should be appreciated, however, that in a lighting installation, the cover plate 296 and the yoke 290 are not present. Instead, a lighting module and a trim may be installed into the housing 200*g*.

FIGS. 28M and 28N show additional views of the sidewall component 220*f* and the top component 260*e* of the housing 200*g*. As shown, the sidewall component 220*f* may once again include a curved portion 217 that defines the round shape of the sidewall 212 of the housing 200*g*. Similar to the sidewall components 220*b*-200*e*, the sidewall component 220*f* may be formed from a single piece of sheet metal rolled into the desired round shape with opposing sides forming a seam 251 that is welded during fabrication. The sidewall component 220*f* may thus surround and define the cavity 210 and may further include a bottom end 221 defining a bottom opening 222 into the cavity 210 and a top end 224 defining a top opening that is enclosed by the top component 260*e*. The sidewall component 220*e* may further include a pair of notches 226 disposed diametrically opposite with respect to one another to provide space for corresponding knockout tabs 263*d* of the top component 260*e*. More generally, the notches 226 and the tabs 263*d* may be offset at any angle relative to one another about the centerline axis 209.

The sidewall component 220*f* may further include a pair of openings 240 disposed diametrically opposite to one another. The openings 240 may provide a mounting feature to couple the bar hanger assembly 400*c* and, specifically, a corresponding pair of bar hanger holders 430*c* to the housing 200*g*. In some implementations, each opening 240 may be shaped as a slot or, more generally, an elongated opening to define a path along which the position of the housing 200*g* may be changed relative to the bar hanger assembly 400*c*. For example, the opening 240 may be a substantially vertical or vertical slot to provide vertical adjustment of the housing 200*g* with respect to the bar hanger assembly 400*c*. The bar hanger holders 430*c*, in turn, may provide horizontal adjustment of the housing 200*g* with respect to respective pairs of bar hangers 410 as discussed in more detail below.

In some implementations, the sidewall component 220*f* may also include a groove 250 disposed above each opening 240 to provide a reference line to align and/or position the bar hanger holder 430*c* to the housing 200*g*. For example, the bar hanger holder 430*c* may include alignment markings (not shown), which the installer can use to align with the groove 250 to position the bottom end 221 of the housing 200*g* at a known distance below the bar hanger assembly 400*c*. As shown in FIG. 28M, the groove 250 may be formed as a horizontal indentation on the sidewall component 220*f*.

In some implementations, the sidewall component 220*f* may also include a groove 239 that forms a reference line to align and/or position a gasket 560 mounted to the housing 200*g*. The groove 239 may be formed as a horizontal indentation that extends around the periphery of the sidewall component 220*f* For example, FIGS. 28G-28J show the gasket 560 may be disposed around an exterior portion of the sidewall component 220*f* located just below the groove 239. Similar to the housing assembly 101*d*, the gasket 560 may wrap tightly around the sidewall component 220*f* to reduce or, in some instances, eliminate gaps between the gasket 560 and the housing 220*f*. The gasket 560 may thus protrude outwards to contact and seal the edges of the ceiling defining the opening within which the housing assembly 101*d* is installed. As before, the gasket 560 may form an airtight seal separating the environment and the ceiling space.

The top component 260*e* may include several of the same features as the top components 260*b*-260*d*. For example, the top component 260*e* may include a base section 261 to cover the top end 224 and top opening of the sidewall component 220*f*. The top component 260*e* may further include a pair of knockout tabs 263*d* that extend from the base section 261 at an angle to cover the notches 226 of the sidewall component 220*f*. Each knockout tab 263*d* may include a circular knockout 270*f*. For a new construction installation, the knockouts 270*f* disposed on the knockout tabs 263*d* may facilitate insertion of a conduit cable or, in some instances, a straight conduit run that passes through one or both of the knockouts 270*f* on the knockout tabs 263*d*. Each knockout tab 263*d* may also include an end portion 266 to cover gaps formed between the knockout tab 263*d* and the curved sidewall component 220*f*. The base section 261 may include multiple circular knockouts 270*e* and 270*f* as well as multiple Romex knockouts 270*g*. The top component 260*e* may further support multiple retainers 206 coupled to the base section 261 via fasteners 205. The top component 260*e* may also include a ground connection feature 283 to couple a ground cable 202 to the top component 260*e* via a fastener 203.

As described above, in some implementations, the components of the housing 200*g* may be fabricated using the same or similar manufacturing processes as a housing tailored for a remodel installation. This may reduce manufacturing costs while providing housings tailored for different installations. For example, the sidewall component 220*f* and the top component 260*e* may be fabricated using the same or similar manufacturing processes as the sidewall component 220*c* and the top component 260*c*, respectively, with modifications to accommodate different mounting features and/or arrangement of knockouts for the remodel and new construction installations.

FIGS. 28A and 28B show the bar hanger assembly 400*c* may include a first pair of bar hangers 410-1 and 410-4 and a second pair of bar hangers 410-2 and 410-3 where the first and second pairs of bar hangers are disposed on opposite sides of the housing 200*g*. Each pair of bar hangers 410 may be telescopically coupled to one another and may be further slidably coupled to corresponding bar hanger holders 430*c*. Each bar hanger holder 430*c*, in turn, may be coupled directly to the sidewall component 220*f* of the housing 200*g*. This allows the installer to adjust the length of the bar hangers 410, for example, to traverse a gap between support structures. Additionally, the position of the housing 200*g* along the bar hangers 410 may also be adjusted, thus allowing the installer to place the housing 200*g* at a desired location along the ceiling.

The bar hanger assembly 400*c* may further include crossmembers 414-1 and 414-2 (collectively referred to herein as a "crossmember 414") that couple to one bar hanger 410 from each pair of bar hangers 410. Specifically, the crossmember 414-1 may be coupled to the bar hangers 410-1 and 410-2 and the crossmember 414-2 may be coupled to the bar hangers 410-3 and 410-4. The crossmembers 414 may thus constrain the bar hangers 410 such that the length of the first and second pairs of bar hangers are substantially equal or equal to one another. In this manner, the crossmembers 414 may reduce the number of independent moving parts in the bar hanger assembly 400*c* during installation. Said in another way, the installer may only adjust the position of the two crossmembers 414-1 and 414-2 rather than adjusting the position of each individual bar hanger 410.

In some implementations, the bar hangers 410 may be substantially identical in shape and/or dimensions. Thus, one bar hanger 410 may engage another bar hanger 410 by being flipped upside down with respect to the other bar hanger 410. For example, the bar hangers 410 in the bar hanger assembly 410*c* may be the same as the bar hangers 410-1 and 410-2 in the bar hanger assembly 400*b*. FIG. 16 shows the bar hanger 410-1 may be rotated 180 degrees with respect to the bar hanger 410-2 when telescopically coupled to one another. In this manner, one type of bar hanger 410 is used, thus reducing the number of different parts in the housing assembly 101*f* for manufacture. However, it should be appreciated that in some implementations, the bar hangers 410 may each have different shapes and/or dimensions. In particular, the bar hangers 410-1 and 410-4 or the bar hangers 410-2 and 410-3 may have different shapes and/or dimensions.

In some implementations, the bar hanger 410 may be shaped and/or dimensioned to reduce lateral play when telescopically coupled to another bar hanger 410. For example, the respective pairs of bar hangers 410 (e.g., the bar hangers 410-1 and 410-4 or the bar hangers 410-2 and 410-3) may physically contact one another such that the relative lateral movement between the bar hangers 410 is reduced or, in some instances, mitigated. In some implementations, the pair of bar hangers 410 may impart a compressive force onto each other that further reduces lateral play. The compressive force may also produce a corresponding frictional force that holds one bar hanger 410 at a desired position with respect to the other bar hanger 410 unless a user applies a sufficiently large force to slidably adjust the respective positions of the bar hangers 410.

Examples of bar hangers that are substantially identical in shape and/or dimension, reduce lateral play, and/or provide a compressive holding force may be found in U.S. application Ser. No. 16/886,365, filed on May 28, 2020, entitled, "ADJUSTABLE HANGER BAR ASSEMBLY" (hereinafter the '365 application) and International Application No. PCT/US2019/054220, filed on Oct. 2, 2019, entitled, "A BAR HANGER ASSEMBLY WITH MATING TELESCOPING BARS" (hereinafter the '220 application). The contents of each of the aforementioned applications is incorporated by reference herein in its entirety.

The crossmember 414 may generally provide several mounting features to facilitate installation onto various support structures including, but not limited to, a wood/metal joist or stud, a T-bar, a hat channel, and a metal frame. The crossmember 414 may be attached to the different support structures using one or more fasteners inserted through appropriate openings in the crossmember. For example, FIGS. 28A and 28B show each crossmember 414 may include captive fasteners 415 to couple the crossmember 414 to, for example, a wood joist. It should be appreciated other fasteners (not shown) may be inserted through one of the openings on the crossmember 414. The crossmember 414 may also include features (e.g., a safety cable opening) to facilitate attachment of a safety cable (also referred to as an aircraft cable or an earthquake cable), which provides a secondary attachment mechanism to ensure the housing assembly 101*f* remains suspended from a support structure in the event the fasteners coupling the crossmember 414 to one or more support structures detach or fail (e.g., during an earthquake).

In some implementations, the crossmember 414 may be a separate component from the bar hangers 410, which may improve ease of manufacture of the crossmember 414. For example, the crossmember 414 may be readily formed from a single piece of sheet metal. The crossmember 414 may be coupled to the bar hangers 410 via one or more rivet fasteners.

The bar hanger holder 430*c* may generally define a passageway 437 to guide and support the pair of bar hangers 410 as shown in FIG. 28G. The bar hanger holder 430*c* may further include a fastener opening to receive a locking fastener 435 to lock the relative position of the housing 200*g* along the bar hangers 410. Specifically, the locking fastener 435, when tightened, may press the bar hangers 410 against the bar hanger holder 430*c*, thus imparting a friction force that restricts movement of the bar hanger holder 430*c* and, by extension, the housing 200*g* along the bar hangers 410.

The bar hanger holder 430*c* may further include a rod 438 that protrudes through the opening 240 on the sidewall component 220*f* of the housing 200*g* as shown in FIG. 28J. This may allow the installer to adjust the position of the housing 200*g* relative to the bar hanger assembly 400*c* by sliding the rod 438 along the path defined by the opening 240. For example, the opening 240 may be a vertical slot as described above, which may allow vertical adjustment of the housing 200*g* with respect the bar hanger holders 430*c*. The bar hanger holder 430*c* may further include a locking nut 439*a* coupled to the rod 438 from within the cavity 210 of the housing 200*g*. When the locking nut 439*a* is sufficiently tightened, the sidewall component 220*f* may be clamped to the bar hanger holder 430*c*, thus maintaining the desired position of the housing 200*g* relative to the bar hanger holders 430*c*.

The bar hanger holder 430*c* may also include vertical side flanges that abut the exterior surface of the sidewall component 220*f* and align the bar hanger holder 430*c* to the housing 200*g*. Specifically, the side flanges may be shaped and/or dimensioned such that the side flanges only abut the curved sidewall component 220*f* when the bar hanger holder 430*c* is oriented substantially vertical or vertical.

In some implementations, the bar hanger holder 430*c* may be formed from a single piece of sheet metal that is bent to form the passageway 437 and the side flanges. As shown in FIGS. 28K and 28L, the bar hanger holder 430*c* may include multiple rivet fasteners 440 to couple together respective ends of the bar hanger holder 430*c* defining the passageway 437 so that the bar hanger holder 430*c* may more stably support the bar hangers 410.

Examples of crossmembers that provide multiple mounting features to couple the housing assembly to various support structures and include one or more safety cable openings and/or bar hanger holders formed of a single piece of sheet metal may be found in U.S. Application No. 63/071,440, filed on Aug. 28, 2020, entitled, "BAR HANGER ASSEMBLY WITH CROSS MEMBERS AND HOUSING ASSEMBLIES USING SAME" (hereinafter the '440 application). The contents of the aforementioned application is incorporated by reference herein in its entirety.

Although the housing 200*g* is tailored to support a lighting system, it should be appreciated that, in some implementations, the housing 200*g* may also be used as an electrical outlet box mounted to a ceiling. Specifically, the housing 200*g* may be used to contain various electrical wires and wire connections (e.g., wire splices). The bottom end 221 and the bottom opening 222 may also be covered by a cover plate 296 as shown in FIGS. 28B, 28D, and 28F. The cover plate 296 may further cover and enclose the opening formed in the ceiling, thus providing a barrier separating the various electrical wiring and components disposed inside the housing 200*g* from the environment.

As described above, the housing 200 may generally be shaped and/or dimensioned to contain a lighting module, at least a portion of a trim, and provide a sufficient volume allowance for a specific number of wires of a particular gauge in accordance with Article 314.16 of the 2020 NEC. Thus, it should be appreciated that in installations where the housing 200*g* is used as an electrical outlet box, the housing 200*g* may generally provide a volume that exceeds the requirements specified by Article 314.16 of the 2020 NEC.

Conventional electrical outlet boxes typically include one or more tabs disposed along an opening facing the environment. Each includes a fastener opening to couple a cover plate to the electrical outlet box. For the housing 200*g*, the sidewall component 220*f* does not include any tabs with openings to facilitate attachment to the cover plate 296. Instead, FIGS. 28H-28L show the housing assembly 101*f* may include the yoke 290 to mechanically couple the cover plate 296 to the housing 200*g*. As shown, the yoke 296 may include a frame 291 and a pair of arms 293 joined to the frame 291. The frame 291 may define an opening 292 and include tabs 295 that extend into the opening 292. Each tab 295 includes a fastener opening that aligns with fastener openings 297 on the cover plate 296. Fasteners 298 may thus be used to couple the cover plate 296 to the frame 291 of the yoke 290. In some implementations, the openings on the tabs 295 may be positioned and/or aligned according to industry standards to ensure compatibility with a large selection of cover plates.

Each arm 293 may further include an opening 294 that aligns with one of the openings 240 on the sidewall component 220*f*. Thus, the rod 438 of the bar hanger holder 430*c* may also extend through the opening 294 to couple the yoke 290 to the housing 200*g*. As shown in FIG. 28J, the locking nut 439*a*, when tightened, may clamp the arm 293 to the sidewall component 220*f* of the housing 200*g*, thus securing the yoke 290 and the cover plate 296 to the housing 200*g*. FIG. 28J further shows the yoke 290 may be shaped and/or dimensioned fit entirely within the cavity 210 of the housing 200*g*. In some implementations, the opening 294 may be shaped as a slot or, more generally, an elongated opening so that the yoke 290 may be pulled out from the bottom end 221 of the housing 200*g* while remaining coupled to the housing 200*g*, thus preventing accidental loss or removal of the yoke 290 from the housing 200*g*.

In a typical installation, the yoke 290 may first be placed in the cavity 210 of the housing 200*g* such that the rod 438 of each bar hanger holder 430*c* passes through the openings 294 on the pair of arms 293. The bottom surface of the frame 291 may be flush with the bottom end 221 (i.e., the bottom surface of the frame 291 and the bottom end 221 lie on the same horizontal plane) or positioned above the bottom end 221. The respective locking nuts 439*a* may then be tightened to securely couple the yoke 290 to the housing 200*g*. The cover plate 296 may then be coupled to the yoke 290 via the fasteners 298 as described above. As shown in FIG. 28J, the cover plate 296 may abut the bottom end 221 of the housing 200*g*.

The yoke 290 may generally be formed a single unitary component. For example, the yoke 290 may be formed from sheet metal. However, it should be appreciated that, in some implementations, the yoke 290 may also be formed from plastic.

The cover plate 296 may also be formed a single unitary component from metal or plastic. Additionally, the cover plate 296 shown in FIGS. 28B, 28D, and 28F is circular in shape. However, it should be appreciated the cover plate 286 may have other shapes including, but not limited to, an ellipse, a polygon (e.g., a square, a rectangle), or any combinations of the foregoing. In some implementations, the cover plate 296 may be a commercial-off-the-shelf component that the installer can purchase and install according to their desired preferences.

FIGS. 29A-29G show another exemplary housing assembly 101*g* for a new construction installation. As shown, the housing assembly 101*g* may include a housing 200*h* and a bar hanger assembly 400*d* of the housing assembly 101*f*.

Figure 29A:
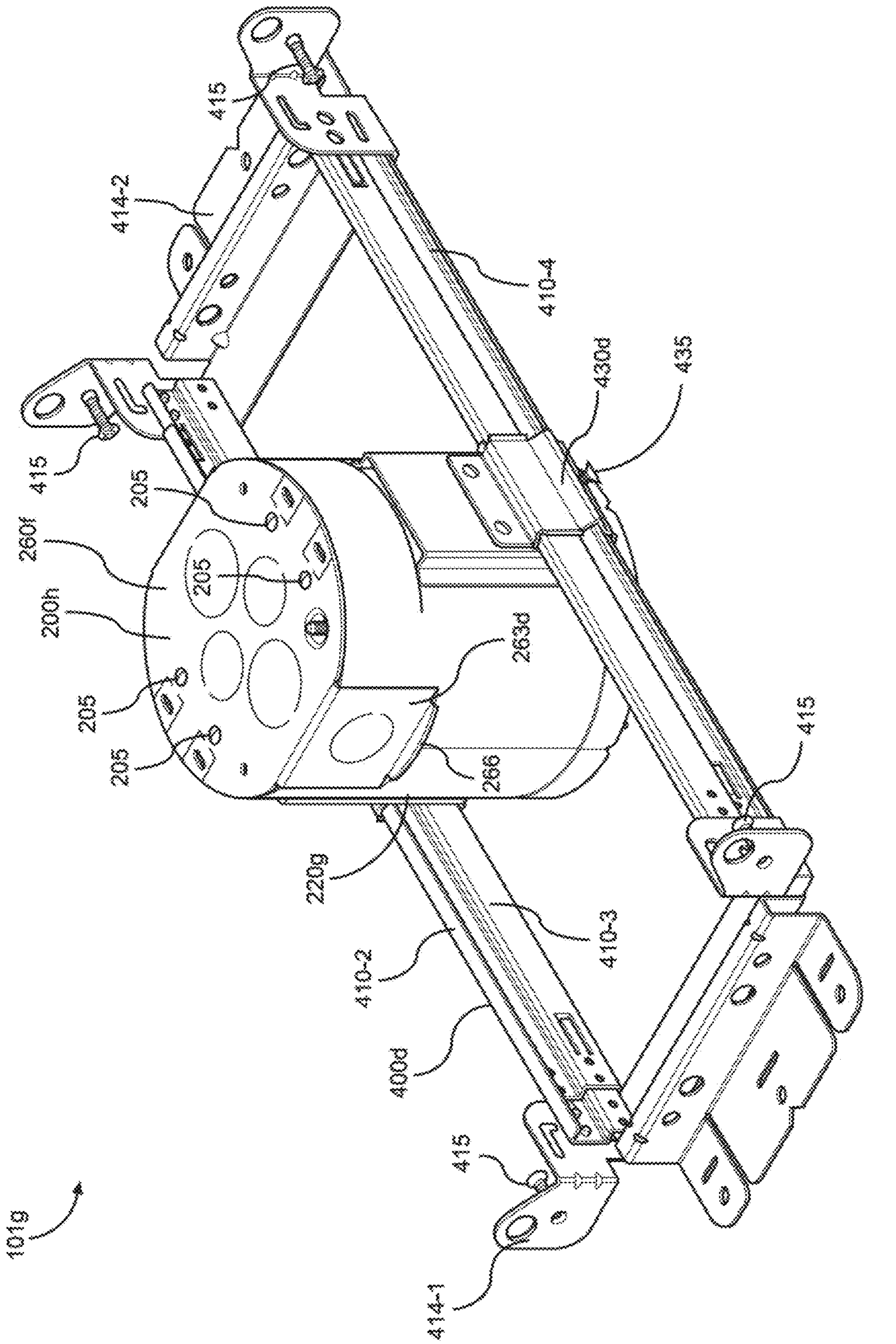
FIG. 29A shows a top, front, right perspective view of another exemplary housing assembly that includes a housing with a single sidewall component for a new construction installation.
Figure 29B:
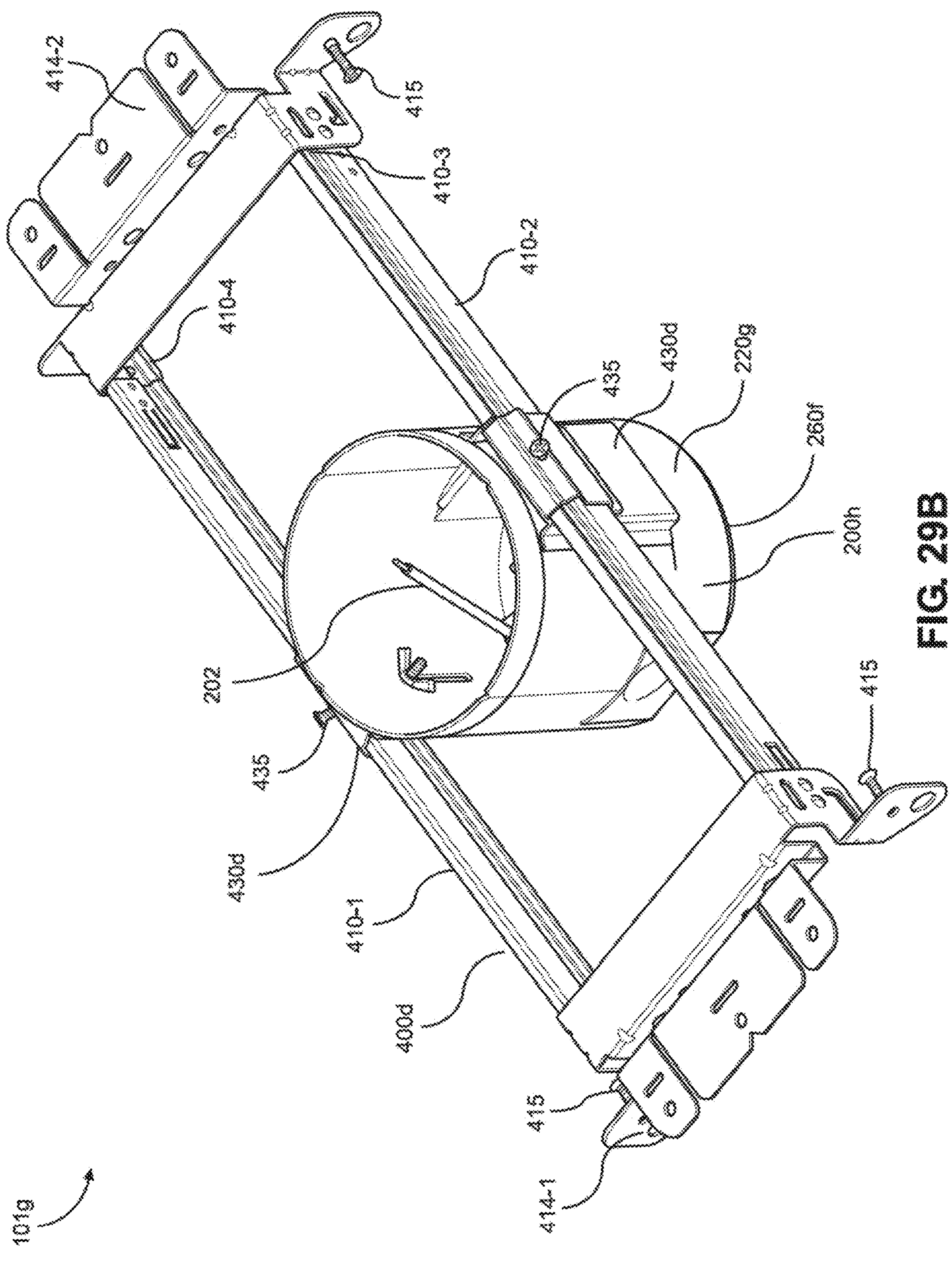
FIG. 29B shows a bottom, front, left perspective view of the housing assembly of FIG. 29A.
Figure 29C:
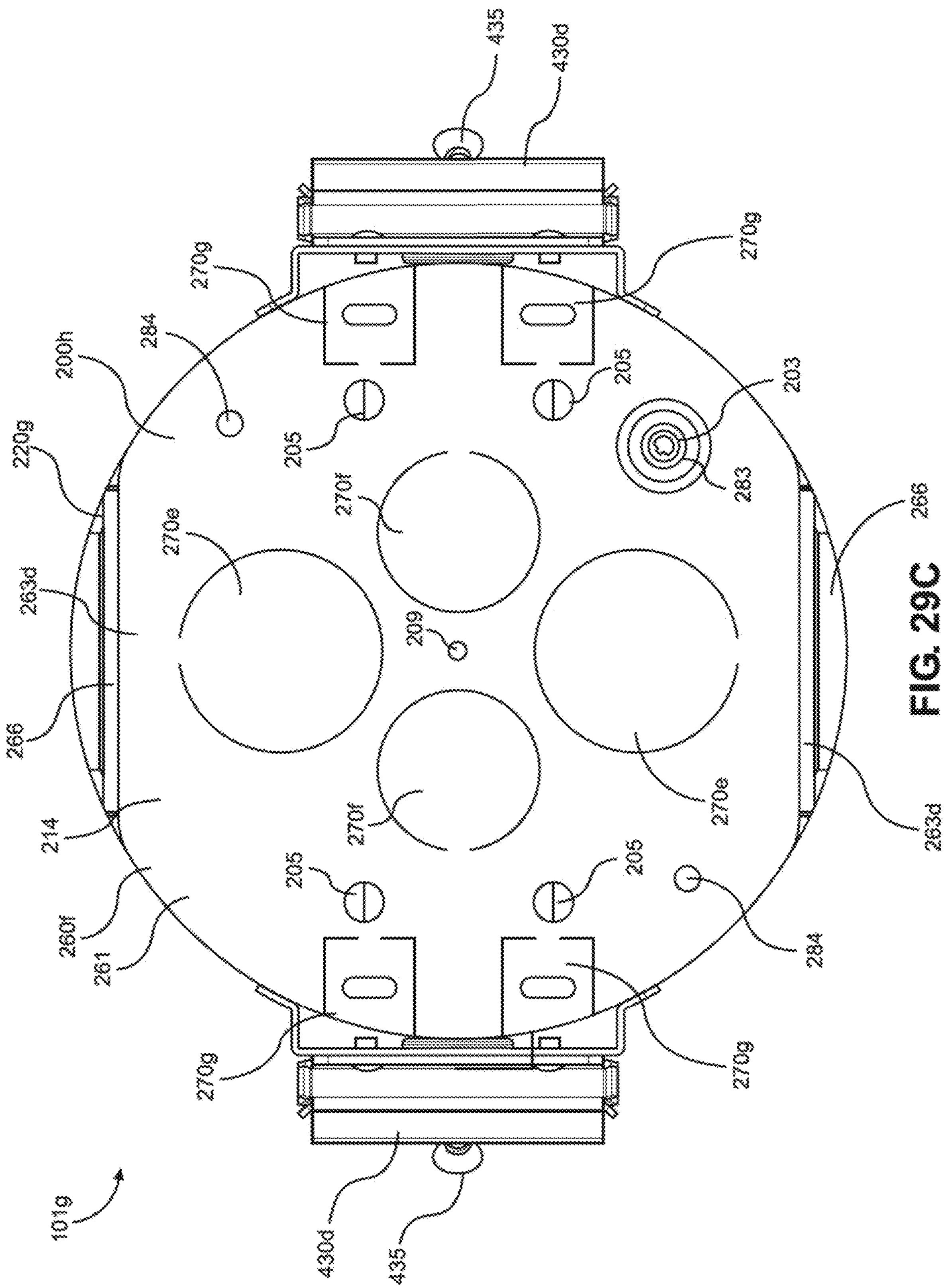
FIG. 29C shows a top view of the housing assembly of FIG. 29A with the bar hanger assembly removed.
Figure 29D:
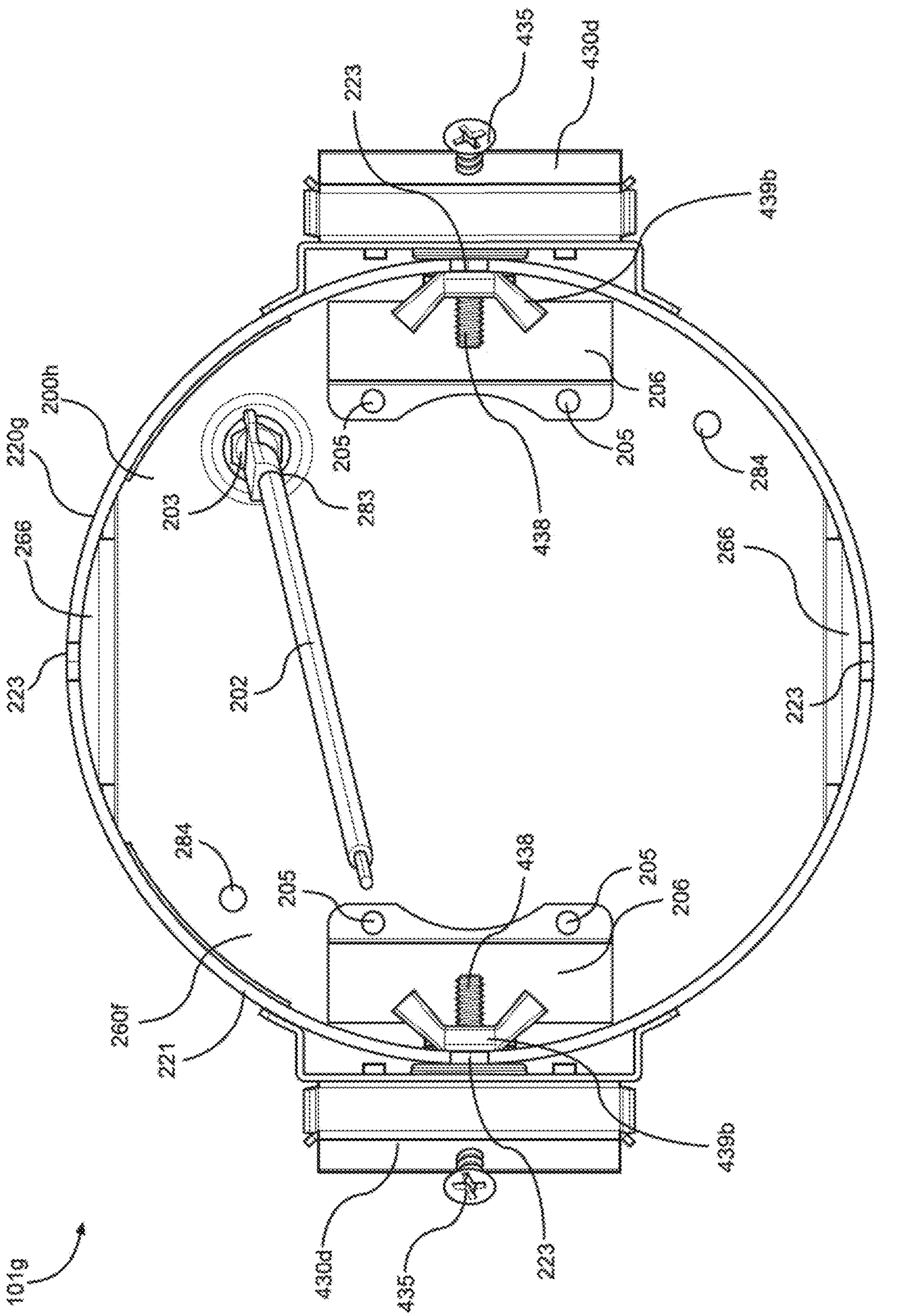
FIG. 29D shows a bottom view of the housing assembly of FIG. 29C.
Figure 29E:
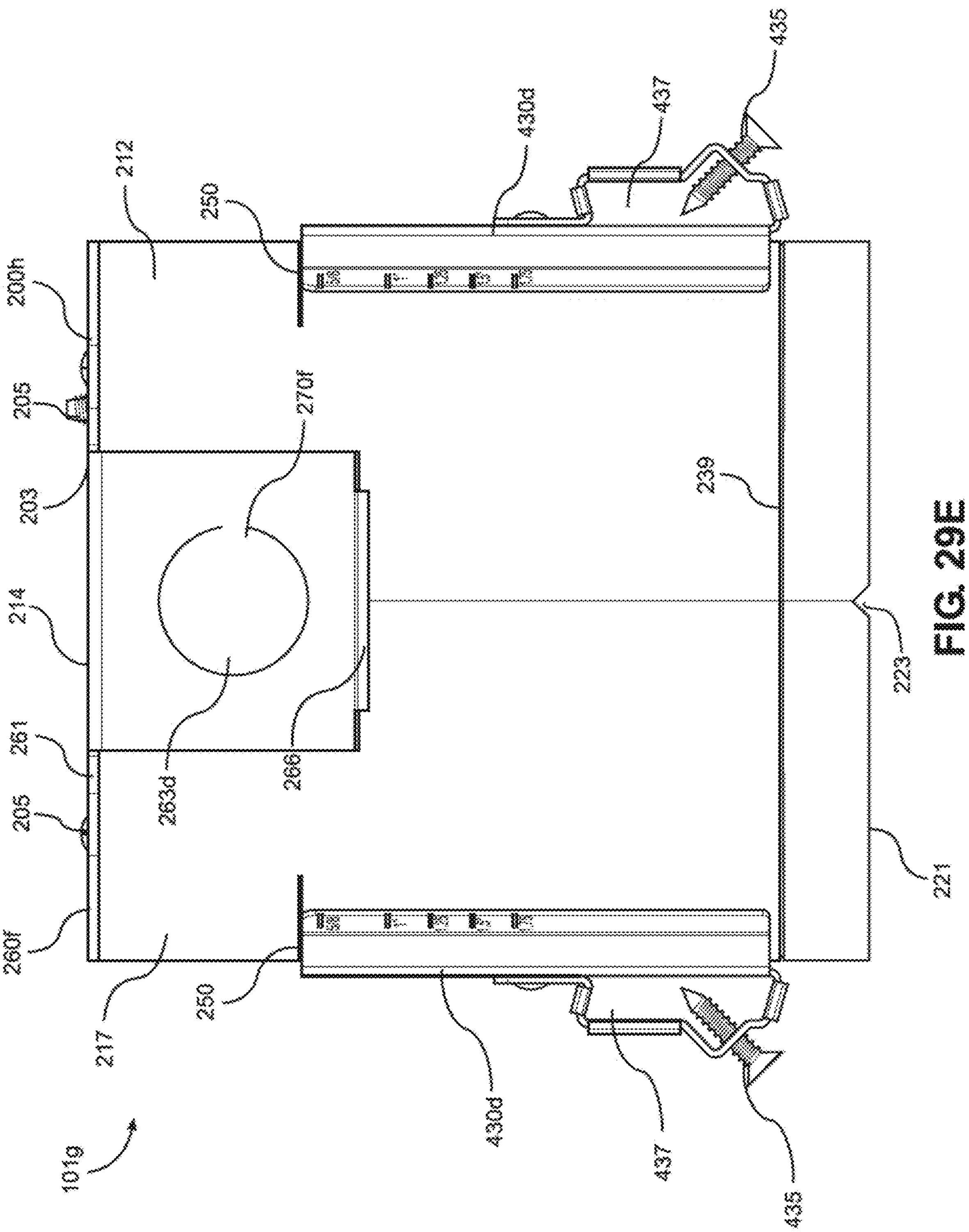
FIG. 29E shows a front view of the housing assembly of FIG. 29C.
Figure 29F:
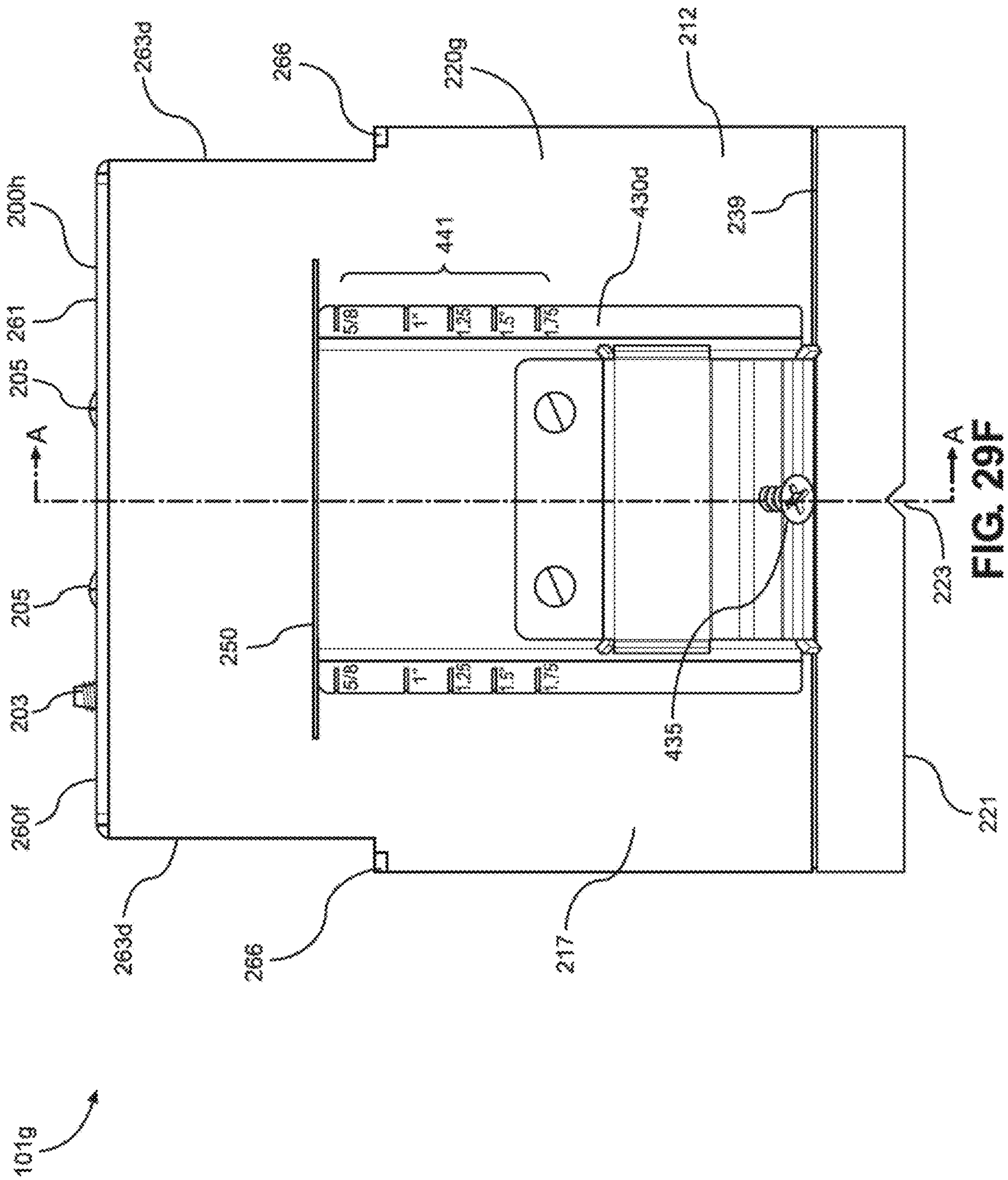
FIG. 29F shows a right-side view of the housing assembly of FIG. 29C.
Figure 29G:
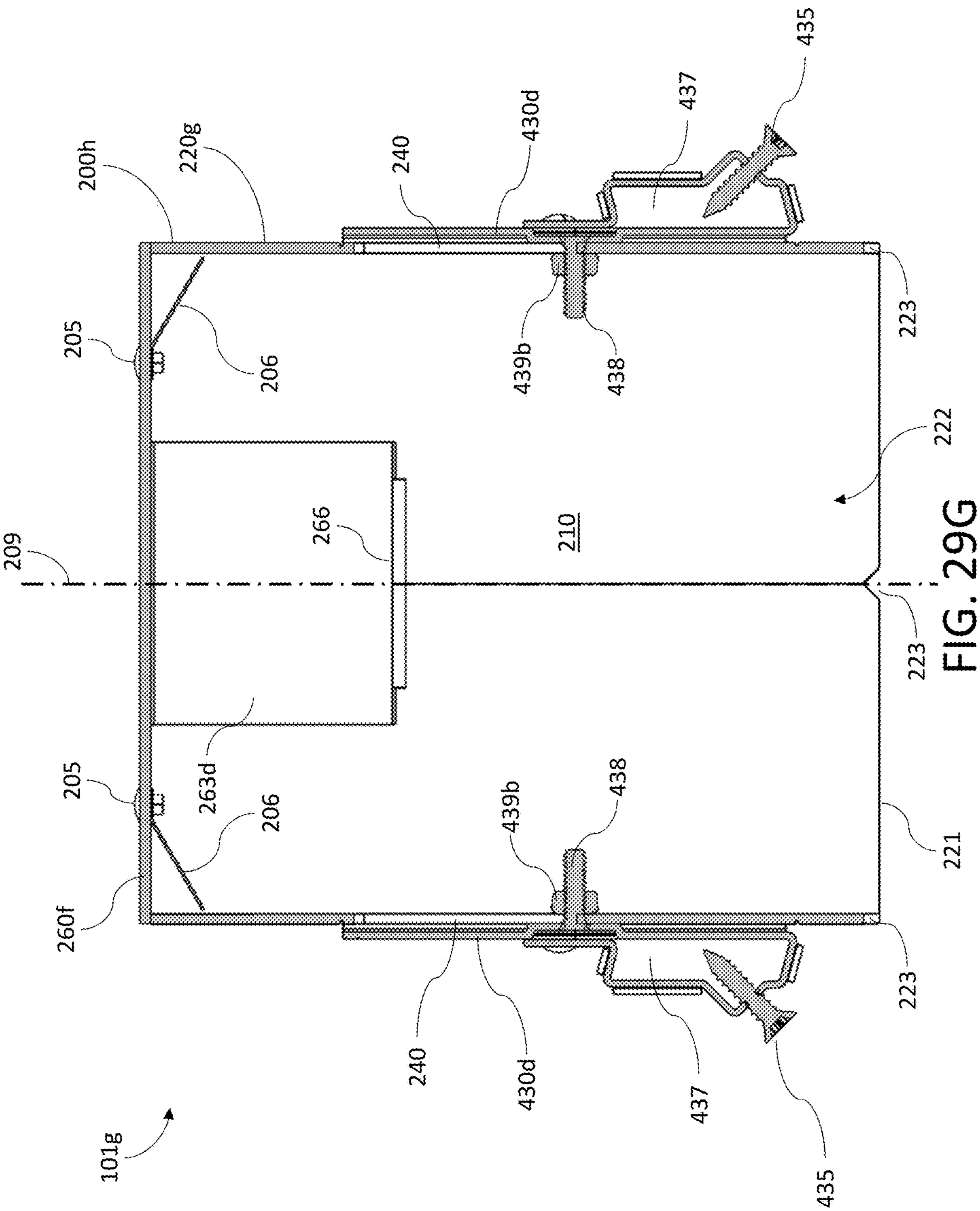
FIG. 29G shows a cross-sectional front view of the housing assembly of FIG. 29C corresponding to the plane A-A of FIG. 29F.

Specifically, the housing 200*h* may include a single sidewall component 220*g* and a top component 260*f*. The sidewall component 220*g* may be a variant of the sidewall component 200*f* that additionally includes multiple notches 223 disposed along the bottom end 221. In some implementations, the notches 1114 may be triangular in shape. The notches 223 may be arranged in pairs that are disposed diametrically opposite from one another along the bottom end 221. For example, FIG. 29D shows two pairs of notches 223 that divide the bottom end 221 into substantially equal or equal quadrants.

The notches 223 may be arranged in this manner to facilitate alignment of the housing assembly 200*h* to the various support structures and/or other housing assemblies in the environment during installation. For example, multiple housing assemblies 101*g* may be installed in an environment and arranged in a row. In order to align the housings 200*h* of the housing assemblies 101*g*, a laser guide may be used to provide a laser beam that defines an alignment axis. The alignment axis may be based on the desired location of the housings 200*h* in the environment or may be used to locate an axis of one housing assembly 101*g* that is already installed in the environment. When installing the housing assemblies 101*g*, the position of each housing 200*h* may be adjusted such that the laser beam passes through a respective pair of notches 223. In this manner, the housings 200*h* may be aligned along a common axis within the environment.

The top component 260*f* may include features from both the top component 260*e* of the housing 200*g* and the top component 260*d* of the housing 200*d*. Specifically, the top component 260*f* may include the base section 261 of the top component 260*d* with the circular knockouts 270*e* and 270*f*, the Romex knockouts 270*g*, the retainers 206, the ground connection feature 283, and the openings 284. The top component 260*f* may further include the knockout tabs 263*d* of the top component 260*e*, which each include the knockout 270*f* and the end portion 266.

The bar hanger assembly 400*d* may also include the bar hangers 410 and the crossmembers 414 of the bar hanger assembly 400*c*. The bar hanger holder 430*d* may also include several of the same features as the bar hanger holder 430*c* with the addition of alignment marks 441 to aid the installer in adjusting the position of the housing 200*h* relative to the bar hanger holders 430*d* during installation. The bar hanger holder 430*d* may also include a wing nut 439*b* disposed within the cavity 210 of the housing 200*h* to lock the housing 200*h* to the bar hanger holders 430*d* from within the cavity 210.

A Round-Shaped Housing With Deep-Drawn Components

FIGS. 30A-30I show yet another exemplary housing 200*i* assembled using a top component 260*g* and a bottom component 220*h*. Similar to the housings 200*b*-200*h*, the top component 260*g* may provide several flat sections to support one or more knockouts while the bottom component 220*h* may define a round shape and, in particular, a round bottom end 221 disposed near or within an opening formed in a ceiling. In this implementation, however, the top component 260*g* may include a base section 261 and a sidewall 269 that defines an upper cavity 215 and the bottom component 220*h* may include a curved portion 217 that surrounds and defines a lower cavity 216.

For the purposes of defining the sidewall 212 and the base end 214, the sidewall 269 of the top component 260*g* and the bottom component 220*h* may together define the sidewall 212 and the top component 260*g* may define the base end 214 of the housing 200*i*. This arrangement may allow for a more complex-shaped sidewall 212 while still separating the various cable routing structural features and the curved shape between the top component 260*g* and the bottom component 220*h* for ease of manufacture. For example, the sidewall 269 of the top component 260*g* may be shaped such that the cross-section is a round square (i.e., four straight sections separated by four curved sections) while the curved portion 217 of the bottom component 220*h* may be shaped such that the cross-section is a circle. This may be accomplished, in part, by forming the top component 260*g* and the bottom component 220*h* using a deep drawing process.

Figure 30A:
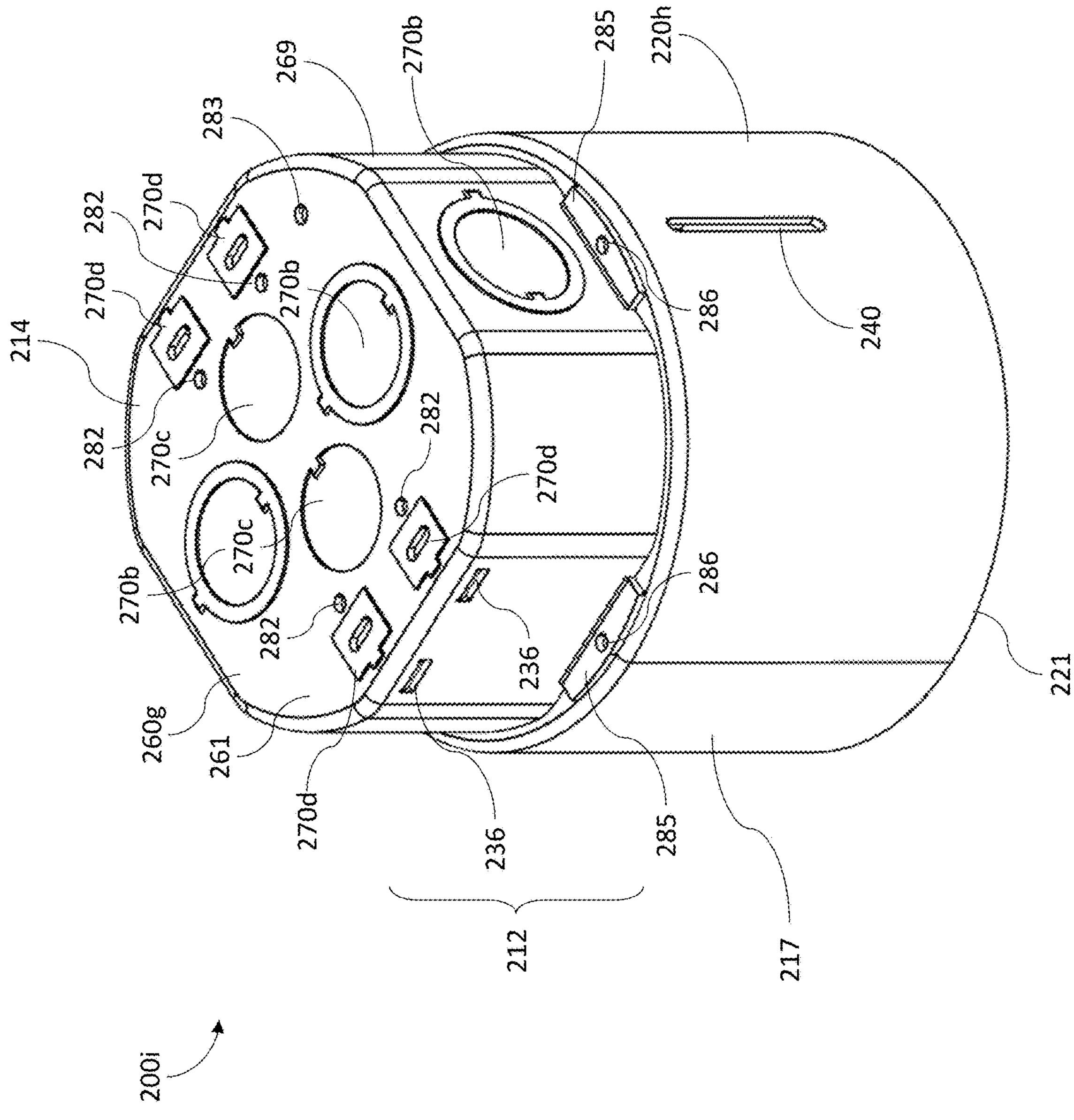
FIG. 30A shows a top, front, left perspective view of an exemplary housing assembly with two deep-drawn components.
Figure 30B:
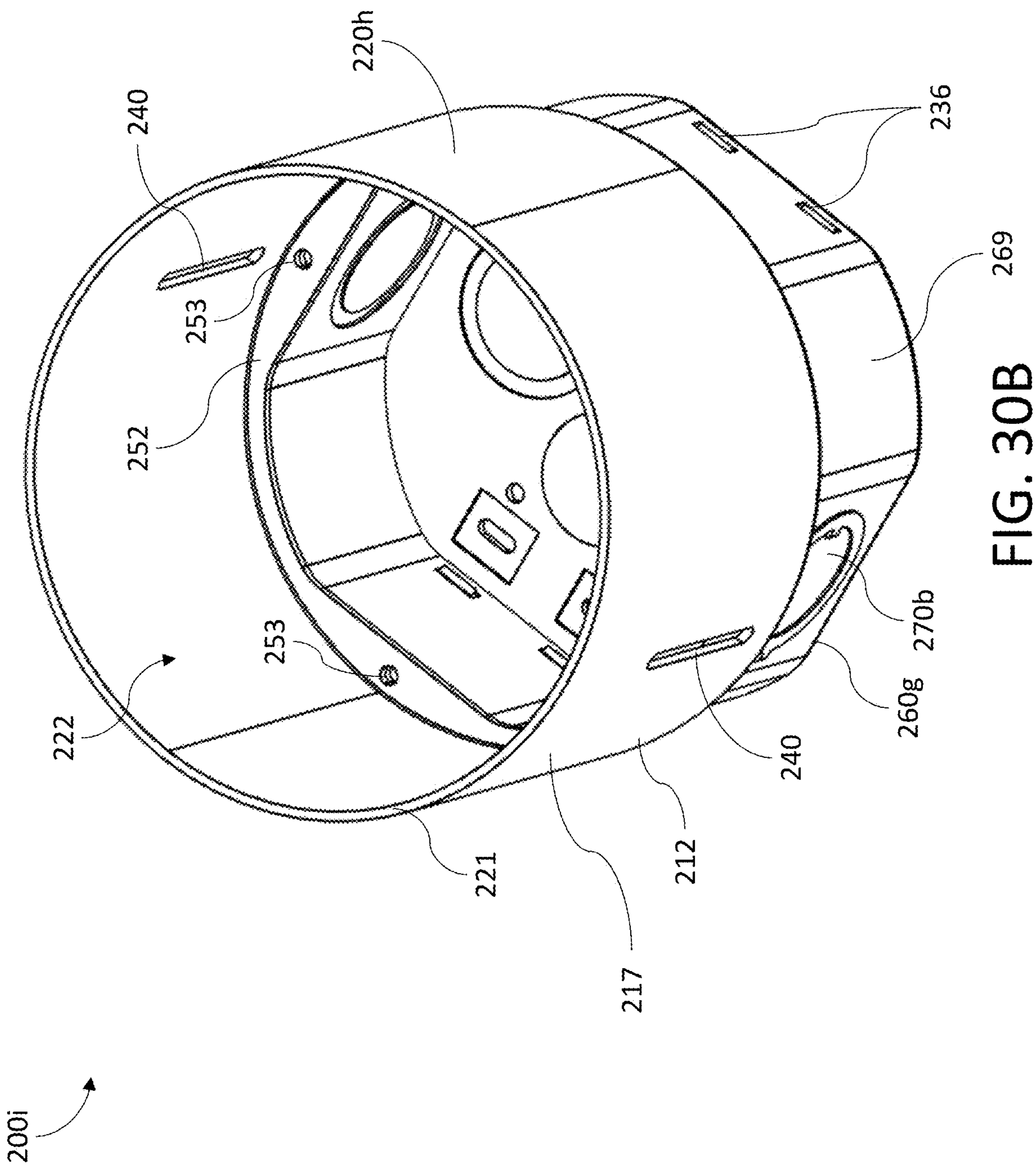
FIG. 30B shows a bottom, rear, right perspective view of the housing assembly of FIG. 30A.
Figure 30C:
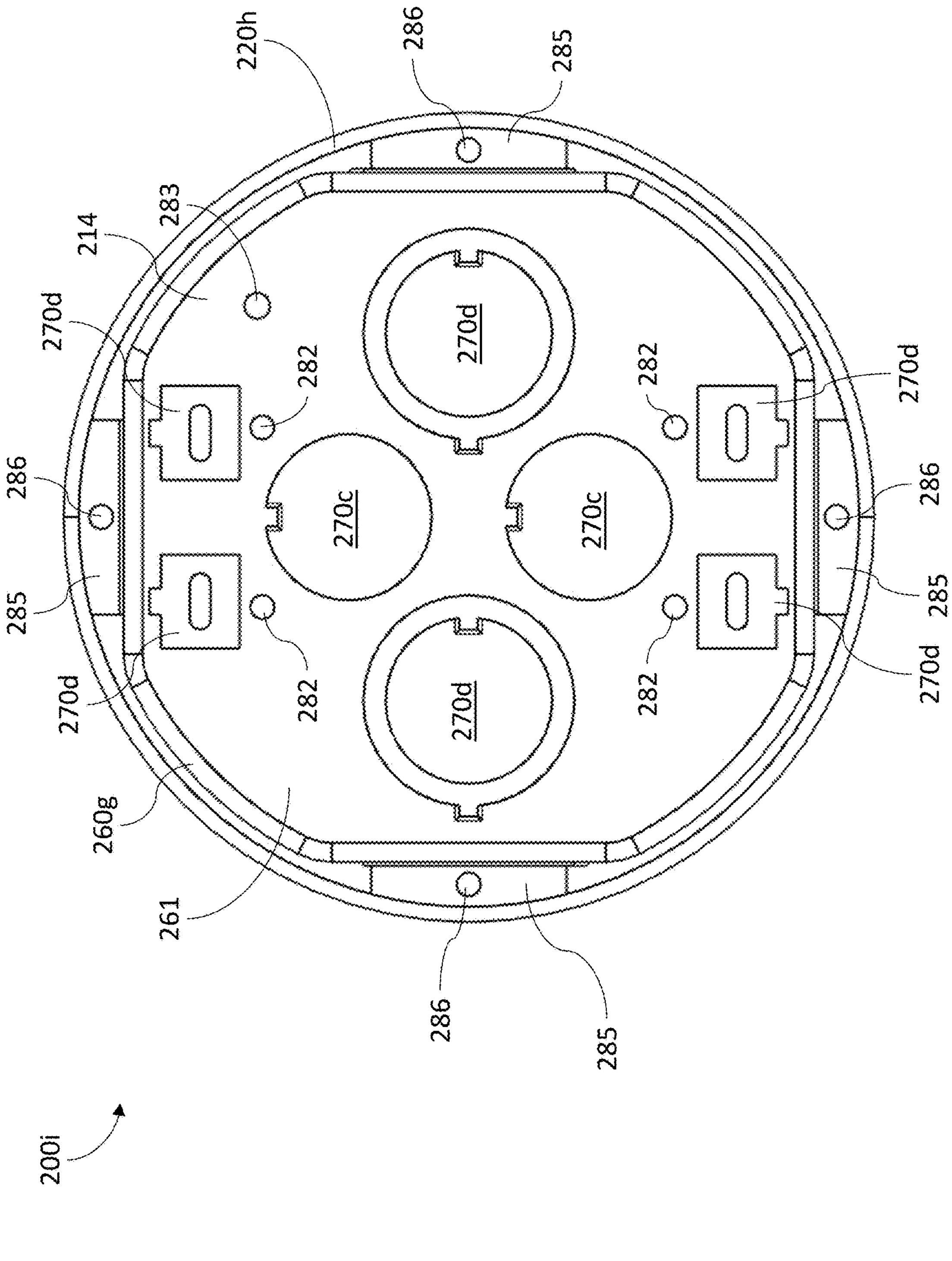
FIG. 30C shows a top view of the housing assembly of FIG. 30A.
Figure 30D:
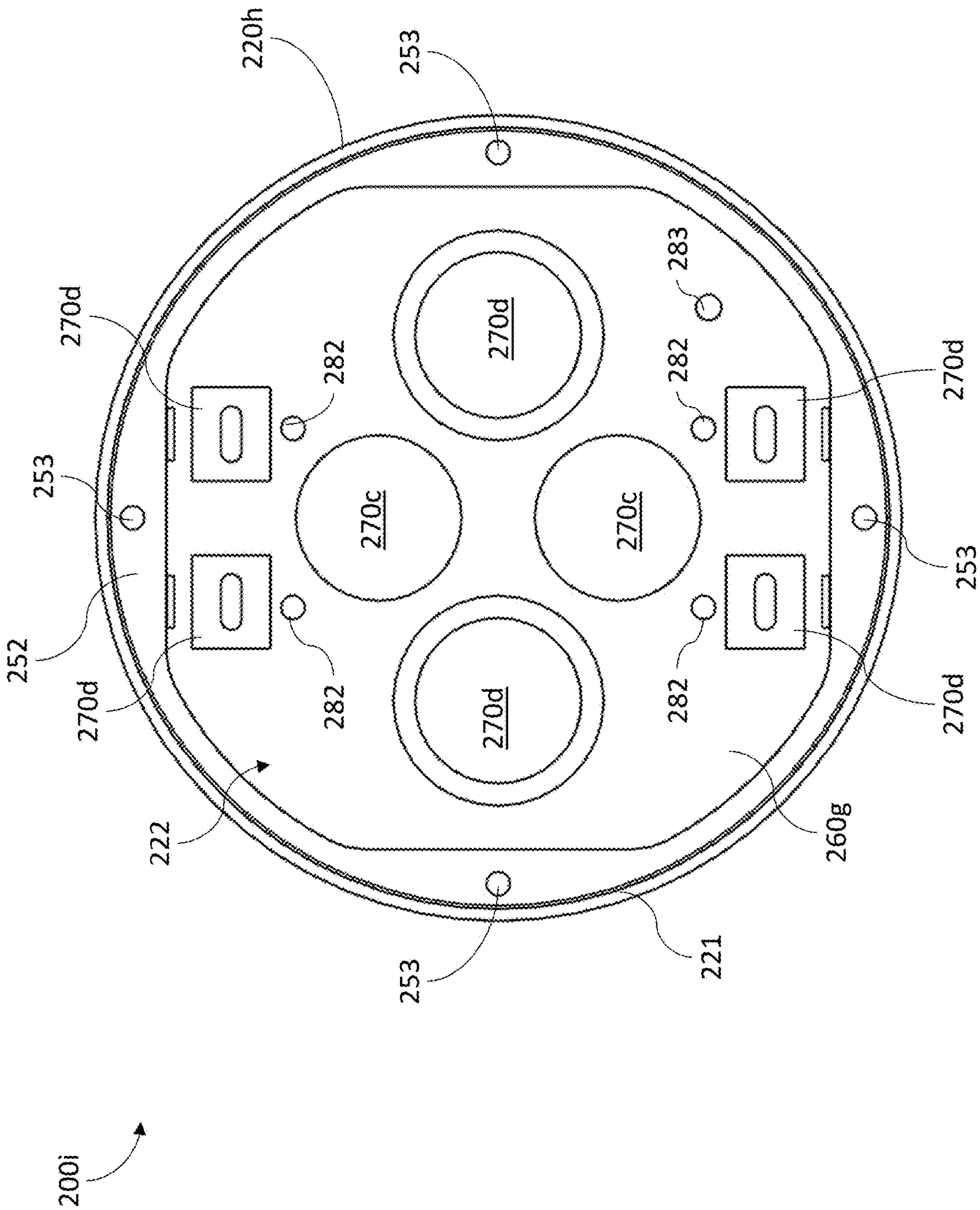
FIG. 30D shows a bottom view of the housing assembly of FIG. 30A.
Figure 30E:
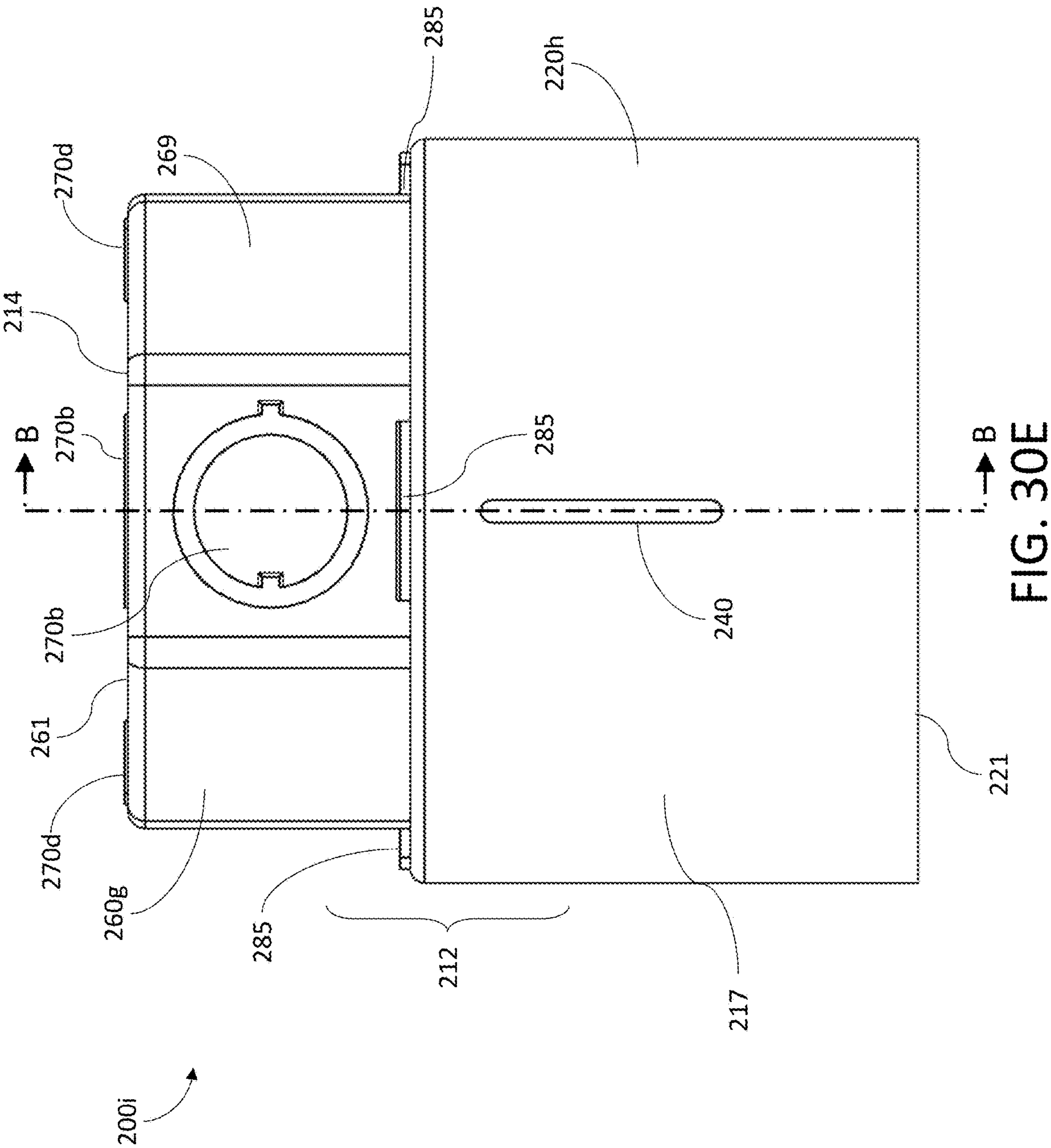
FIG. 30E shows a front view of the housing assembly of FIG. 30A.
Figure 30F:
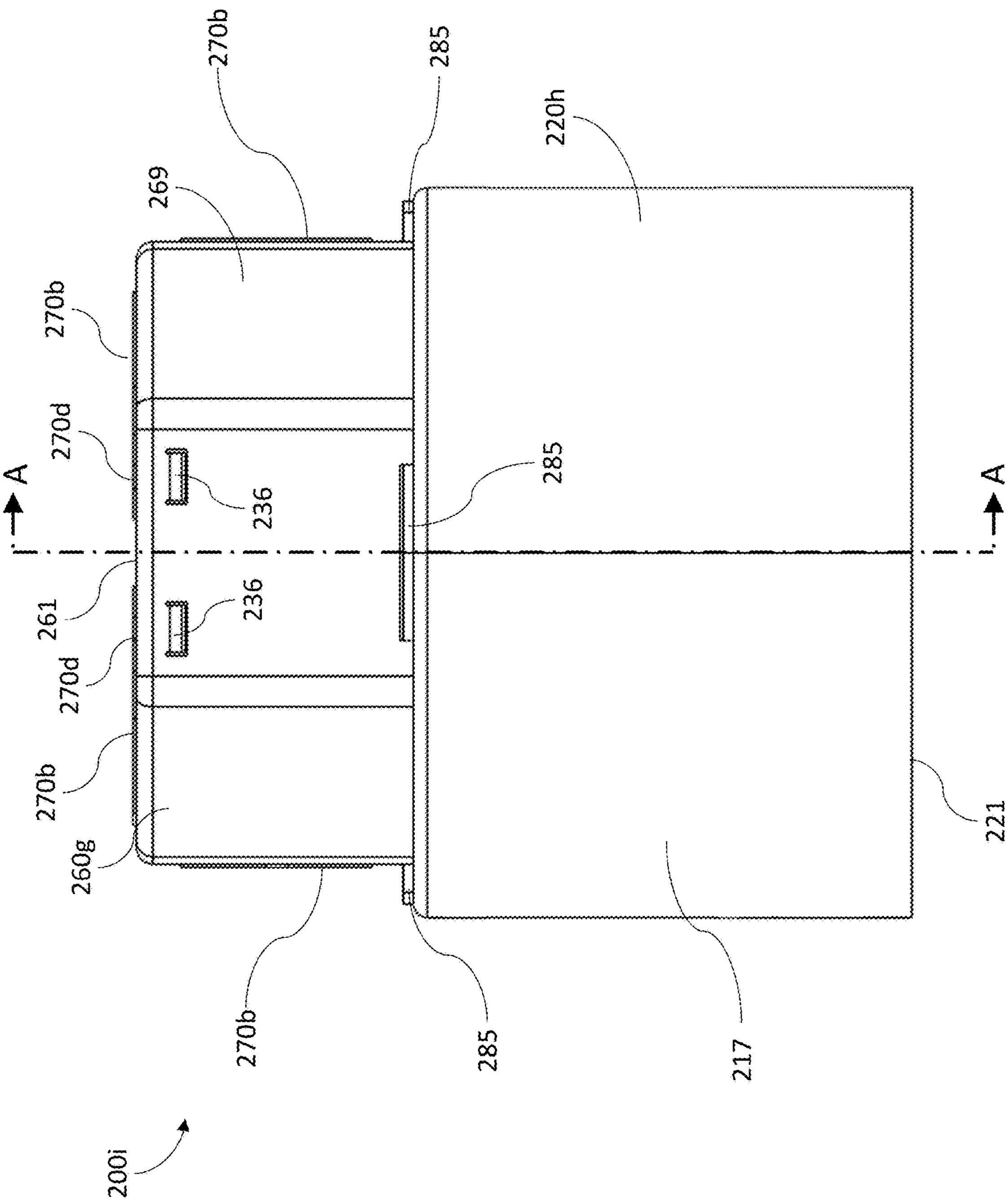
FIG. 30F shows a right-side view of the housing assembly of FIG. 30A.
Figure 30G:
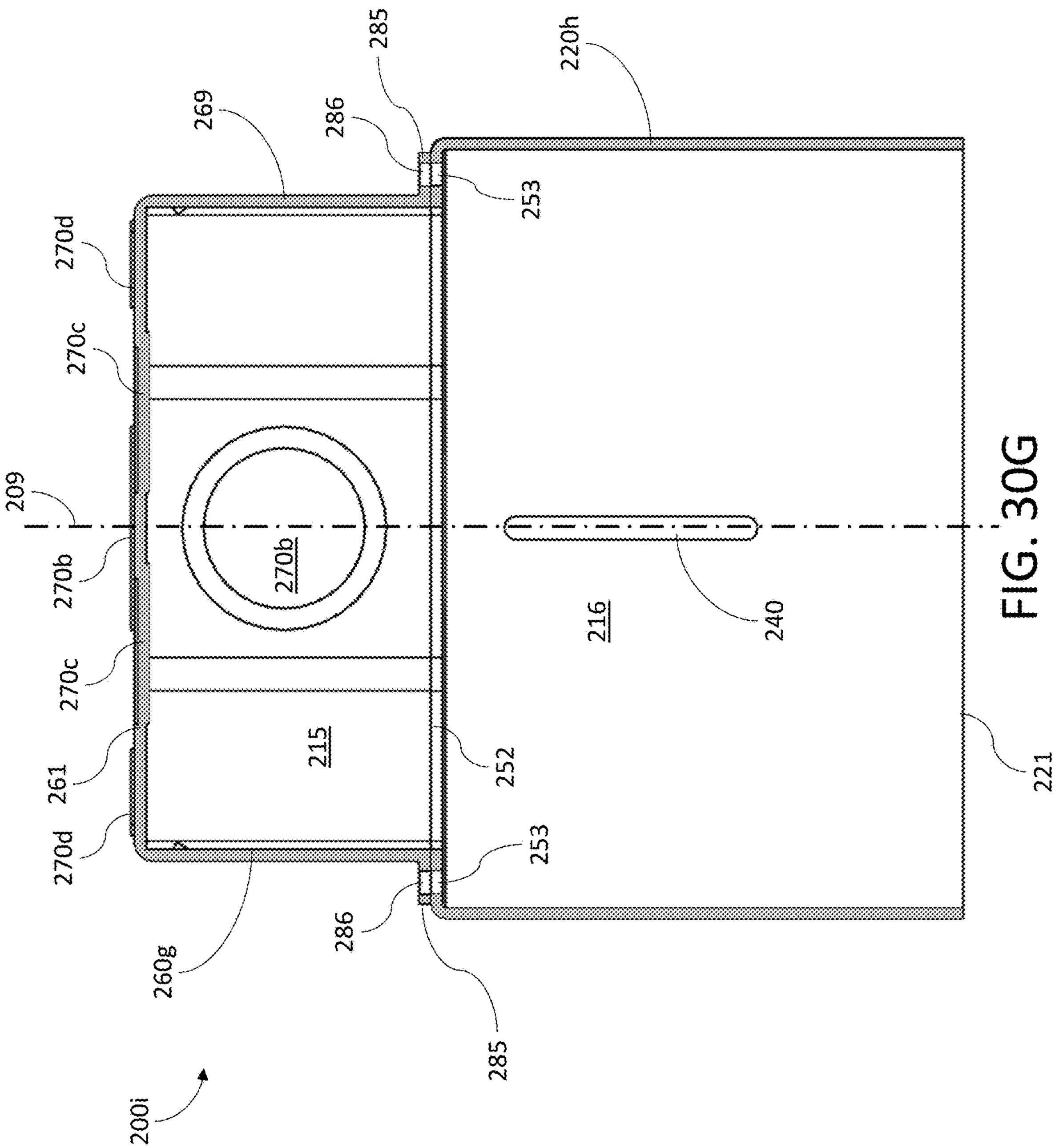
FIG. 30G shows a cross-sectional front view of the housing assembly corresponding to the plane A-A of FIG. 30F.
Figure 30H:
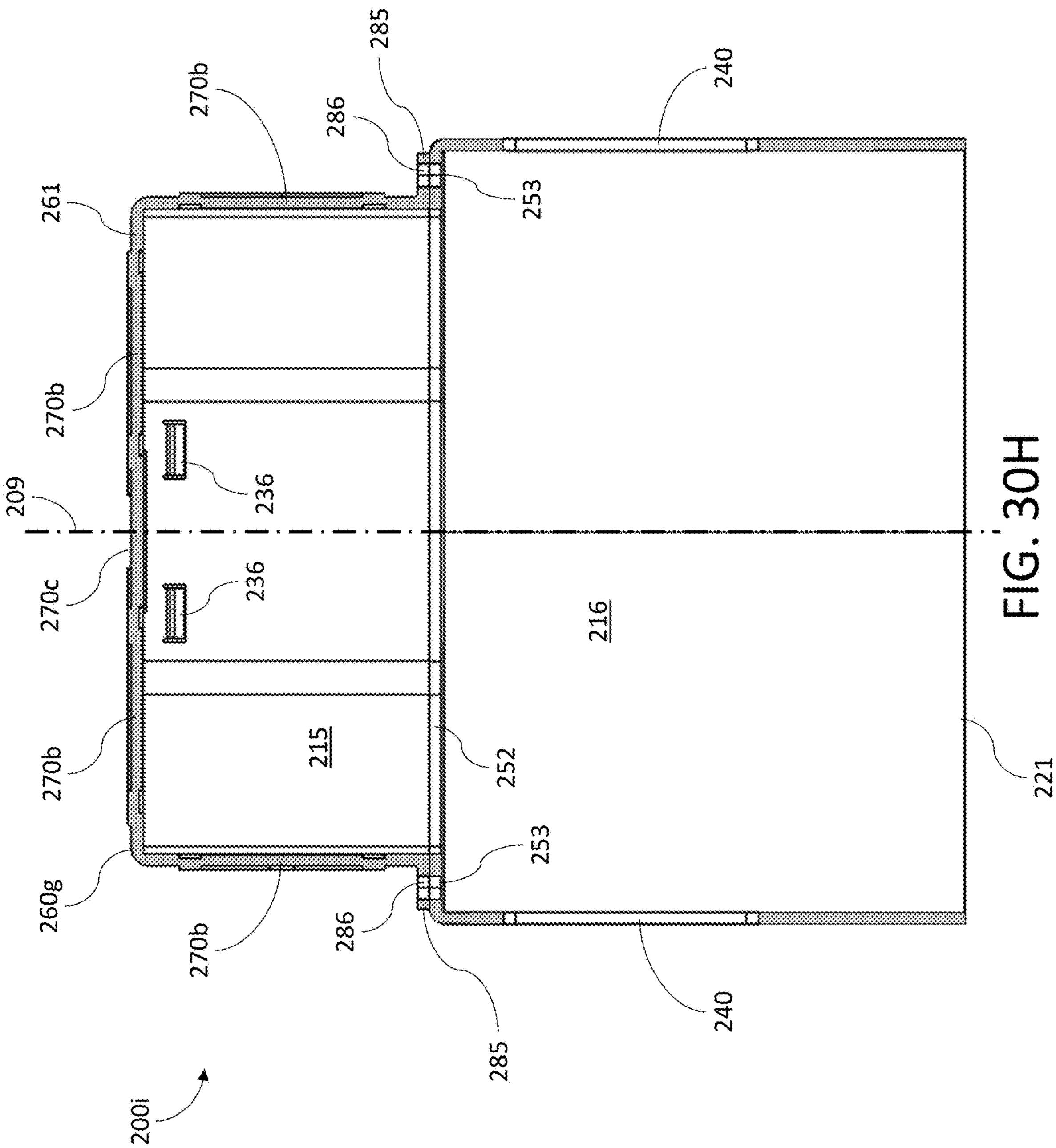
FIG. 30H shows a cross-sectional right-side view of the housing assembly corresponding to the plane B-B of FIG. 30E.

As shown in FIGS. 30G and 30H, the upper cavity 215 may be disposed directly above and adjoin the lower cavity 216. In some implementations, the top component 260*g* may be shaped and/or dimensioned to provide a cavity 215 with a volume allowance that complies with Article 314.16 of the 2020 NEC. The bottom component 220*h* may be shaped and/or dimensioned to provide a cavity 216 that is sufficiently large to contain a lighting module, at least a portion of a trim, and any wires and/or wiring connections with wires and/or cables inserted into the housing 200*i* (e.g., the cable 96 from the external power supply system).

Figure 30I:
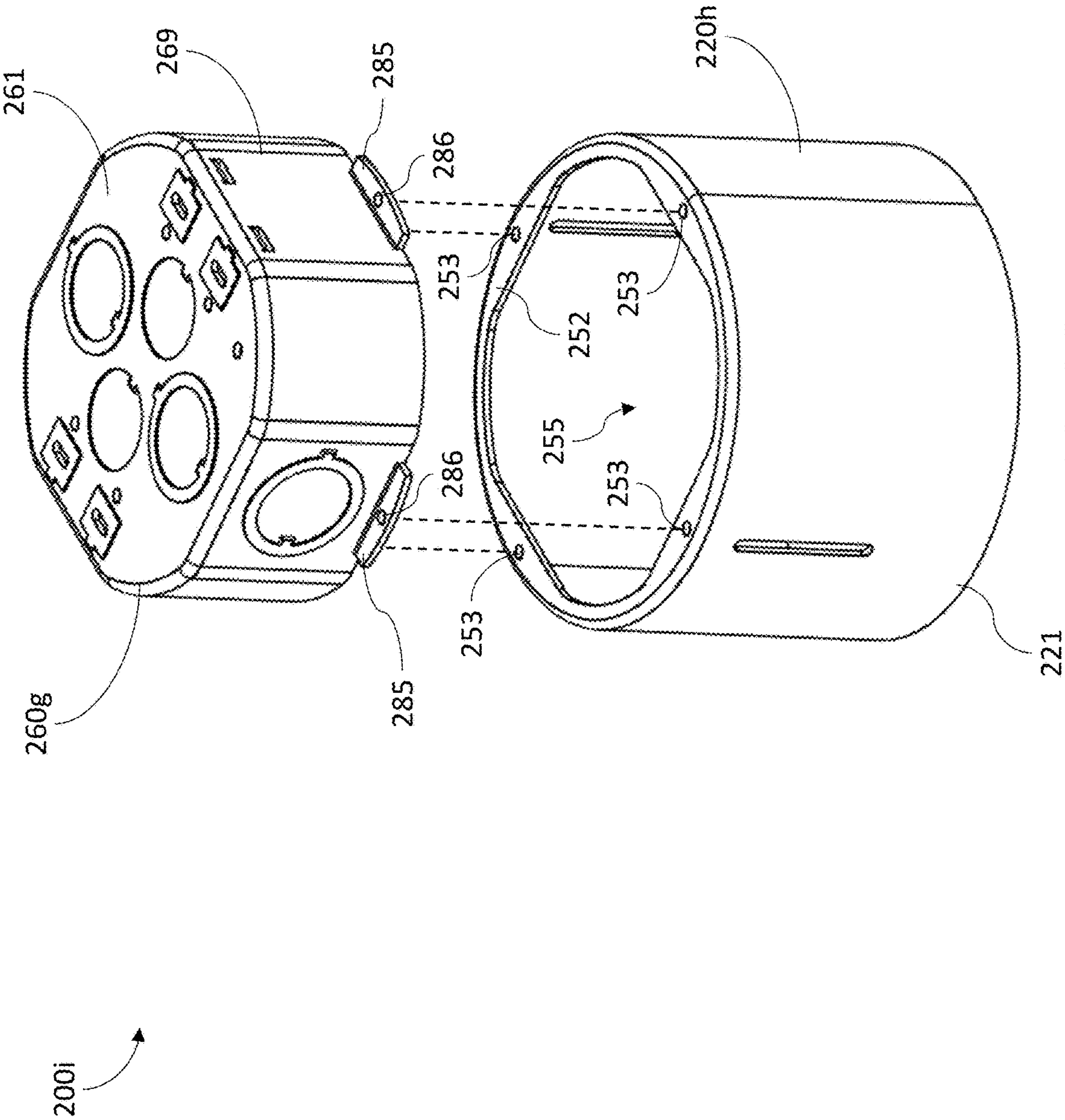
FIG. 30I shows an exploded top, front, right perspective view of the housing assembly of FIG. 30A.

FIG. 30I shows the bottom component 220*h* may further include a flange 252 formed along the top end of the bottom component 220*h* that defines a top opening 255 so that the upper cavity 215 may be accessible from the lower cavity 216. As shown, the flange 252 may include multiple fastener openings 253 that align with fastener openings 286 of the top component 260*g* to facilitate attachment of the top component 260*g* to the bottom component 220*h* via corresponding fasteners (not shown). The bottom component 220*h* may further include a pair of elongated openings 240 to facilitate attachment of a bar hanger assembly (e.g., the bar hanger assemblies 400*a*-400*d*) to the housing 200*i* for a new construction installation. However, it should be appreciated that, in some implementations, the bottom component 220*h* may instead include various openings to facilitate attachment to a spring clip assembly (e.g., the spring clip assemblies 500*a*-500*c*).

FIGS. 30A and 30C show the base section 261 may support multiple circular knockouts 270*b* and 270*c* and multiple Romex knockouts 270*d*. The base section 261 may further include openings 282 to support retainers (not shown) to clamp wires and/or cables inserted through openings formed by the removal of the Romex knockouts 270*d*. Additionally, the base section 261 may include a ground connection feature 283, which is shown as an opening, to couple a ground cable (not shown) to the top component 260*g* via a fastener (not shown). The sidewall 269, as described above, may include multiple flat sections that supporting either one knockout 270*b* or a pair of slots 236 for the Romex knockouts 270*d* on the base section 261. In some implementations, the sidewall 269 may include a pair of knockouts 270*b* disposed on opposing sides. In some implementations, the sidewall 269 may also include two pairs of slots 236 disposed on opposing sides.

The bottom end of the sidewall 269 may further include tabs 285 that define the fastener openings 286 for attachment with the bottom component 220*h*. As shown in FIGS. 30E and 30F, the tabs 285 may abut the flange 252 after assembly. It should be appreciated that, in some implementations, the bottom end of the sidewall 269 may be welded to the flange 252. Thus, the top component 260*g* may not include the tabs 285 with the fastener openings 286 and the flange 252 of the bottom component 220*h* may not include the openings 253.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A housing for a lighting system, the housing comprising:

a sidewall that defines at least a portion of a cavity, the sidewall comprising:

a top end; and a bottom end, disposed opposite to the top end, defining a bottom opening into the cavity; and a top component, coupled to the sidewall such that the top component is permanently affixed to the sidewall, having one or more knockouts, the top component comprising:

a base section, abutting at least a portion of the top end of the sidewall, to cover the top end, the base section being flat in shape with an outer edge aligned with an exterior edge of the top end;

a first tab extending from the base section; and a second tab extending from the base section, wherein:

at least a portion of the sidewall has a curved shape;

a bottom portion of the cavity proximate to the bottom opening has a first cross-sectional shape that is circular;

a top exterior portion of the housing proximate to the top end has a second cross-sectional shape comprising a circular section corresponding to the sidewall, a first straight section corresponding to the first tab, and a second straight section corresponding to the second tab; and each of the sidewall and the top component is formed from steel.

2. The housing of claim 1, wherein the cavity has a volume that ranges between 30 cubic inches and 80 cubic inches.

3. The housing of claim 1, wherein the sidewall is shaped as a cylindrical tube with a uniform sidewall thickness.

4. The housing of claim 1, wherein each of the sidewall and the top component have a uniform thickness that ranges between about 0.6 mm and about 2.0 mm.

5. The housing of claim 1, wherein:

the sidewall has no flat section;

the top end of the sidewall further defines a notch that extends from the top end towards the bottom end, the notch being substantially covered by the first tab of the top component;

the first tab is flat in shape such that a gap is formed between the first tab and the sidewall; and the top component further comprises a first end portion, extending from the first tab, to cover the gap.

6. The housing of claim 1, wherein:

the first and second tabs of the top component do not include a knockout; and the sidewall of the housing further comprises a plurality of openings disposed around the sidewall.

7. A housing assembly, comprising:

the housing of claim 6;

a mounting ring, comprising:

a collar coupled to the sidewall of the housing; and a flange, joined to the collar and disposed around the sidewall of the housing, to physically contact a bottom surface of a ceiling when the housing assembly is installed in the ceiling, the flange having a bottom surface that is one of aligned with the bottom end of the housing or disposed below the bottom end of the housing; and a plurality of spring clips, each spring clip of the plurality of spring clips comprising:

a bent section coupled to the collar of the mounting ring and disposed outside the housing; and an actuator mechanism directly coupled to the bent section and partially inserted through a corresponding opening of the plurality of openings of the housing, the actuator mechanism being actuated from within the cavity of the housing, wherein when the housing assembly is disposed in the ceiling and the actuator mechanism is actuated, the bent section deflects in an outwards direction causing a portion of the bent section to physically contact a top surface of the ceiling such that the portion of the bent section and the flange of the mounting ring together securely couples the housing assembly to the ceiling.

8. The housing assembly of claim 7, wherein:

each opening of the plurality of openings is a T-shaped opening comprising:

a wide portion; and a narrow portion disposed directly above the wide portion; and the actuator mechanism of each spring clip of the plurality of spring clips comprises:

a push flange joined to the bent section, the push flange comprising:

a wide section passing through the wide portion of the corresponding opening when the actuator mechanism is not actuated; and a pair of notches, disposed within the cavity when the actuator mechanism is not actuated, defining a narrow section; and a handle joined to the push flange and disposed inside the cavity of the housing, wherein:

the actuator mechanism is actuated by pushing the handle in the outwards direction to displace the wide section of the push flange through the wide portion of the corresponding opening so as to deflect the bent section in the outwards direction; and when the push flange is sufficiently displaced through the corresponding opening such that the narrow section of the push flange is disposed in the corresponding opening, the narrow section of the push flange is moved from the wide portion to the narrow portion of the corresponding opening, the pair of notches thereafter preventing further displacement of the push flange thereby locking the bent section in place.

9. The housing assembly of claim 7, wherein the housing assembly is installable in a ceiling having a thickness that ranges between ⅜ inches and 1-¼ inches.

10. The housing of claim 1, wherein:

at least one of the first or second tabs of the top component of the housing includes a knockout; and the sidewall of the housing further comprises a first opening and a second opening disposed diametrically opposite to the first opening.

11. A housing assembly, comprising:

the housing of claim 10; and a bar hanger assembly, coupled to the housing, to securely couple the housing assembly to a support structure comprising at least one of a wood joist, a metal joist, a T-bar, or a hat channel, the bar hanger assembly comprising:

a first bar hanger holder coupled to the first opening;

a first pair of bar hangers slidably coupled to the first bar hanger holder;

a second bar hanger holder coupled to the second opening; and a second pair of bar hangers slidably coupled to the second bar hanger holder.

12. A housing for a lighting system, the housing comprising:

a sidewall component forming a portion of a sidewall of the housing, the sidewall component being shaped as a cylindrical tube and providing no flat section along any exterior portion or interior portion of the sidewall, the sidewall component comprising:

a first end defining a first opening; and a second end, disposed opposite to the first end, defining a second opening and a first notch that extends from the second opening towards the first end; and a top component coupled to the sidewall component, the top component comprising:

a base section, abutting at least a portion of the second end of the sidewall component, to substantially cover the second opening, the base section being flat in shape;

a first tab, extending from the base section, to substantially cover the first notch, the first tab being flat in shape such that a first gap is formed between the first tab and the sidewall component; and a first end portion, extending from the first tab, to cover the first gap, wherein each of the sidewall component and the top component is formed as a single metallic component.

13. The housing of claim 12, wherein each of the sidewall component and the top component have a uniform thickness that ranges between about 0.6 mm and about 2.0 mm.

14. The housing of claim 12, wherein each of the sidewall component and the top component is formed from galvanized steel.

15. The housing of claim 12, wherein:

the second end of the sidewall component further defines a second notch that extends from the second opening towards the first end, the second notch being disposed diametrically opposite to the first notch; and the top component further comprises:

a second tab, extending from the base section, to substantially cover the second notch, the second tab being flat in shape such that a second gap is formed between the second tab and the sidewall component; and a second end portion, extending from the second tab, to cover the second gap.

16. The housing of claim 12, wherein the top component further comprises at least one of:

at least one circular knockout disposed on at least one of the base section or the first tab;

at least one Romex knockout disposed on the base section; or a ground cable opening disposed on the base section, to receive a fastener to connect a ground cable to the housing.

17. The housing of claim 12, wherein the sidewall component of the housing further comprises:

a plurality of T-shaped openings disposed around the sidewall component, each T-shaped opening of the plurality of T-shaped openings comprising:

a wide portion; and a narrow portion disposed directly above the wide portion.

18. The housing of claim 12, wherein the sidewall component of the housing further comprises:

a first slot; and a second slot disposed diametrically opposite to the first slot and in parallel alignment with the first slot.

19. A housing for a lighting system, the housing comprising:

a sidewall component forming a portion of a sidewall of the housing, the sidewall component being shaped as a cylindrical tube and providing no flat section along any exterior portion or interior portion of the sidewall, the sidewall component comprising:

a first end defining a first opening; and a second end, disposed opposite to the first end, defining a second opening, a first notch that extends from the second opening towards the first end, and a second notch that extends from the second opening towards the first end, the second notch being disposed diametrically opposite to the first notch; and a top component coupled to the sidewall component, the top component comprising:

a base section, abutting at least a portion of the second end of the sidewall component, to substantially cover the second opening, the base section being flat in shape;

a first tab, extending from the base section and oriented at a right angle with respect to the base section, to substantially cover the first notch, the first tab being flat in shape such that a first gap is formed between the first tab and the sidewall component;

a first end portion, extending from the first tab, to cover the first gap;

a second tab, extending from the base section and oriented at a right angle with respect to the base section, to substantially cover the second notch, the second tab being flat in shape such that a second gap is formed between the second tab and the sidewall component;

a second end portion, extending from the second tab, to cover the second gap;

at least one knockout disposed on at least one of the base section, the first tab, or the second tab, wherein:

each of the sidewall component and the top component is formed as a single component; and each of the sidewall component and the top component is formed from steel having a uniform thickness that ranges between 0.6 mm and 2.0 mm.

20. A housing assembly, comprising:

the housing of claim 19, wherein:

the first and second tabs of the top component do not include a knockout; and the sidewall component of the housing further comprises a plurality of T-shaped openings disposed around the sidewall component;

a mounting ring, comprising:

a collar coupled to the sidewall component the housing; and a flange joined to the collar and disposed around the sidewall component of the housing; and a plurality of spring clips, each spring clip of the plurality of spring clips comprising:

a bent section coupled to the collar of the mounting ring and disposed outside the housing;

a push flange joined to the bent section and passing through a corresponding T-shaped opening of the plurality of T-shaped openings; and a handle joined to the push flange and disposed inside the cavity of the housing.

21. A housing assembly, comprising:

the housing of claim 19, wherein:

at least one of the first or second tabs of the top component of the housing includes a knockout; and the sidewall component of the housing further comprises a third opening and a fourth opening disposed diametrically opposite to the third opening; and a bar hanger assembly, coupled to the housing, to securely couple the housing assembly to a support structure comprising at least one of a wood joist, a metal joist, a T-bar, or a hat channel, the bar hanger assembly comprising:

a first bar hanger holder coupled to the third opening;

a first pair of bar hangers slidably coupled to the first bar hanger holder;

a second bar hanger holder coupled to the fourth opening; and a second pair of bar hangers slidably coupled to the second bar hanger holder.

* * * * *